United States Patent
Hamilton

(10) Patent No.: US 12,310,545 B1
(45) Date of Patent: May 27, 2025

(54) GENERAL PURPOSE TIDYING ROBOT

(71) Applicant: Clutterbot, Inc., Claymont, DE (US)

(72) Inventor: Justin David Hamilton, Wellington (NZ)

(73) Assignee: Clutterbot, Inc., Claymont, DE (US)

( * ) Notice: Subject to any disclaimer, the term of this patent is extended or adjusted under 35 U.S.C. 154(b) by 0 days.

(21) Appl. No.: 18/819,084

(22) Filed: Aug. 29, 2024

(51) Int. Cl.
| | | |
|---|---|---|
| *A47L 7/02* | (2006.01) | |
| *A47L 7/00* | (2006.01) | |
| *A47L 9/00* | (2006.01) | |
| *A47L 9/28* | (2006.01) | |
| *B25J 15/00* | (2006.01) | |
| *G05D 1/622* | (2024.01) | |

(52) U.S. Cl.
CPC ............... *A47L 7/02* (2013.01); *A47L 7/0085* (2013.01); *A47L 9/0063* (2013.01); *A47L 9/009* (2013.01); *A47L 9/2805* (2013.01); *A47L 9/2852* (2013.01); *A47L 9/2873* (2013.01); *A47L 9/2884* (2013.01); *A47L 9/2894* (2013.01); *B25J 15/0019* (2013.01); *G05D 1/622* (2024.01); *A47L 2201/022* (2013.01); *A47L 2201/04* (2013.01); *A47L 2201/06* (2013.01)

(58) Field of Classification Search
CPC ...... A47L 2201/04; A47L 7/02; A47L 7/0085; A47L 9/009; A47L 9/2805; A47L 9/2852; A47L 2201/06; B25J 15/0019
See application file for complete search history.

(56) References Cited

U.S. PATENT DOCUMENTS

| | | | |
|---|---|---|---|
| 9,827,678 B1* | 11/2017 | Gilbertson | .......... A47L 11/4055 |
| 11,407,118 B1* | 8/2022 | Augenbraun | .......... B25J 9/1612 |
| 12,064,880 B2* | 8/2024 | Hamilton | ............. B25J 11/008 |

(Continued)

FOREIGN PATENT DOCUMENTS

| AU | 2015218522 A1 | 9/2015 |
|---|---|---|
| CN | 110558900 A | 12/2019 |

(Continued)

OTHER PUBLICATIONS

Bahl, Laavanye et al. "Cu Bi: Room De cluttering Robot". May 2019. Retrieved from the Internet (Year: 2019).

(Continued)

*Primary Examiner* — Marc Carlson
(74) *Attorney, Agent, or Firm* — Carnelian Law, LLC

(57) ABSTRACT

Disclosed is a method and tidying robot system that performs it. A robot of a tidying robot system receives a starting location, a target cleaning area, and obstructions in its path navigating the target cleaning area. It determines a tidying strategy including vacuuming and obstruction handling. It executes the tidying strategy, vacuuming the target cleaning area and moving and/or avoiding obstructions, which are tidyable and/or movable objects. Where the obstruction may be picked up, the robot determines and executes a pickup strategy. Where the obstruction may be relocated but not picked up, it pushes the obstruction to a different location. Where the obstruction cannot be relocated/picked up, it alters its path to avoid the obstruction. The robot determines if the dirt collector is full, and if so, navigates to a base station configured to charge the robot and empty the dirt collector. Otherwise, it continues to execute the tidying strategy.

10 Claims, 75 Drawing Sheets

(56) References Cited

U.S. PATENT DOCUMENTS

| | | |
|---|---|---|
| 2007/0239315 A1 | 10/2007 | Sato et al. |
| 2016/0260161 A1* | 9/2016 | Atchley ................ G06Q 50/40 |
| 2017/0329333 A1* | 11/2017 | Passot ................ A47L 11/4011 |
| 2018/0104815 A1* | 4/2018 | Yang ..................... B25J 11/0085 |
| 2018/0284792 A1 | 10/2018 | Kleiner et al. |
| 2020/0156246 A1* | 5/2020 | Srivastav ............... G06V 10/82 |
| 2021/0069904 A1* | 3/2021 | Duan ....................... B25J 9/161 |
| 2022/0168893 A1 | 6/2022 | Hamilton et al. |
| 2022/0253056 A1* | 8/2022 | Ranjan .................. A47L 11/405 |
| 2024/0292990 A1* | 9/2024 | Hamilton .............. A47L 9/2857 |

FOREIGN PATENT DOCUMENTS

| | | | |
|---|---|---|---|
| CN | 114468859 A | | 5/2022 |
| CN | 117442132 A | * | 1/2024 |
| DE | 102017112740 A1 | * | 12/2018 |
| JP | 2020138046 A | | 9/2020 |
| KR | 20230139407 A | * | 10/2023 |
| KR | 20240133919 A | * | 9/2024 |
| WO | 2016105702 A1 | | 6/2016 |
| WO | 2020190272 A1 | | 9/2020 |
| WO | 2022115761 A1 | | 6/2022 |
| WO | WO-2023110103 A1 | * | 6/2023 |

OTHER PUBLICATIONS

FSP2024PCT PCT/IJS2022!077917 International Search Report.
FSP2024PCT PCT/US2022/077917 Written Opinion of the ISA.
Official Action Translation from Japanese Patent Office dated Apr. 2, 2024 for application JP 2023-533262 100107766.
PCT/US2021/061143 International Search Report Feb. 8, 2022.
PCT/US2021/061143 Written Opinion of the International Searching Authority Feb. 6, 2022.

* cited by examiner

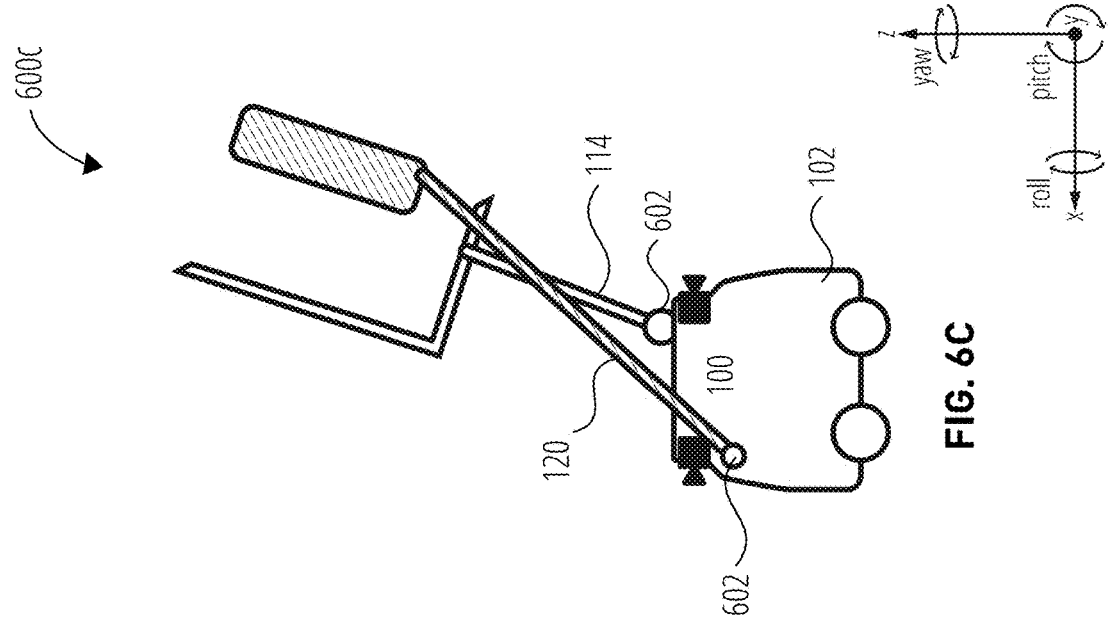
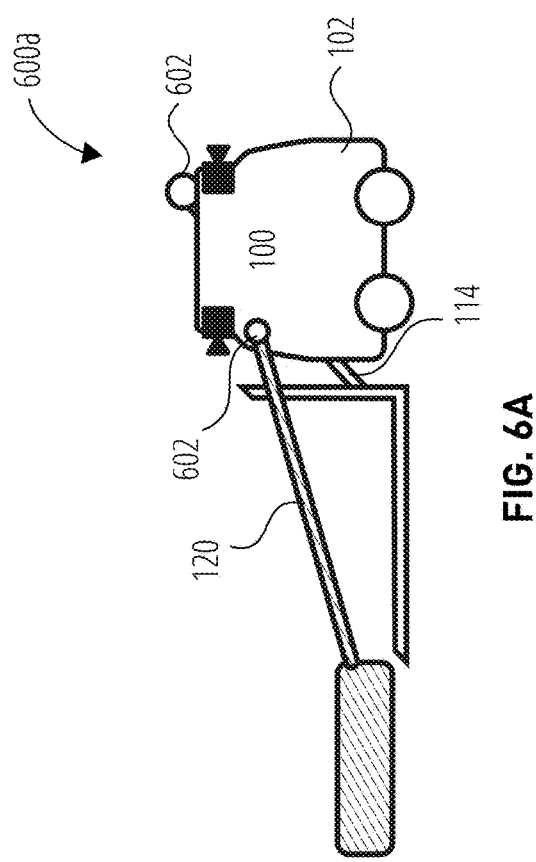
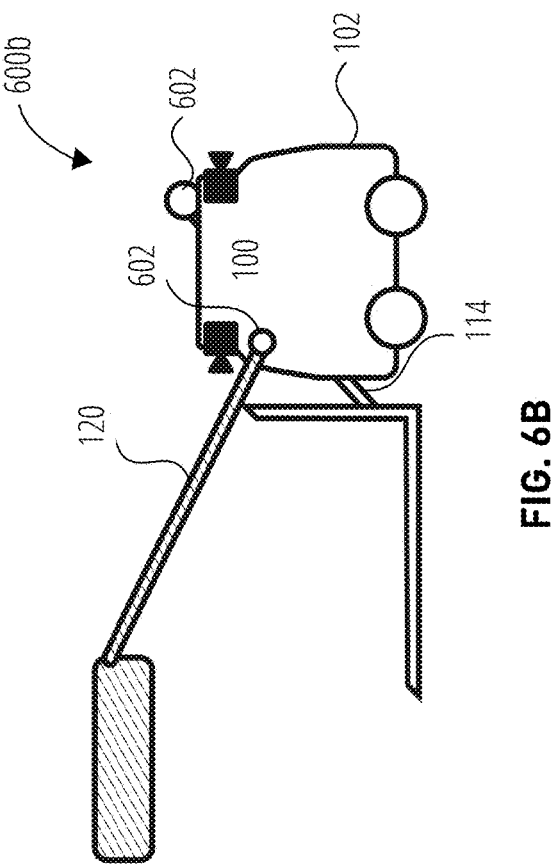
FIG. 6A
FIG. 6B
FIG. 6C

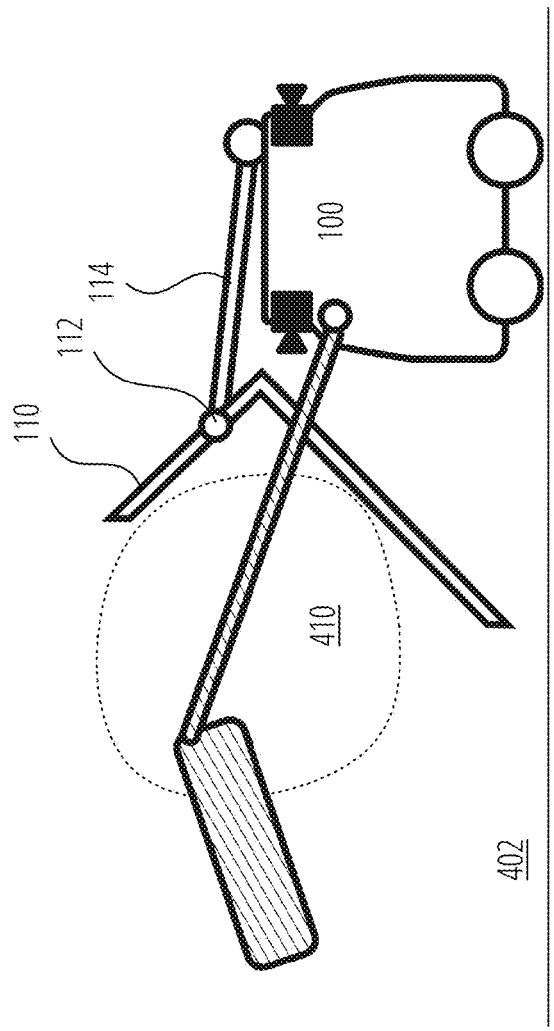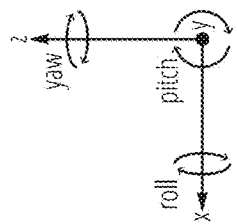
FIG. 7

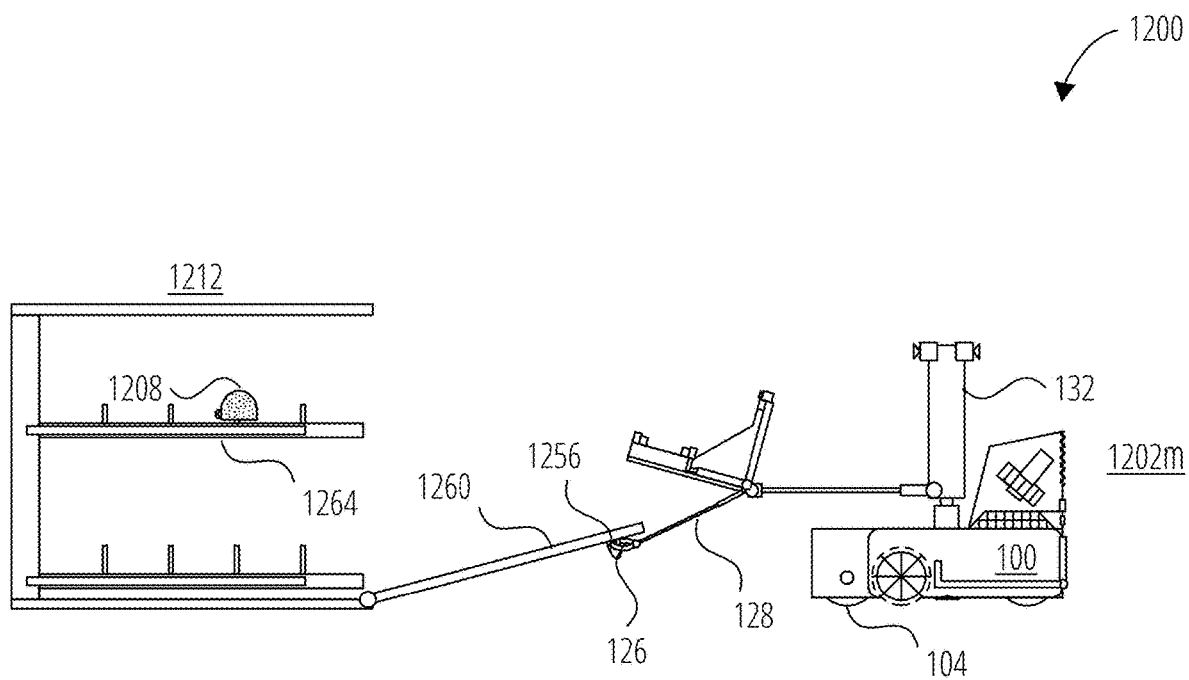
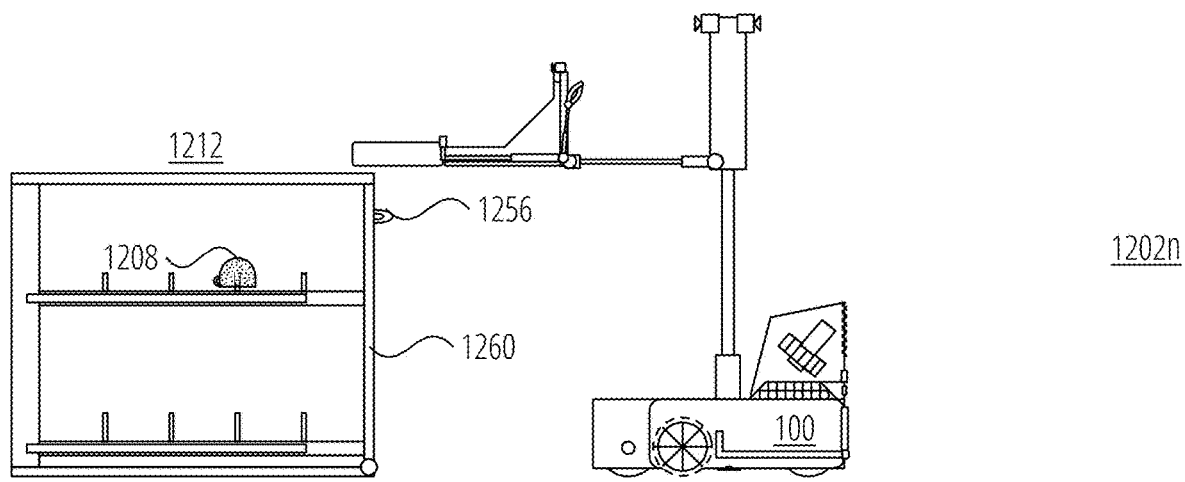
FIG. 12E

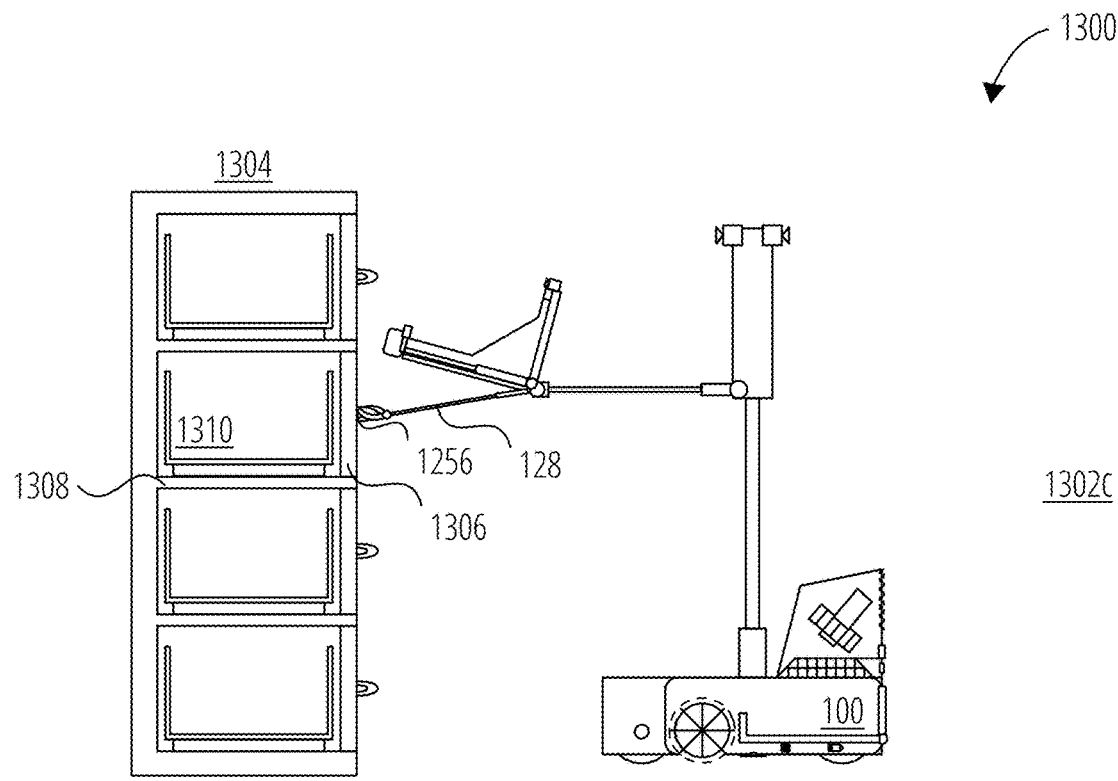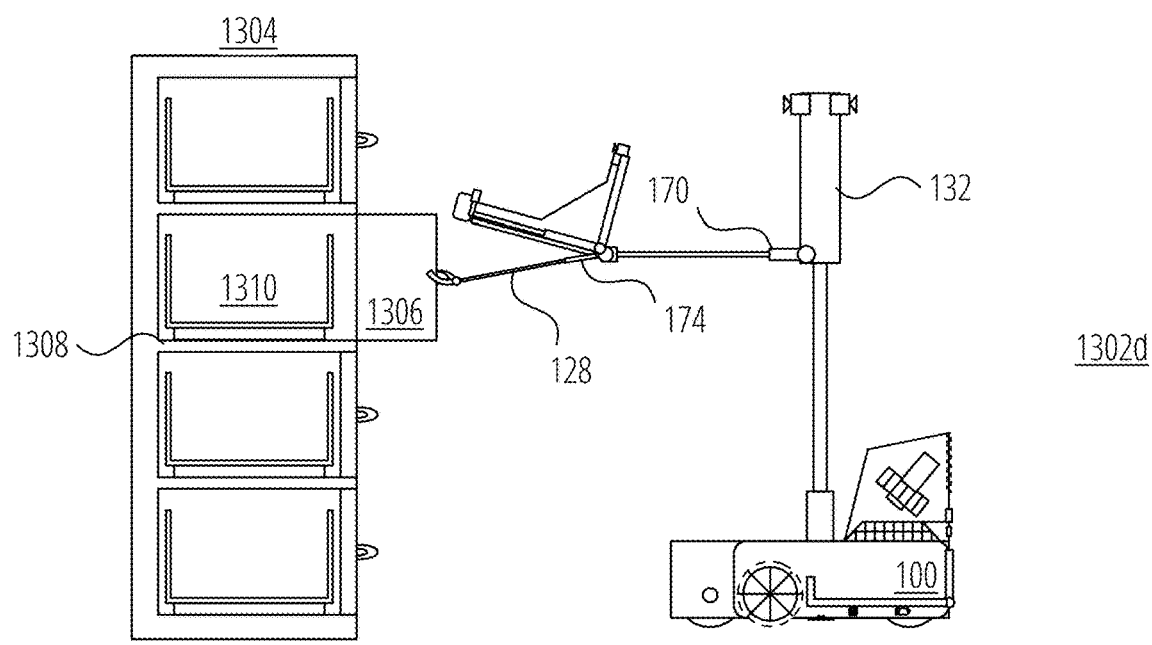
FIG. 13B

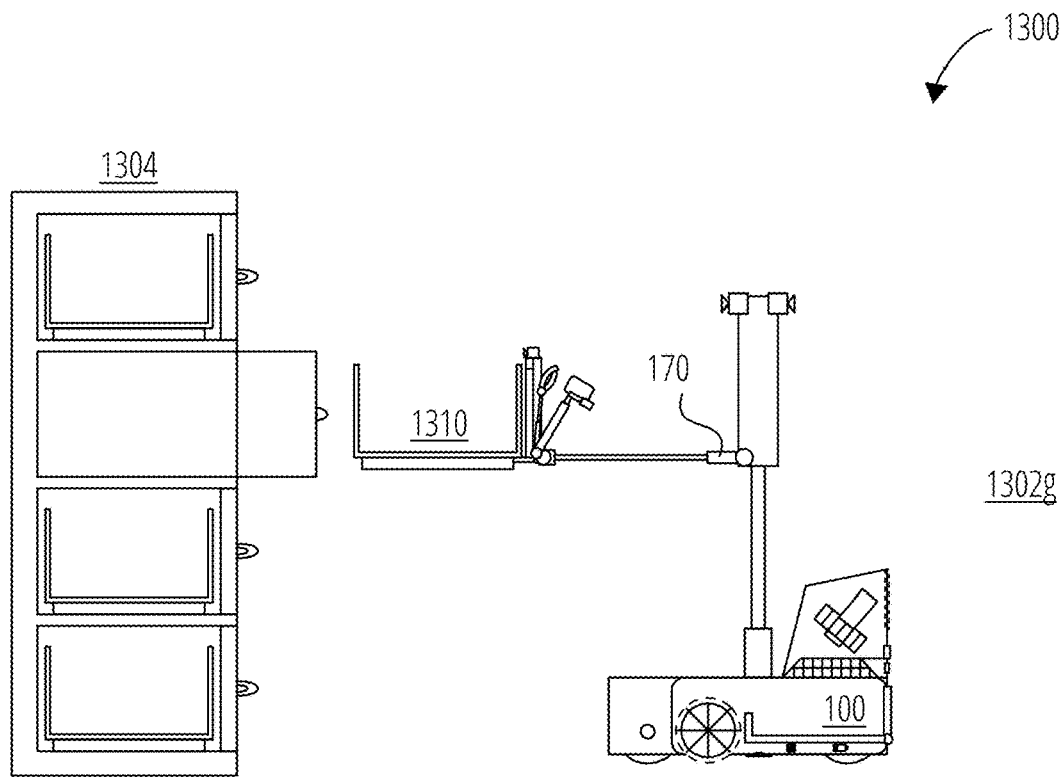
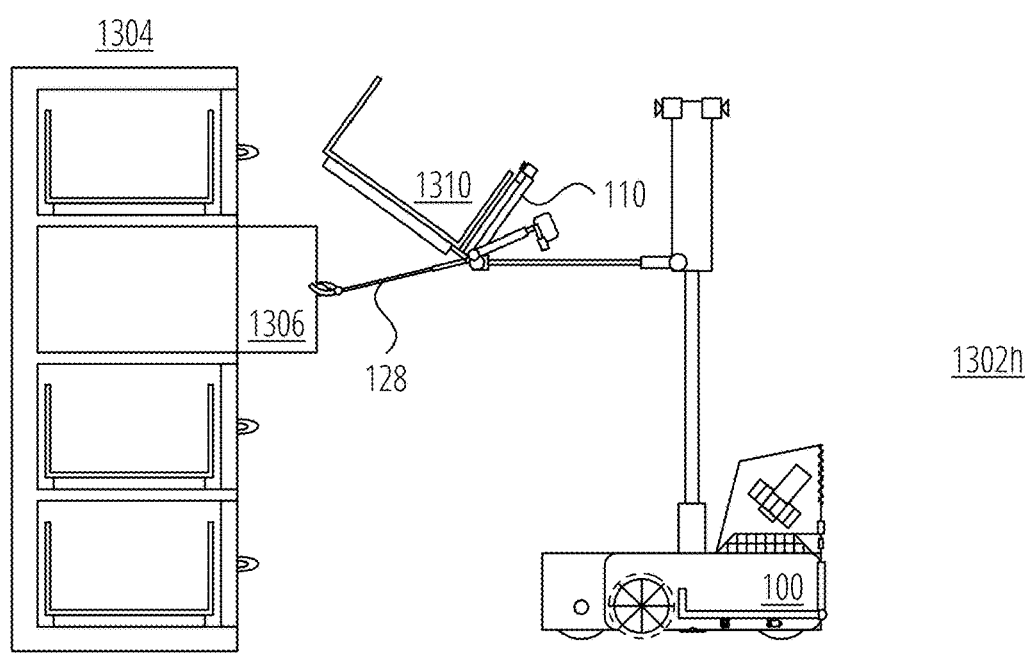
FIG. 13D

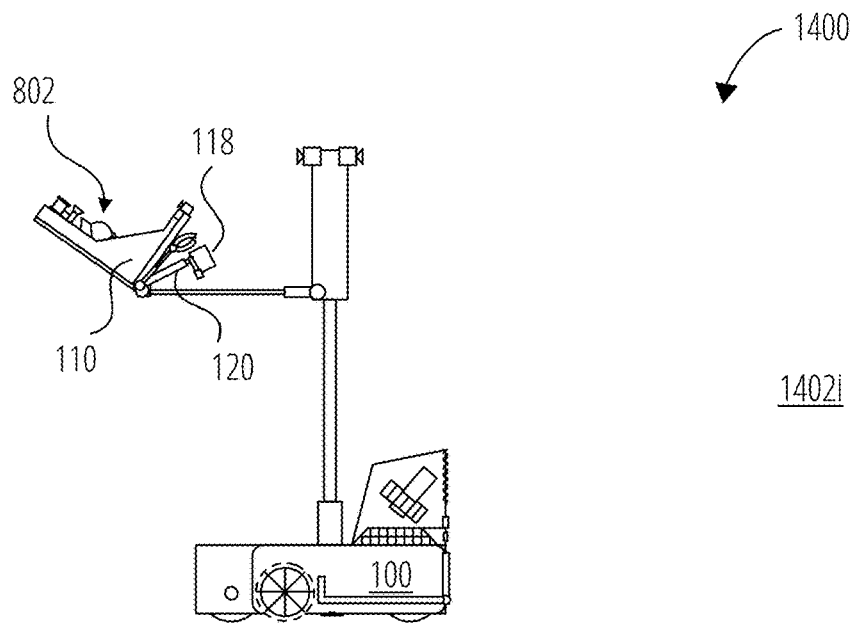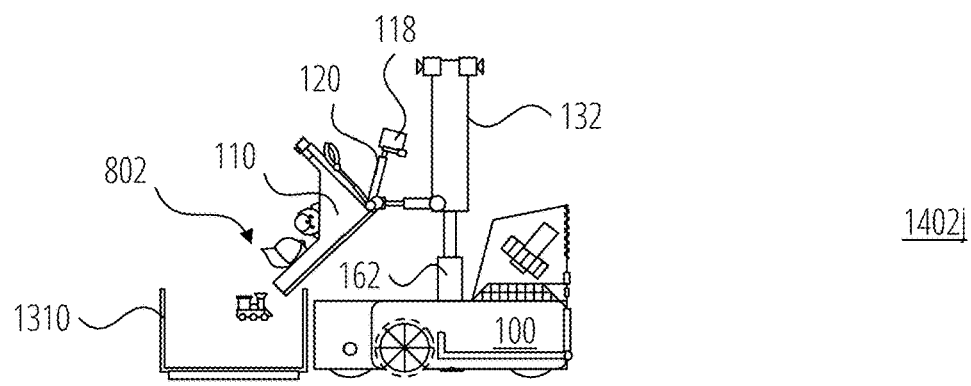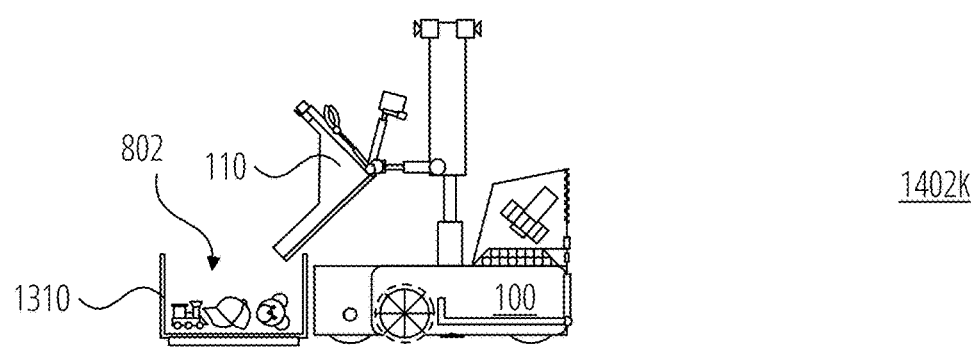
FIG. 14D

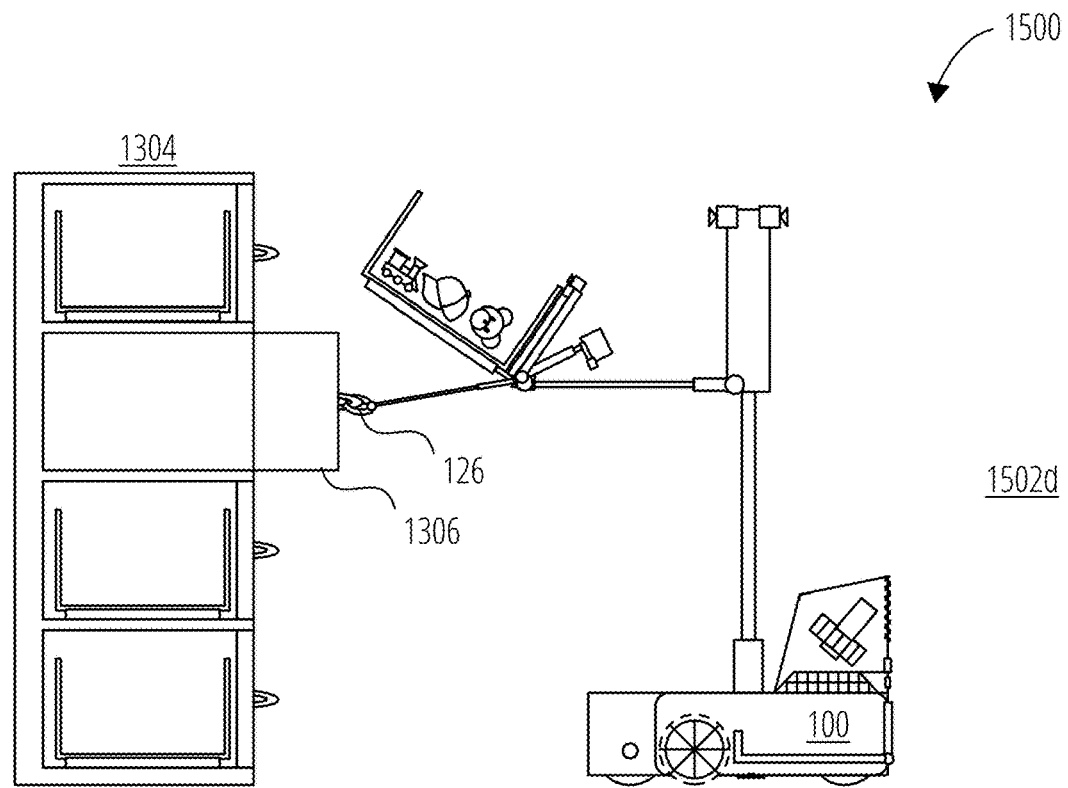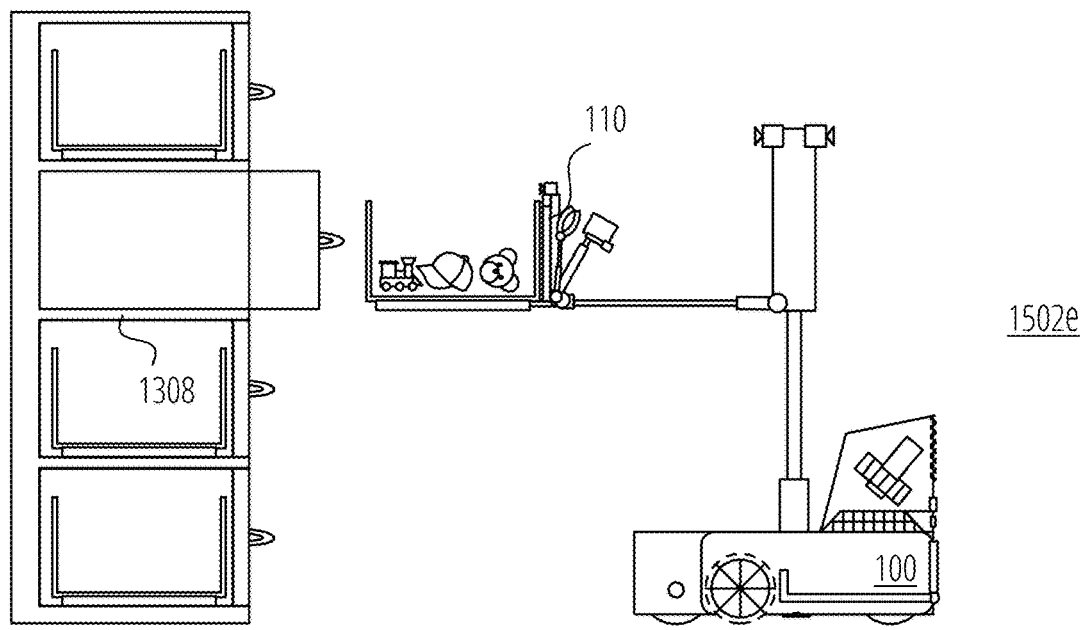
FIG. 15B

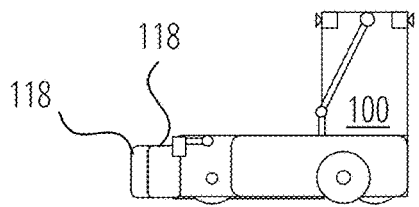
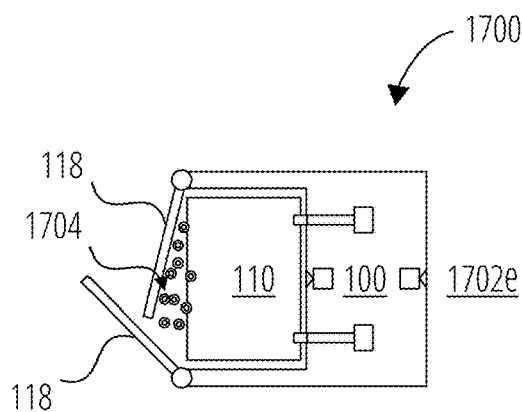
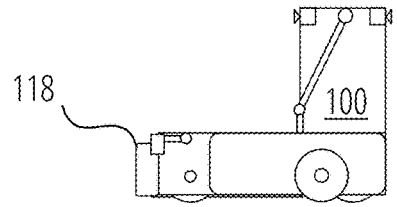
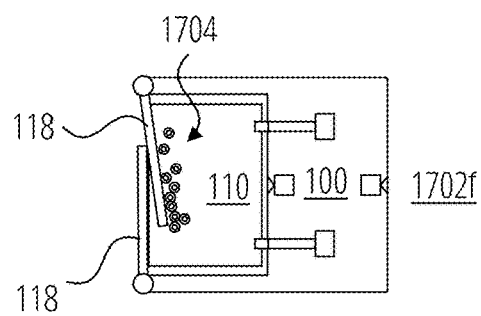
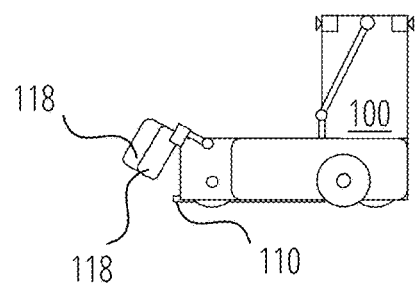
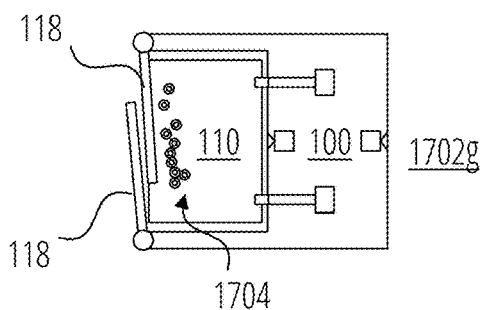
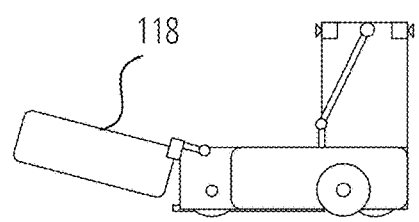
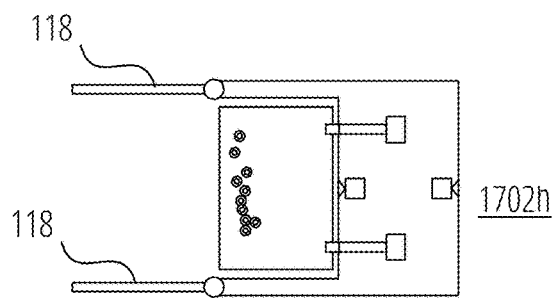
FIG. 17C
FIG. 17D

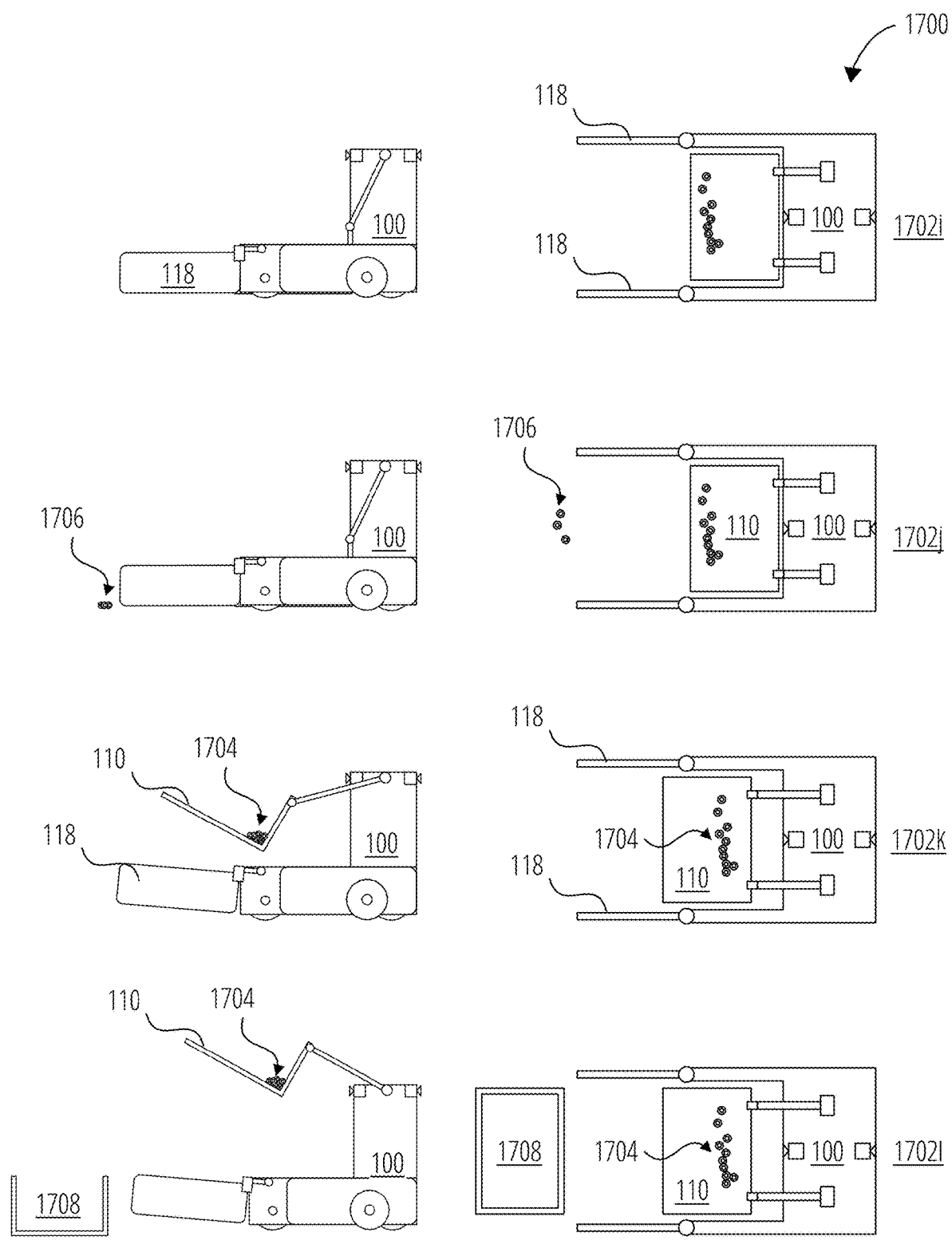
FIG. 17E        FIG. 17F

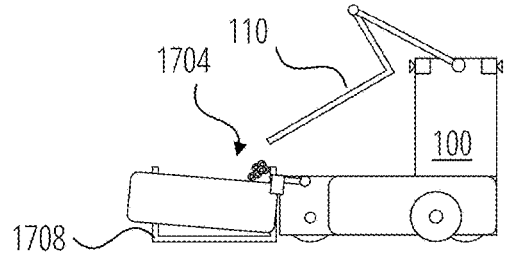
FIG. 17G
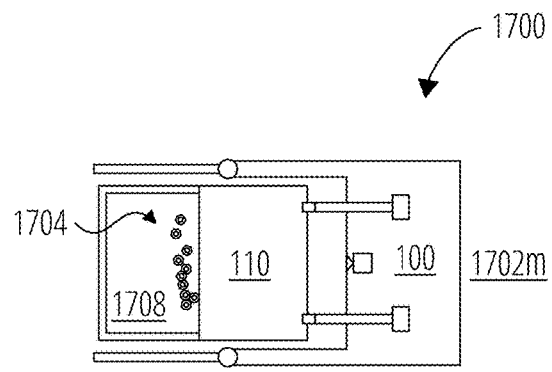
FIG. 17H
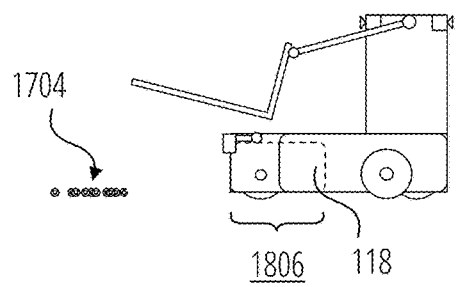
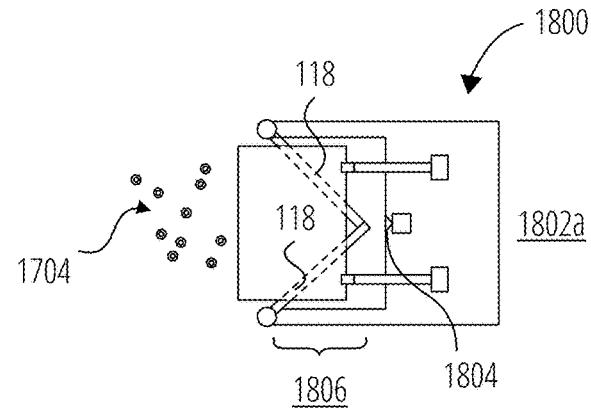
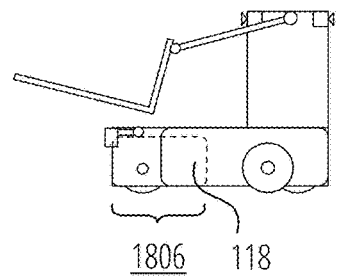
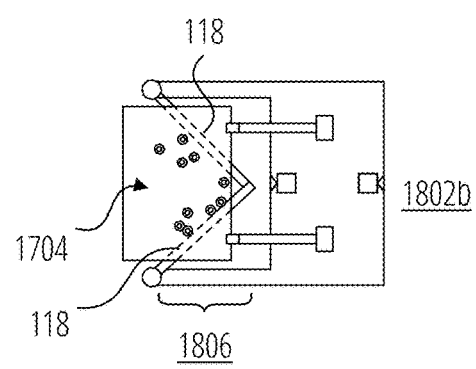
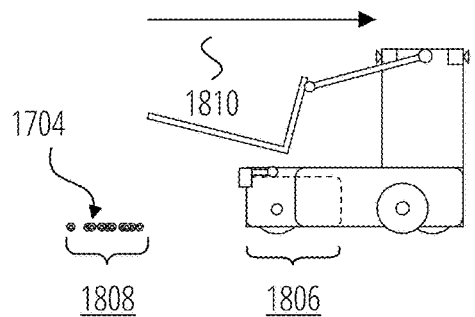
FIG. 18A
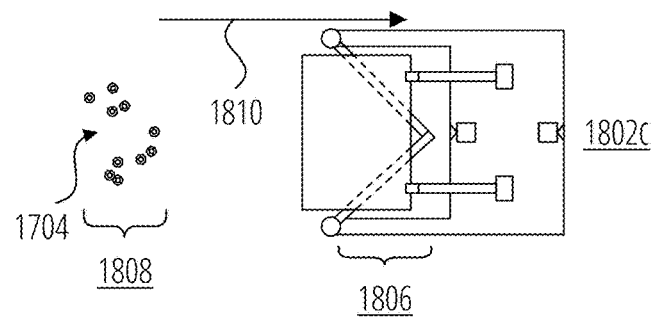
FIG. 18B

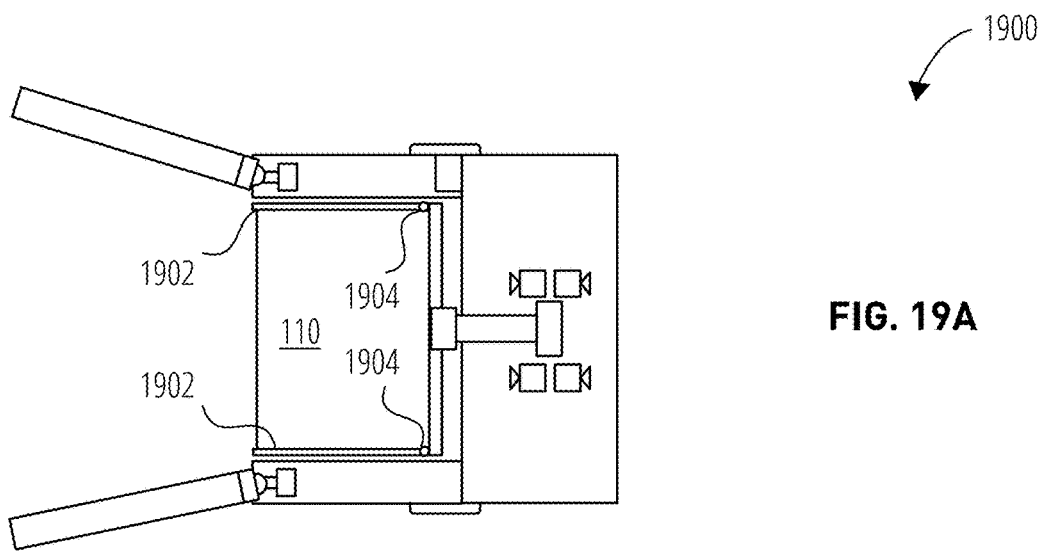
FIG. 19A
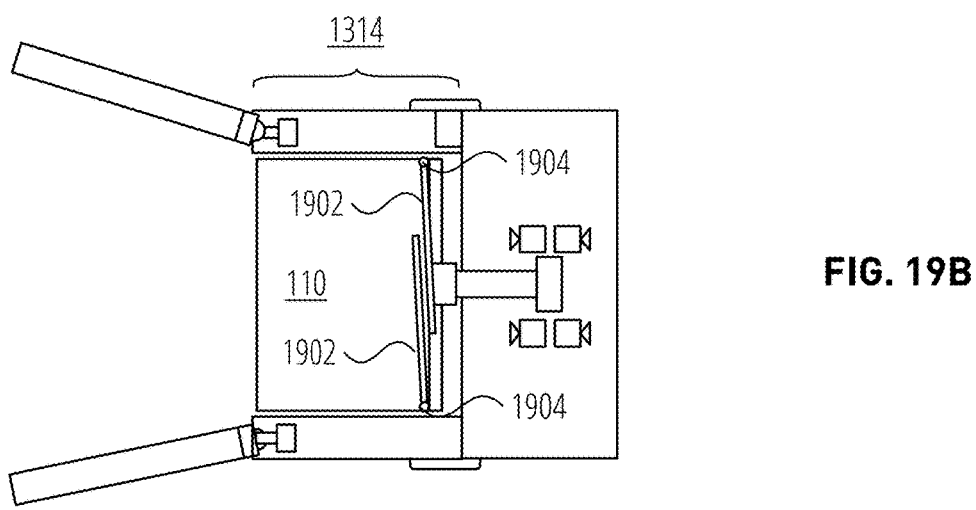
FIG. 19B
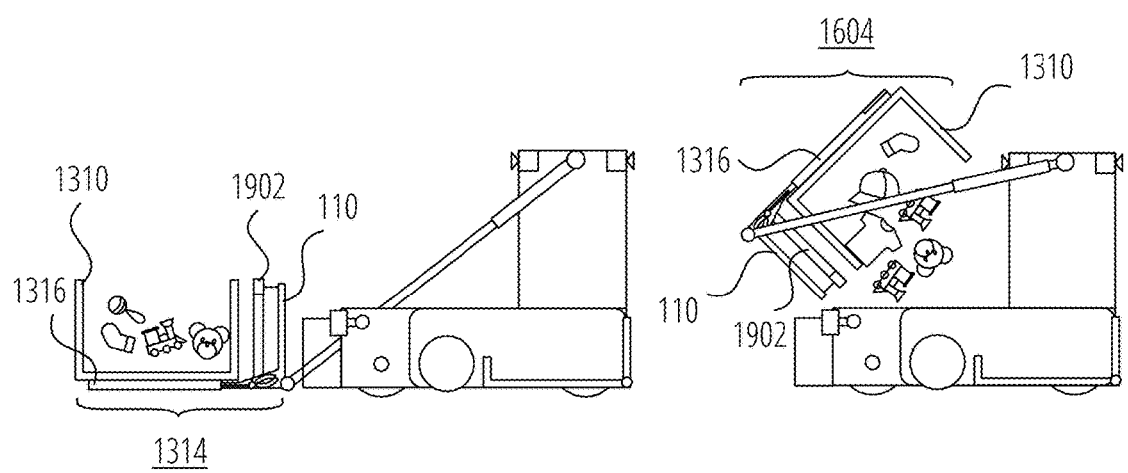
FIG. 19C
FIG. 19D

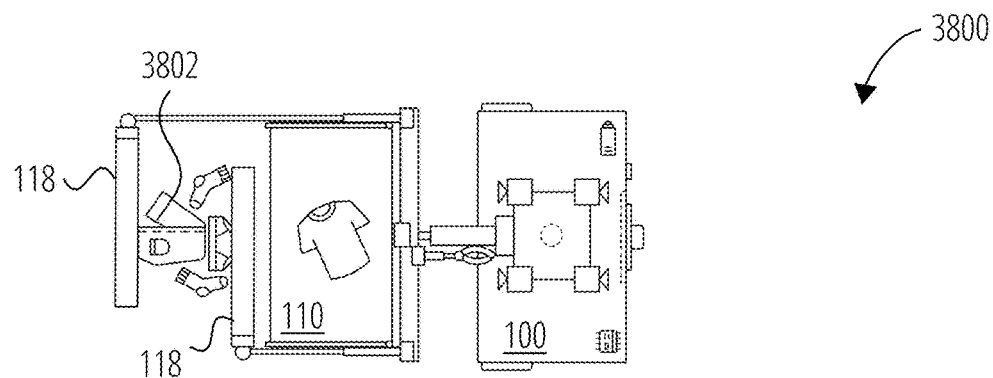
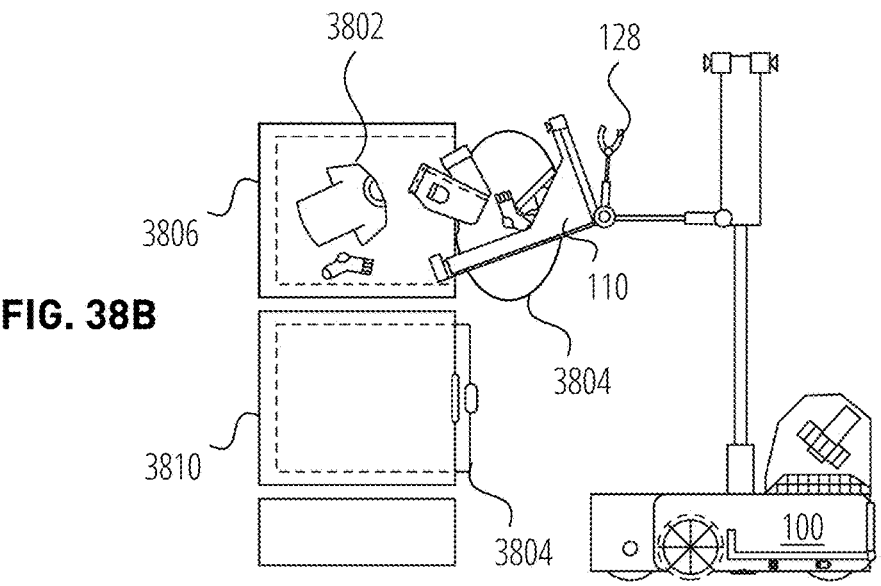
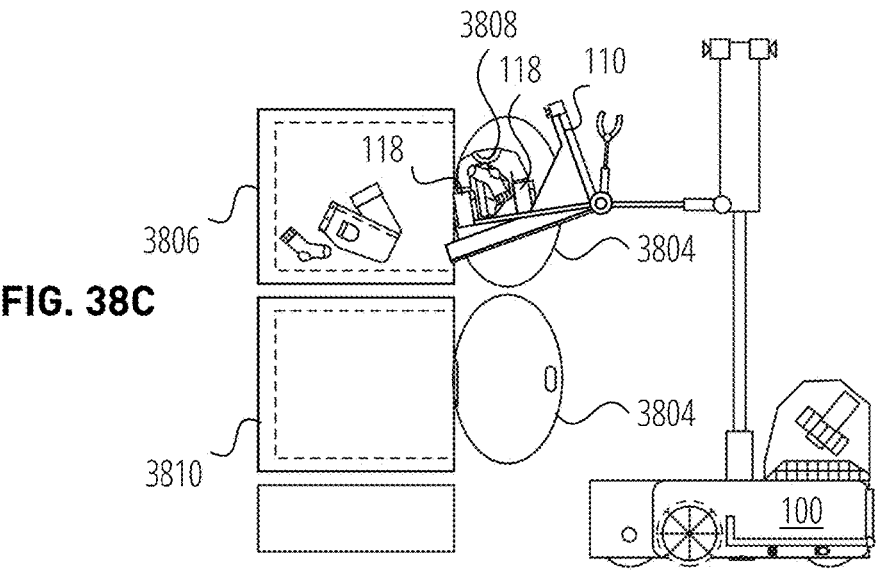

GENERAL PURPOSE TIDYING ROBOT

BACKGROUND

Obstructions or objects underfoot represent not only a nuisance but also a safety hazard. Thousands of people each year are injured in a fall at home. A floor cluttered with loose objects may represent a danger, but many people have limited time in which to address the clutter in their homes. Automated cleaning or tidying robots may represent an effective solution.

Tidying robots conventionally organize objects into standard categories based on an object's type and other attributes that may be determined with classification. However, conventional robotic tidying solutions may be limited in their capabilities, and may be unable to autonomously complete a comprehensive cleaning operation without additional manual work by the user.

There is, therefore, a need for a general purpose tidying robot capable of complex and comprehensive housework operations.

BRIEF SUMMARY

Disclosed is a method that includes receiving, at a robot of a tidying robot system, a starting location, a target cleaning area, attributes of the target cleaning area, and obstructions in a path of the robot navigating in the target cleaning area. The method further includes determining a tidying strategy including a vacuuming strategy and an obstruction handling strategy. The method further includes executing, by the robot, the tidying strategy by at least one of vacuuming the target cleaning area, moving an obstruction, and avoiding the obstruction, wherein the obstruction includes at least one of a tidyable object and a movable object. On condition the obstruction is able to be 4432, the method further includes determining a pickup strategy and executing the pickup strategy, capturing the obstruction with the pusher pads, and placing the obstruction in the scoop. On condition the obstruction is able to be relocated but not picked up, the method further includes pushing the obstruction to a different location using at least one of the pusher pads, the scoop, and the chassis. On condition the obstruction cannot be relocated and cannot be picked up, the method further includes avoiding the obstruction by altering the path of the robot around the obstruction. The method further includes determining if the dirt collector is full. On condition the dirt collector is full, the method further includes navigating to a base station having a base station charge connector configured to couple with the robot charge connector. Finally, on condition the dirt collector is not full, the method includes continuing to execute the tidying strategy.

Also disclosed is a tidying robot system comprising a robot, a base station, a robotic control system, and logic that when executed directs the robot to perform the disclosed method. The robot includes a chassis, a robot vacuum system with a vacuum generating assembly and a dirt collector, a capture and containment system with a scoop, a scoop motor configured to rotate the scoop into different positions at a scoop pivot point, a scoop arm, a scoop arm motor configured to rotate the scoop arm into different positions around a scoop arm pivot point, a scoop arm linear actuator configured to extend the scoop arm, pusher pads including a first pusher pad and a second pusher pad, a first pusher pad motor configured to rotate the first pusher pad around a first pad pivot point, a second pusher pad motor configured to rotate the second pusher pad around a second pad pivot point, pusher pad arms including a first pusher pad arm and a second pusher pad arm, a first pusher pad arm motor and a second pusher pad arm motor configured to rotate the respective first pusher pad arm and second pusher pad arm around pad arm pivot points, a first pusher pad arm linear actuator and a second pusher pad arm linear actuator configured to extend and retract the respective first pusher pad arm and second pusher pad arm, a gripper arm, a gripper arm motor configured to move the gripper arm around a gripper pivot point, a gripper arm linear actuator configured to extend and retract the gripper arm, a lifting column configured to raise and lower the capture and containment system through extension and retraction of a lifting column linear actuator, a robot charge connector, at least one wheel or one track for mobility of the robot, a battery, a processor, and a memory storing instructions that, when executed by the processor, allow operation and control of the robot. The base station includes a base station charge connector configured to couple with the robot charge connector. The robotic control system may be included in at least one of the robot and a cloud server.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1A shows a side view and FIG. 1B shows a top view.

FIG. 6A illustrates a lowered scoop position and lowered pusher position 600*a* for the tidying robot 100 in accordance with one embodiment.

FIG. 6B illustrates a lowered scoop position and raised pusher position 600*b* for the tidying robot 100 in accordance with one embodiment.

FIG. 6C illustrates a raised scoop position and raised pusher position 600c for the tidying robot 100 in accordance with one embodiment.

FIG. 7 illustrates a front dump action 800 for the tidying robot 100 in accordance with one embodiment.

FIG. 12A-FIG. 12E illustrate an obstruction placement procedure 1200 in accordance with one embodiment.

FIG. 13A-FIG. 13E illustrate an obstruction placement procedure 1300 in accordance with one embodiment.

FIG. 14A-FIG. 14D illustrate a process for tidying tidyable objects from a table into a bin 1400 in accordance with one embodiment.

FIG. 15A-FIG. 15D illustrate a portable bin placement procedure 1500 in accordance with one embodiment.

FIG. 17A-FIG. 17H illustrate a process for pre-sweeping a floor 1700 in accordance with one embodiment.

FIG. 18A and FIG. 18B illustrate a process for sweeping in an inverted wedge configuration 1800 in accordance with one embodiment.

FIG. 19A-FIG. 19D illustrate a tidying robot with movable scoop walls 1900 in various configurations in accordance with one embodiment.

FIG. 38A-FIG. 38C illustrate tidying robot laundry cleaning activities 3800 in accordance with one embodiment.

DETAILED DESCRIPTION

The disclosed solution illustrated herein and described in detail with respect to the figures referenced below is a general purpose tidying robot. This tidying robot may be configured to open and close cabinets and appliances, move bins and other objects off of and onto shelves and countertops, tidy and organize toys and other objects, vacuum, mop, and perform combinations of these tasks in an order determined by conditions detected in an environment to be tidied. In this disclosure, "configured to" perform a task refers to something physical, such as a device, circuit, memory storing program instructions executable to implement the task, etc.

The drawings in this disclosure may not be to scale, and are not intended to be limiting in size or location of specific elements of the tidying robot unless otherwise specified or claimed herein. One of ordinary skill in the art will realize that various elements may be larger, smaller, further forward, further back, higher, lower, or otherwise sized and located than is shown in the exemplary embodiments provided while remaining capable of performing the functions described herein.

Figure 1A:
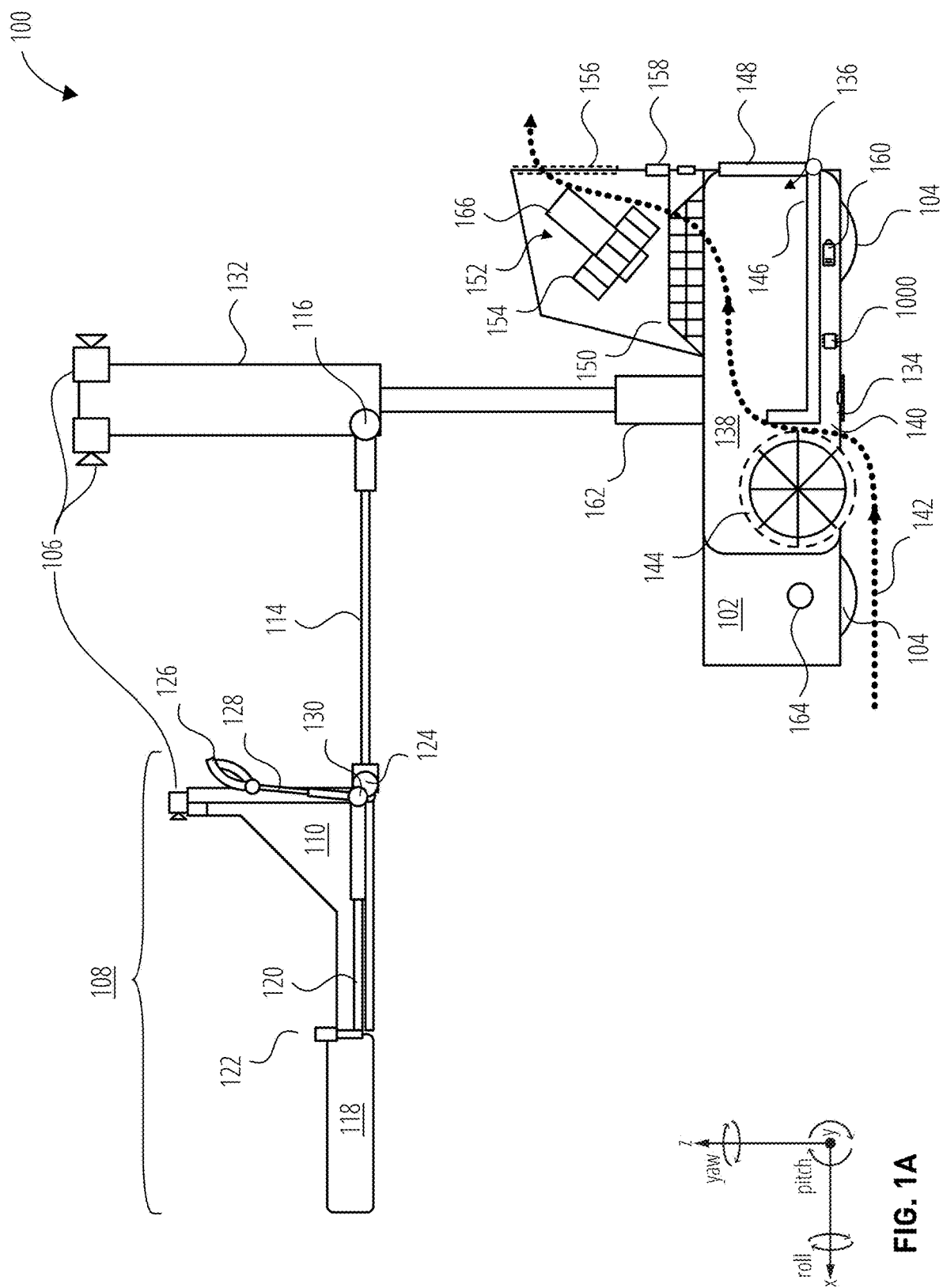
FIG. 1A and FIG. 1B illustrate a tidying robot 100 in accordance with one embodiment.

FIG. 1A-FIG. 2B illustrate a tidying robot 100 in accordance with one embodiment. FIG. 1A shows a side view and FIG. 1B shows a top view. The tidying robot 100 may comprise a chassis 102, a mobility system 104, a sensing system 106, a capture and containment system 108, and a robotic control system 1000. The capture and containment system 108 may further comprise a scoop 110, a scoop pivot point 112, a scoop arm 114, a scoop arm pivot point 116, two pusher pads 118 with pad pivot points 122, two pusher pad arms 120 with pad arm pivot points 124, an actuated gripper 126, a gripper arm 128 with a gripper pivot point 130, and a lifting column 132 to raise and lower the capture and containment system 108 to a desired height. In one embodiment, the gripper arm 128 may include features for gripping and/or gripping surfaces in lieu of or in addition to an actuated gripper 126.

The tidying robot 100 may further include a mop pad 134, and robot vacuum system 136. The robot vacuum system 136 may include a vacuum compartment 138, a vacuum compartment intake port 140, a cleaning airflow 142, a rotating brush 144, a dirt collector 146, a dirt release latch 148, a vacuum compartment filter 150, and a vacuum generating assembly 152 that includes a vacuum compartment fan 154, a vacuum compartment motor 166, and a vacuum compartment exhaust port 156. The tidying robot 100 may include a robot charge connector 158, a battery 160, and number of motors, actuators, sensors, and mobility components as described in greater detail below, and a robotic control system 1000 providing actuation signals based on sensor signals and user inputs.

The chassis 102 may support and contain the other components of the tidying robot 100. The mobility system 104 may comprise wheels as indicated, as well as caterpillar tracks, conveyor belts, etc., as is well understood in the art. The mobility system 104 may further comprise motors, servos, or other sources of rotational or kinetic energy to impel the tidying robot 100 along its desired paths. Mobility system 104 components may be mounted on the chassis 102 for the purpose of moving the entire robot without impeding or inhibiting the range of motion needed by the capture and containment system 108. Elements of a sensing system 106, such as cameras, lidar sensors, or other components, may be mounted on the chassis 102 in positions giving the tidying robot 100 clear lines of sight around its environment in at least some configurations of the chassis 102, scoop 110, pusher pad 118, and pusher pad arm 120 with respect to each other.

The chassis 102 may house and protect all or portions of the robotic control system 1000, (portions of which may also be accessed via connection to a cloud server) comprising in some embodiments a processor, memory, and connections to the mobility system 104, sensing system 106, and capture and containment system 108. The chassis 102 may contain other electronic components such as batteries 160, wireless communications 206 devices, etc., as is well understood in the art of robotics. The robotic control system 1000 may function as described in greater detail with respect to FIG. 10. The mobility system 104 and or the robotic control system 1000 may incorporate motor controllers used to control the speed, direction, position, and smooth movement of the motors. Such controllers may also be used to detect force feedback and limit maximum current (provide overcurrent protection) to ensure safety and prevent damage.

The capture and containment system 108 may comprise a scoop 110 with an associated scoop motor 180 to rotate the scoop 110 into different positions at the scoop pivot point 112. The capture and containment system 108 may also include a scoop arm 114 with an associated scoop arm motor 178 to rotate the scoop arm 114 into different positions around the scoop arm pivot point 116, and a scoop arm linear actuator 170 to extend the scoop arm 114. Pusher pads 118 of the capture and containment system 108 may have pusher pad motors 182 to rotate them into different positions around the pad pivot points 122. Pusher pad arms 120 may be associated with pusher pad arm motors 184 that rotate them around pad arm pivot points 124, as well as pusher pad arm linear actuators 172 to extend and retract the pusher pad arms 120. The gripper arm 128 may include a gripper arm motor 186 to move the gripper arm 128 around a gripper pivot point 130, as well as a gripper arm linear actuator 174 to extend and retract the gripper arm 128. In this manner the gripper arm 128 may be able to move and position itself and/or the actuated gripper 126 to perform the tasks disclosed herein.

Points of connection shown herein between the scoop arms and pusher pad arms are exemplary positions and are not intended to limit the physical location of such points of connection. Such connections may be made in various locations as appropriate to the construction of the chassis and arms, and the applications of intended use. In some embodiments, the pusher pad arms 120 may attach to the scoop 110, as shown here. In other embodiments, the pusher pad arm 120 may attach to the chassis 102 as shown, for example, in FIG. 5A or FIG. 8. It will be well understood by one of ordinary skill in the art that the configurations illustrated may be designed to perform the basic motions described with respect to FIG. 4A-FIG. 9 and the processes illustrated elsewhere herein.

The geometry of the scoop 110 and the disposition of the pusher pads 118 and pusher pad arms 120 with respect to the scoop 110 may describe a containment area, illustrated more clearly in FIG. 4A-FIG. 4E, in which objects may be securely carried. Servos, direct current (DC) motors, or other actuators at the scoop arm pivot point 116, pad pivot points 122, and pad arm pivot points 124 may be used to adjust the disposition of the scoop 110, pusher pads 118, and pusher pad arms 120 between fully lowered scoop and grabber positions and raised scoop and grabber positions, as illustrated with respect to FIG. 4A-FIG. 4C.

In some embodiments, gripping surfaces may be configured on the sides of the pusher pads 118 facing inward toward objects to be lifted. These gripping surfaces may provide cushion, grit, elasticity, or some other feature that increases friction between the pusher pads 118 and objects to be captured and contained. In some embodiments, the pusher pad 118 may include suction cups in order to better grasp objects having smooth, flat surfaces. In some embodiments, the pusher pads 118 may be configured with sweeping bristles. These sweeping bristles may assist in moving small objects from the floor up onto the scoop 110. In some embodiments, the sweeping bristles may angle down and inward from the pusher pads 118, such that, when the pusher pads 118 sweep objects toward the scoop 110, the sweeping bristles form a ramp, allowing the foremost bristles to slide beneath the object, and direct the object upward toward the pusher pads 118, facilitating capture of the object within the scoop and reducing a tendency of the object to be pressed against the floor, increasing its friction and making it more difficult to move.

The capture and containment system 108, as well as some portions of the sensing system 106, may be mounted atop a lifting column 132, such that these components may be raised and lowered with respect to the ground to facilitate performance of complex tasks. A lifting column linear actuator 162 may control the elevation of the capture and containment system 108 by extending and retracting the lifting column 132. A lifting column motor 176 may allow the lifting column 132 to rotate so that the capture and containment system 108 may be moved with respect to the tidying robot 100 base or chassis 102 in all three dimensions.

The tidying robot 100 may include floor cleaning components such as a mop pad 134 and a vacuuming system. The mop pad 134 may be able to raise and lower with respect to the bottom of the tidying robot 100 chassis 102, so that it may be placed in contact with the floor when desired. The mop pad 134 may include a drying element to dry wet spots detected on the floor. In one embodiment, the tidying robot 100 may include a fluid reservoir, which may be in contact with the mop pad 134 and able to dampen the mop pad 134 for cleaning. In one embodiment, the tidying robot 100 may be able to spray cleaning fluid from a fluid reservoir onto the floor in front of or behind the tidying robot 100, which may then be absorbed by the mop pad 134.

The vacuuming system may include a vacuum compartment 138, which may have a vacuum compartment intake port 140 allowing cleaning airflow 142 into the vacuum compartment 138. The vacuum compartment intake port 140 may be configured with a rotating brush 144 to impel dirt and dust into the vacuum compartment 138. Cleaning airflow 142 may be induced to flow by a vacuum compartment fan 154 powered by a vacuum compartment motor 166. cleaning airflow 142 may pass through the vacuum compartment 138 from the vacuum compartment intake port 140 to a vacuum compartment exhaust port 156, exiting the vacuum compartment 138 at the vacuum compartment exhaust port 156. The vacuum compartment exhaust port 156 may be covered by a grating or other element permeable to cleaning airflow 142 but able to prevent the ingress of objects into the chassis 102 of the tidying robot 100.

Figure 3B:
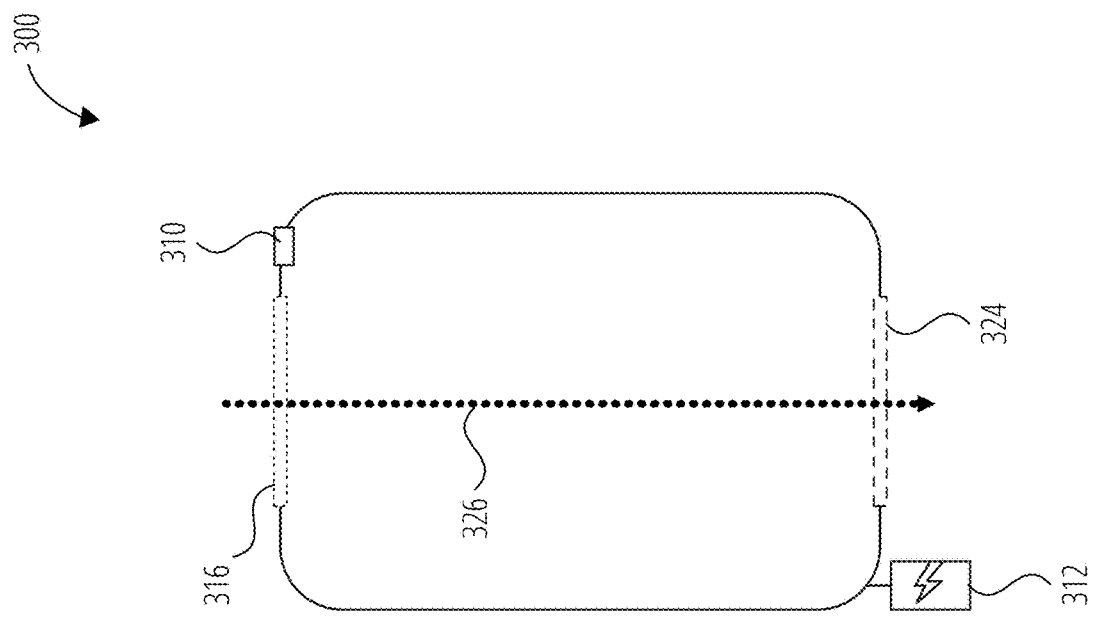
FIG. 3A and FIG. 3B illustrate a left side view and a top view of a base station 300, respectively, in accordance with one embodiment.
Figure 3A:
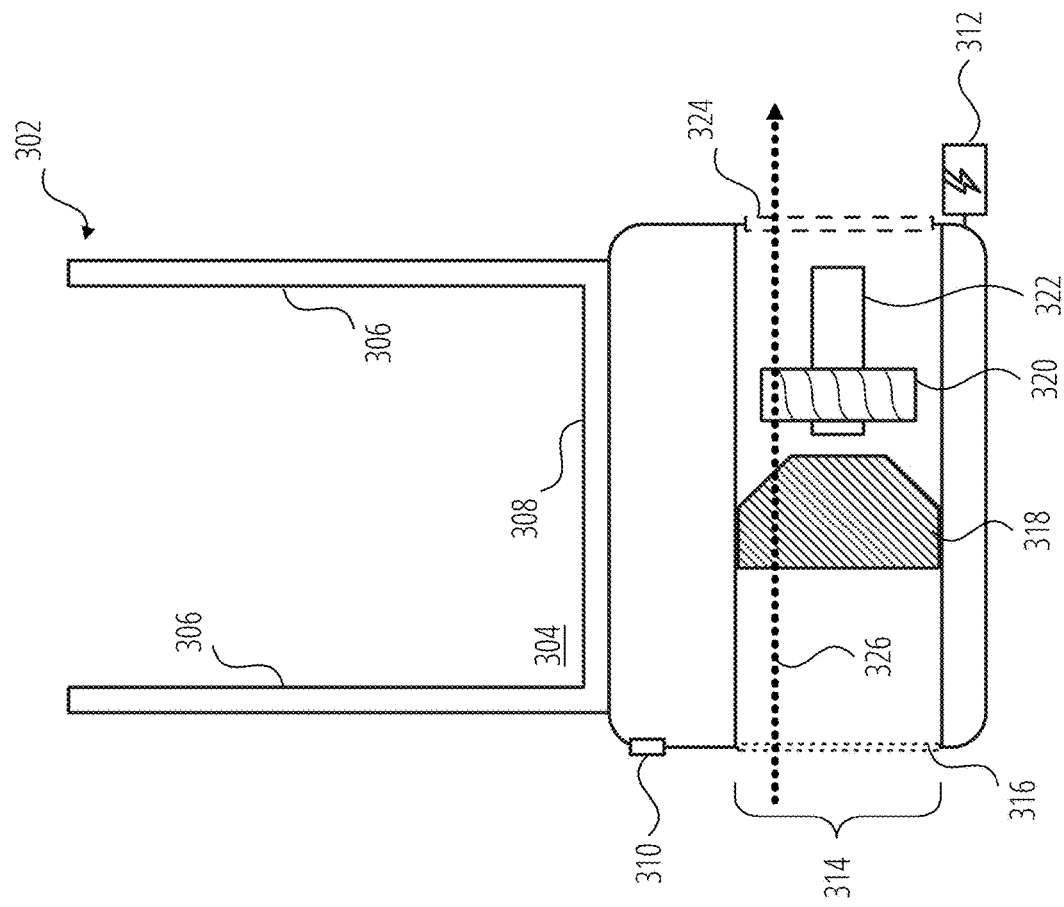

A vacuum compartment filter 150 may be disposed between the vacuum compartment intake port 140 and the vacuum compartment exhaust port 156. The vacuum compartment filter 150 may prevent dirt and dust from entering and clogging the vacuum compartment fan 154. The vacuum compartment filter 150 may be disposed such that blocked dirt and dust are deposited within a dirt collector 146. The dirt collector 146 may be closed off from the outside of the chassis 102 by a dirt release latch 148. The dirt release latch 148 may be configured to open when the tidying robot 100 is docked at a base station 300 with a vacuum emptying system 314, as is illustrated in FIG. 3A and FIG. 3B and described below. A robot charge connector 158 may connect the tidying robot 100 to a base station charge connector 310, allowing power from the base station 300 to charge the tidying robot 100 battery 160.

Figure 2A:
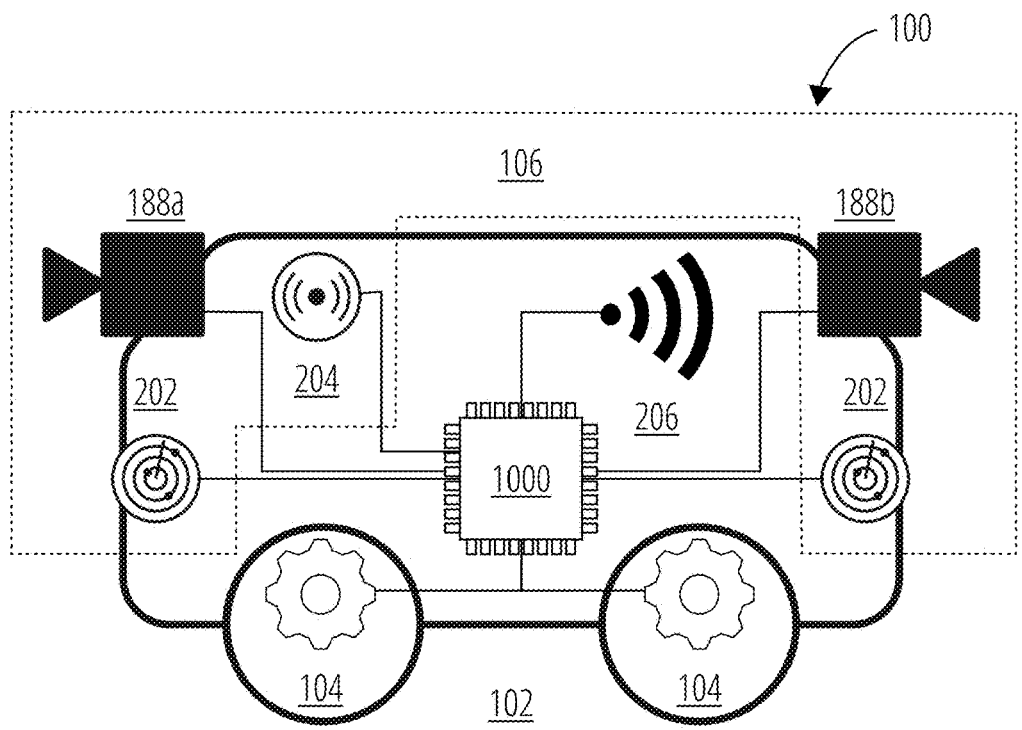
FIG. 2A and FIG. 2B illustrate a simplified side view and top view of a chassis 102 of the tidying robot 100, respectively.
Figure 2B:
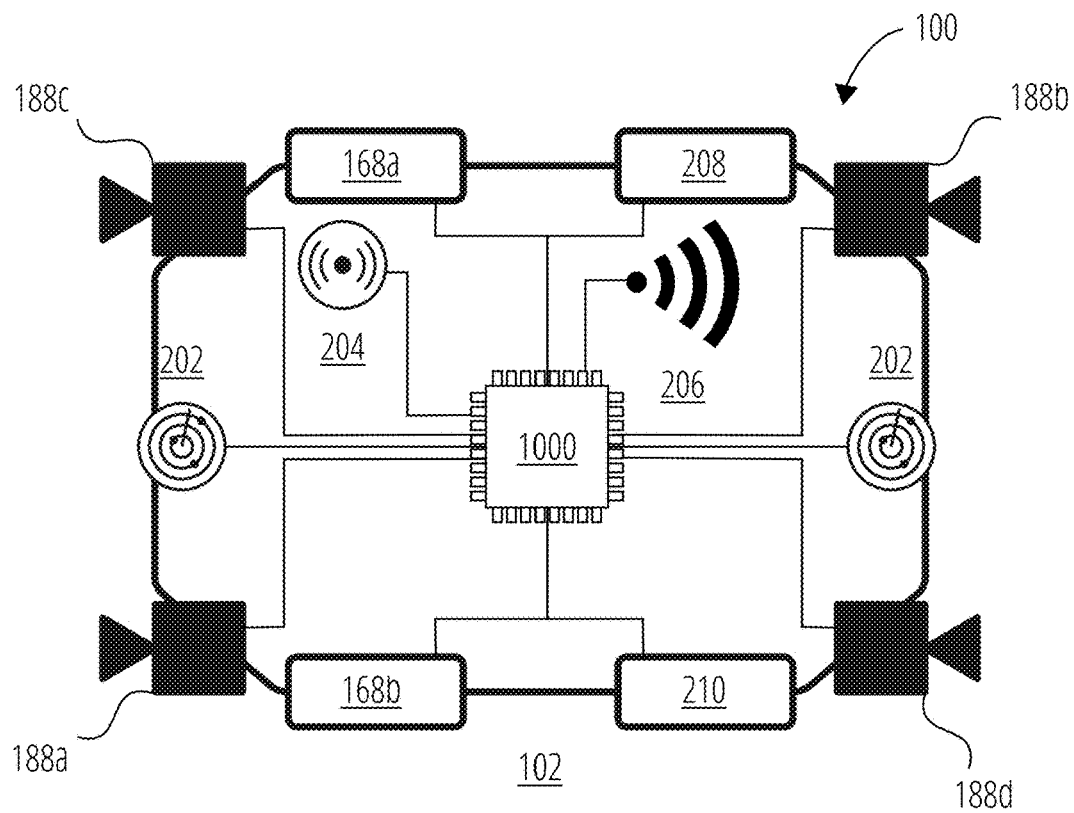

FIG. 2A and FIG. 2B illustrate a simplified side view and top view of a chassis 102, respectively, in order to show in more detail aspects of the mobility system 104, the sensing system 106, and the communications 206, in connection with the robotic control system 1000. In some embodiments, the communications 206 may include the network interface 1012 described in greater detail with respect to robotic control system 1000.

Figure 1B:
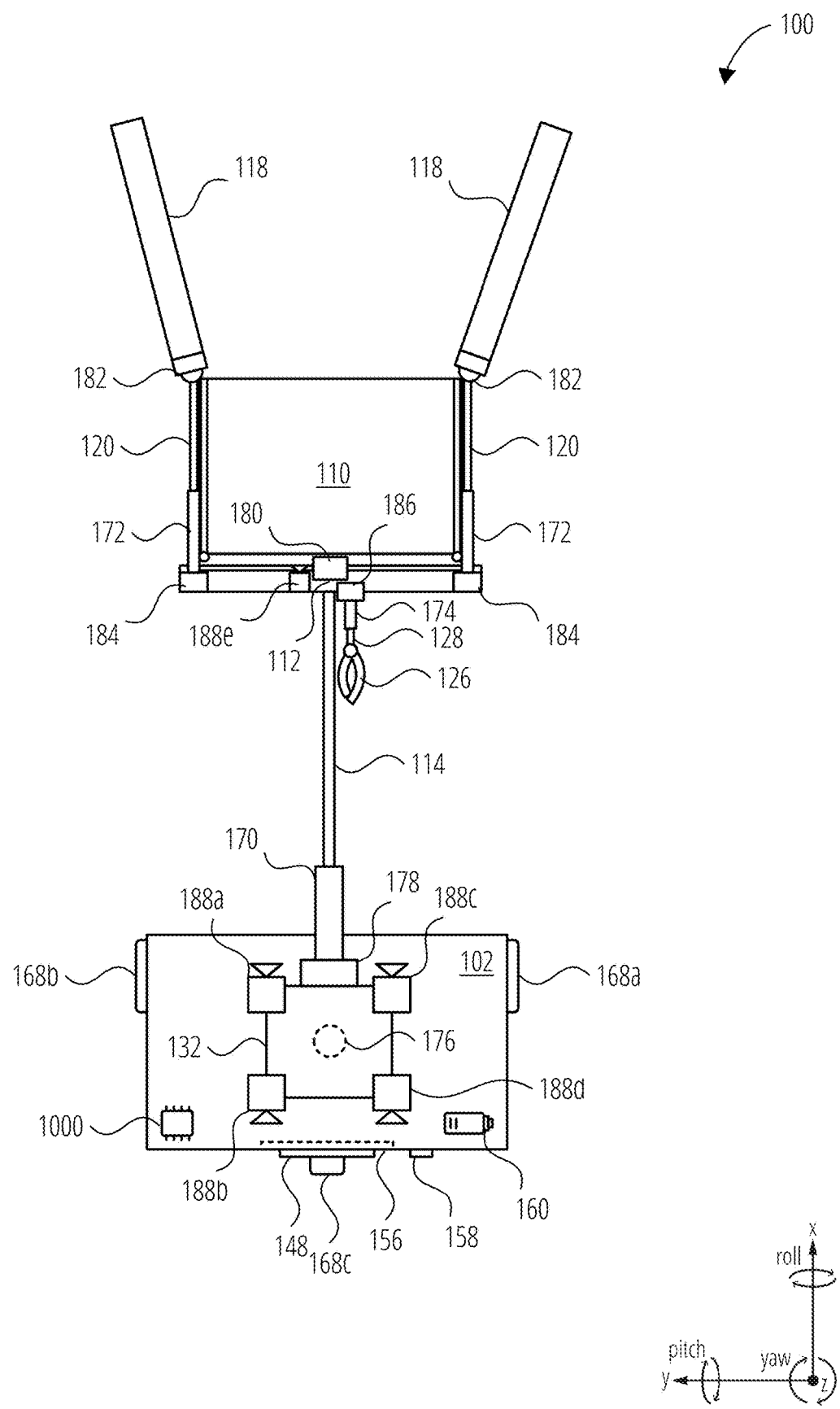

In one embodiment, the mobility system 104 may comprise a left front wheel 168b and a right front wheel 168a powered by mobility system motor 164, and a single rear wheel 168c, as illustrated in FIG. 1A and FIG. 1B. The single rear wheel 168c may be actuated or may be a passive roller or caster providing support and reduced friction with no driving force.

In one embodiment, the mobility system 104 may comprise a right front wheel 168a, a left front wheel 168b, a right rear wheel 208, and a left rear wheel 210. The tidying robot 100 may have front-wheel drive, where right front wheel 168a and left front wheel 168b are actively driven by one or more actuators or motors, while the right rear wheel 208 and left rear wheel 210 spin on an axle passively while supporting the rear portion of the chassis 102. In another embodiment, the tidying robot 100 may have rear-wheel drive, where the right rear wheel 208 and left rear wheel 210 are actuated and the front wheels turn passively. In another embodiment, the tidying robot 100 may have additional motors to provide all-wheel drive, may use a different number of wheels, or may use caterpillar tracks or other mobility devices in lieu of wheels.

The sensing system 106 may further comprise cameras such as the front left camera 188a, rear left camera 188b, front right camera 188c, rear right camera 188d, and scoop camera 188e, light detecting and ranging (LIDAR) sensors such as lidar sensors 202, and inertial measurement unit (IMU) sensors, such as IMU sensors 204. In some embodiments, there may be a single front camera and a single rear camera.

FIG. 3A and FIG. 3B illustrate a base station 300 in accordance with one embodiment. FIG. 3A shows a left side view and FIG. 3B shows a top view. The base station 300 may comprise an object collection bin 302 with a storage compartment 304 to hold tidyable objects, heavy dirt and debris, or other obstructions. The storage compartment 304 may be formed by bin sides 306 and a bin base 308. "Tidyable objects" in this disclosure are elements detected in the environment that may be moved by the robot and put away in a home location. These objects may be of a type and size such that the robot may autonomously put them away, such as toys, clothing, books, stuffed animals, soccer balls, garbage, remote controls, keys, cellphones, etc. The base station 300 may further comprise a base station charge connector 310, a power source connection 312, and a vacuum emptying system 314 including a vacuum emptying system intake port 316, a vacuum emptying system filter bag 318, a vacuum emptying system fan 320, a vacuum emptying system motor 322, and a vacuum emptying system exhaust port 324.

The object collection bin 302 may be configured on top of the base station 300 so that a tidying robot 100 may deposit objects from the scoop 110 into the object collection bin 302. The base station charge connector 310 may be electrically coupled to the power source connection 312. The power source connection 312 may be a cable connector configured to couple through a cable to an alternating current (AC) or direct current (DC) source, a battery, or a wireless charging port, as will be readily apprehended by one of ordinary skill in the art. In one embodiment, the power source connection 312 is a cable and male connector configured to couple with 120V AC power, such as may be provided by a conventional U. S. home power outlet.

The vacuum emptying system 314 may include a vacuum emptying system intake port 316 allowing vacuum emptying airflow 326 into the vacuum emptying system 314. The vacuum emptying system intake port 316 may be configured with a flap or other component to protect the interior of the vacuum emptying system 314 when a tidying robot 100 is not docked. A vacuum emptying system filter bag 318 may be disposed between the vacuum emptying system intake port 316 and a vacuum emptying system fan 320 to catch dust and dirt carried by the vacuum emptying airflow 326 into the vacuum emptying system 314. The vacuum emptying system fan 320 may be powered by a vacuum emptying system motor 322. The vacuum emptying system fan 320 may pull the vacuum emptying airflow 326 from the vacuum emptying system intake port 316 to the vacuum emptying system exhaust port 324, which may be configured to allow the vacuum emptying airflow 326 to exit the vacuum emptying system 314. The vacuum emptying system exhaust port 324 may be covered with a grid to protect the interior of the vacuum emptying system 314.

Figure 4C:
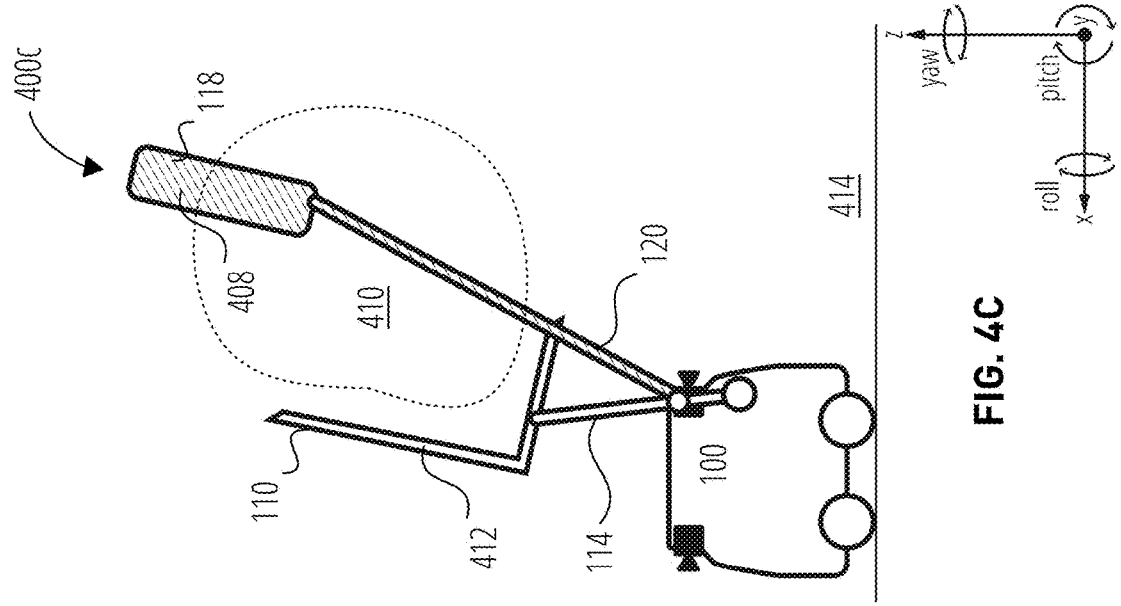
FIG. 4C illustrates a raised scoop position and raised pusher position 400*c* for the tidying robot 100 in accordance with one embodiment.
Figure 4A:
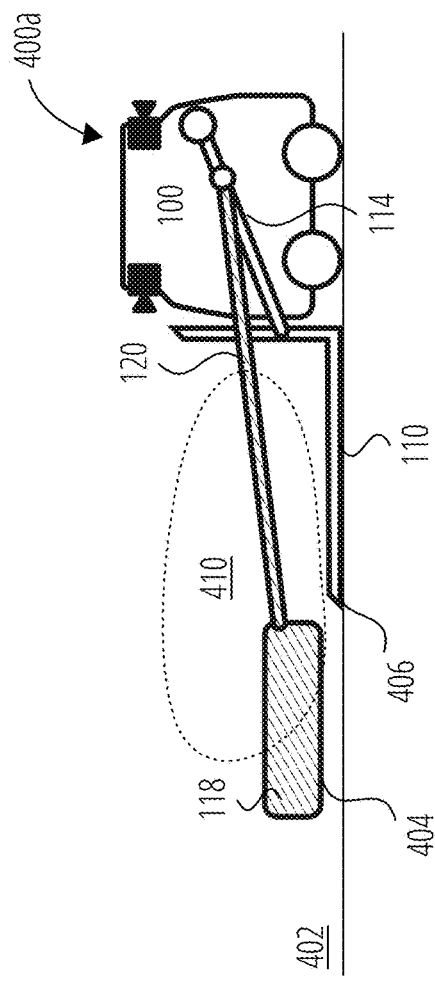
FIG. 4A illustrates a lowered scoop position and lowered pusher position 400*a* for the tidying robot 100 in accordance with one embodiment.

FIG. 4A illustrates a tidying robot 100 such as that introduced with respect to FIG. 1A disposed in a lowered scoop position and lowered pusher position 400a. In this configuration, the pusher pads 118 and pusher pad arms 120 rest in a lowered pusher position 404, and the scoop 110 and scoop arm 114 rest in a lowered scoop position 406 at the front 402 of the tidying robot 100. In this position, the scoop 110 and pusher pads 118 may roughly describe a containment area 410 as shown.

Figure 4B:
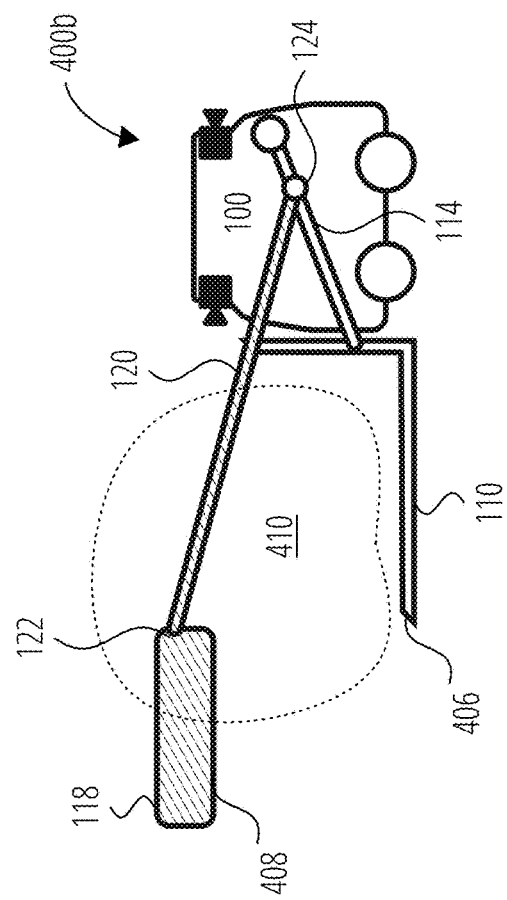
FIG. 4B illustrates a lowered scoop position and raised pusher position 400*b* for the tidying robot 100 in accordance with one embodiment.

FIG. 4B illustrates a tidying robot 100 with a lowered scoop position and raised pusher position 400b. Through the action of servos or other actuators at the pad pivot points 122 and pad arm pivot points 124, the pusher pads 118 and pusher pad arms 120 may be raised to a raised pusher position 408 while the scoop 110 and scoop arm 114 maintain a lowered scoop position 406. In this configuration, the pusher pads 118 and scoop 110 may roughly describe a containment area 410 as shown, in which an object taller than the scoop 110 height may rest within the scoop 110 and be held in place through pressure exerted by the pusher pads 118.

Pad arm pivot points 124, pad pivot points 122, scoop arm pivot points 116 and scoop pivot points 112 (as shown in FIG. 7) may provide the tidying robot 100 a range of motion of these components beyond what is illustrated herein. The positions shown in the disclosed figures are illustrative and not meant to indicate the limits of the robot's component range of motion.

FIG. 4C illustrates a tidying robot 100 with a raised scoop position and raised pusher position 400c. The pusher pads 118 and pusher pad arms 120 may be in a raised pusher position 408 while the scoop 110 and scoop arm 114 are in a raised scoop position 412. In this position, the tidying robot 100 may be able to allow objects drop from the scoop 110 and pusher pad arms 120 to an area at the rear 414 of the tidying robot 100.

The carrying position may involve the disposition of the pusher pads 118, pusher pad arms 120, scoop 110, and scoop arm 114, in relative configurations between the extremes of lowered scoop position and lowered pusher position 400a and raised scoop position and raised pusher position 400c.

Figure 4D:
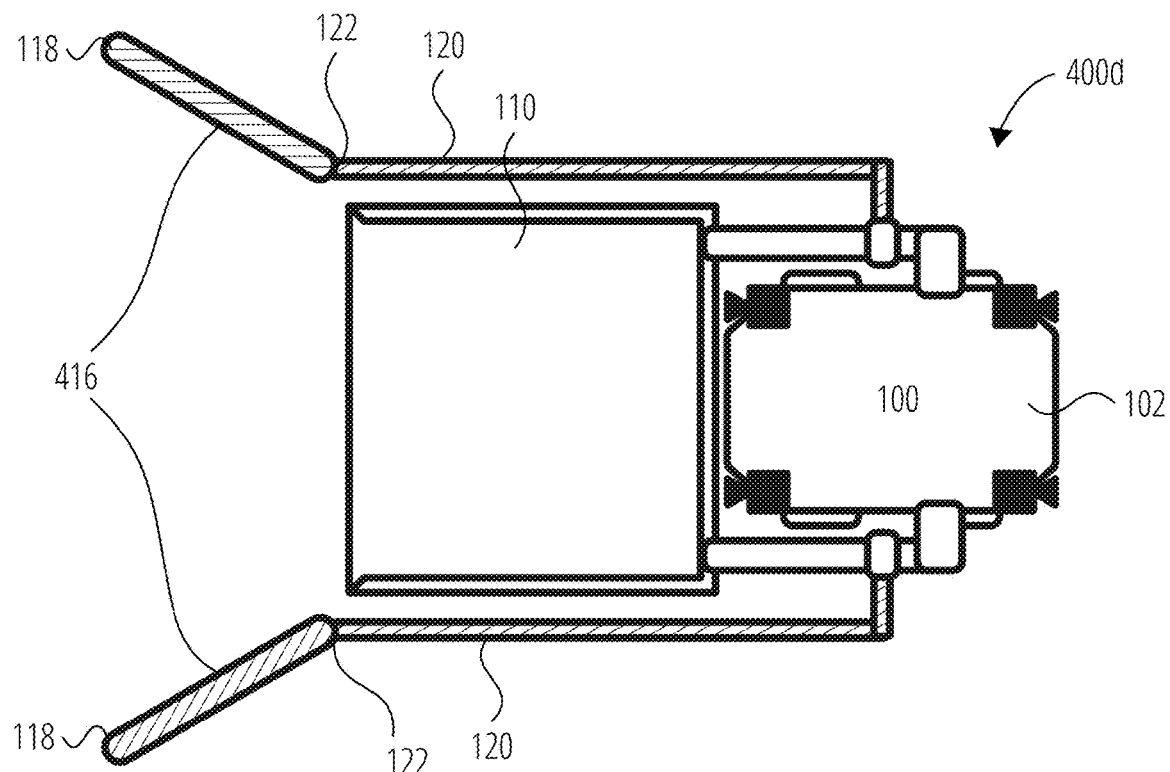
FIG. 4D illustrates a tidying robot 100 with pusher pads extended 400*d* in accordance with one embodiment.

FIG. 4D illustrates a tidying robot 100 with pusher pads extended 400d. By the action of servos or other actuators at the pad pivot points 122, the pusher pads 118 may be configured as extended pusher pads 416 to allow the tidying robot 100 to approach objects as wide or wider than the robot chassis 102 and scoop 110. In some embodiments, the pusher pads 118 may be able to rotate through almost three hundred and sixty degrees, to rest parallel with and on the outside of their associated pusher pad arms 120 when fully extended.

Figure 4E:
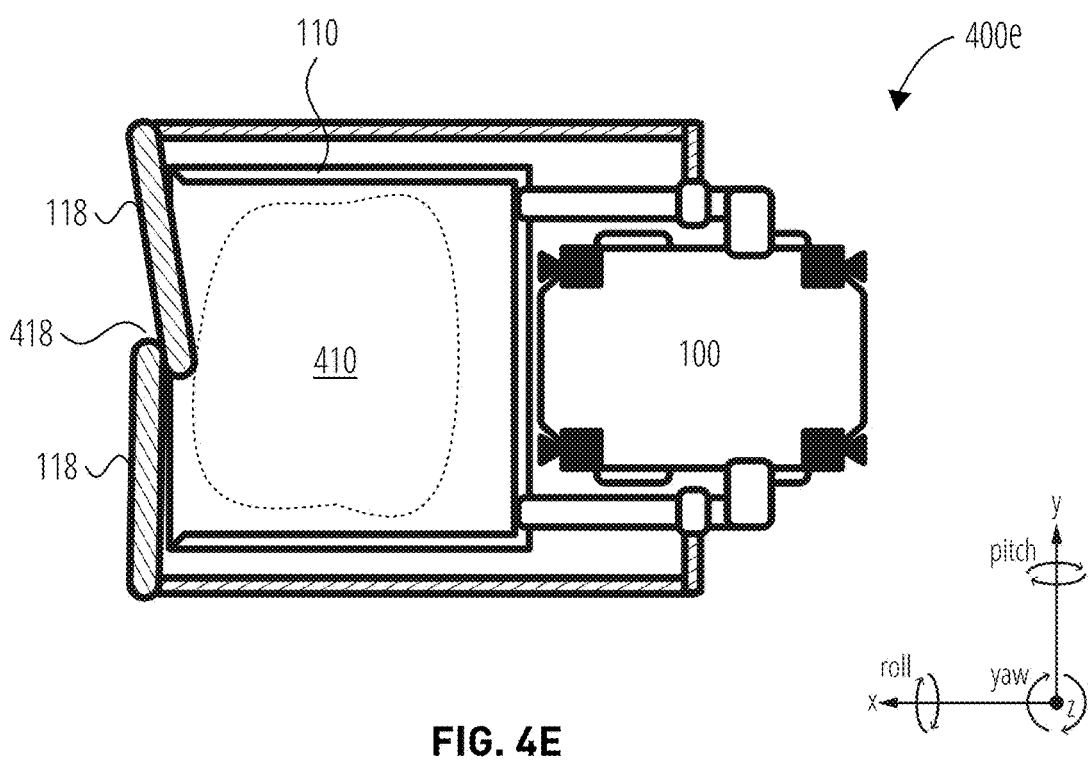
FIG. 4E illustrates a tidying robot 100 with pusher pads retracted 400*e* in accordance with one embodiment.

FIG. 4E illustrates a tidying robot 100 with pusher pads retracted 400e. The closed pusher pads 418 may roughly define a containment area 410 through their position with respect to the scoop 110. In some embodiments, the pusher pads 118 may be able to rotate farther than shown, through almost three hundred and sixty degrees, to rest parallel with and inside of the side walls of the scoop 110.

Figure 5C:
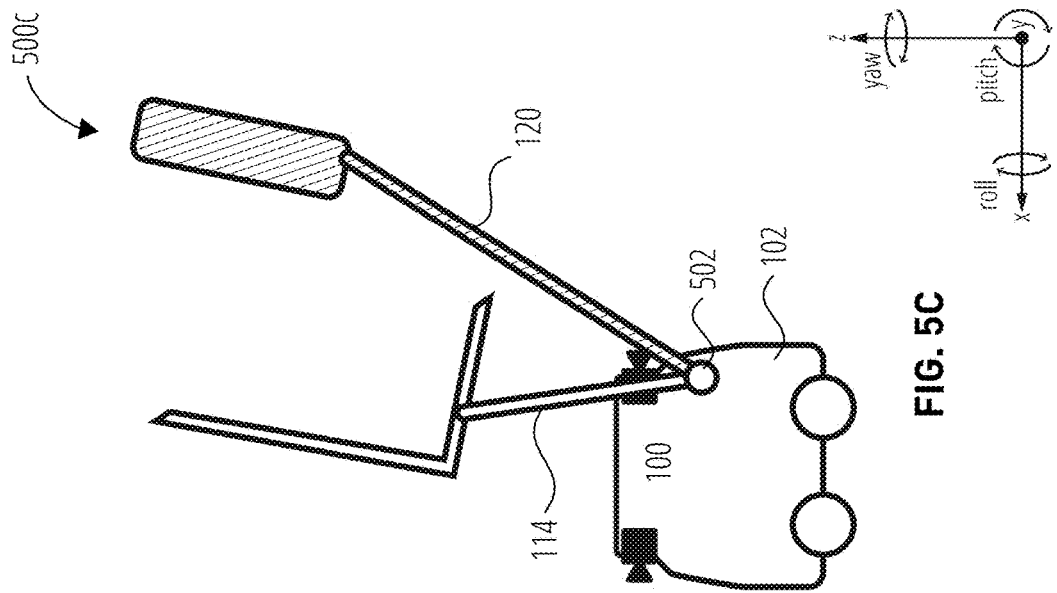
FIG. 5C illustrates a raised scoop position and raised pusher position 500*c* for the tidying robot 100 in accordance with one embodiment.
Figure 5A:
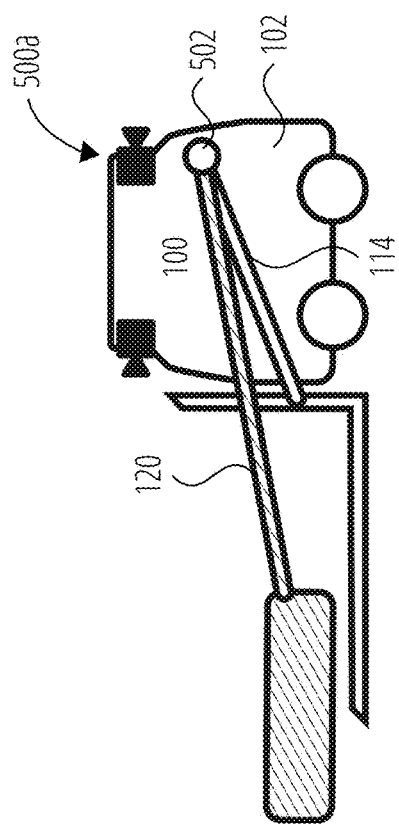
FIG. 5A illustrates a lowered scoop position and lowered pusher position 500*a* for the tidying robot 100 in accordance with one embodiment.
Figure 5B:
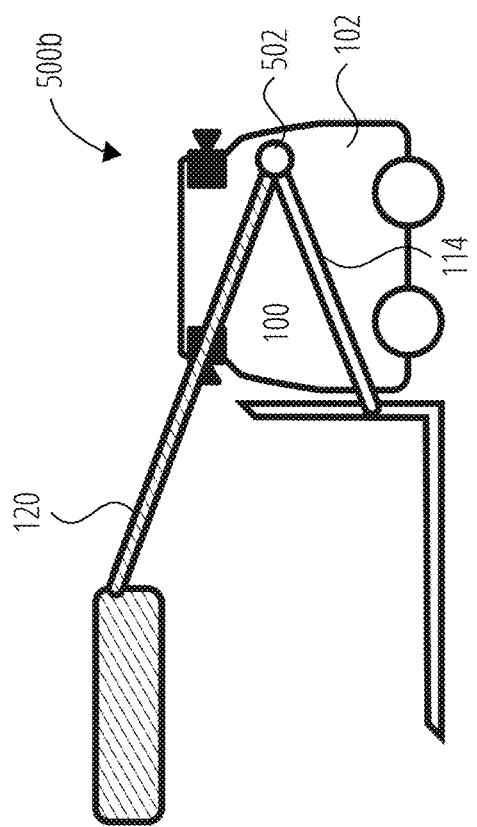
FIG. 5B illustrates a lowered scoop position and raised pusher position 500*b* for the tidying robot 100 in accordance with one embodiment.

FIG. 5A-FIG. 5C illustrate a tidying robot 100 such as that introduced with respect to FIG. 1A. In such an embodiment, the pusher pad arms 120 may be controlled by a servo or other actuator at the same point of connection 502 with the chassis 102 as the scoop arms 114. The tidying robot 100 may be seen disposed in a lowered scoop position and lowered pusher position 500a, a lowered scoop position and raised pusher position 500b, and a raised scoop position and raised pusher position 500c. This tidying robot 100 may be configured to perform the algorithms disclosed herein.

The point of connection shown between the scoop arms 114/pusher pad arms 120 and the chassis 102 is an exemplary position and is not intended to limit the physical location of this point of connection. Such connection may be made in various locations as appropriate to the construction of the chassis 102 and arms, and the applications of intended use.

FIG. 6A-FIG. 6C illustrate a tidying robot 100 such as that introduced with respect to FIG. 1A. In such an embodiment, the pusher pad arms 120 may be controlled by a servo or servos (or other actuators) at different points of connection 602 with the chassis 102 from those controlling the scoop arm 114. The tidying robot 100 may be seen disposed in a lowered scoop position and lowered pusher position 600a, a lowered scoop position and raised pusher position 600b, and a raised scoop position and raised pusher position 600c. This tidying robot 100 may be configured to perform the algorithms disclosed herein.

The different points of connection 602 between the scoop arm and chassis and the pusher pad arms and chassis shown are exemplary positions and not intended to limit the physical locations of these points of connection. Such connections may be made in various locations as appropriate to the construction of the chassis and arms, and the applications of intended use.

FIG. 7 illustrates a tidying robot 100 such as was previously introduced in a front drop position 700. The arms of the tidying robot 100 may be positioned to form a containment area 410 as previously described.

The tidying robot 100 may be configured with a scoop pivot point 112 where the scoop 110 connects to the scoop arm 114. The scoop pivot point 112 may allow the scoop 110 to be tilted forward and down while the scoop arm 114 is raised, allowing objects in the containment area 410 to slide out and be deposited in an area to the front 402 of the tidying robot 100.

Figure 8:
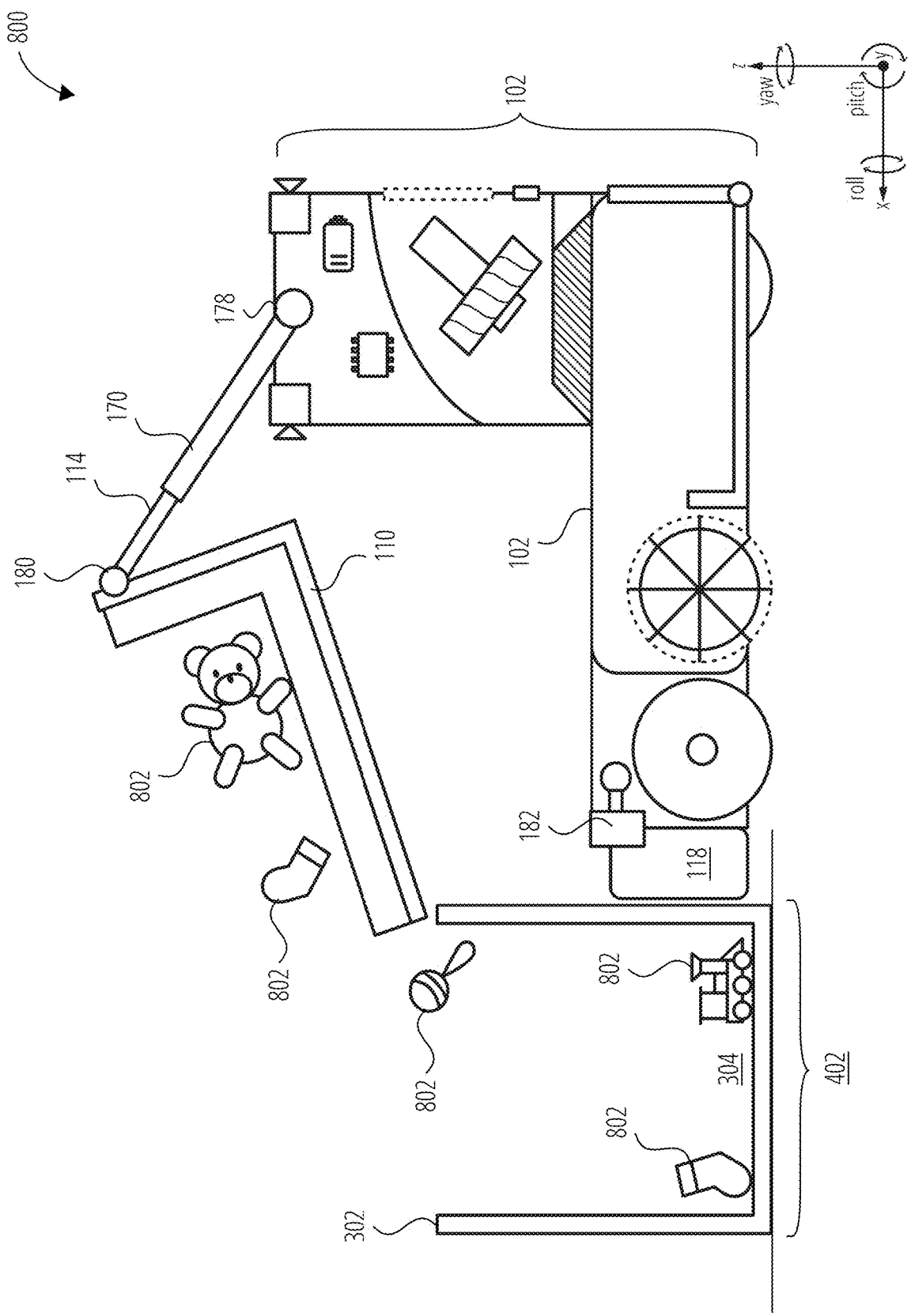
FIG. 8 illustrates a tidying robot 100 performing a front dump in accordance with one embodiment.

FIG. 8 illustrates how the positions of the components of the tidying robot 100 may be configured such that the tidying robot 100 may approach an object collection bin 302 and perform a front dump action 800. The scoop 110 may be raised by scoop arm motor 178, extended by scoop arm linear actuator 170, and tilted by scoop motor 180 so that tidyable objects 802 carried in the scoop 110 may be deposited into the storage compartment 304 of the object collection bin 302 positioned to the front 402 of the tidying robot 100, as is also described with respect to the front drop position 700 of FIG. 7.

Figure 9:
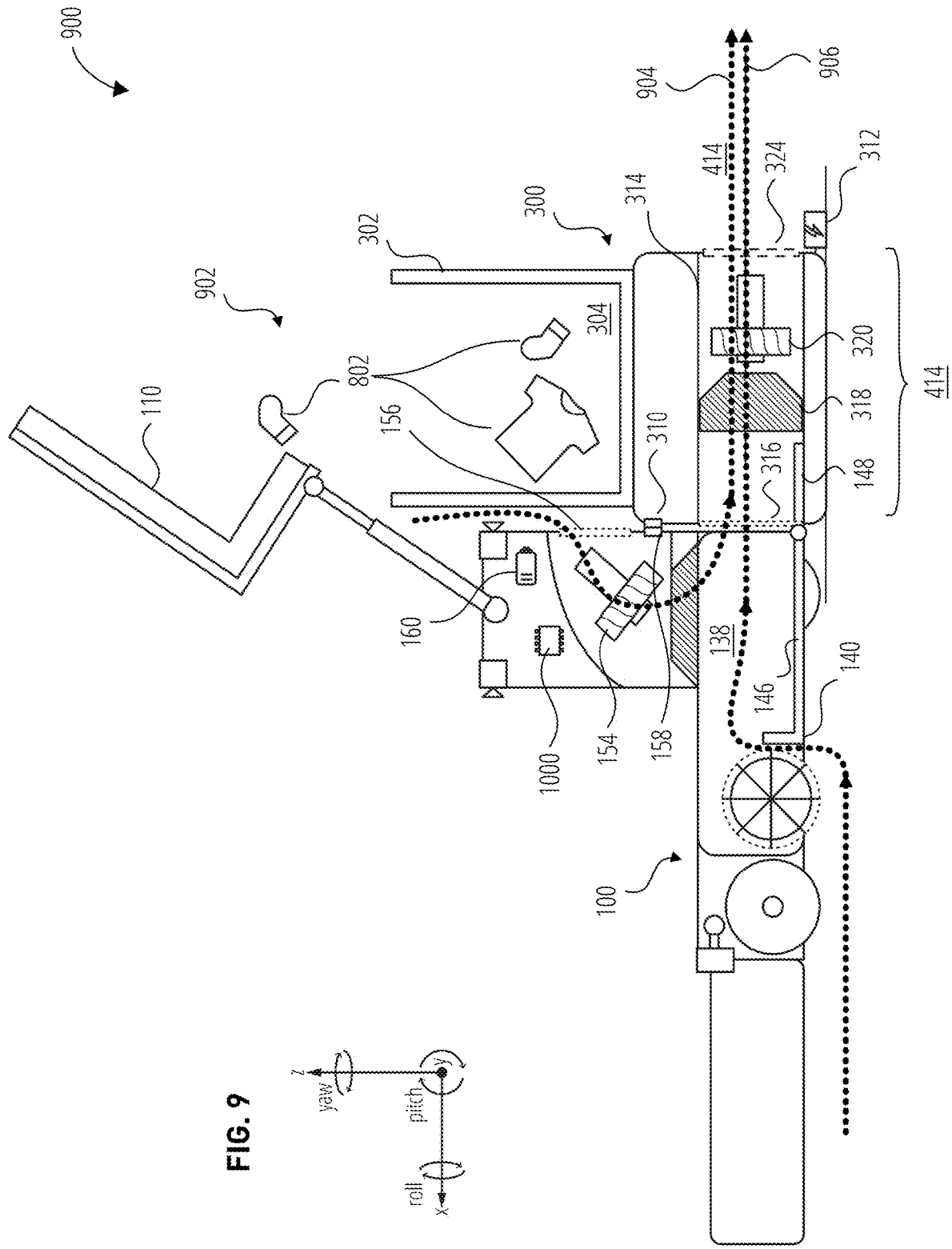
FIG. 9 illustrates a tidying robotic system interaction 900 in accordance with one embodiment.

FIG. 9 illustrates a tidying robotic system interaction 900 in accordance with one embodiment. The tidying robotic system may include the tidying robot 100, the base station 300, a robotic control system 1000, and logic 1014 that when executed directs the robot to perform the disclosed method. When the tidying robot 100 is docked at a base station 300 having an object collection bin 302, the scoop 110 may be raised and rotated up and over the tidying robot 100 chassis 102, allowing tidyable objects 802 in the scoop 110 to drop into the storage compartment 304 of the object collection bin 302 to the rear 414 of the tidying robot 100 in a rear dump action 902, as is also described with respect to the raised scoop position and raised pusher position 400c and raised scoop position and raised pusher position 500c described with respect to FIG. 4C and FIG. 5C, respectively.

In a docked state, the robot charge connector 158 may electrically couple with the base station charge connector 310 such that electrical power from the power source connection 312 may be carried to the battery 160, and the battery 160 may be recharged toward its maximum capacity for future use.

When the tidying robot 100 docks at its base station 300, the dirt release latch 148 may lower, allowing the vacuum compartment 138 to interface with the vacuum emptying system 314. Where the vacuum emptying system intake port 316 is covered by a protective element, the dirt release latch 148 may interface with that element to open the vacuum emptying system intake port 316 when the tidying robot 100 is docked. The vacuum compartment fan 154 may remain inactive or may reverse direction, permitting or compelling airflow 904 through the vacuum compartment exhaust port 156, into the vacuum compartment 138, across the dirt collector 146, over the dirt release latch 148, into the vacuum emptying system intake port 316, through the vacuum emptying system filter bag 318, and out the vacuum emptying system exhaust port 324, in conjunction with the operation of the vacuum emptying system fan 320. The action of the vacuum emptying system fan 320 may also pull airflow 906 in from the vacuum compartment intake port 140, across the dirt collector 146, over the dirt release latch 148, into the vacuum emptying system intake port 316, through the vacuum emptying system filter bag 318, and out the vacuum emptying system exhaust port 324. In combination, airflow 904 and airflow 906 may pull dirt and dust from the dirt collector 146 into the vacuum emptying system filter bag 318, emptying the dirt collector 146 for future vacuuming tasks. The vacuum emptying system filter bag 318 may be manually discarded and replaced on a regular basis.

Figure 10:
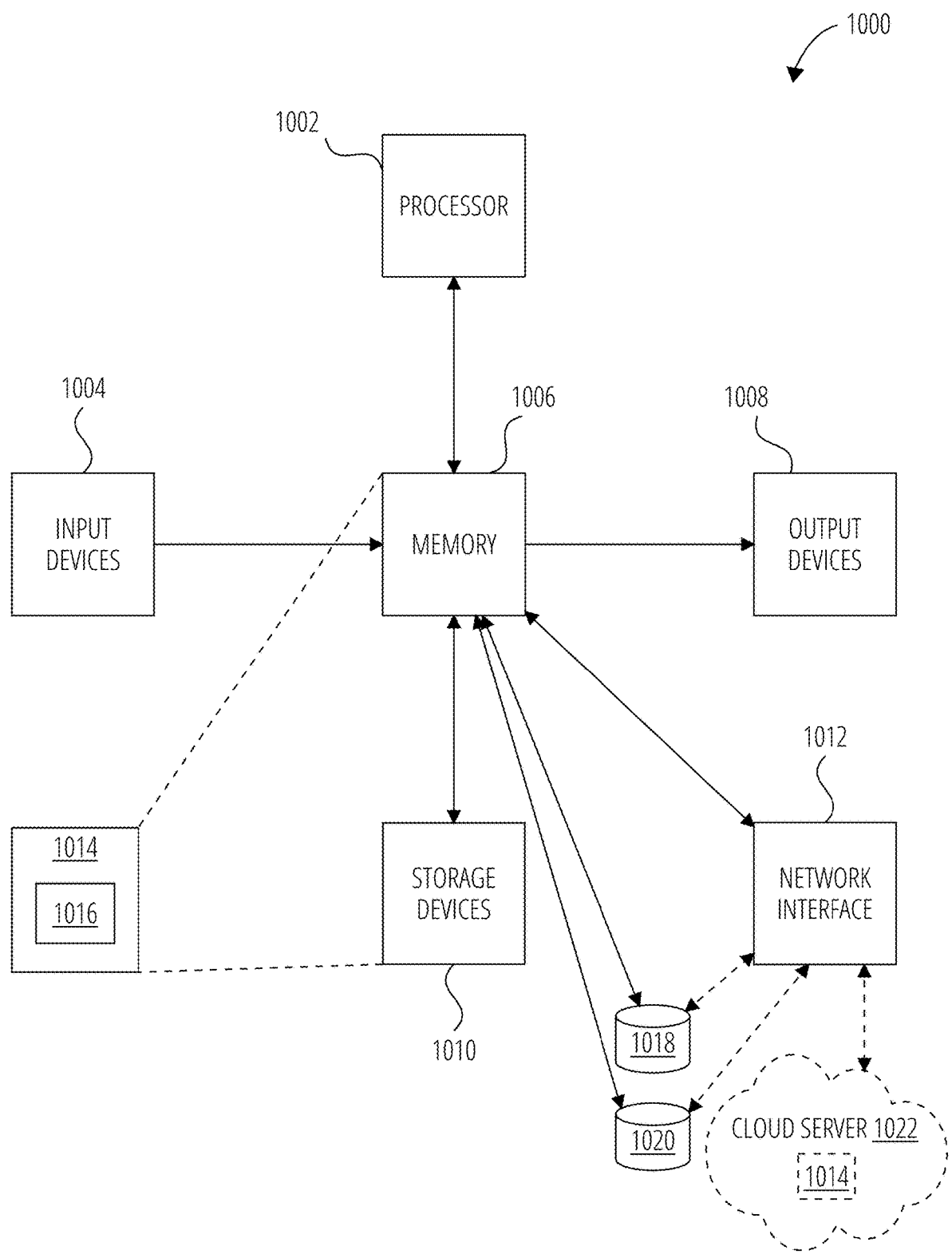
FIG. 10 illustrates an embodiment of a robotic control system 1000 to implement components and process steps of the system described herein.

FIG. 10 depicts an embodiment of a robotic control system 1000 to implement components and process steps of the systems described herein. Some or all portions of the robotic control system 1000 and its operational logic may be contained within the physical components of a robot and/or within a cloud server in communication with the robot and/or within the physical components of a user's mobile computing device, such as a smartphone, tablet, laptop, personal digital assistant, or other such mobile computing devices. In one embodiment, aspects of the robotic control system 1000 on a cloud server and/or user's mobile computing device may control more than one robot at a time, allowing multiple robots to work in concert within a working space.

Input devices 1004 (e.g., of a robot or companion device such as a mobile phone or personal computer) comprise transducers that convert physical phenomena into machine internal signals, typically electrical, optical, or magnetic signals. Signals may also be wireless in the form of electromagnetic radiation in the radio frequency (RF) range but also potentially in the infrared or optical range. Examples of input devices 1004 are contact sensors which respond to touch or physical pressure from an object or proximity of an object to a surface, mice which respond to motion through space or across a plane, microphones which convert vibrations in the medium (typically air) into device signals, scanners which convert optical patterns on two or three-dimensional objects into device signals. The signals from the input devices 1004 are provided via various machine signal conductors (e.g., busses or network interfaces) and circuits to memory 1006.

The memory 1006 is typically what is known as a first- or second-level memory device, providing for storage (via configuration of matter or states of matter) of signals received from the input devices 1004, instructions and information for controlling operation of the central processing unit or processor 1002, and signals from storage devices 1010. The memory 1006 and/or the storage devices 1010 may store computer-executable instructions and thus forming logic 1014 that when applied to and executed by the processor 1002 implement embodiments of the processes disclosed herein. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). Logic 1014 may include portions of a computer program, along with configuration data, that are run by the processor 1002 or another processor. Logic 1014 may include one or more machine learning models 1016 used to perform the disclosed actions. In one embodiment, portions of the logic 1014 may also reside on a mobile or desktop computing device accessible by a user to facilitate direct user control of the robot.

Information stored in the memory 1006 is typically directly accessible to the processor 1002 of the device. Signals input to the device cause the reconfiguration of the internal material/energy state of the memory 1006, creating in essence a new machine configuration, influencing the behavior of the robotic control system 1000 by configuring the processor 1002 with control signals (instructions) and data provided in conjunction with the control signals.

Second- or third-level storage devices 1010 may provide a slower but higher capacity machine memory capability. Examples of storage devices 1010 are hard disks, optical disks, large-capacity flash memories or other non-volatile memory technologies, and magnetic memories.

In one embodiment, memory 1006 may include virtual storage accessible through a connection with a cloud server using the network interface 1012, as described below. In such embodiments, some or all of the logic 1014 may be stored and processed remotely.

The processor 1002 may cause the configuration of the memory 1006 to be altered by signals in storage devices 1010. In other words, the processor 1002 may cause data and instructions to be read from storage devices 1010 in the memory 1006 which may then influence the operations of processor 1002 as instructions and data signals, and which may also be provided to the output devices 1008. The processor 1002 may alter the content of the memory 1006 by signaling to a machine interface of memory 1006 to alter the internal configuration and then converted signals to the storage devices 1010 alter its material internal configuration. In other words, data and instructions may be backed up from memory 1006, which is often volatile, to storage devices 1010, which are often non-volatile.

Output devices 1008 are transducers that convert signals received from the memory 1006 into physical phenomena such as vibrations in the air, patterns of light on a machine display, vibrations (i.e., haptic devices), or patterns of ink or other materials (i.e., printers and 3-D printers).

The network interface 1012 receives signals from the memory 1006 and converts them into electrical, optical, or wireless signals to other machines, typically via a machine network. The network interface 1012 also receives signals from the machine network and converts them into electrical, optical, or wireless signals to the memory 1006. The network interface 1012 may allow a robot to communicate with a cloud server 1022 containing logic 1014, a mobile device, other robots, and other network-enabled devices.

In one embodiment, a global database 1018 may provide data storage available across the devices that comprise or are supported by the robotic control system 1000. The global database 1018 may include maps, robotic instruction algorithms, robot state information, static, movable, and tidyable object reidentification fingerprints, labels, and other data associated with known static, movable, and tidyable object reidentification fingerprints, or other data supporting the implementation of the disclosed solution. The global database 1018 may be a single data structure or may be distributed across more than one data structure and storage platform, as may best suit an implementation of the disclosed solution. In one embodiment, the global database 1018 is coupled to other components of the robotic control system 1000 through a wired or wireless network, and in communication with the network interface 1012.

In one embodiment, a robot instruction database 1020 may provide data storage available across the devices that comprise or are supported by the robotic control system 1000. The robot instruction database 1020 may include the programmatic routines that direct specific actuators of the tidying robot, such as are described previously, to actuate and cease actuation in sequences that allow the tidying robot to perform individual and aggregate motions to complete tasks.

Figure 11:
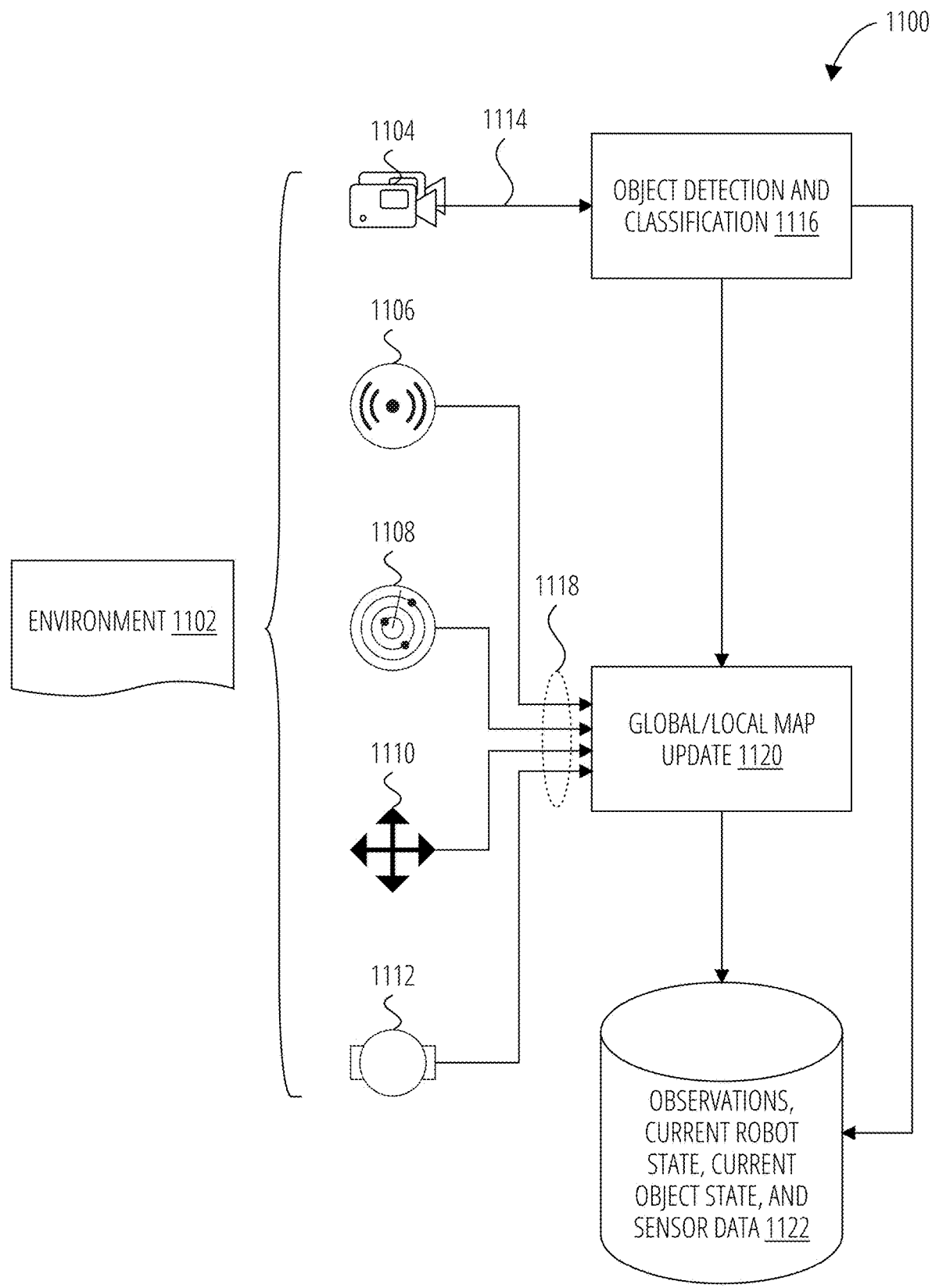
FIG. 11 illustrates sensor input analysis 1100 in accordance with one embodiment.
Figure 12A:
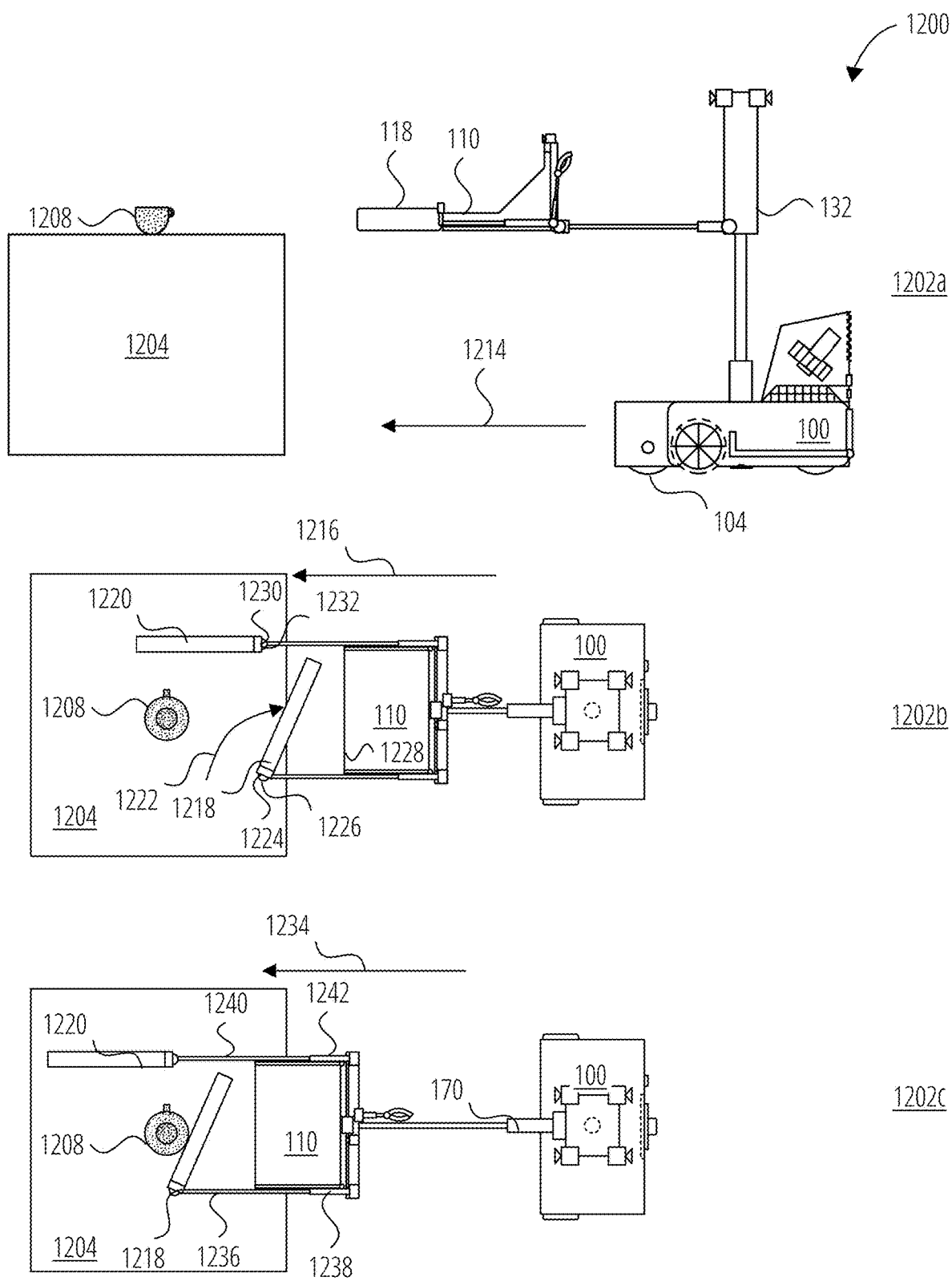
Figure 12B:
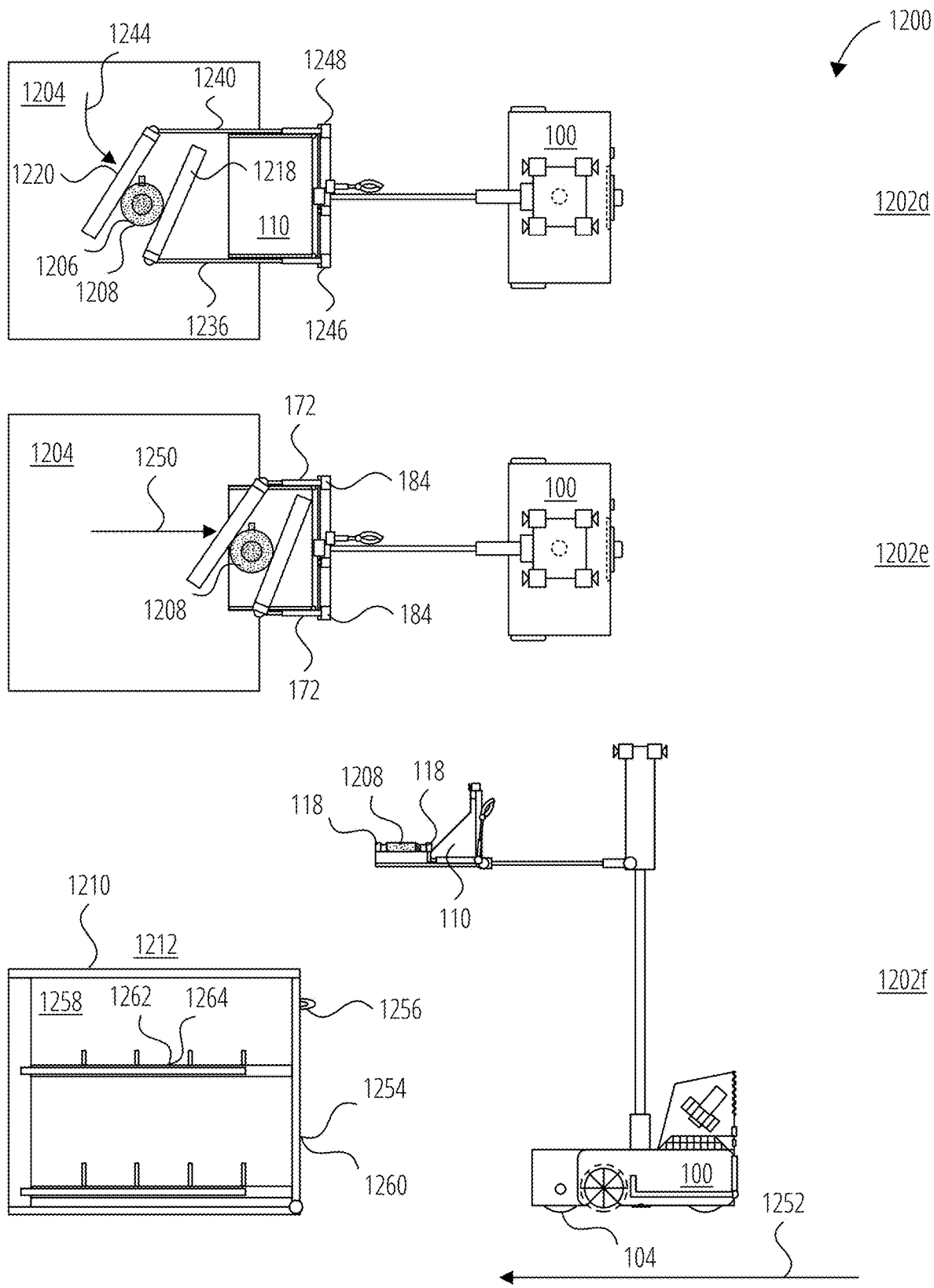
Figure 12C:
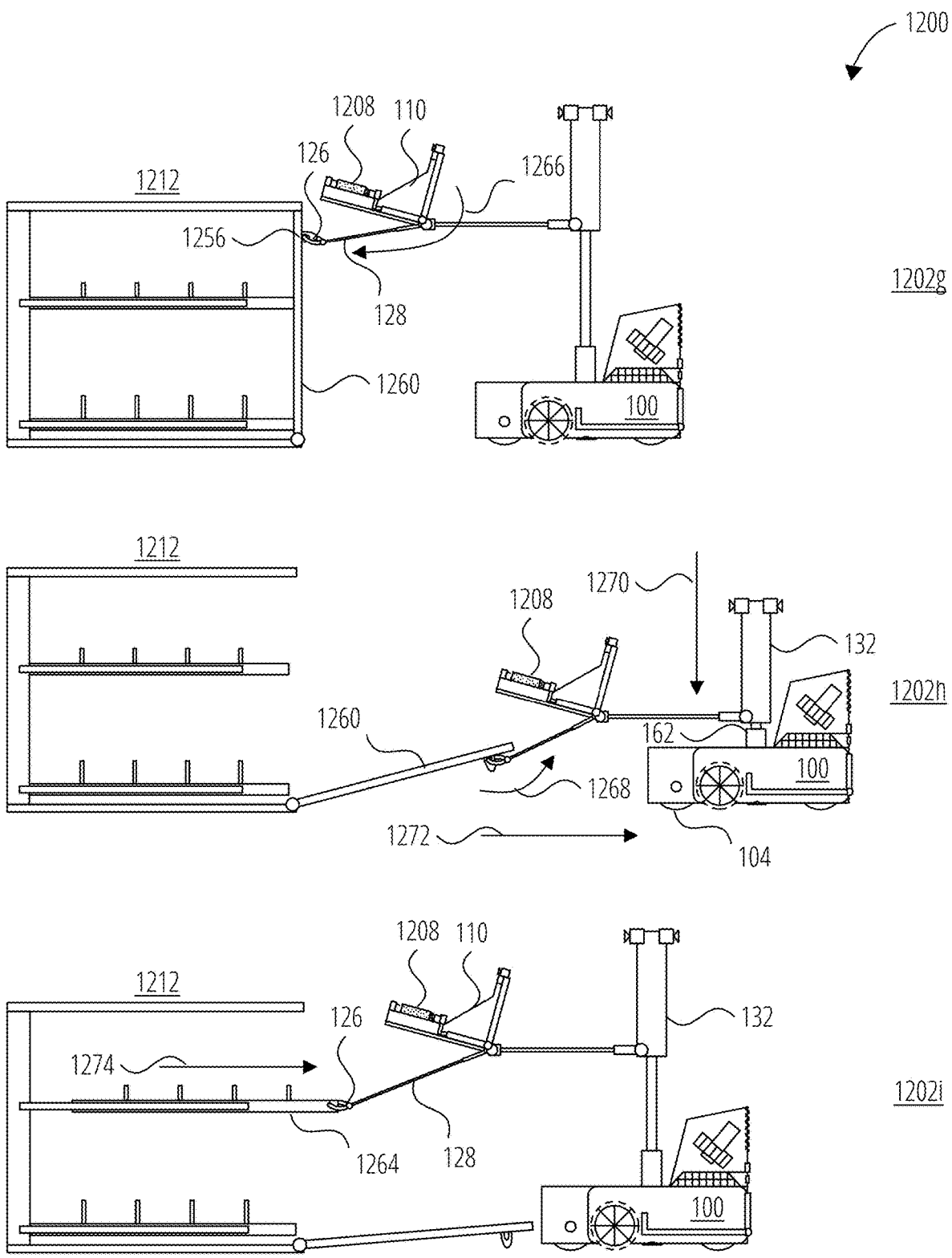
Figure 12D:
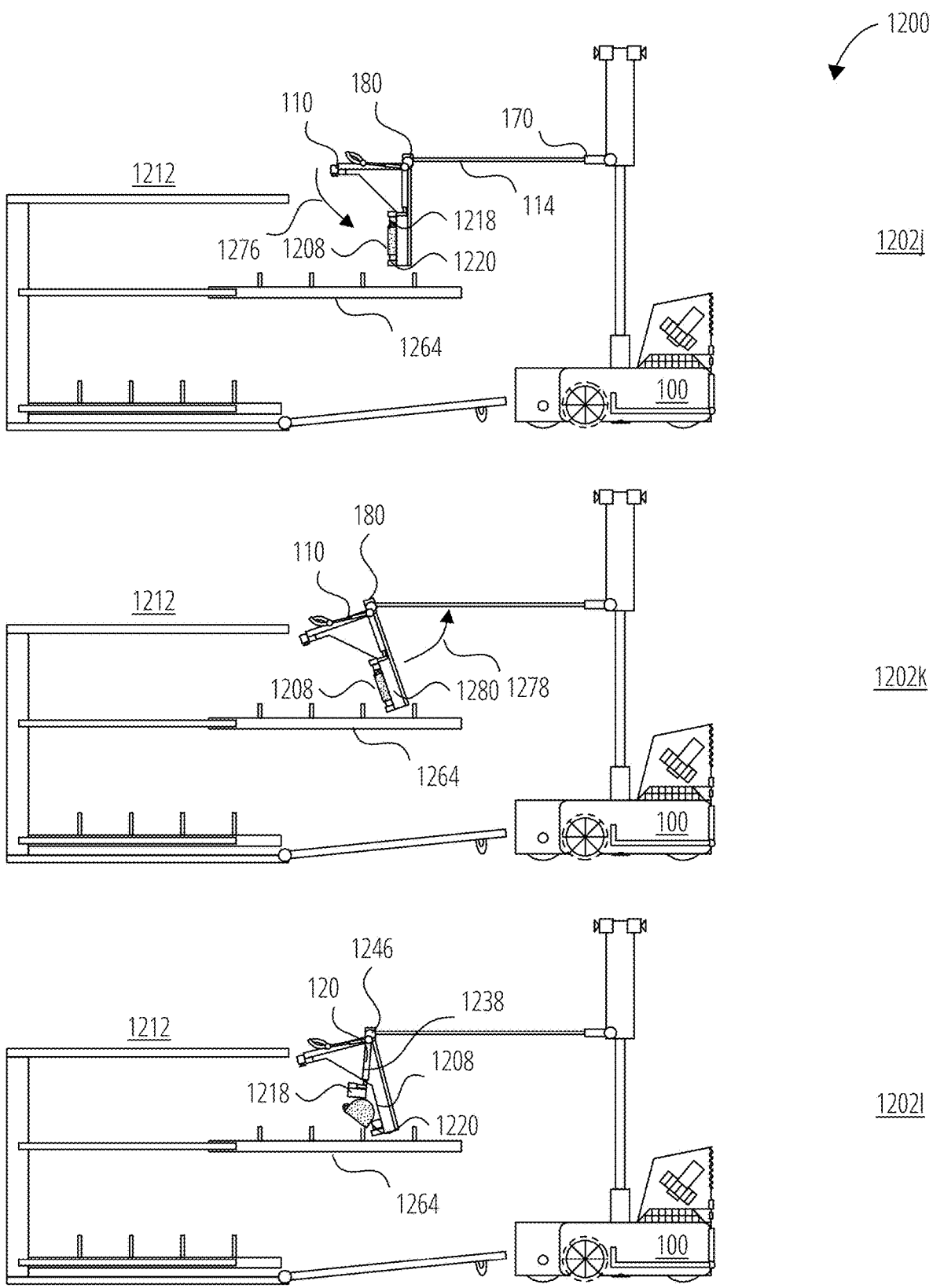
Figure 13A:
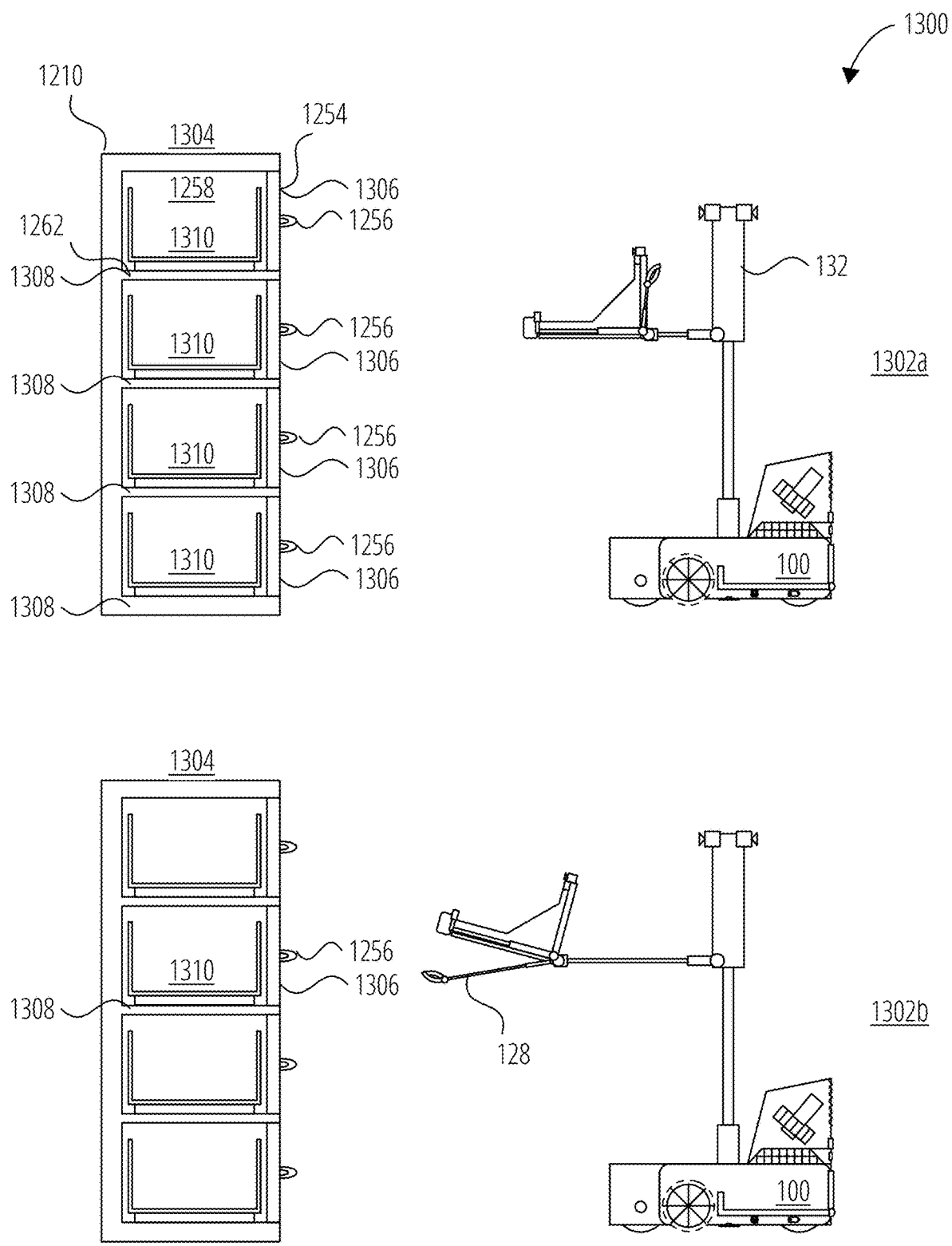
Figure 13C:
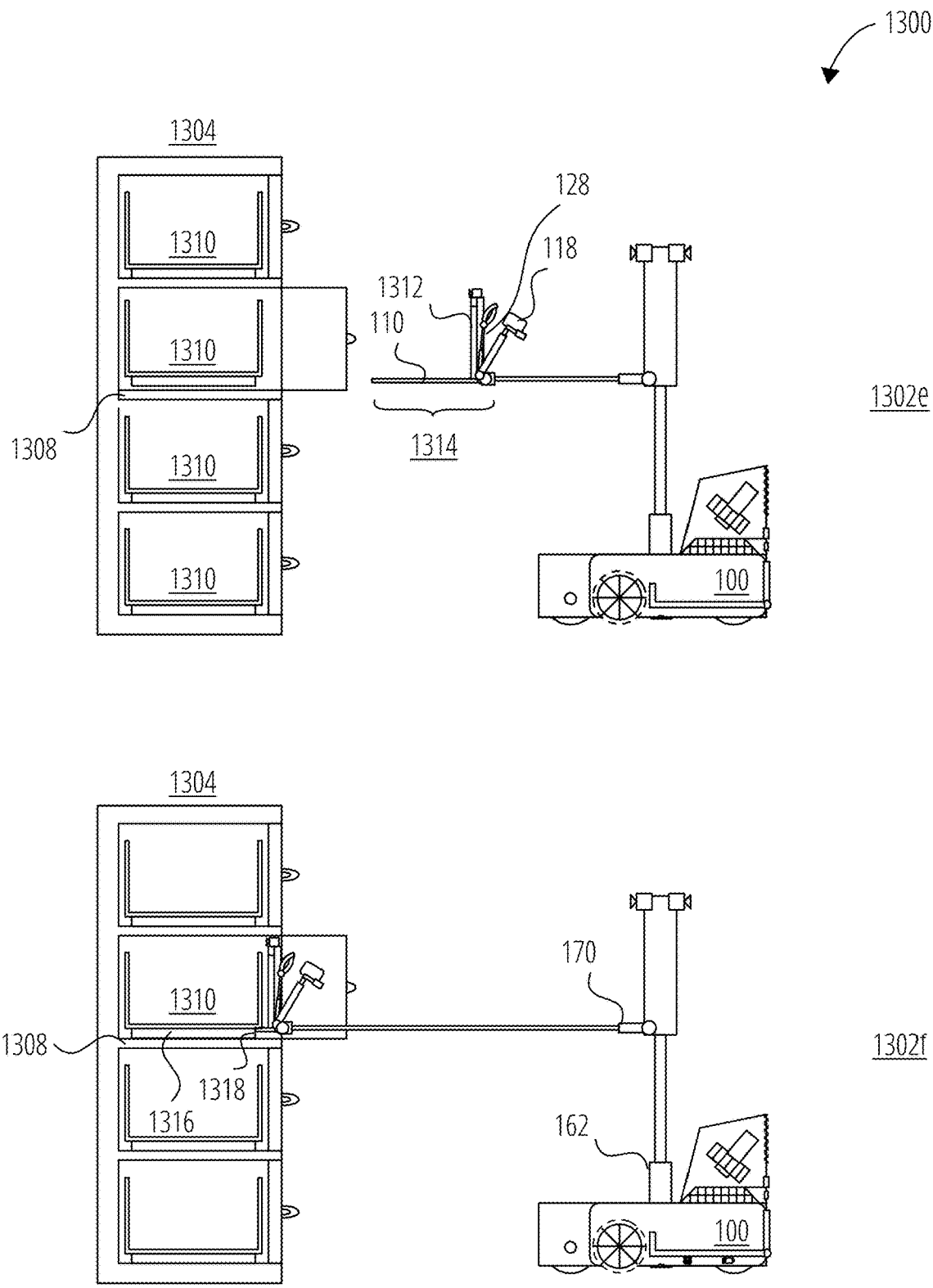
Figure 13E:
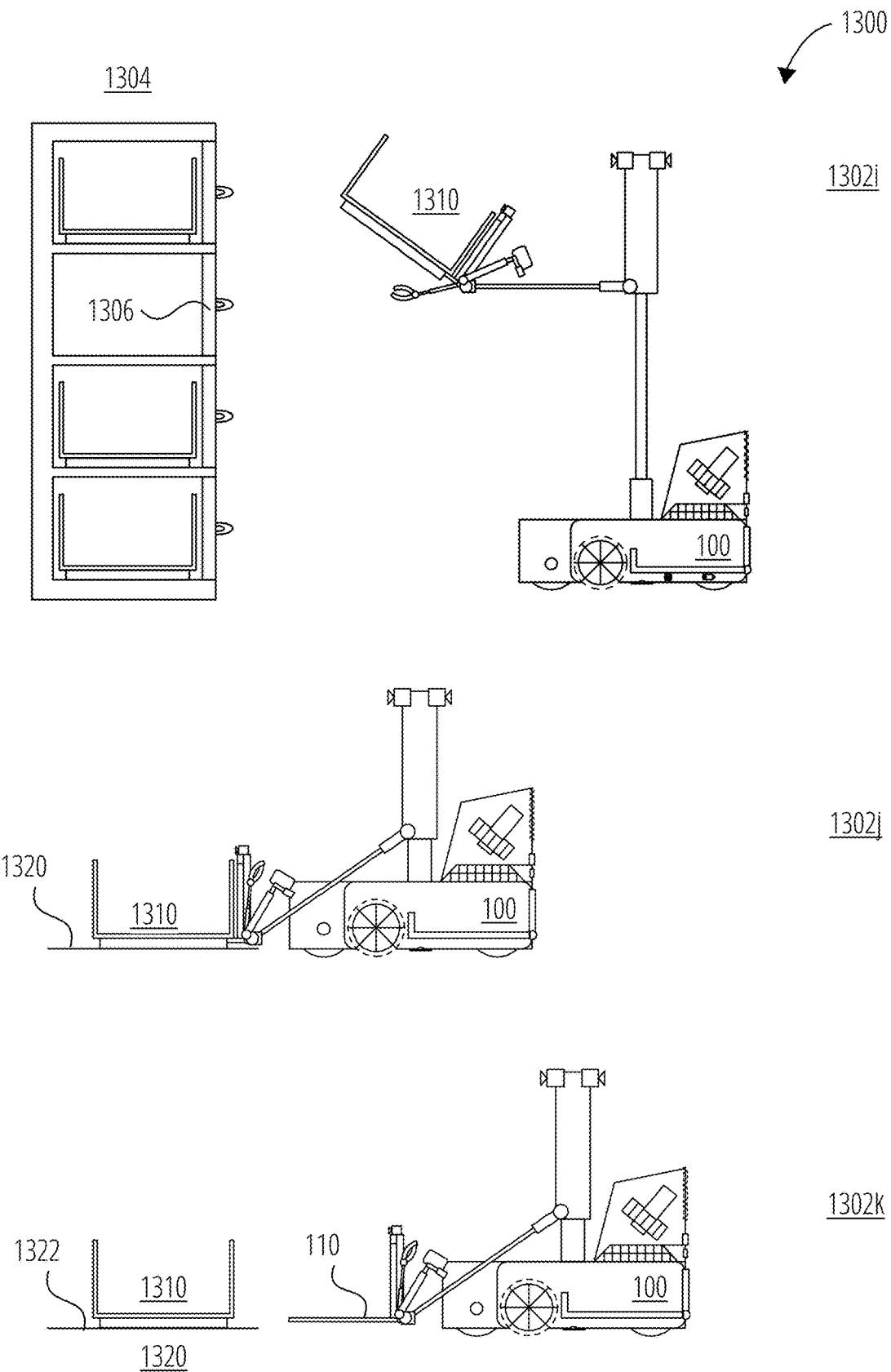
Figure 14A:
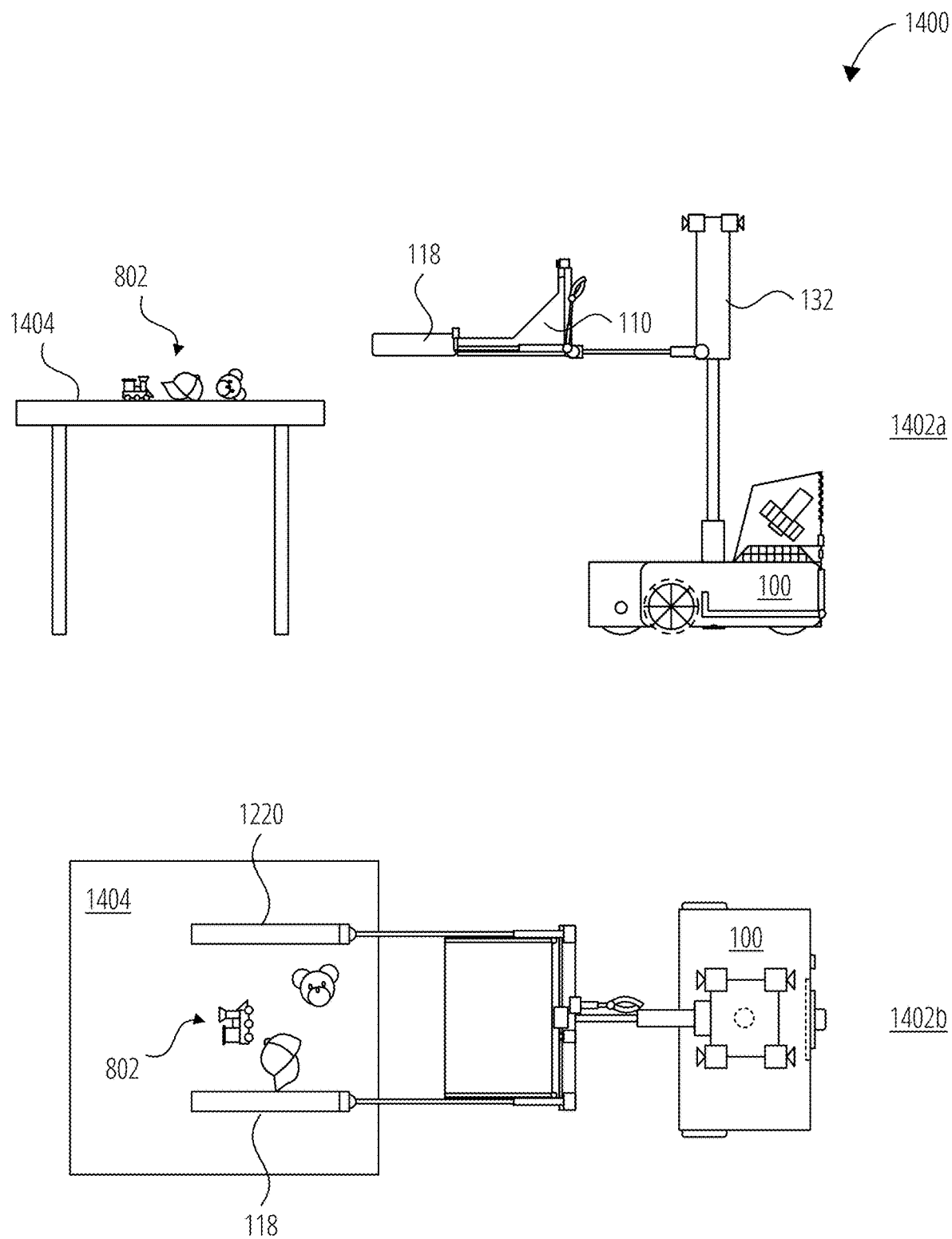
Figure 14B:
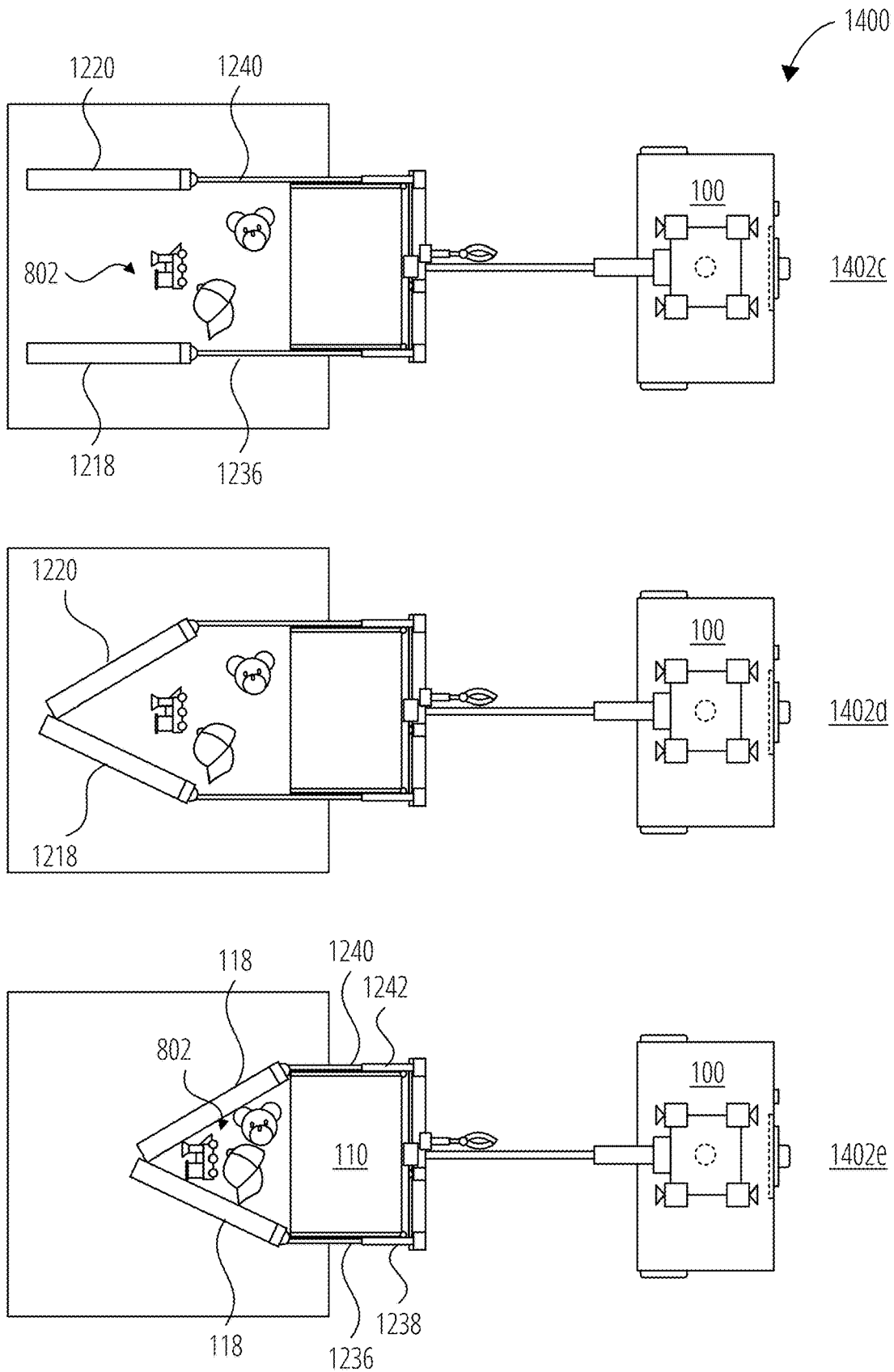
Figure 14C:
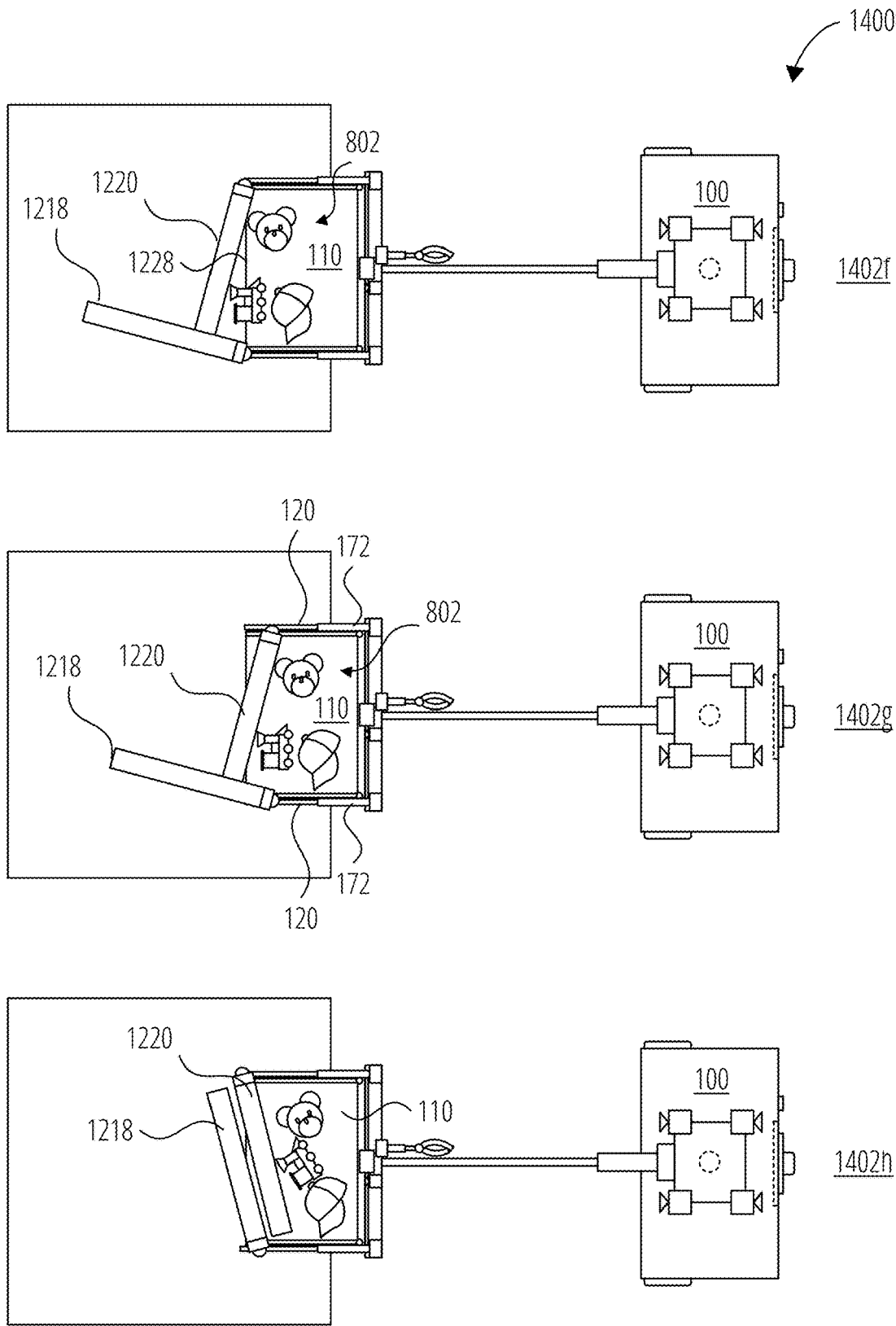
Figure 15A:
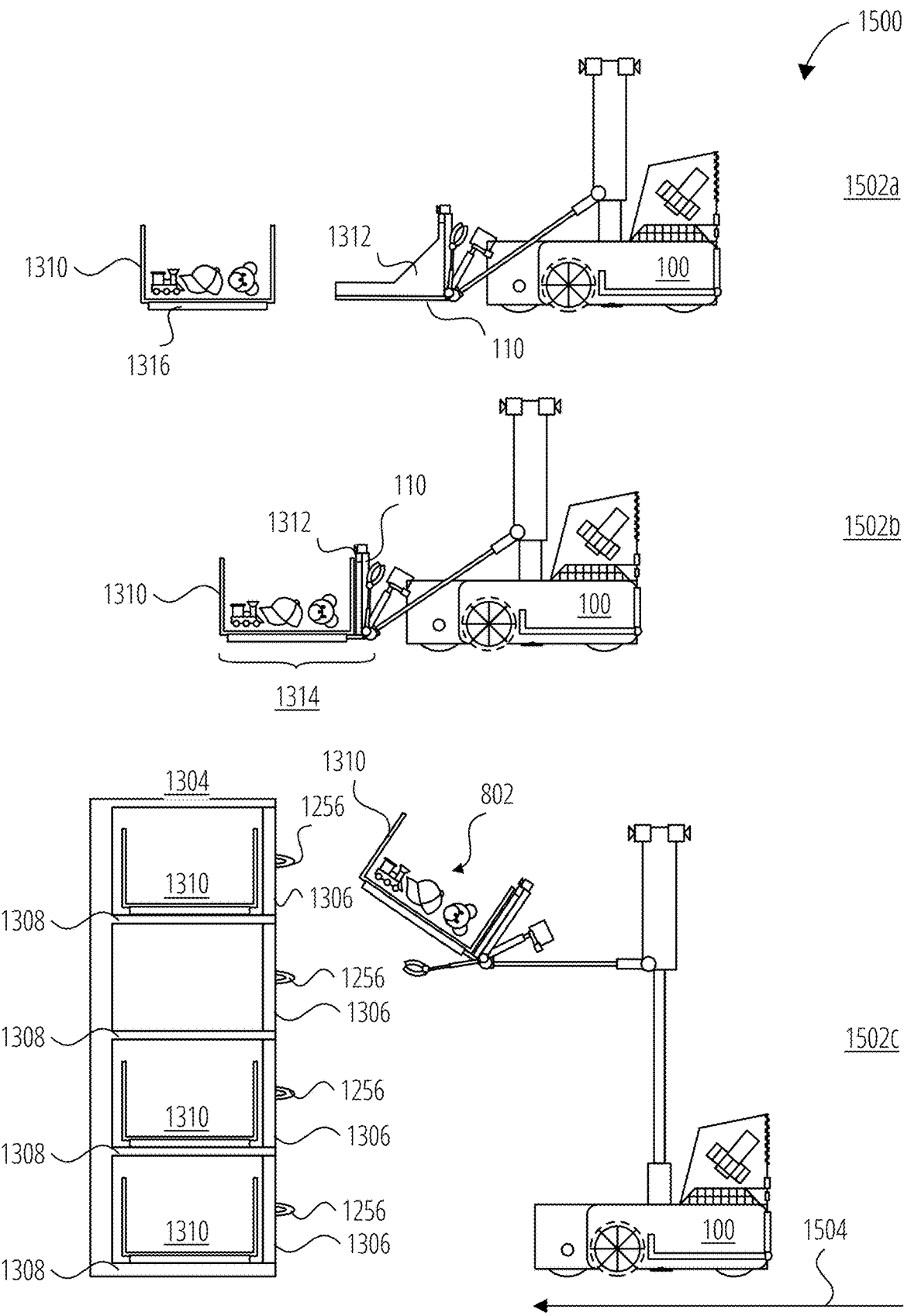
Figure 15C:
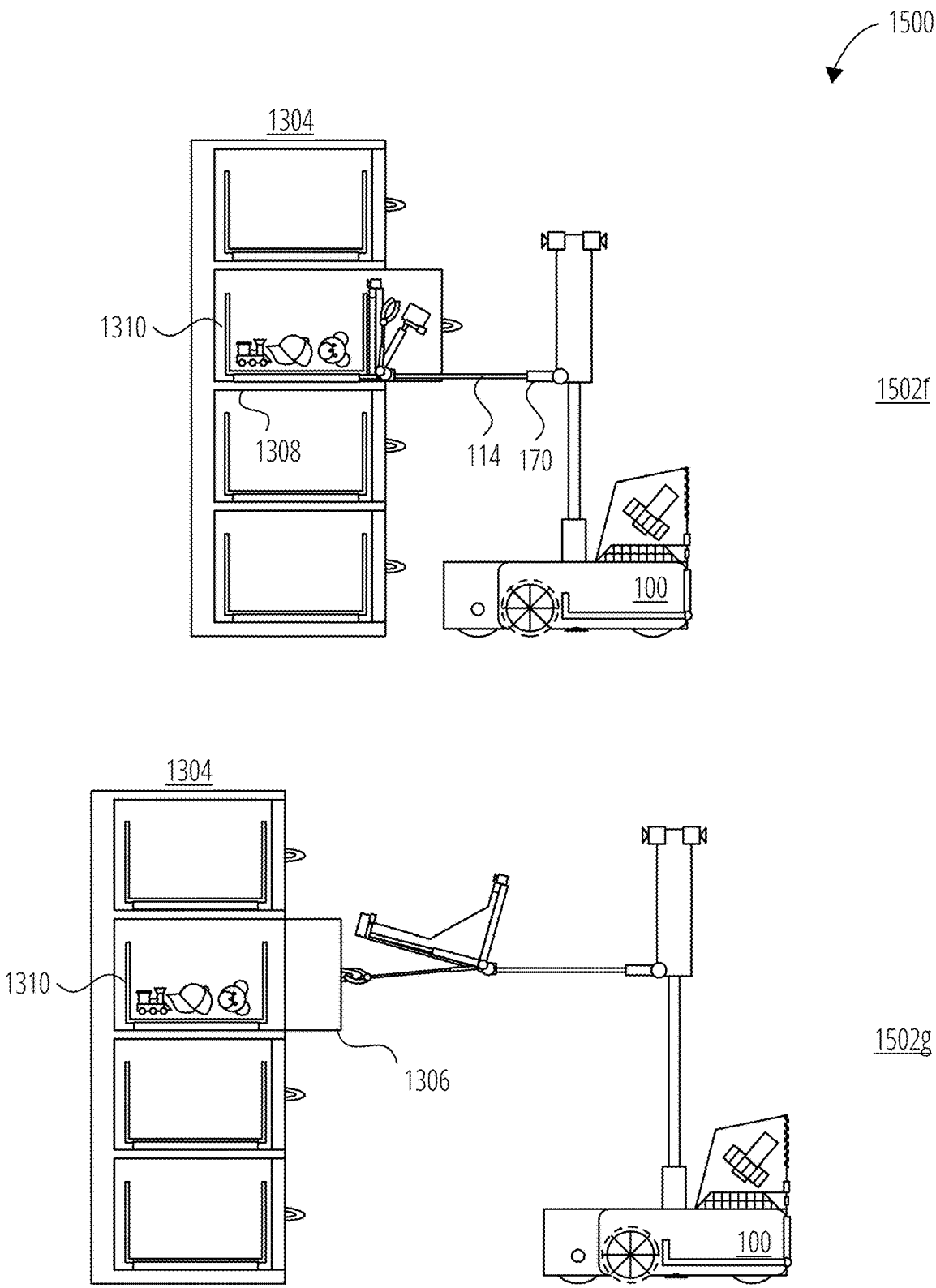
Figure 15D:
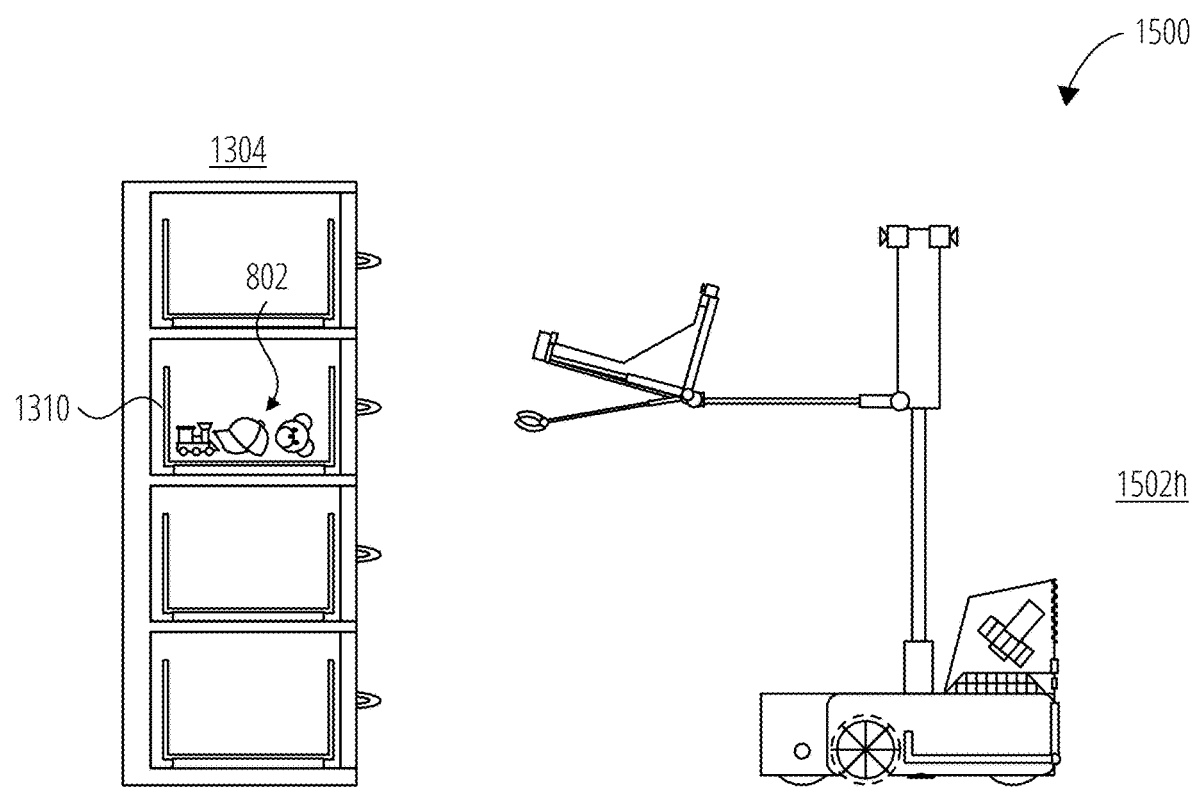

FIG. 11 illustrates sensor input analysis 1100 in accordance with one embodiment. Sensor input analysis 1100 may inform the tidying robot 100 of the dimensions of its immediate environment 1102 and the location of itself and other objects within that environment 1102.

The tidying robot 100 as previously described includes a sensing system 106. This sensing system 106 may include at least one of cameras 1104, IMU sensors 1106, lidar sensor 1108, odometry 1110, and actuator force feedback sensor 1112. These sensors may capture data describing the environment 1102 around the tidying robot 100.

Image data 1114 from the cameras 1104 may be used for object detection and classification 1116. Object detection and classification 1116 may be performed by algorithms and models configured within the robotic control system 1000 of the tidying robot 100. In this manner, the characteristics and types of objects in the environment 1102 may be determined.

Image data 1114, object detection and classification 1116 data, and other sensor data 1118 may be used for a global/local map update 1120. The global and/or local map may be stored by the tidying robot 100 and may represent its knowledge of the dimensions and objects within its decluttering environment 1102. This map may be used in navigation and strategy determination associated with decluttering tasks.

The tidying robot 100 may use a combination of camera 1104, lidar sensor 1108 and the other sensors to maintain a global or local area map of the environment and to localize itself within that. Additionally, the robot may perform object detection and object classification and may generate visual re-identification fingerprints for each object. The robot may utilize stereo cameras along with a machine learning/neural network software architecture (e.g., semi-supervised or supervised convolutional neural network) to efficiently classify the type, size and location of different objects on a map of the environment.

The robot may determine the relative distance and angle to each object. The distance and angle may then be used to localize objects on the global or local area map. The robot may utilize both forward and backward facing cameras to scan both to the front and to the rear of the robot.

image data 1114, object detection and classification 1116 data, other sensor data 1118, and global/local map update 1120 data may be stored as observations, current robot state, current object state, and sensor data 1122. The observations, current robot state, current object state, and sensor data 1122 may be used by the robotic control system 1000 of the tidying robot 100 in determining navigation paths and task strategies.

FIG. 12A-FIG. 12E illustrate an obstruction placement procedure 1200 in accordance with one embodiment. Steps 1202a-1202n illustrate the actions a tidying robot 100 may take to approach a tabletop or countertop 1204, remove an obstruction 1206 such as a dirty cup 1208, and place it at a destination 1210, such as a dishwasher 1212. In step 1202a, the tidying robot 100 may approach 1214 the countertop 1204 through the action of the mobility system 104. The tidying robot 100 may have its pusher pads 118 extended in front of the scoop 110. The lifting column 132 may be elevated such that the bottom of the scoop 110 is level with and slightly above the top of the countertop 1204.

In step 1202b, the tidying robot 100 may continue to approach 1216 the countertop 1204 and the cup 1208 with the first pusher pad 1218 rotated inward 1222 at a first pad pivot point 1224 by a first pusher pad motor 1226 toward the front edge 1228 of the scoop 110, and parallel to or angled toward that front edge 1228. The second pusher pad 1220 may be open and pointing forward as shown or may be rotated outward at a second pad pivot point 1230 by a second pusher pad motor 1232 to be further away from the scoop 110 front edge 1228. In step 1202c, the tidying robot 100 may drive forward or may extend 1234 the scoop arm linear actuator 170, and/or the first pusher pad arm 1236 using the first pusher pad arm linear actuator 1238 and the second pusher pad arm 1240 using the second pusher pad arm linear actuator 1242, horizontally forward until the cup 1208 is in contact with the first pusher pad 1218.

In step 1202d, the tidying robot 100 may close 1244 the second pusher pad 1220 so that the cup 1208 is held firmly between the first pusher pad 1218 and the second pusher pad 1220. The first pusher pad arm motor 1246 at the base of the first pusher pad arm 1236 and the second pusher pad arm motor 1248 at the base of the second pusher pad arm 1240 may be rotated to lift the cup 1208 slightly up and off of the countertop 1204. The cup 1208 may be positioned slightly above the level of the front edge 1228 of the scoop 110. In step 1202e, the pusher pad arm linear actuators 172 may retract 1250 so that the cup 1208 passes above the front edge 1228 into an area fully above the scoop 110. The first and second pusher pad arm motors 184 may rotate to lower the cup 1208 onto the scoop 110.

In step 1202f, the tidying robot 100 may plan and execute an approach path 1252, using the mobility system 104 to drive from the countertop 1204 to the destination 1210, such as the dishwasher 1212. The destination 1210 may have an access panel 1254 with a handle 1256 allowing access to an interior of the destination 1258, such as a dishwasher door 1260. The destination 1210 may include storage platforms 1262 such as dishwasher trays 1264. During path planning and navigation, the tidying robot 100 may hold the cup 1208 securely in the scoop 110 with the pusher pads 118. In step 1202g, the tidying robot 100 may rotate and extend 1266 the gripper arm 128 underneath the scoop 110 so that the gripper arm 128 or actuated gripper 126 may grab the handle 1256 of the dishwasher door 1260.

In step 1202h, the tidying robot 100 may retract and potentially rotate 1268 the gripper arm 128 to begin opening the dishwasher 1212. The tidying robot 100 may then retract the lifting column linear actuator 162 to lower 1270 the lifting column 132 while backing up 1272 using its mobility system 104 to fully open the dishwasher door 1260. In step 1202i, the tidying robot 100 may use the gripper arm 128 or actuated gripper 126 to partially or completely pull out 1274 one of the dishwasher trays 1264 while still holding the cup 1208 securely in the scoop 110. This action may be performed through similar forward and backward motions of the tidying robot 100 along with extension, retraction, and rotation of the gripper arm 128, raising and lowering of the lifting column 132, etc.

In step 1202j, the tidying robot 100 may extend the scoop arm linear actuator 170 of the scoop arm 114 so that the scoop 110 is over the dishwasher tray 1264. The scoop motor 180 may rotate 1278 so that the scoop 110 begins to invert 1276. At this time, the first pusher pad 1218 and second pusher pad 1220 may still apply firm pressure to the cup 1208. In step 1202k, the scoop motor 180 may continue to rotate 1278 the scoop 110 so that the cup 1208 is held in a partially inverted position 1280 slightly above the dishwasher tray 1264 while the cup is still held securely in the scoop 110.

In step 1202l, the first pusher pad 1218 may rotate slightly through the action of its first pusher pad arm motor 1246, and the first pusher pad arm linear actuator 1238 may extend slightly as shown, moving the cup 1208 slowly out of the scoop 110 and onto the dishwasher tray 1264. The first pusher pad 1218 and second pusher pad 1220 may maintain firm pressure on the cup 1208 as it is being moved to keep its motion steady and controlled. In step 1202m, the cup 1208 may now rest safely on the dishwasher tray 1264. The tidying robot 100 may push the dishwasher tray 1264 back into the dishwasher 1212 and close the dishwasher door 1260 through coordinated operation of the mobility system 104, gripper arm 128, lifting column 132, etc., in a manner similar to the steps previously described.

In step 1202n, now that the cup 1208 is in the dishwasher 1212, the dishwasher door 1260 is closed, and the handle 1256 is released, the tidying robot 100 may plan a path to return to the countertop to pick up another dish to put in the dishwasher 1212, to navigate to a base station, or to perform other tidying tasks. Once the dishwasher 1212 has completed washing the cup 1208, it may be removed from the dishwasher 1212 using steps similar to those implemented to remove the cup 1208 from the countertop 1204.

One of ordinary skill in the art will appreciate that, while the first pusher pad is shown here to be the left pusher pad and the second pusher pad is illustrated as the right pusher pad, the actions described here and elsewhere in this disclosure may be performed as readily with the right pusher pad being the first and the left the second. The designations "first," "second," "right," and "left" used herein are not intended to limit the performance of these actions to a specifically sided sequence of motion for the tidying robot 100.

FIG. 13A-FIG. 13E illustrate an obstruction placement procedure 1300 in accordance with one embodiment. In steps 1302a-1302k of this process, a tidying robot 100 may operate to approach a destination 1210 with access panels 1254 having handles 1256 allowing access to an interior of the destination 1258, as well as storage platforms 1262, such as cabinet 1304 having handled cabinet doors 1306 and shelves 1308 for storing portable bins 1310. The portable bins 1310 may be configured to be lifted and carried by the tidying robot 100. The portable bins 1310 may be configured for carrying by the tidying robot 100 as shown for portable bins 2300-3400 illustrated in FIG. 23-FIG. 34. The tidying robot 100 may be configured with movable scoop walls, such as the tidying robots with movable scoop walls 1900-2200.

In step 1302a, the tidying robot 100 may approach a cabinet 1304 or closet having closed cabinet doors 1306, behind which are stored portable bins 1310 on shelves 1308. The lifting column 132 may be raised to a height appropriate to engage with a desired cabinet door 1306 handle 1256 of the cabinet 1304. In step 1302b, the tidying robot 100 may extend its gripper arm 128 toward the handle 1256 of the desired cabinet door 1306. The tidying robot 100 may follow an algorithm to explore the cabinet 1304 and identify different portable bins 1310 and their locations within it to detect the correct one, may store a lookup table of specific portable bin 1310 locations, etc.

In step 1302c, the gripper arm 128 (or actuated gripper 126) may engage with and close around the cabinet door 1306 handle 1256 in order to grasp it. In step 1302d, the gripper arm linear actuator 174 may retract, the scoop arm linear actuator 170 may retract, or the tidying robot 100 may drive backwards to open the cabinet door 1306. Note that the base of the gripper arm 128 may allow some deflection (e.g., by incorporating a spring) as the cabinet door 1306 likely rotates while opening. The tidying robot 100 may also turn in its entirety or the lifting column 132 may rotate slightly to account for the rotation of the opening cabinet door 1306.

In step 1302e, the movable scoop walls 1312 may rotate back into the scoop 110 or otherwise out of the way so that sides of the scoop 110 don't interfere with the scoop 110 passing beneath portable bins 1310. Similarly, the gripper arm 128 and pusher pads 118 may be moved so as to avoid obstructing engagement of the scoop 110 with the portable bin 1310. In this position, the scoop 110 may be considered to be in a "forklift" configuration (forklift configuration 1314) for engaging with the desired portable bin 1310. In step 1302*f*, the tidying robot 100 may extend the scoop arm linear actuator 170 or may drive forward so that the scoop 110 passes beneath the portable bin 1310 in the cabinet 1304. The lifting column linear actuator 162 may be extended to lift the portable bin 1310 slightly up off of the cabinet 1304 shelf 1308.

In one embodiment, the portable bin 1310 may have a scoop slot 1316 that includes a scoop slot opening 1318. The scoop slot opening 1318 may allow the scoop 110 to pass into the scoop slot 1316, and the scoop slot 1316 may allow the portable bin 1310 to remain engaged with the scoop 110 as the scoop 110 is manipulated into various positions and orientations. In step 1302*f*, the scoop arm linear actuator 170 may extend and insert the scoop 110 into the scoop slot opening 1318 until a known position is reached or a force detector detects resistance indicating that the scoop 110 is fully seated within the scoop slot 1316.

In step 1302*g*, the tidying robot 100 may back away from the cabinet 1304 and/or retract the scoop arm linear actuator 170, moving the portable bin 1310 out of the cabinet 1304. In step 1302*h*, the tidying robot 100 may tilt the scoop 110 up and back while extending the gripper arm 128 to grasp the cabinet door 1306. The tidying robot 100 may then close the cabinet door 1306 by pushing with the gripper arm 128.

In step 1302*i*, after closing the cabinet door 1306, the tidying robot 100 may drive away while carrying the portable bin 1310. In step 1302*j*, the tidying robot 100 may lower the portable bin 1310 onto the floor 1320. The portable bin 1310 may also be placed by the tidying robot 100 onto a table, a countertop, or other stable, flat surface 1322. In step 1302*k*, the tidying robot 100 may back up, leaving the portable bin 1310 on the floor 1320 or other surface. The portable bin 1310 may include legs or a slot under it so the tidying robot 100 may easily remove its scoop 110 from under the portable bin 1310.

FIG. 14A-FIG. 14D illustrate a process for tidying tidyable objects from a table into a bin 1400 in accordance with one embodiment. Steps 1402*a*-1402*k* illustrate a tidying robot 100 completing the actions needed for this process. In step 1402*a*, the tidying robot 100 may drive to an elevated surface 1404 such as a table that has tidyable objects 802 on it, with the lifting column 132 set at a height such that the scoop 110 and pusher pads 118 are higher than the top of the elevated surface 1404. The tidying robot 100 may continue to drive toward the elevated surface 1404 in step 1402*b* with the first pusher pad 1218 and second pusher pad 1220 extended forward so that the target tidyable objects 802 may fit between them.

The tidying robot 100 may drive forward in step 1402*c* so that the tidyable objects 802 are in front of the scoop 110 and in between the first pusher pad 1218 and second pusher pad 1220. The second pusher pad arm 1240 and first pusher pad arm 1236 may be extended so that the first pusher pad 1218 and second pusher pad 1220 are past the tidyable objects 802. In step 1402*d*, the first pusher pad 1218 and the second pusher pad 1220 may be closed into a wedge configuration so that there is no gap between the tips of the pusher pads. In step 1402*e*, the tidying robot 100 may retract the first pusher pad arm linear actuator 1238 and second pusher pad arm linear actuator 1242 so that the tidyable objects 802 are fully surrounded by the pusher pads 118 and the scoop 110.

In step 1402*f*, the tidying robot 100 may close the second pusher pad 1220 so that the tidyable objects 802 are pushed across the front edge 1228 of the scoop 110. The first pusher pad 1218 may move slightly to make space and to prevent a gap from forming between the first pusher pad 1218 and the second pusher pad 1220. Alternatively, the first pusher pad 1218 may be closed instead. In step 1402*g*, the pusher pad arm 120 pusher pad arm linear actuators 172 may be retracted to further push the tidyable objects 802 into the scoop 110. In step 1402*h*, the first pusher pad 1218 and second pusher pad 1220 may be fully closed across the front of the scoop 110.

In step 1402*i*, the tidying robot 100 may tilt the scoop 110 up and back, creating a "bowl" configuration in order to carry the tidyable objects 802. In step 1402*j*, the tidying robot 100 may drive to and may dock with a portable bin 1310 (or an object collection bin 302 such as was previously illustrated in and described with respect to FIG. 3A). The tidying robot 100 may lower the lifting column 132 using the lifting column linear actuator 162, thereby lowering the scoop 110 to be just above the portable bin 1310. In step 1402*j* or previously, the tidying robot 100 may rotate the pusher pad arms 120 to move the pusher pads 118 away from the front of the scoop 110. The tidying robot 100 may tilt the scoop 110 forward in a front dump action 800 as previously described. In step 1402*k*, the tidyable objects 802 may fall off of the scoop 110 and into the portable bin 1310.

FIG. 15A-FIG. 15D illustrate a portable bin placement procedure 1500 in accordance with one embodiment. Steps 1502*a*-1502*h* illustrate a tidying robot 100 completing the actions needed for this process. In step 1502*a*, the tidying robot 100 may lower the scoop 110 to ground level (or countertop/table level) so that the bottom of the scoop 110 is flat, just above the found, table, or countertop surface. The movable scoop wall 1312 may be rotated, retracted, or otherwise repositioned so that the scoop 110 is configured in a forklift configuration 1314 where the side walls of the scoop 110 will not interfere with the scoop 110 going under bins or sliding into a scoop slot 1316 of a portable bin 1310. In step 1502*b* the tidying robot 100 may drive forward so that the scoop 110 goes under the bottom of the bin. This may be facilitated by configuring the bin with legs or a slot, making it easy for bottom of the scoop 110 to slide under the bin. Portable bins 1310 having such configurations are illustrated in FIG. 26-FIG. 34. In step 1502*c*, the tidying robot 100 may lift the portable bin 1310 full of tidyable objects 802 and may navigate along a return approach path 1504 to a cabinet 1304 having cabinet doors 1306 with handles 1256 and shelves 1308 for storing portable bins 1310.

In step 1502*d*, the tidying robot 100 may extend its actuated gripper 126 and use the actuated gripper 126 to open the cabinet 1304 cabinet door 1306 behind which it wishes to place the portable bin 1310. In step 1502*e*, the tidying robot 100 may align the scoop 110 to be flat and level with the cabinet 1304 shelf 1308.

In step 1502*f*, the tidying robot 100 may drive forward or may extend the scoop arm 114 scoop arm linear actuator 170 so that the portable bin 1310 is held slightly above the cabinet 1304 shelf 1308. The tidying robot 100 may then lower the scoop 110 slightly so the portable bin 1310 is supported by the cabinet 1304 shelf 1308. In step 1502*g*, the tidying robot 100 may back up, leaving the portable bin 1310 in the cabinet 1304. The tidying robot 100 may use the actuated gripper 126 to close the cabinet 1304 cabinet door 1306. The portable bin 1310 full of tidyable object 802 is now put away in the closed cabinet 1304, as shown in step 1502*h*.

Figure 16A:
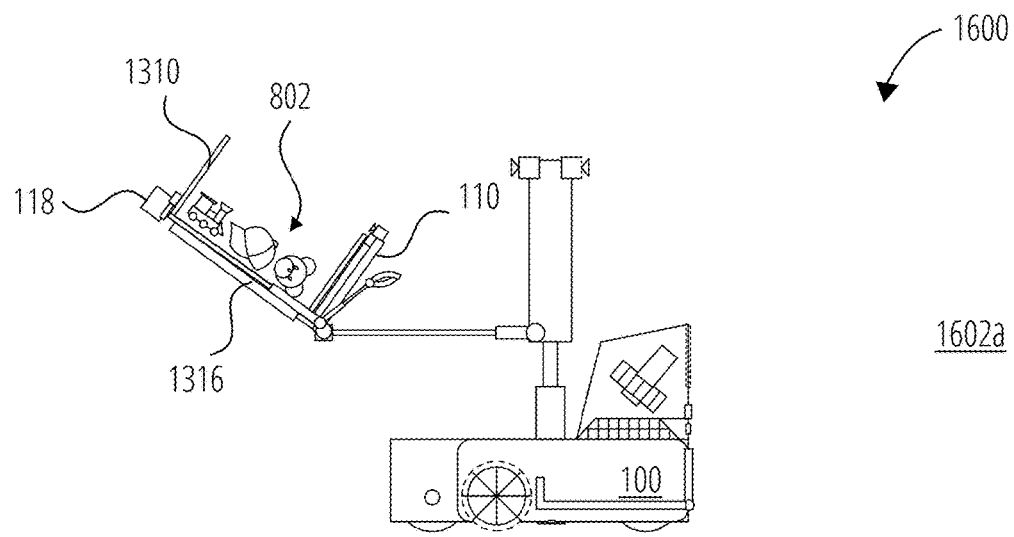
FIG. 16A-FIG. 16C illustrate a process for emptying tidyable objects from a bin and sorting them on the floor 1600 in accordance with one embodiment.
Figure 16B:
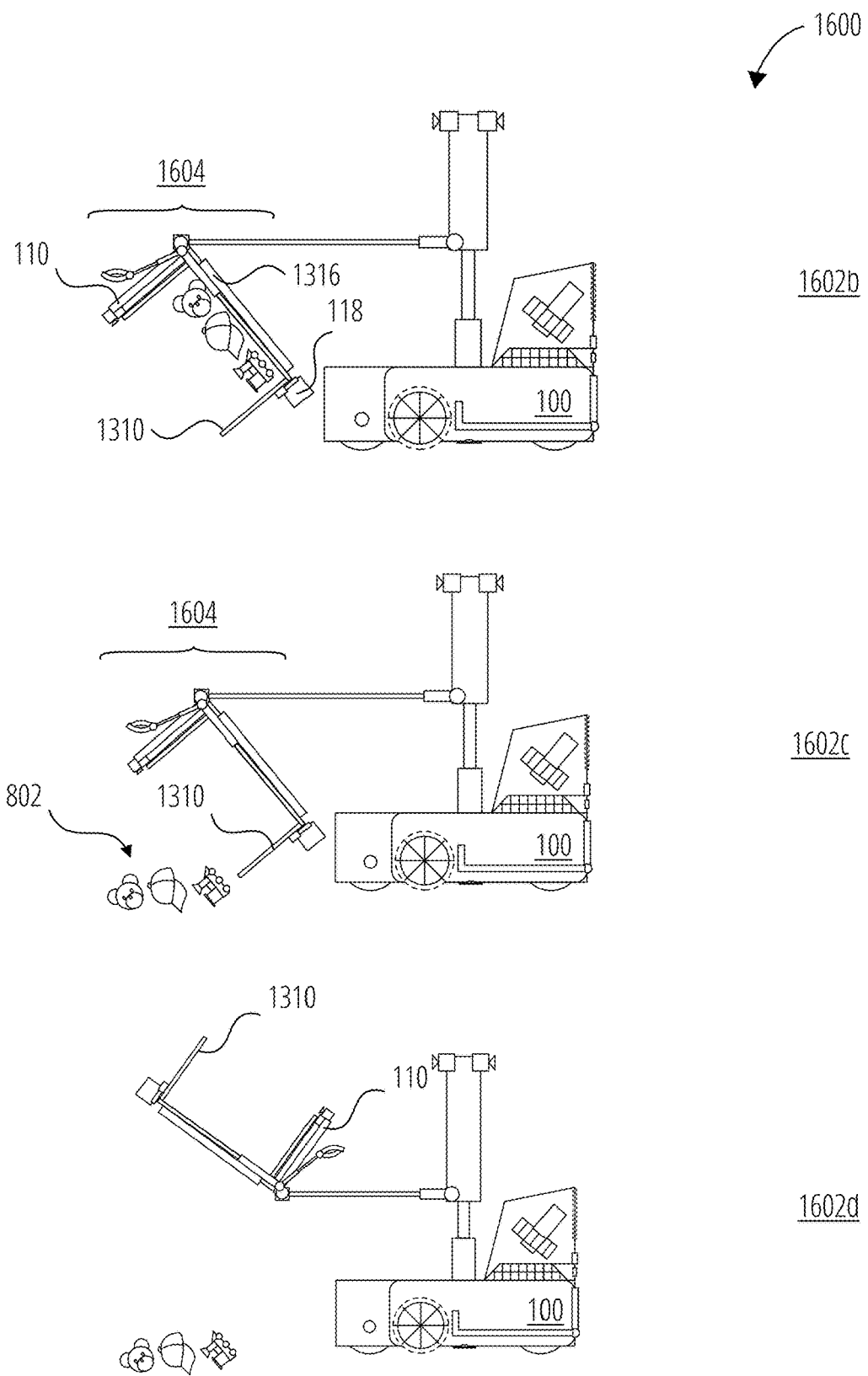
Figure 16C:
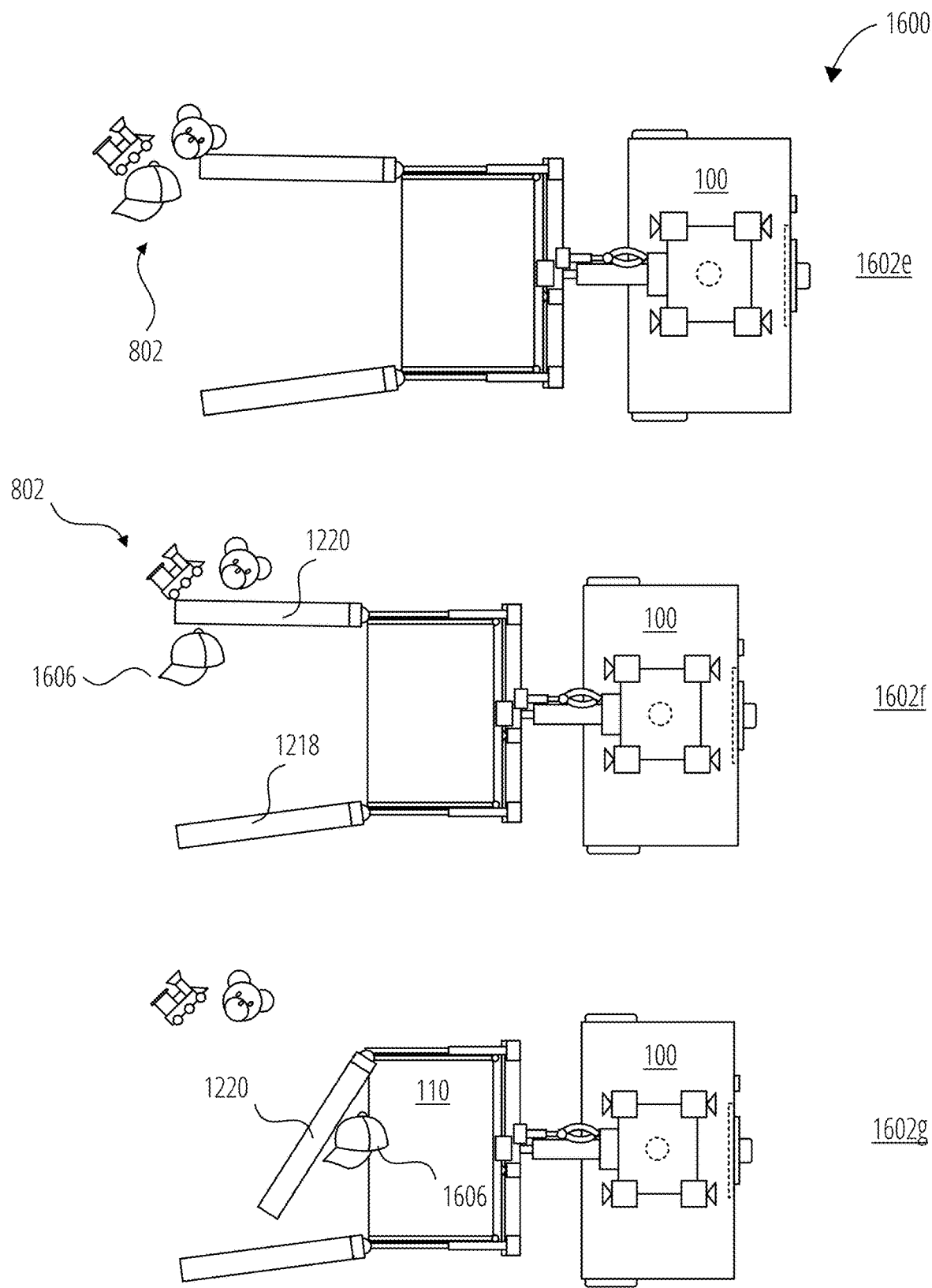
Figures 17A, 17B:
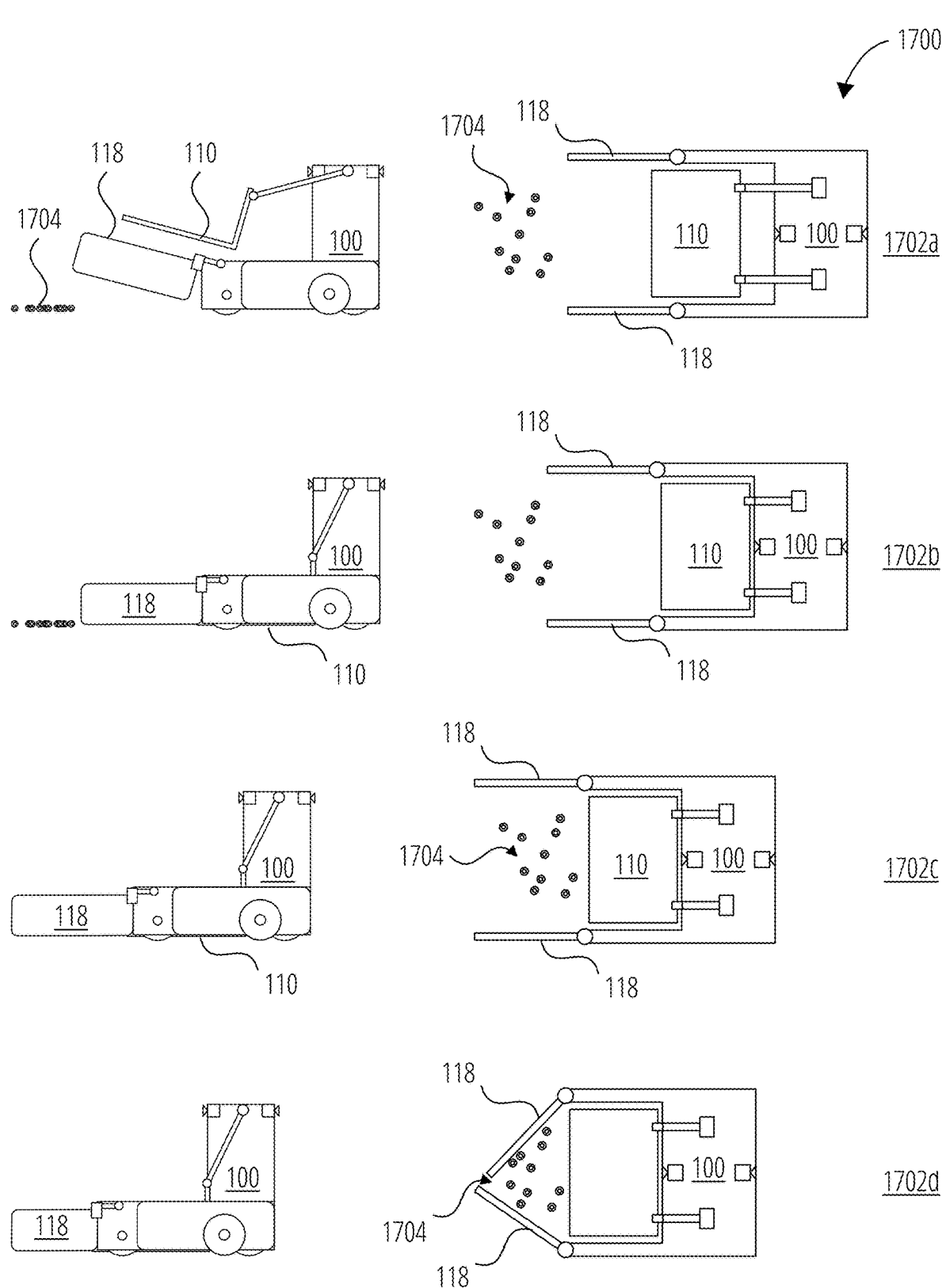

FIG. 16A-FIG. 16C illustrate a process for emptying tidyable objects from a bin and sorting them on the floor 1600 in accordance with one embodiment. Steps 1602*a*-1602*g* illustrate a tidying robot 100 completing the actions needed for this process. In step 1602a, the bottom of the scoop 110 of the tidying robot 100 may reside within the scoop slot 1316 under the portable bin 1310 full of tidyable objects 802, which may be accomplished in a manner similar to that described previously. The left and right pusher pads 118 may be closed in front of the portable bin 1310.

In step 1602b, the scoop 110 may tilt forward into an inverted position 1604, but the portable bin 1310 may still be retained due to the bottom of the scoop 110 being through the scoop slot 1316 on the portable bin 1310 while the pusher pads 118 keep the portable bin 1310 from sliding forward.

In step 1602c, the tidyable objects 802 may fall out of the portable bin 1310 onto the floor (or another destination location such as a play mat, table, countertop, bed, or toy chest). In step 1602d, the scoop 110 may be tilted back up and back. The tidying robot 100 may continue to carry the now empty portable bin 1310.

Tidyable objects 802 may be sorted by the tidying robot 100 on the floor in step 1602e. In step 1602f, the second pusher pad 1220 may be driven forward between tidyable objects 802 in order to separate the target object(s), such as the target object 1606 shown, from objects that are intended to be left on the floor. Alternatively, the first pusher pad 1218 may be used to separate the target object(s) from those intended to remain on the floor, though this is not illustrated.

In step 1602g, the second pusher pad 1220 may rotate closed, pushing the target object 1606 onto the scoop 110. The scoop 110 may be then lifted up and back in order to carry the target object 1606 or target objects 1606 and then dump them into a target bin or another target location.

FIG. 17A-FIG. 17H illustrate a process for pre-sweeping a floor 1700 in accordance with one embodiment. FIG. 17A FIG. 17C, FIG. 17E, and FIG. 17G illustrate a side view of the steps performed and FIG. 17B, FIG. 17D, FIG. 17F, and FIG. 17H illustrate a top view of each step. Steps 1702a-1702m illustrate a tidying robot 100 completing the actions needed for this process.

While following a standard vacuuming pattern with the scoop 110 lifted and pusher pads 118 lifted in step 1702a, the tidying robot 100 may encounter heavy dirt and debris 1704 on the floor that cannot be easily vacuumed (e.g., dropped food, small rocks, broken glass, hair, etc.). In step 1702b, the tidying robot 100 may drop its pusher pads 118 and scoop 110 to be level against the floor. In step 1702c, the tidying robot 100 may drive forward so that the target heavy dirt and debris 1704 is between the pusher pads 118 and toward scoop 110 edge. In step 1702d, the tidying robot 100 may close its pusher pads 118 to fully encapsulate the target heavy dirt and debris 1704.

In step 1702e, the tidying robot 100 may use the pusher pads 118 to push the heavy dirt and debris 1704 toward the scoop 110 while minimizing the gap between the pusher pads 118. In step 1702f, the tidying robot 100 may fully push the heavy dirt and debris 1704 onto the scoop 110 with one pusher pad 118 following closely behind the other pusher pad 118 so that there is no gap. In step 1702g, the tidying robot 100 may lift the pusher pads 118 up to avoid pushing the heavy dirt and debris 1704 out of the scoop 110. In step 1702h, the tidying robot 100 may open the pusher pads 118 while they are lifted.

In step 1702i, the tidying robot 100 may drop its pusher pads 118 back to floor level. In step 1702j, the tidying robot 100 may drive forward to pick up additional heavy dirt and debris 1706 that is still on the floor, repeating the process from step 1702b on, adding more heavy dirt and debris 1704 to the scoop 110. In step 1702k, the tidying robot 100 may lift its scoop 110 and pusher pads 118 when done picking up the heavy dirt and debris 1704. The tidying robot 100 may continue to follow the standard vacuuming pattern, incrementally picking up additional heavy dirt and debris 1706 into the scoop 110 as needed.

In step 1702l, when done vacuuming, or when the scoop 110 is full, the tidying robot 100 may navigate to a disposal location 1708 in order to dump heavy dirt and debris 1704 out of the scoop 110. In step 1702m, the tidying robot 100 may dock with the disposal location 1708 and dump the heavy dirt and debris 1704 out of the scoop 110. The tidying robot 100 may then continue vacuuming, return to a base station if vacuuming is complete, perform or explore for additional tasks, etc.

FIG. 18A and FIG. 18B illustrate a process for sweeping in an inverted wedge configuration 1800 in accordance with one embodiment. FIG. 18A shows a side view and FIG. 18B a top view of the tidying robot 100 performing each step. Steps 1802a-1802c illustrate a tidying robot 100 completing the actions needed for this process.

In step 1802a, the pusher pads 118 may rotate back toward the center of the chassis 1804 and so be placed in an inverted wedge configuration 1806 in front of the vacuum intake port to passively collect heavy dirt and debris 1704 on the floor as the tidying robot 100 drives forward. In step 1802b, the inverted wedge configuration 1806 may encourage the heavy dirt and debris 1704 to accumulate toward the center where the pusher pads 118 meet as the tidying robot 100 drives forward.

Once sufficient heavy dirt and debris 1704 accumulates, or if the tidying robot 100 encounters obstructions it needs to handle, the tidying robot 100 may push the heavy dirt and debris 1704 to an intermediate location 1808, as shown in step 1802c. The tidying robot 100 may back up a full robot length 1810, open its pusher pads 118 and go through a pickup cycle to collect the pile of heavy dirt and debris 1704, as described above with respect to steps 1702j-1702m shown in FIG. 17E-FIG. 17H. The tidying robot 100 may also back away from the intermediate location 1808, return to the obstructions, and execute an obstruction handling strategy, returning to collect the heavy dirt and debris 1704 from the intermediate location 1808 once the obstructions are handled, and continuing its vacuum cleaning pattern for areas that have not yet been vacuumed.

FIG. 19A-FIG. 19D illustrate a tidying robot with movable scoop walls 1900 in various configurations in accordance with one embodiment. FIG. 19A and FIG. 19B show top views. FIG. 19C and FIG. 19D show side views.

In FIG. 19A, a top view of the tidying robot with movable scoop walls 1900 is shown. The horizontally rotating movable scoop walls 1902 are shown extended to either side of the scoop 110. motors 1904 may be seen where each horizontally rotating movable scoop wall 1902 attaches near the rear of the scoop 110. These motors may rotate the horizontally rotating movable scoop walls 1902 inward, toward each other and toward the rear of the scoop 110, as shown in FIG. 19B. In another embodiment, the horizontally rotating movable scoop walls 1902 may rotate outward and extend backward behind and perpendicular to the rear of the scoop 110, or fold into a cavity or notch provided along the back edge of the scoop 110. This may place the tidying robot with movable scoop walls 1900 into a forklift configuration 1314, as described with respect to step 1302e of FIG. 13C, allowing the tidying robot with movable scoop walls 1900 to engage with the scoop slot 1316 of a portable bin 1310.

FIG. 19C shows a side view of the tidying robot with movable scoop walls 1900 with the scoop 110 in the forklift configuration 1314 shown in FIG. 19B. The tidying robot with movable scoop walls 1900 may be seen with the scoop 110 engaged within the scoop slot 1316 of a portable bin 1310. FIG. 19D shows a side view of the tidying robot with movable scoop walls 1900 placing the portable bin 1310 into an inverted position 1604, facilitated by the engagement of the scoop 110 within the scoop slot 1316 of the portable bin 1310.

Figures 20A, 20B:
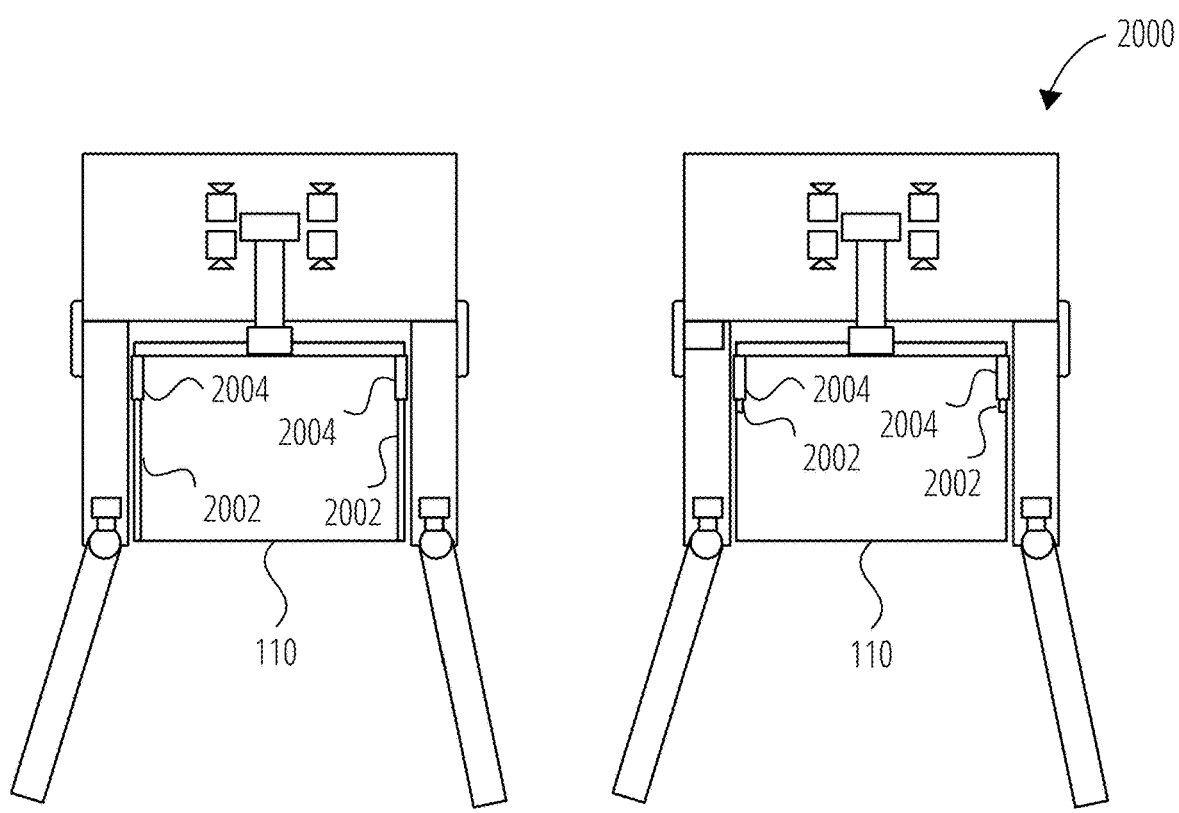
FIG. 20A and FIG. 20B illustrate a tidying robot with movable scoop walls 2000 in various configurations in accordance with one embodiment.

FIG. 20A and FIG. 20B illustrate a tidying robot with movable scoop walls 2000 in various configurations in accordance with one embodiment. The tidying robot with movable scoop walls 2000 may comprise retracting movable scoop walls 2002 and linear actuators 2004. The retracting movable scoop walls 2002 may extend to the front edge of the scoop 110 as shown in FIG. 20A, or may be retracted by the linear actuators 2004 as shown in FIG. 20B. The retracting movable scoop walls 2002 may retract simultaneously, independently, or in a coordinated manner, as needed for specific applications.

In one embodiment, each retracting movable scoop wall 2002 may use a combination of a cable and a spring rather than a linear actuator 2004. The spring may maintain the retracting movable scoop wall 2002 in the extended position shown in FIG. 20A. The cable may be wound by a small motor to pull the retracting movable scoop wall 2002 into a retracted position as shown in FIG. 20B. The narrower portion of the retracting movable scoop wall 2002 toward the front of the scoop 110 may retract into the wider portion of the retracting movable scoop wall 2002 toward the rear of the scoop 110.

Figures 21A, 21B:
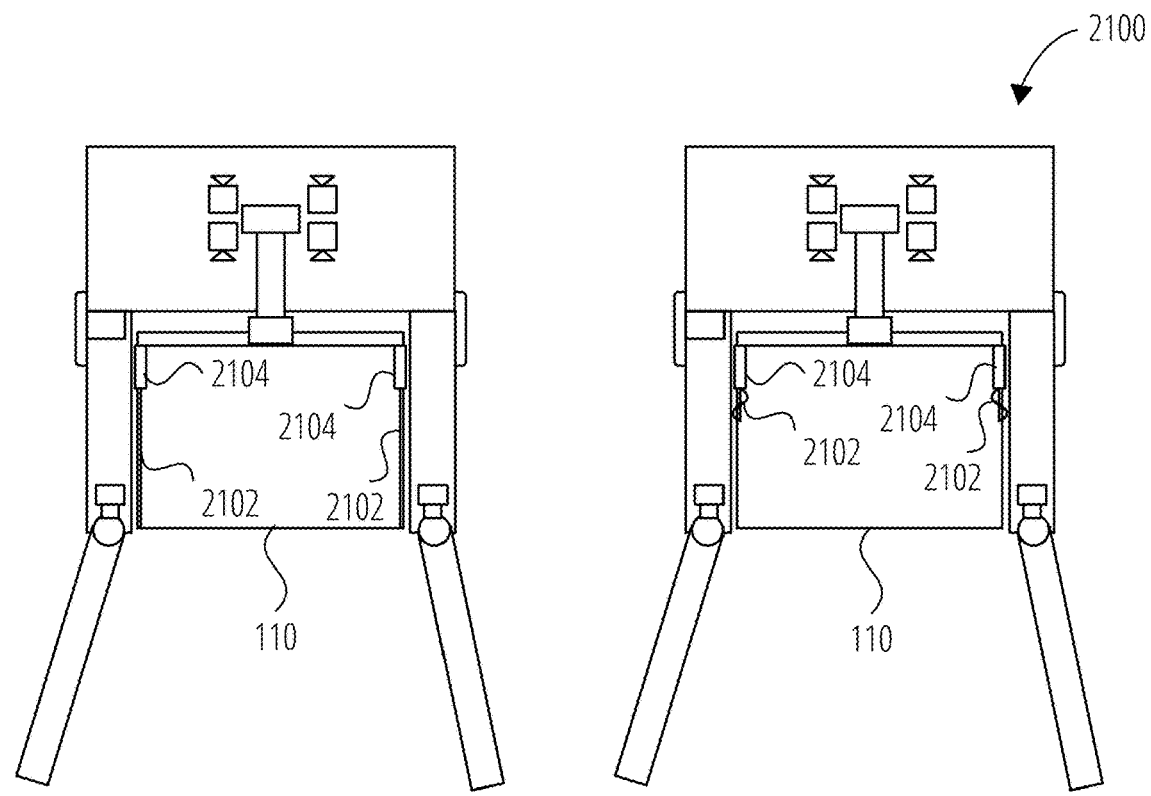
FIG. 21A and FIG. 21B illustrate a tidying robot with movable scoop walls 2100 in various configurations in accordance with one embodiment.

FIG. 21A and FIG. 21B illustrate a tidying robot with movable scoop walls 2100 in various configurations in accordance with one embodiment. The tidying robot with movable scoop walls 2100 may comprise collapsing movable scoop walls 2102 and linear actuators 2104. The collapsing movable scoop wall 2102 may be made of a flexible material such as a durable fabric, mesh, or other membrane, that is kept under tension in the extended position, as shown in FIG. 21A, but may be pulled towards the back of the scoop 110 into a retracted position, as shown in FIG. 21B, by the linear actuator 2104.

A rod controlled by the linear actuator 2104 of each collapsing movable scoop wall 2102 may be threaded through small holes in the fabric, mesh, or membrane, such that the material of the collapsing movable scoop wall 2102 may fold neatly into a compact repeating "S" shape without extending too far out from or into the scoop 110. In one embodiment, a cable and spring as described above may be used to extend and retract the collapsing movable scoop walls 2102.

Figure 22A:
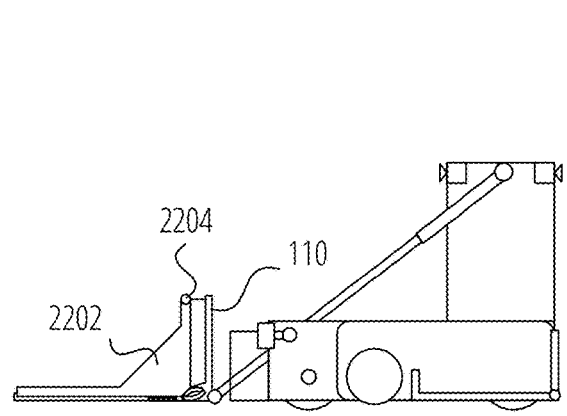
FIG. 22A and FIG. 22B illustrate a tidying robot with movable scoop walls 2200 in accordance with one embodiment.
Figure 22B:
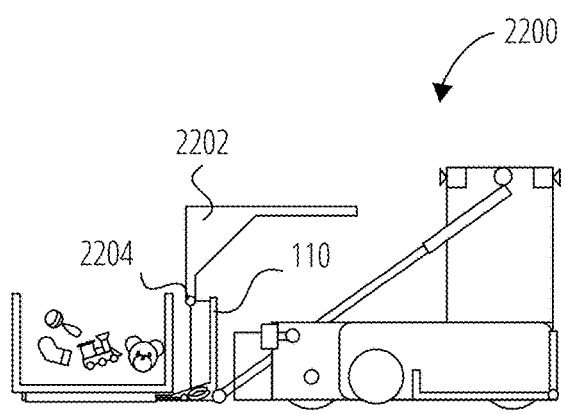

FIG. 22A and FIG. 22B illustrate a tidying robot with movable scoop walls 2200 in accordance with one embodiment. The tidying robot with movable scoop walls 2200 may comprise vertically rotating movable scoop walls 2202 and motors 2204. The vertically rotating movable scoop walls 2202 may rotate up over the top of the scoop 110 through the action of the motors 2204. In this manner, the vertically rotating movable scoop wall 2202 may be moved out of the way of the scoop 110 engaging with portable bins 1310 with either scoop slots or legs. The illustrated embodiment may also work for scoops 110 having curved bases, rather than the flat base illustrated here, which may obstruct the horizontal rotation of the movable scoop walls.

Figure 23:
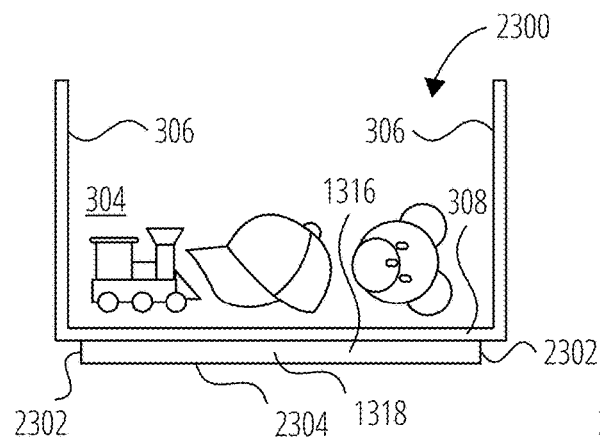
FIG. 23 illustrates a portable bin 2300 in accordance with one embodiment.

FIG. 23 illustrates a front elevation view of a portable bin 2300 in accordance with one embodiment. The portable bin 2300 may comprise a storage compartment 304, bin sides 306, a bin base 308, a scoop slot 1316, a scoop slot opening 1318, scoop slot sides 2302, and a scoop slot bottom 2304. The scoop slot 1316 may be fully or primarily enclosed, having a solid scoop slot bottom 2304 and scoop slot sides 2302.

The scoop slot 1316 may be provided under the portable bin 2300 storage compartment 304 and bin base 308. The scoop slot 1316 may be bounded by scoop slot sides 2302 and a scoop slot bottom 2304, which may define a scoop slot opening 1318 configured to allow the scoop 110 of a tidying robot 100 to slide into the scoop slot 1316, as introduced with respect to steps 1302e and 1302f of FIG. 13C. This may allow the tidying robot 100 to move a portable bin into an inverted position 1604 as illustrated in FIG. 16B.

Figure 24:
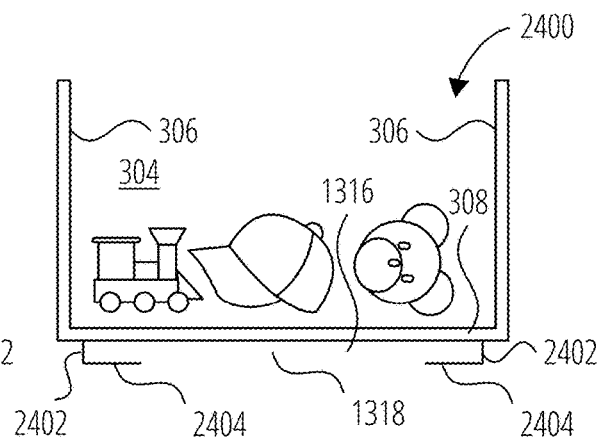
FIG. 24 illustrates a portable bin 2400 in accordance with one embodiment.

FIG. 24 illustrates a front elevation view of a portable bin 2400 in accordance with one embodiment. The portable bin 2400 may comprise a storage compartment 304, bin sides 306, a bin base 308, a scoop slot 1316, a scoop slot opening 1318, scoop slot sides 2402, and a scoop slot bottom 2404. The scoop slot 1316 may be partially or primarily open along its sides, or along the scoop slot bottom 2404, as shown here, while still providing enclosure adequate to secure the portable bin 2400 to the scoop 110 of the tidying robot 100.

The scoop slot 1316 may be provided under the portable bin 2400 storage compartment 304 and bin base 308. The scoop slot 1316 may be bounded by scoop slot sides 2402 and portions of a scoop slot bottom 2304, which may define a scoop slot opening 1318 configured to allow the scoop 110 of a tidying robot 100 to slide into the scoop slot 1316, as introduced with respect to steps 1302e and 1302f of FIG. 13C. This may allow the tidying robot 100 to move a portable bin into an inverted position 1604 as illustrated in FIG. 16B.

Figure 25:
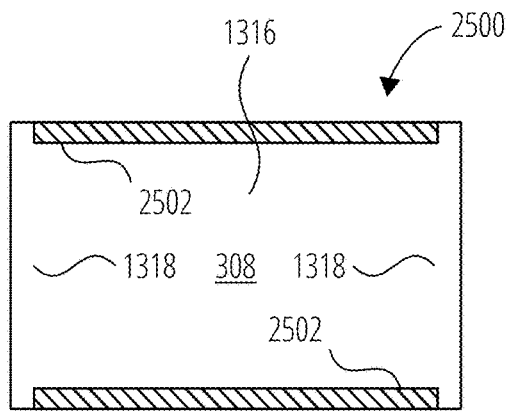
FIG. 25 illustrates a portable bin 2500 in accordance with one embodiment.

FIG. 25 illustrates a bottom plan view of a portable bin 2500 in accordance with one embodiment. The portable bin 2500 may comprise a storage compartment 304 and bin sides 306 not pictured here, a bin base 308, and legs 2502 positioned along two opposite sides of the bin base 308.

The legs 2502 may raise the bin base 308 off of the ground, forming a scoop slot 1316 area beneath the portable bin 2500 that may allow the scoop 110 of a tidying robot 100 to slide into the two scoop slot opening 1318 areas at either end of the portable bin 2500 between the legs 2502, the ground, and the bin base 308. In this manner, the scoop 110 of the tidying robot 100 may get beneath the portable bin 2500 and lift it securely, similar to a forklift. The legs 2502 may prevent the portable bin 2500 from sliding sideways off of the scoop 110 while a tilted position of the scoop 110 may prevent the portable bin 2500 from sliding forward off of the scoop 110.

Figure 26:
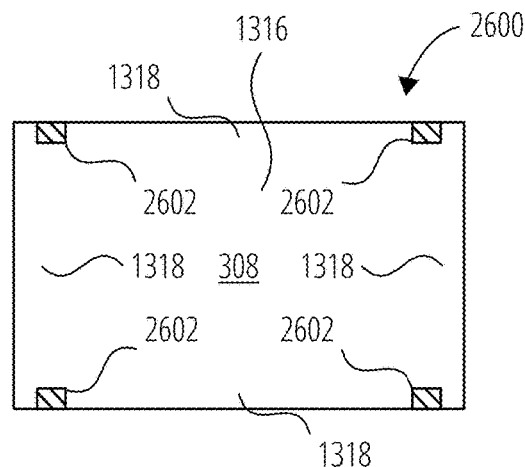
FIG. 26 illustrates a portable bin 2600 in accordance with one embodiment.

FIG. 26 illustrates a bottom plan view of a portable bin 2600 in accordance with one embodiment. The portable bin 2600 may comprise a storage compartment 304 and bin sides 306 not pictured here, a bin base 308, and legs 2602 positioned at or near each corner of the bin base 308.

The legs 2602 may raise the bin base 308 off of the ground, forming a scoop slot 1316 area beneath the portable bin 2600 that may allow the scoop 110 of a tidying robot 100 to slide into scoop slot opening 1318 areas at each side of the portable bin 2600 between the legs 2502, the ground, and the bin base 308. In this manner, the scoop 110 of the tidying robot 100 may get beneath the portable bin 2500 and lift it securely, similar to a forklift. The legs 2602 may prevent the portable bin 2600 from sliding sideways off of the scoop 110 while a tilted position of the scoop 110 may prevent the portable bin 2600 from sliding forward off of the scoop 110.

Figure 27:
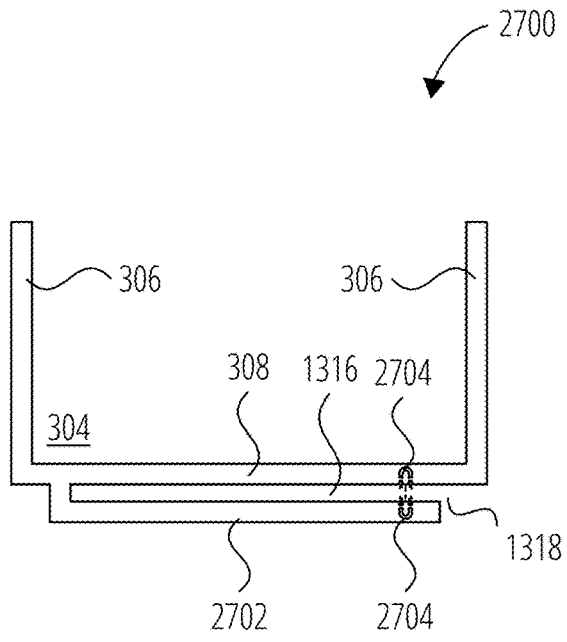
FIG. 27 illustrates a portable bin 2700 in accordance with one embodiment.

FIG. 27 illustrates a side elevation view of a portable bin 2700 in accordance with one embodiment. The portable bin 2700 may comprise a storage compartment 304, bin sides 306, a bin base 308, a scoop slot 1316, a scoop slot opening 1318, a scoop slot bottom 2702, and magnets 2704.

The magnets 2704 may be aligned with each other, one in the bin base 308 and one in the scoop slot bottom 2702, near or at the scoop slot opening 1318. They may be configured to repel each other, and thus may prevent the scoop slot opening 1318 and scoop slot 1316 from being compressed by weight of the bin or objects in the storage compartment 304 to a degree that prevents or inhibits the passage of the scoop 110 into the scoop slot opening 1318. The repulsion of the magnets 2704 may also induce the scoop slot opening 1318 to open more widely when not engaged with a scoop 110, reducing friction upon entry of the scoop 110 into the scoop slot opening 1318.

In one embodiment, the scoop 110 of the tidying robot 100 may include metallic or magnetic components that passively or dynamically engage the magnets 2704, and provide an additional mechanism for securing the portable bin 2700 to the scoop 110. Such components may be capable of switching their magnetic fields on and off, such that they may attract the magnets 2704 while the portable bin 2700 is being carried, but repel or cease to attract them when the tidying robot 100 needs to deposit the portable bin 2700 at a desired location.

Figure 28:
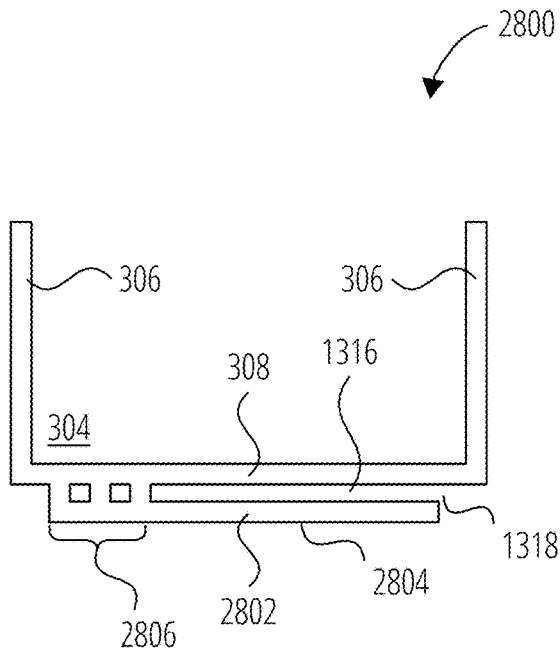
FIG. 28 illustrates a portable bin 2800 in accordance with one embodiment.

FIG. 28 illustrates a side elevation view of a portable bin 2800 in accordance with one embodiment. The portable bin 2800 may comprise a storage compartment 304, bin sides 306, a bin base 308, a scoop slot 1316, a scoop slot opening 1318, and a scoop slot bottom 2802.

The scoop slot bottom 2802 may be formed from material with high yield strength 2804, and may include a reinforced area 2806 at the end of the scoop slot 1316 opposite the scoop slot opening 1318. These features may prevent the scoop slot opening 1318 from being compressed by the weight of the bin or objects in the storage compartment 304 to a degree that prevents the passage of the scoop 110 into the scoop slot opening 1318.

Figure 29:
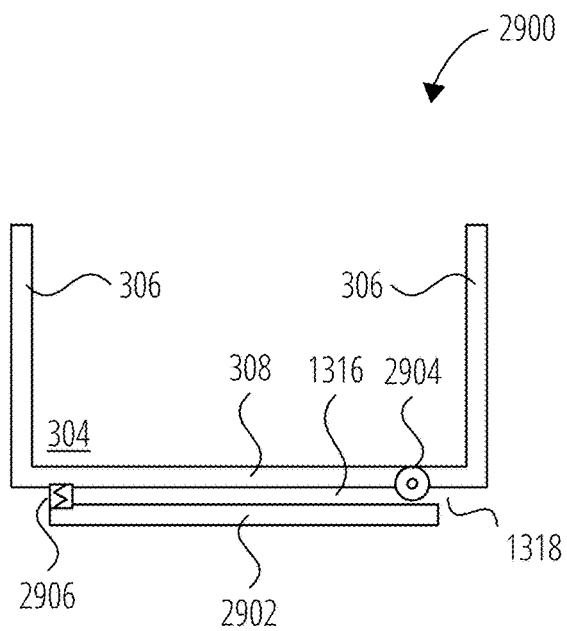
FIG. 29 illustrates a portable bin 2900 in accordance with one embodiment.

FIG. 29 illustrates a side elevation view of a portable bin 2900 in accordance with one embodiment. The portable bin 2900 may comprise a storage compartment 304, bin sides 306, a bin base 308, a scoop slot 1316, a scoop slot opening 1318, a scoop slot bottom 2902, a wheel and bearing 2904, and a linear spring 2906.

The wheel and bearing 2904 may be attached to the bin base 308 and positioned near the scoop slot opening 1318. A single wheel and bearing 2904 may be positioned toward the center of the edge of the bin base 308 near the scoop slot opening 1318, or one wheel and bearing 2904 may be attached at either side of that bin base 308 edge. Other configurations may also be possible.

The wheel and bearing 2904 may reduce friction and facilitate entry of the scoop 110 into the scoop slot opening 1318. The linear spring 2906 may be positioned opposite the scoop slot 1316 from the scoop slot opening 1318, and may allow the scoop slot 1316 to widen as the edge of the scoop 110 passes between the wheel and bearing 2904 and the scoop slot bottom 2902, further facilitating entry of the scoop 110 into the scoop slot 1316.

Figure 30:
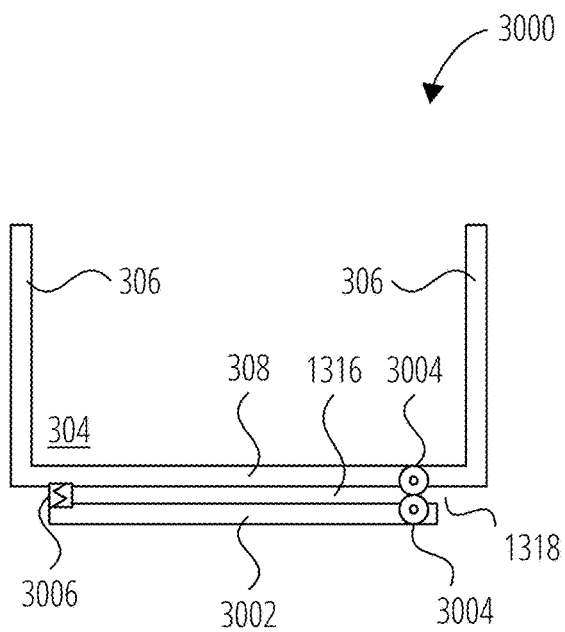
FIG. 30 illustrates a portable bin 3000 in accordance with one embodiment.

FIG. 30 illustrates a side elevation view of a portable bin 3000 in accordance with one embodiment. The portable bin 3000 may comprise a storage compartment 304, bin sides 306, a bin base 308, a scoop slot 1316, a scoop slot opening 1318, a scoop slot bottom 3002, wheels and bearings 3004, and a linear spring 3006.

The wheels and bearings 3004 may be positioned near the scoop slot opening 1318 with one attached to the bin base 308 and the other to the scoop slot bottom 3002. A single set of wheels and bearings 3004 may be positioned toward the center of the edge of the bin base 308 near the scoop slot opening 1318, or one set of wheels and bearings 3004 may be attached at either side of that bin base 308 edge. Other configurations may also be possible.

The wheels and bearings 3004 may reduce friction and facilitate entry of the scoop 110 into the scoop slot opening 1318. The linear spring 3006 may be positioned opposite the scoop slot 1316 from the scoop slot opening 1318, and may allow the scoop slot 1316 to widen as the edge of the scoop 110 passes between the wheels and bearings 3004, further facilitating entry of the scoop 110 into the scoop slot 1316.

Figure 31:
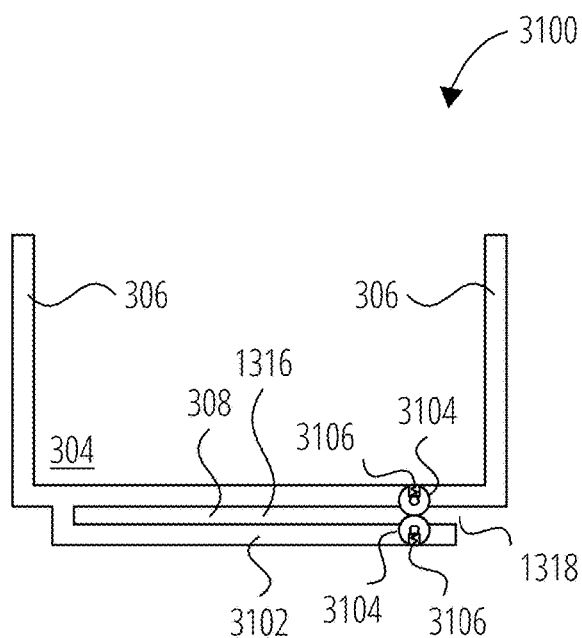
FIG. 31 illustrates a bin 3100 in accordance with one embodiment.

FIG. 31 illustrates a side elevation view of a bin 3100 in accordance with one embodiment. The bin 3100 may comprise a storage compartment 304, bin sides 306, a bin base 308, a scoop slot 1316, a scoop slot opening 1318, a scoop slot bottom 3102, wheels and bearings 3104, and linear springs 3106.

The wheels and bearings 3104 may be positioned near the scoop slot opening 1318 with one attached to the bin base 308 and the other to the scoop slot bottom 3102. A single set of wheels and bearings 3104 may be positioned toward the center of the edge of the bin base 308 near the scoop slot opening 1318, or one set of wheels and bearings 3104 may be attached at either side of that bin base 308 edge. Other configurations may also be possible.

The wheels and bearings 3104 may reduce friction and facilitate entry of the scoop 110 into the scoop slot opening 1318. The wheels and bearings 3104 may be attached to the bin base 308 and scoop slot bottom 3102 through the linear springs 3106. The linear springs 3106 may allow the wheels and bearings 3104 to move away from each other elastically as the scoop 110 passes between them, further facilitating entry of the scoop 110 into the scoop slot 1316.

Figure 32:
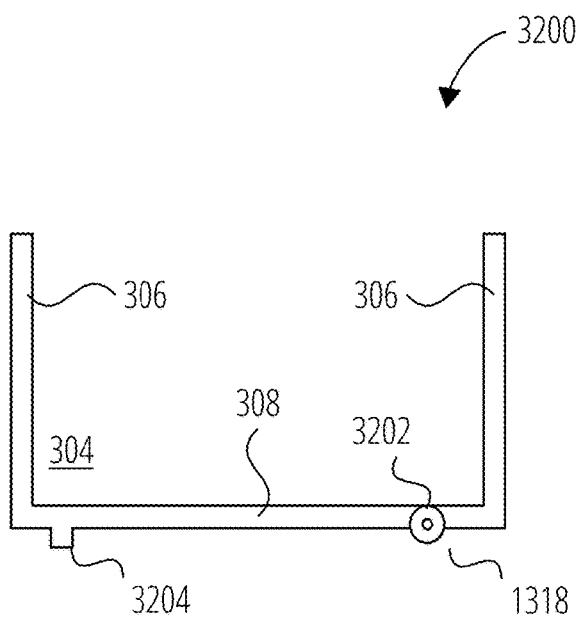
FIG. 32 illustrates a portable bin 3200 in accordance with one embodiment.

FIG. 32 illustrates a side elevation view of a portable bin 3200 in accordance with one embodiment. The portable bin 3200 may comprise a storage compartment 304, bin sides 306, a bin base 308, a scoop slot opening 1318, one or more wheels and bearings 3202, and one or more legs 3204.

The leg or legs 3204 and the one or more wheels and bearings 3202 may raise the bin base 308 off of the ground, forming a scoop slot 1316 area beneath the portable bin 3200 that may allow the scoop 110 of a tidying robot 100 to slide into scoop slot opening 1318 areas. The leg 3204 may be a linear ridge such as the legs 2502 illustrated in FIG. 25, running along the edge of the bin base 308 opposite the scoop slot opening 1318 area. Legs 3204 such as the legs 2602 showing in FIG. 26 may, alternatively, be positioned at either corner of the bin base 308 opposite the scoop slot opening 1318. A single wheel and bearing 3202 may be positioned toward the center of the edge of the bin base 308 near the scoop slot opening 1318, or one wheel and bearing 3202 may be attached at either side of that bin base 308 edge. Other configurations may also be possible.

The wheel and bearing 3202 may reduce friction as the front edge of the scoop 110 passes through the scoop slot opening 1318 into the scoop slot 1316 area beneath the bin base 308. The leg 3204 may provide an amount of friction that maintains the portable bin 3200 as the scoop 110 passes beneath it. These components may also prevent the portable bin 3200 from sliding sideways off of the scoop 110.

Figure 33:
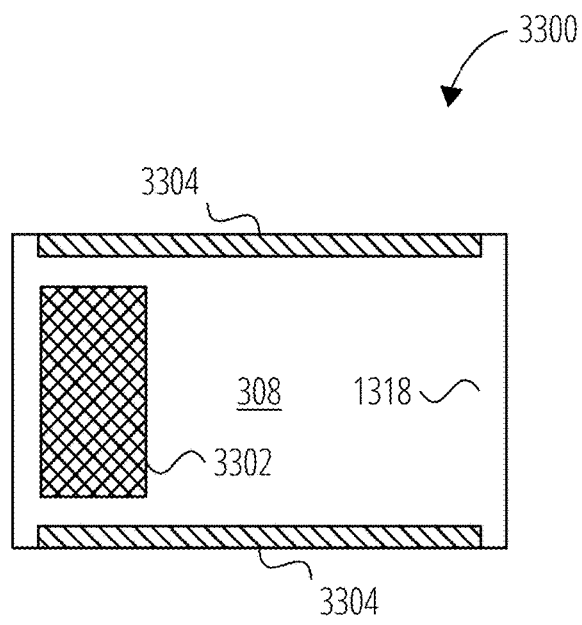
FIG. 33 illustrates a portable bin 3300 in accordance with one embodiment.

FIG. 33 illustrates a bottom plan view of a portable bin 3300 in accordance with one embodiment. The portable bin 3300 may comprise a storage compartment 304 and bin sides 306 not pictured here, a bin base 308, a scoop slot opening 1318, a ledge 3302, and legs 3304. The leg 3304 shown are similar to the two legs 2502 illustrated in FIG. 25, but in one embodiment, the portable bin 3300 may have four legs such as the legs 2602 shown in FIG. 26.

The ledge 3302 may be affixed to but have a gap between it and the bin base 308, such that it may hook under the front of the scoop 110 when the scoop 110 is fully inserted into the scoop slot 1316 formed between the legs 3304, the bin base 308, and the ground. This may allow the scoop 110 to turn the portable bin 3300 upside down into an inverted position 1604 as shown in FIG. 16B in order to dump toys out. The ledge may keep the portable bin 3300 in place even when it is upside down on the scoop 110.

Figure 34:
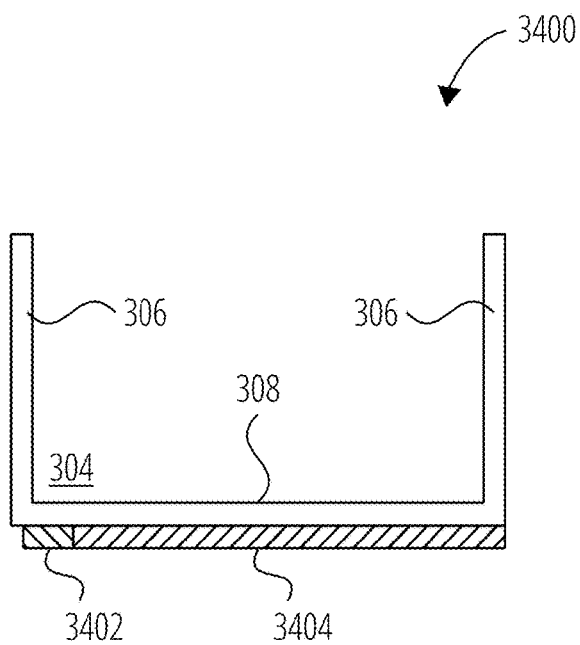
FIG. 34 illustrates a portable bin 3400 in accordance with one embodiment.

FIG. 34 illustrates a side elevation view of a portable bin 3400 in accordance with one embodiment. The portable bin 3400 may comprise a storage compartment 304, bin sides 306, and a bin base 308 configured with a high friction material 3402 and a low friction material 3404.

The low friction material 3404 may allow the front edge of the scoop 110 to pass beneath the bin base 308 easily, allowing the scoop 110 to slide beneath the portable bin 3400. The high friction material 3402 may prevent the portable bin 3400 from sliding on the floor as the scoop 110 passes beneath it, and may prevent the portable bin 3400 from sliding off of the scoop 110 as the bin is lifted and carried by the tidying robot 100.

Figure 35:
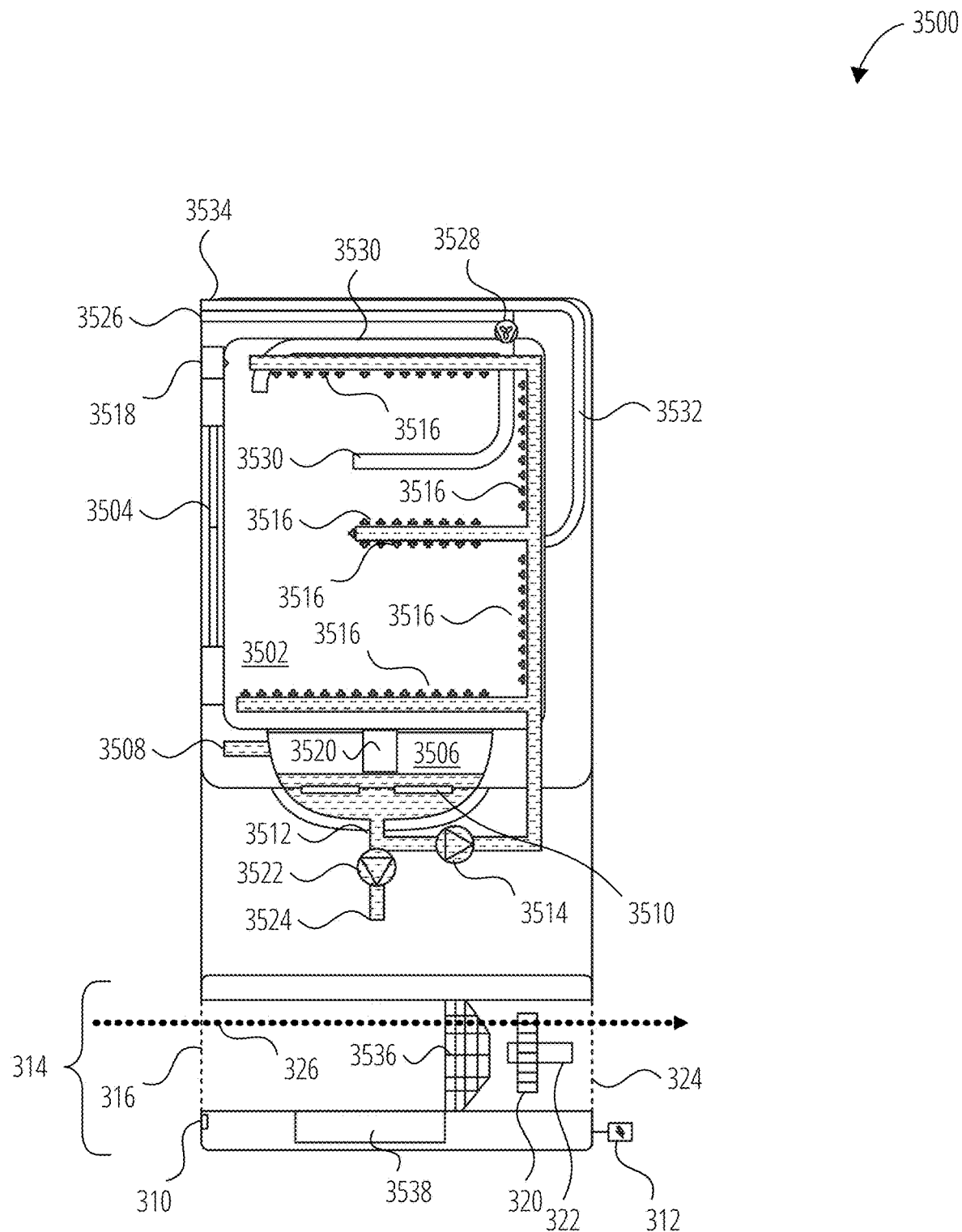
FIG. 35 illustrates a sanitizing station 3500 in accordance with one embodiment.

FIG. 35 illustrates a sanitizing station 3500 in accordance with one embodiment. The sanitizing station 3500 may include the same vacuum emptying and power charging components previously described with respect to the base station 300 illustrated in FIG. 3A and FIG. 3B.

These may include the base station charge connector 310, power source connection 312, and the vacuum emptying system 314. The vacuum emptying system 314 may include a vacuum emptying system intake port 316, a vacuum emptying system fan 320, and a vacuum emptying system motor 322, and a vacuum emptying system exhaust port 324. In one embodiment, the vacuum emptying system 314 may include the vacuum emptying system filter bag 318 as shown in FIG. 3A. In another embodiment, the vacuum emptying system 314 may include a vacuum emptying system filter 3536 and a vacuum emptying system dirt collecting bag 3538.

The sanitizing station 3500 may also include a sanitizing chamber 3502 with a water-tight door 3504, a water reservoir 3506 with a water intake 3508, a water heater 3510, and a drain 3512, a recirculation pump 3514, water spray nozzles 3516, a detergent dispenser 3518, a wastewater filter 3520, a wastewater pump 3522, a wastewater outlet 3524, a drying air intake 3526, a drying fan 3528, drying air conduits 3530, an air outlet conduit 3532, and a drying air outlet 3534. These elements of the sanitizing station 3500 may be configured to interact with the tidying robot 100 as shown in and described in greater detail with respect to FIG. 36.

Figure 36:
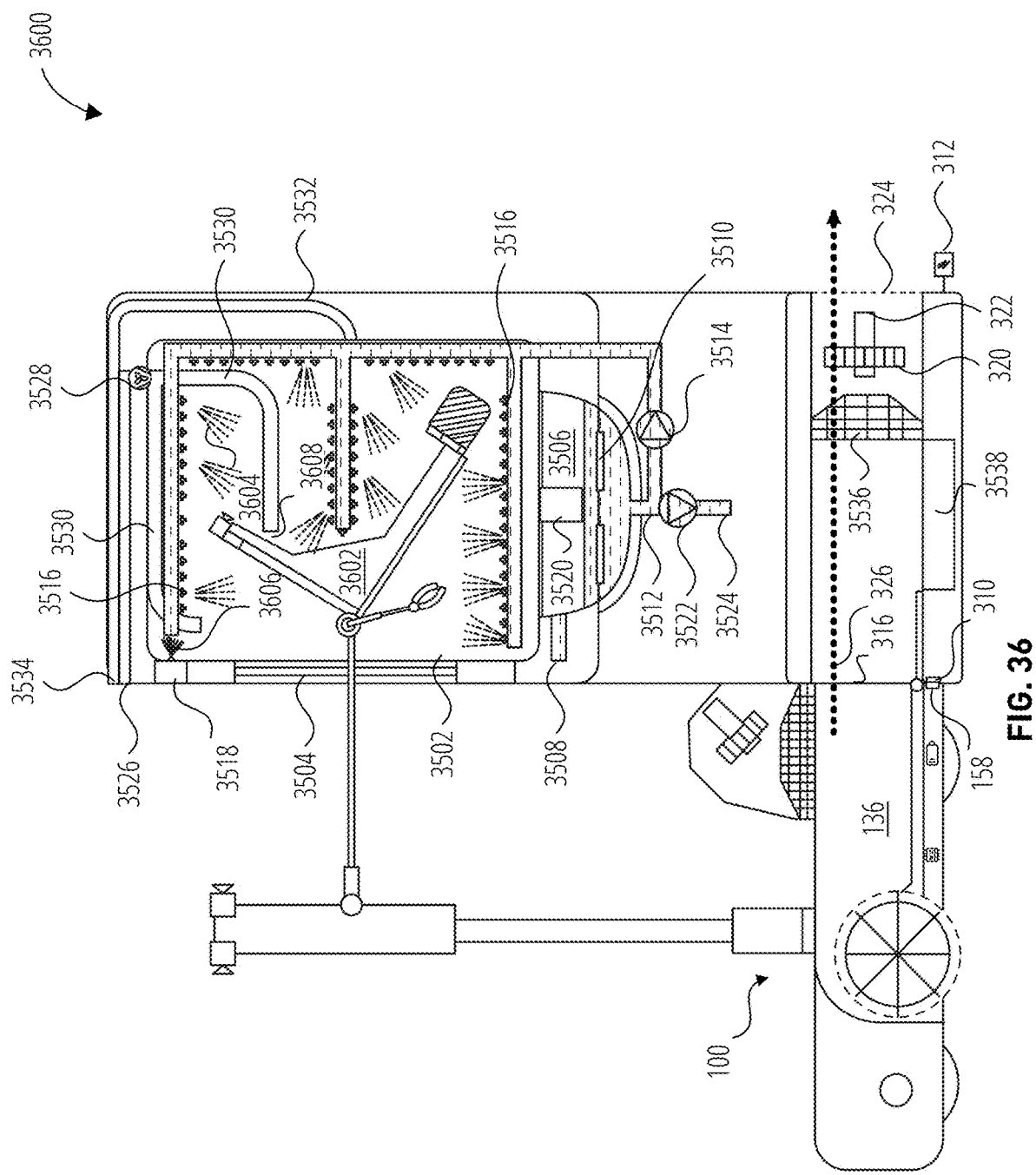
FIG. 36 illustrates a tidying robot interacting with a sanitizing station 3600 in accordance with one embodiment.

FIG. 36 illustrates a side elevation view of a tidying robot interacting with a sanitizing station 3600 in accordance with one embodiment. The tidying robot interacting with a sanitizing station 3600 may include interaction with vacuum emptying system 314 and base station charge connector 310 as shown here and as shown and described in more detail with respect to FIG. 9. Where the vacuum emptying system 314 includes the vacuum emptying system filter 3536 and vacuum emptying system dirt collecting bag 3538, the vacuum emptying system filter 3536 may be disposed to filter the vacuum emptying airflow 326 from the vacuum emptying system intake port 316 to the vacuum emptying system exhaust port 324, and a vacuum emptying system dirt collecting bag 3538 may be disposed beneath the intake of the vacuum emptying system filter 3536 to catch dirt filtered from the vacuum emptying airflow 326.

The water-tight door 3504 of the sanitizing station 3500 may allow ingress and egress of end effectors 3602 of a tidying robot 100. As part of the tidying robot interacting with a sanitizing station 3600, the tidying robot 100 may place the end effectors 3602 at the end of its scoop arm 114, such as its scoop 110, pusher pads 118, pusher pad arms 120, and gripper arm 128, into the sanitizing chamber 3502 as shown. The water-tight door 3504 may close around or to either side of the scoop arm 114, and may include rubber sealing flaps or other sealing elements as are well understood in the art, to form a water-tight seal against the scoop arm 114 and prevent sanitizing fluids from leaking out of the sanitizing chamber 3502. The water-tight door 3504 shown here closes upon the scoop arm 114 from above and below by sliding similarly sized door portions vertically within tracks, but this is not intended to limit such a configuration. One may readily apprehend that such a door may also be rotated to open and close using motors at the upper and lower connection points to sanitizing chamber 3502 shown here, may connect to the sides of the sanitizing chamber 3502 instead and may slide or rotate to open and close horizontally, may include a large and a small door portion, etc., as best suits the intended application.

With the end effectors 3602 of the tidying robot within the sanitizing chamber 3502 and the water-tight door 3504 closed, The water reservoir 3506 may be filled with water from the water intake 3508. This water intake 3508 may be connected by hose or pipe to a household water supply as will be readily understood by one of ordinary skill in the art. A water heater 3510 may heat the water in the water reservoir 3506 to a high temperature, such as at or near boiling. The drain 3512 of the water reservoir 3506 may direct this hot water to a recirculation pump 3514 in fluid connection with the water spray nozzles 3516 within the sanitizing chamber 3502. This hot water 3604 may be sprayed on the end effectors 3602 of the tidying robot 100, along with detergent 3606 from the detergent dispenser 3518, thus sanitizing the end effectors 3602. The water spray nozzles 3516 may spray additional hot water 3604 to thoroughly rinse all detergent 3606 from the end effectors 3602.

After the end effector 3602 have been sanitized and rinsed, the hot water 3604 and detergent 3606 may flow through a wastewater filter 3520 back into the water reservoir 3506, and may be directed by a wastewater pump 3522 from the drain 3512 to the wastewater outlet 3524. The wastewater outlet 3524 may connect through piping or tubing to a household wastewater system as will be readily understood by one of ordinary skill in the art.

Air from the drying air intake 3526 may then be pulled by one or more drying fans 3528 into drying air conduits 3530 that direct this drying airflow onto the end effectors 3602. The drying airflow 3608 may pass through an air outlet conduit 3532 to a drying air outlet 3534. In one embodiment, the drying airflow 3608 may be heated before passing into the drying air conduit 3530 to speed the drying process. Once the end effectors 3602 are dry, the water-tight door 3504 may be opened and the end effectors 3602 may be removed from the sanitizing chamber 3502.

Figures 37A, 37B:
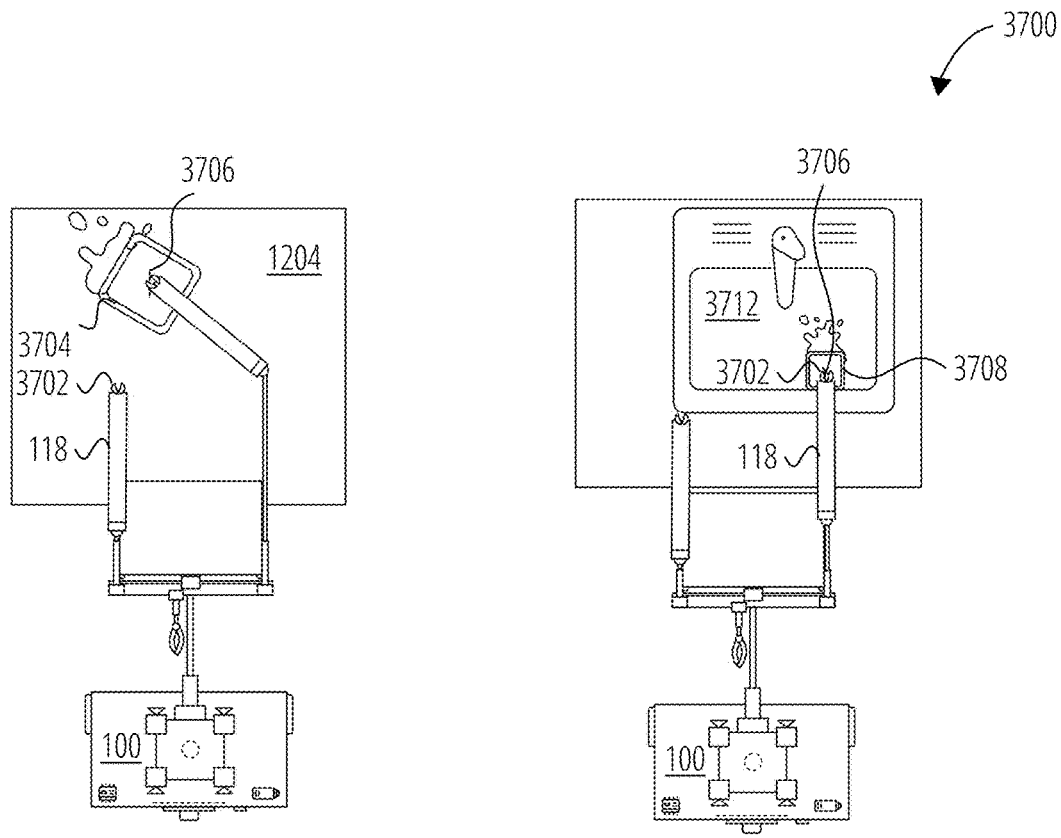
FIG. 37A-FIG. 37D illustrate tidying robot cleaning activities 3700 in accordance with various embodiments.
Figures 37C, 37D:
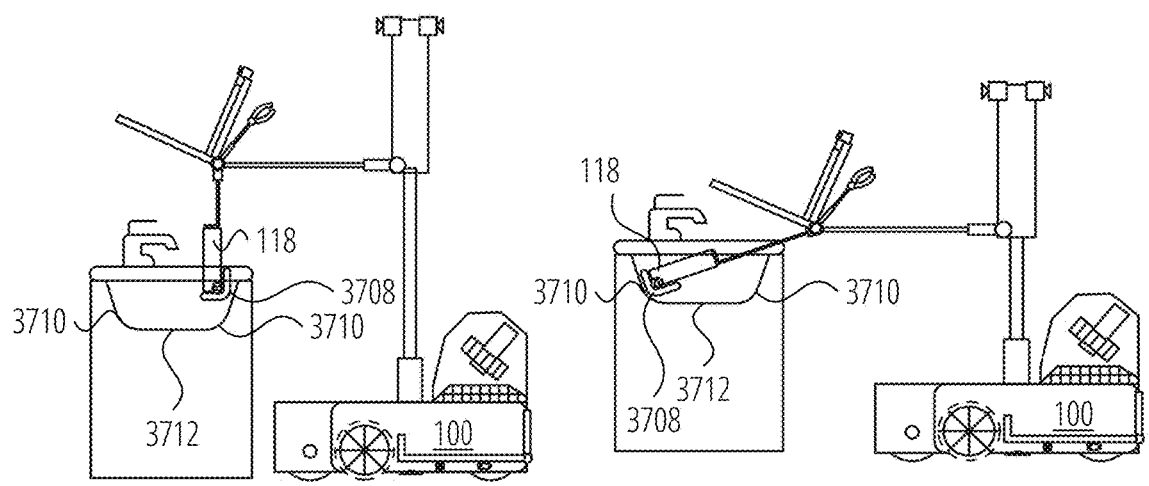

FIG. 37A-FIG. 37D illustrate tidying robot cleaning activities 3700 in accordance with various embodiments. The tidying robot 100 may be configured with pad end grippers 3702 at the end of its pusher pads 118. As shown in FIG. 37A, the tidying robot 100 may clean a countertop 1204 by gripping a gripping tab 3706 of a wiping pad 3704 with its pad end gripper 3702 and maneuvering the pusher pad 118 to move the wiping pad 3704 across the surface of the countertop 1204. As shown in FIG. 37B-FIG. 37D, the tidying robot 100 may also grip a gripping tab 3706 of a curved wiping pad with gripping tab 3708 in its pad end grippers 3702 in order to clean the curved sides 3710 of a sink basin 3712. FIG. 37B provides a top plan view of the tidying robot 100 cleaning the near curved side 3710 of the sink basin 3712. FIG. 37C and FIG. 37D show left elevation views of how the tidying robot 100 may move to manipulate its pusher pads 118 in order to wipe the near and far curved sides 3710 of the sink basin 3712.

FIG. 38A-FIG. 38C illustrate tidying robot laundry cleaning activities 3800 in accordance with one embodiment. FIG. 38A shows a top plan view of a tidying robot 100 gathering dirty laundry 3802 using its pusher pads 118 in order to move the dirty laundry 3802 into its scoop 110. FIG. 38B shows a left elevation view of the tidying robot 100, having opened the door 3804 of a washer 3806, tilting its scoop 110 to drop the dirty laundry 3802 into the washer 3806. The tidying robot 100 may open the door 3804 and interact with the controls of a washer 3806 with the end of a pusher pad 118 or with the gripper arm, as one of ordinary skill in the art will appreciate. FIG. 38C shows a left elevation view of the tidying robot 100, after the washing cycle of the washer 3806 is complete, and having opened the doors 3804 of both the washer 3806 and the dryer 3810, collecting clean wet laundry 3808 into its scoop 110 using its pusher pads 118. The tidying robot 100 may use a maneuver similar to that shown in FIG. 38B to then deposit the clean wet laundry 3808 into the dryer 3810 for the laundry cycle.

Figure 39A:
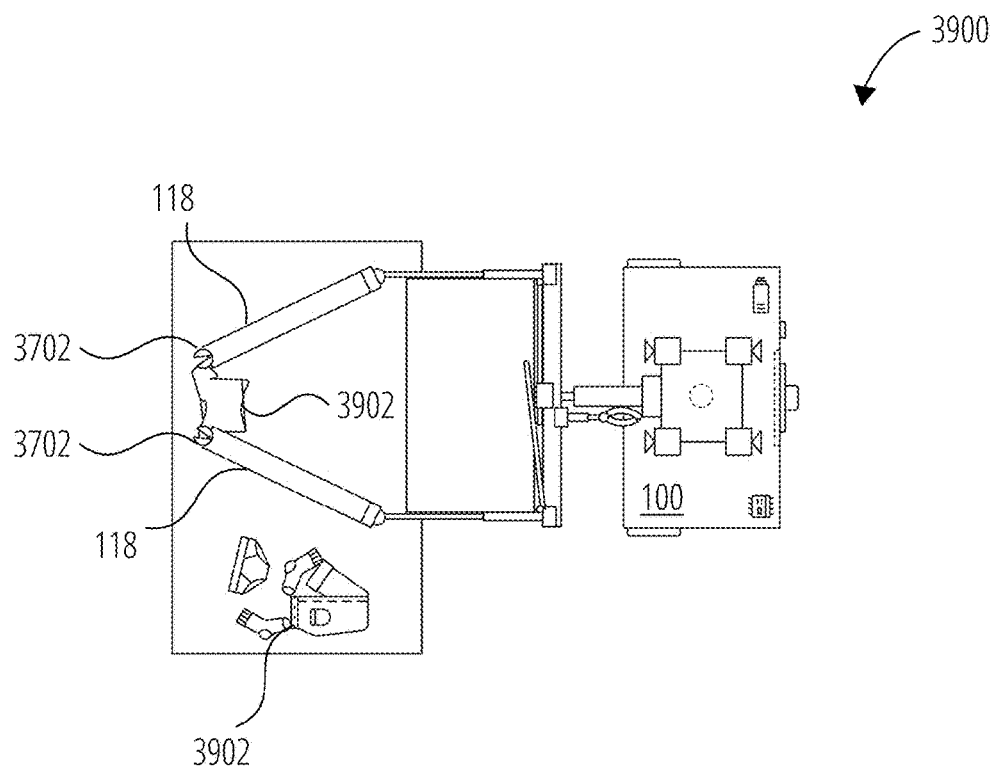
FIG. 39A and FIG. 39B illustrate tidying robot laundry folding activities 3900 in accordance with one embodiment.
Figure 39B:
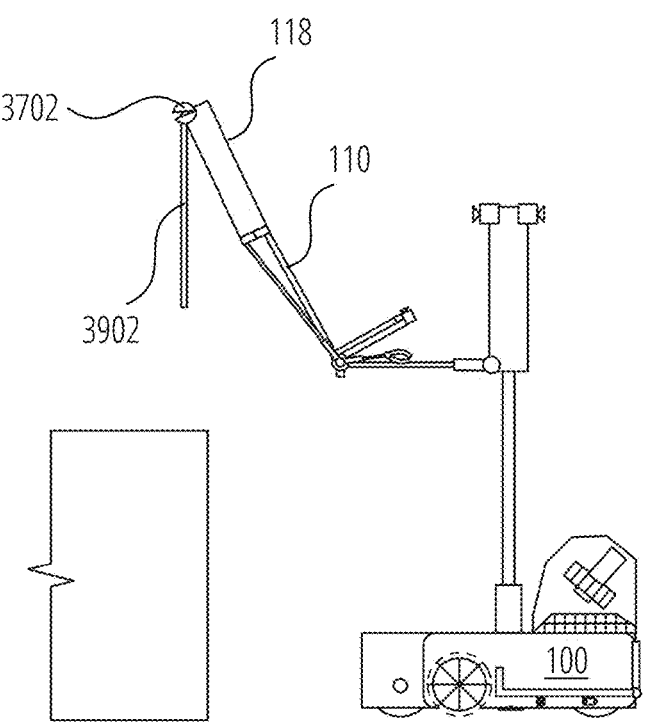

FIG. 39A and FIG. 39B illustrate tidying robot laundry folding activities 3900 in accordance with one embodiment. The tidying robot 100 may use pad end grippers 3702 at the ends of its pusher pads 118 to grip clean dry laundry 3902. The tidying robot 100 may lift an article of clean dry laundry 3902 and maneuver the pusher pad 118 so as to manipulate the article into a folded state, as shown in FIG. 39A. The tidying robot 100 may spread and fold the article on a counter top. As shown in FIG. 39B, the tidying robot 100 may grip the article of clean dry laundry 3902 with the pad end grippers 3702 and may lift the article into the air so as to allow gravity to help in straightening the article for tidier folding. From the position shown in FIG. 39B, the tidying robot 100 may drape the clean dry laundry 3902 across the front scoop 110 edge to facilitate creating a clean, straight fold.

Figure 40A:
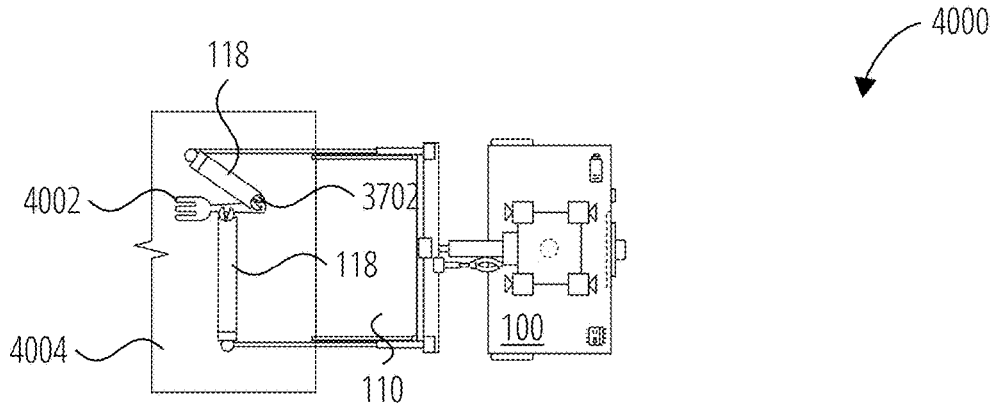
FIG. 40A-FIG. 40C illustrate tidying robot cooking and serving activities 4000 in accordance with one embodiment.
Figure 40B:
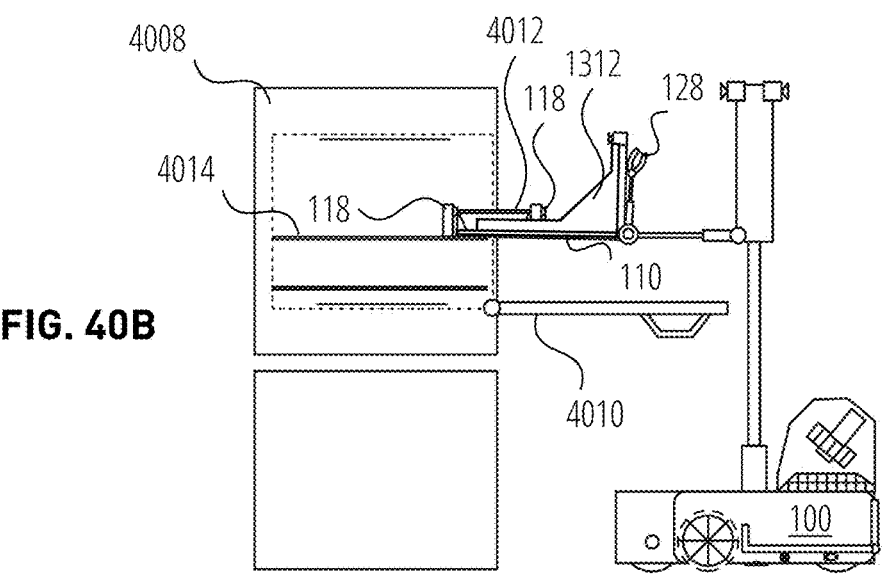
Figure 40C:
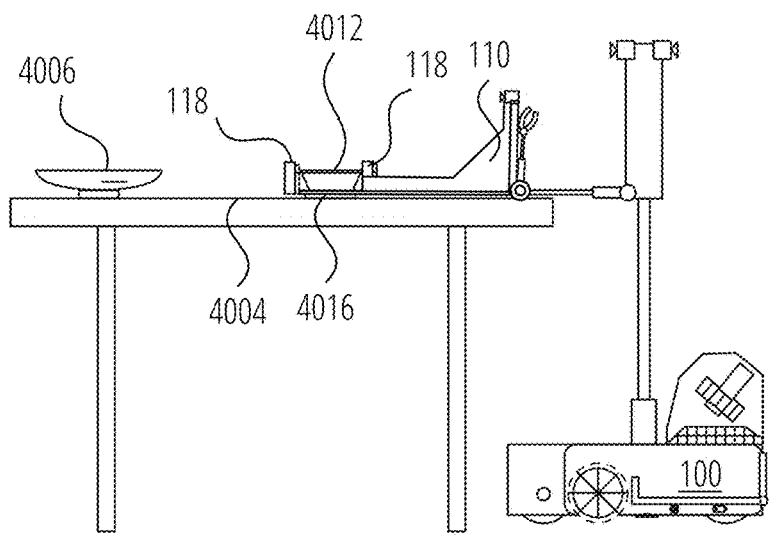

FIG. 40A-FIG. 40C illustrate tidying robot cooking and serving activities 4000 in accordance with one embodiment. FIG. 40A provides a top plan view of a tidying robot 100 setting a place setting on a dining surface 4004 by positioning a piece of cutlery 4002 such as a fork as shown, or a spoon or knife, at a desired place on a dining surface 4004 using its pusher pads 118 and pad end grippers 3702. Other tableware such as the plate 4006 shown on the dining surface 4004 in FIG. 40C may be similarly manipulated through various maneuvers of the pusher pads 118 and/or pad end grippers 3702. While it is not shown here, one of ordinary skill in the art will appreciate that a tidying robot 100 may pieces of cutlery 4002 in its scoop 110 to transport them from a cabinet to the dining surface 4004.

A tidying robot 100 may be equipped with a scoop 110, pusher pads 118, pad end grippers 3702, movable scoop walls 1312, and other end effectors constructed from insulated or heat resistant material. Such a tidying robot 100 may, as shown in FIG. 40B, open an oven 4008 door 4010 with its gripper arm 128 and place a baking dish 4012 of food to be cooked into the oven 4008. With the baking dish 4012 residing in the scoop 110, and the pusher pads 118 may secure the baking dish 4012 within the scoop 110.

At least one movable scoop wall 1312 (not visible here) may be retracted or folded out of the way to allow one of the pusher pads 118 to maneuver within the scoop 110. One movable scoop wall 1312 may be left extended as shown to secure the baking dish 4012 or other object within the scoop on three sides for improved security and support. The scoop 110 may be positioned at or just above the height of a rack 4014 in the oven 4008, and the pusher pads 118 may be maneuvered to slide the baking dish 4012 off of the scoop 110 and onto the rack 4014. The tidying robot 100 may use its gripper arm 128 to close the door 4010 and interact with the oven 4008 controls to prepare the food. Using similar maneuvers, the tidying robot 100 may reverse this action previously described to remove the baking dish 4012 from the oven 4008 when the food is cooked or heated as desired.

The tidying robot 100 may use a similar coordinated motion to place a dish of food on a dining surface 4004. Where the dish is hot, such as the baking dish 4012 newly removed from the oven 4008, the tidying robot 100 may place a hot pad or trivet 4016 on the dining surface 4004 before retrieving the baking dish 4012. The tidying robot 100 may then place the baking dish 4012 onto the hot pad or trivet 4016 as shown in FIG. 40C.

Figure 41:
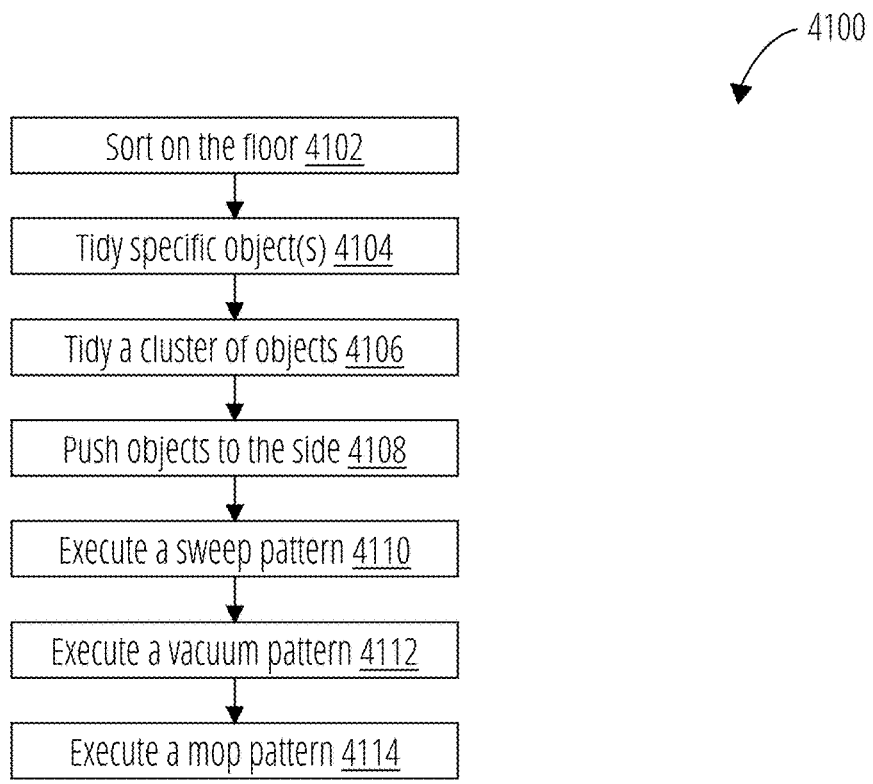
FIG. 41 illustrates an exemplary multi-stage tidying routine 4100 in accordance with one embodiment.

FIG. 41 illustrates an exemplary multi-stage tidying routine 4100 in accordance with one embodiment. Although the example exemplary multi-stage tidying routine 4100 depicts a particular sequence of operations, the sequence may be altered without departing from the scope of the present disclosure. For example, some of the operations depicted may be performed in parallel or in a different sequence that does not materially affect the function of the exemplary multi-stage tidying routine 4100. In other examples, different components of an example device or system that implements the exemplary multi-stage tidying routine 4100 may perform functions at substantially the same time or in a specific sequence.

According to some examples, the method includes sorting on the floor at block 4102. For example, the tidying robot 100 illustrated in FIG. 1A may sort on the floor. The tidying robot may initially sort objects located on the floor. This sorting may group the objects based on an object type for easier pickup.

According to some examples, the method includes tidying specific object(s) at block 4104. The tidying robot may put away a specific object or specific objects, dropping them at their home locations.

According to some examples, the method includes tidying a cluster of objects at block 4106. The tidying robot may tidy clusters of objects, dropping them at their home locations. In one embodiment, the robot may collect multiple objects having the same home location as one cluster to be tidied.

According to some examples, the method includes pushing objects to the side at block 4108. The tidying robot may push remaining objects without home locations to the side of the room they currently reside in, along the wall, into an open closet, or otherwise to an area out of the way of future operations.

According to some examples, the method includes executing a sweep pattern at block 4110. The tidying robot may use pusher pads having brushes to sweep dirt and debris from the floor into the scoop. The robot may then transport the dirt and debris to a garbage bin and dump it therein.

According to some examples, the method includes executing a vacuum pattern at block 4112. The tidying robot may vacuum up any remaining fine dust and dirt, leaving the floor clear. In one embodiment, the vacuumed dust and dirt may be stored in the robot's dust bin and emptied later at the charging dock. In one embodiment, the sweep pattern and vacuum pattern may be executed concurrently while the tidying robot 100 is in an inverted wedge configuration, as shown in FIG. 18A and FIG. 18B.

According to some examples, the method includes executing a mop pattern at block 4114. For example, the tidying robot 100 introduced in FIG. 1A may execute a mop pattern. The tidying robot may wet-mop the floor using a mop pad to further deep-clean a hard floor such as tile, vinyl, or wood.

This staged approach may allow the robot to progressively tidy a messy room by breaking the cleaning effort into manageable tasks, such as organizing objects on the floor before trying to put them away, putting objects away before sweeping, sweeping up dirt and debris such as food pieces before vacuuming up finer particles, etc.

Figure 42:
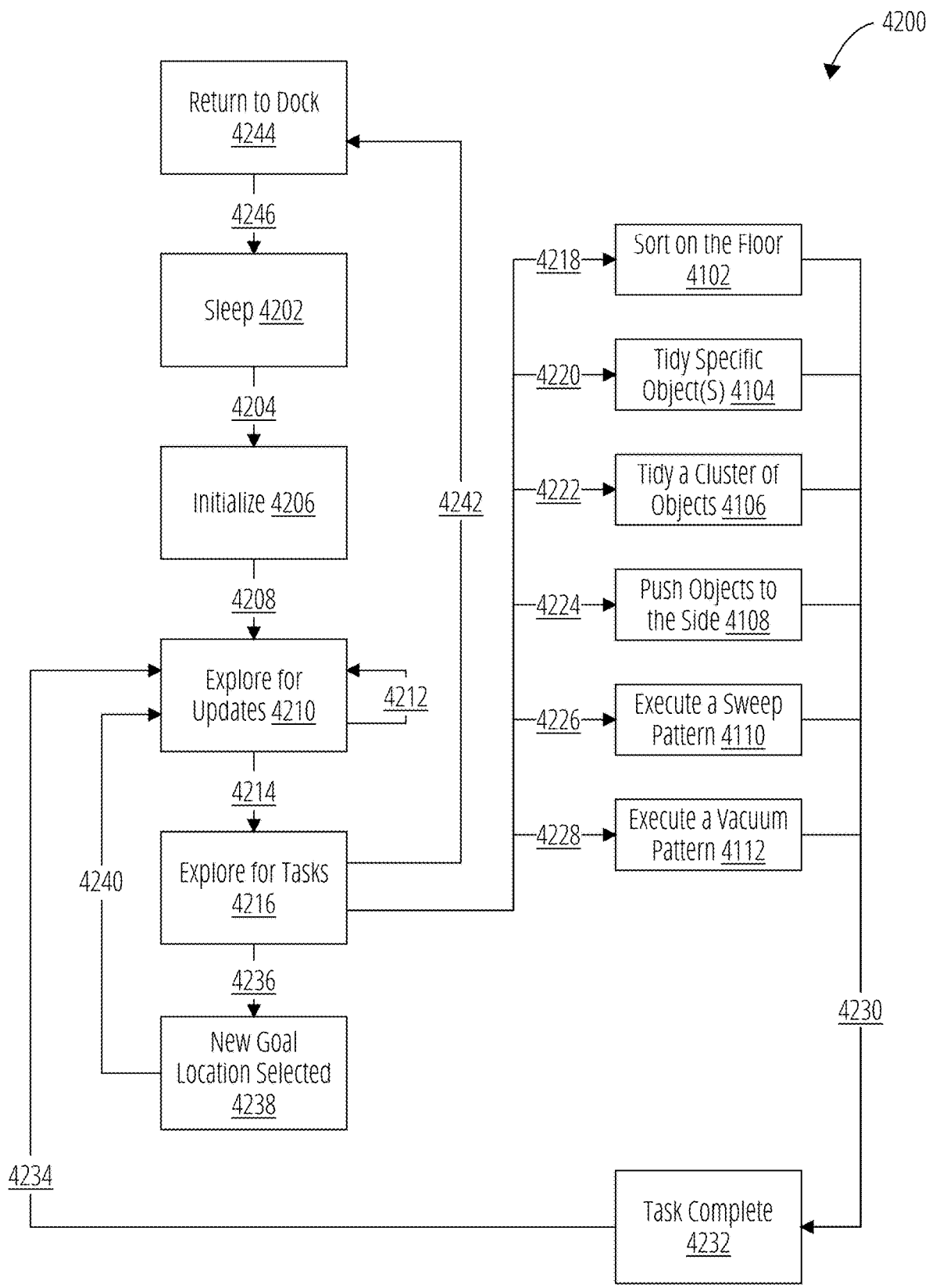
FIG. 42 illustrates a robot operation state diagram 4200 in accordance with one embodiment.

FIG. 42 illustrates a robot operation state diagram 4200 in accordance with one embodiment. A tidying robot may begin in a sleep 4202 state. In this sleep 4202 state, the robot may be sleeping and charging at the base station 300.

When the robot wakes up 4204, it may transition to an initialize 4206 state. During the initialize 4206 state, the robot may perform a number of system checks and functions preparatory to its operation, including loading existing maps.

Once the robot is ready 4208, it may transition to an explore for updates 4210 state. During the explore for updates 4210 state, the robot may update its global map and the robot may be localized within that map by processing video frames captured by the robot's cameras and other sensor data. The robot keeps exploring 4212 until the map is updated and the robot is localized 4214.

Once the map is updated and the robot is localized 4214, the robot may transition to an explore for tasks 4216 state. In its explore for tasks 4216 state, the robot may compare a prioritized task list against map information to find its next task for execution. In another embodiment, the robot may be instructed to navigate a pattern throughout the environment looking for tasks to perform. In one embodiment, the prioritized task list may indicate the robot is to perform a process such as the exemplary multi-stage tidying routine 4100. Where the robot finds objects to sort 4218, it may perform block 4102 of the exemplary multi-stage tidying routine 4100. Where the robot finds specific objects to tidy 4220, it may perform block 4104 of the exemplary multi-stage tidying routine 4100 after performing block 4102 as needed. Where the robot finds a cluster of objects to tidy 4222, it may perform block 4106 of the exemplary multi-stage tidying routine 4100 after performing block 4102 and block 4104 as needed. Where the robot finds objects to be pushed to the side 4224, it may perform block 4108 of the exemplary multi-stage tidying routine 4100 after performing blocks 4102-4106 as needed. Where the robot finds an area that needs sweeping 4226, it may perform block 4110 of the exemplary multi-stage tidying routine 4100 after performing blocks 4102-4108 as needed. Where the robot finds an area that needs vacuuming 4228, it may perform block 4112 of the exemplary multi-stage tidying routine 4100 after performing blocks 4102-4110 as needed. In one embodiment, the robot may determine that an area needs to be mopped after it has been swept and/or vacuumed and may perform a mopping task after block 4110 or block 4112. Once the robot determines a task is finished 4230, it may mark the task complete 4232, then it continues exploring 4234. The robot may then transition back through the explore for updates 4210 state and the explore for tasks 4216 state.

If the robot selects a new goal location 4236, it may transition from the explore for tasks 4216 state to the new goal location selected 4238 state, allowing it to view and map previously unobserved scenes in the environment. The robot navigates to the new location 4240 and returns to the explore for updates 4210 state.

While the robot is in the explore for tasks 4216 state, if it determines its battery is low or there is nothing to tidy 4242, it may transition to the return to dock 4244 state. In this state, the robot may select a point near its base station 300 as its goal location, may navigate to that point, and may then dock with the base station 300 to charge. When the robot is docked and charging 4246, it may return to the sleep 4202 state.

Figure 43:
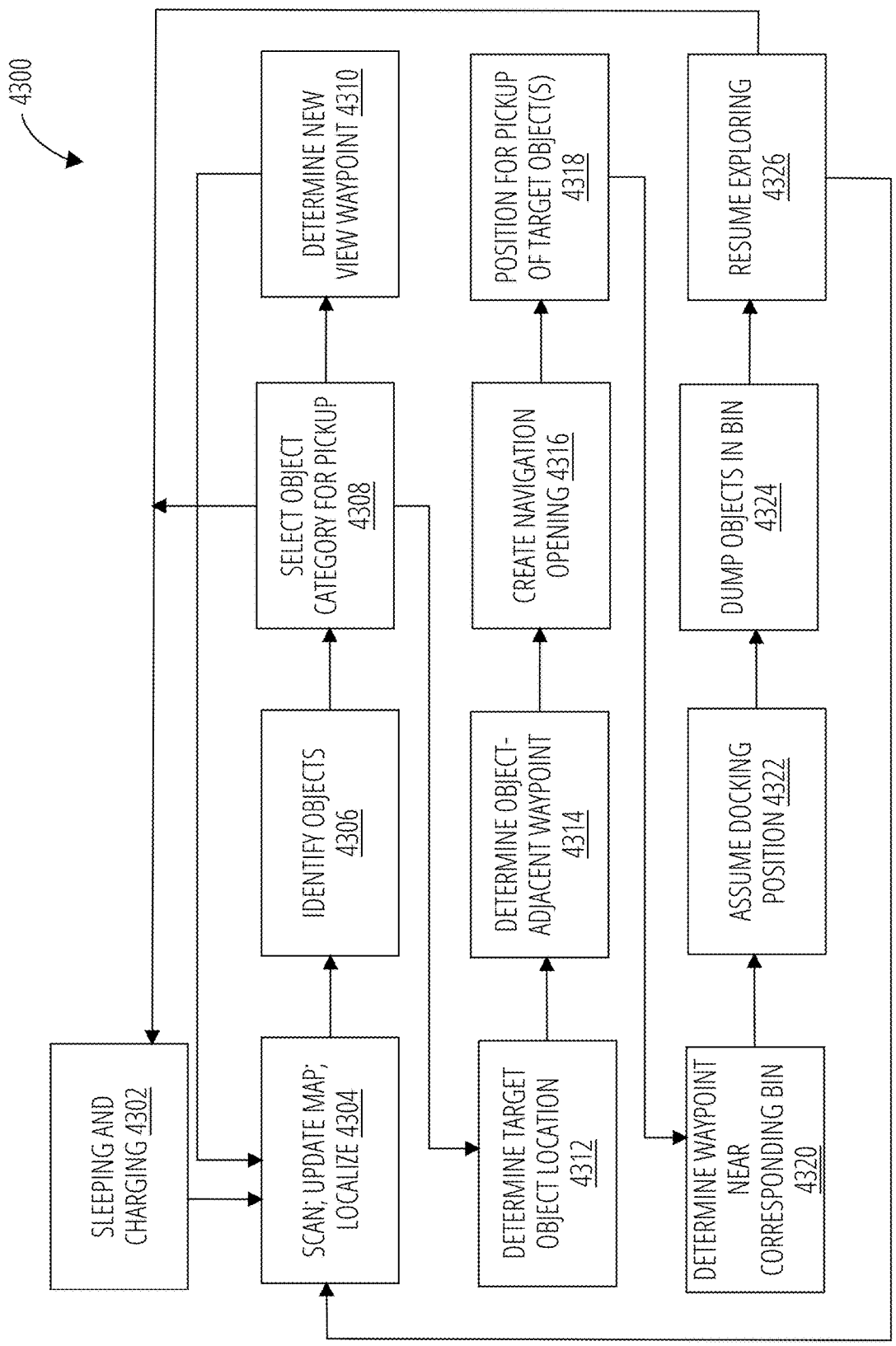
FIG. 43 depicts another robotic process 4300 in accordance with one embodiment.
Figure 44:
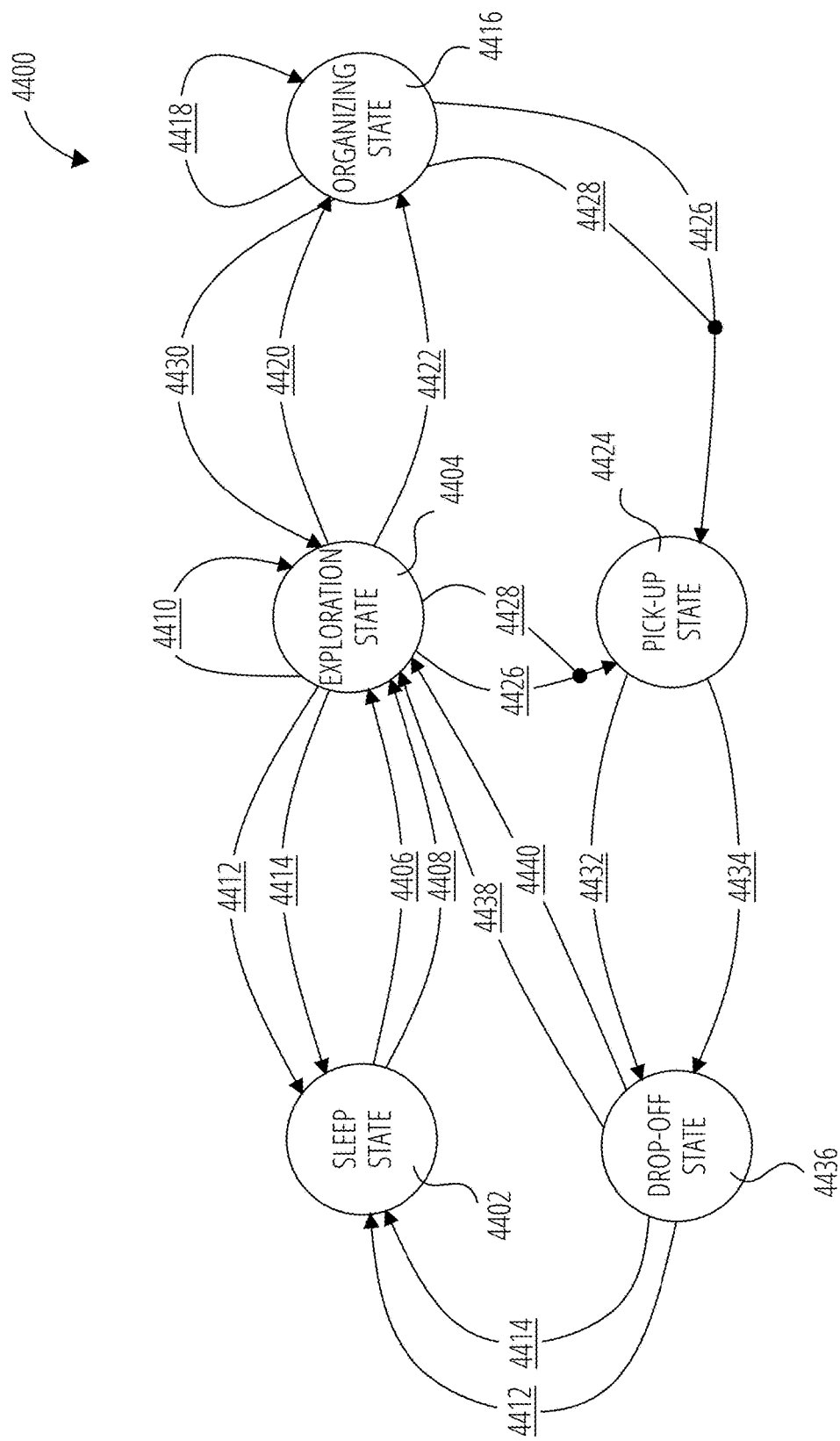
FIG. 44 depicts a state space map 4400 for a robotic system in accordance with one embodiment.

FIG. 43 also depicts a robotic process 4300 in one embodiment, in which the robotic system sequences through an embodiment of a state space map 4400 as depicted in FIG. 44.

The sequence begins with the robot sleeping (sleep state 4402) and charging at the base station (block 4302). The robot is activated, e.g., on a schedule, and enters an exploration mode (environment exploration state 4404, activation action 4406, and schedule start time 4408). In the environment exploration state 4404, the robot scans the environment using cameras (and other sensors) to update its environmental map and localize its own position on the map (block 4304, explore for configured interval 4410). The robot may transition from the environment exploration state 4404 back to the sleep state 4402 on condition that there are no more objects to pick up 4412, or the battery is low 4414.

From the environment exploration state 4404, the robot may transition to the object organization state 4416, in which it operates to move the items on the floor to organize them by category 4418. This transition may be triggered by the robot determining that objects are too close together on the floor 4420, or determining that the path to one or more objects is obstructed 4422. If none of these triggering conditions is satisfied, the robot may transition from the environment exploration state 4404 directly to the object pick-up state 4424 on condition that the environment map comprises at least one drop-off container for a category of objects 4426, and there are unobstructed items for pickup in the category of the container 4428. Likewise, the robot may transition from the object organization state 4416 to the object pick-up state 4424 under these latter conditions. The robot may transition back to the environment exploration state 4404 from the object organization state 4416 on condition that no objects are ready for pick-up 4430.

In the environment exploration state 4404 and/or the object organization state 4416, image data from cameras is processed to identify different objects (block 4306). The robot selects a specific object type/category to pick up, determines a next waypoint to navigate to, and determines a target object and location of type to pick up based on the map of environment (block 4308, block 4310, and block 4312).

In the object pick-up state 4424, the robot selects a goal location that is adjacent to the target object(s) (block 4314). It uses a path-planning algorithm to navigate itself to that new location while avoiding obstacles. "Obstacles" refers to objects that may impede the passage of a robot as it navigates its environment to complete desired tasks. The robot actuates left and right pusher arms to create an opening large enough that the target object may fit through, but not so large that other unwanted objects are collected when the robot drives forward (block 4316). The robot drives forward so that the target object is between the left and right pusher arms, and the left and right pusher arms work together to push the target object onto the collection scoop (block 4318).

The robot may continue in the object pick-up state 4424 to identify other target objects of the selected type to pick up based on the map of the environment. If other such objects are detected, the robot selects a new goal location that is adjacent to the target object. It uses a path-planning algorithm to navigate itself to that new location while avoiding obstacles while carrying the target object(s) that were previously collected. The robot actuates left and right pusher arms to create an opening large enough that the target object may fit through, but not so large that other unwanted objects are collected when the robot drives forward. The robot drives forward so that the next target object(s) are between the left and right pusher arms. Again, the left and right pusher arms work together to push the target object onto the collection scoop.

On condition that all identified objects in category are picked up 4432, or if the scoop is at capacity 4434, the robot transitions to the object drop-off state 4436 and uses the map of the environment to select a goal location that is adjacent to the bin for the type of objects collected and uses a path planning algorithm to navigate itself to that new location while avoiding obstacles (block 4320). The robot backs up toward the bin into a docking position where the back of the robot is aligned with the back of the bin (block 4322). The robot lifts the scoop up and backward, rotating over a rigid arm at the back of the robot (block 4324). This lifts the target objects up above the top of the bin and dumps them into the bin.

From the object drop-off state 4436, the robot may transition back to the environment exploration state 4404 on condition that there are more items to pick up 4438, or it has an incomplete map of the environment 4440. the robot resumes exploring and the process may be repeated (block 4326) for each other type of object in the environment having an associated collection bin.

The robot may alternatively transition from the object drop-off state 4436 to the sleep state 4402 on condition that there are no more objects to pick up 4412 or the battery is low 4414. Once the battery recharges sufficiently, or at the next activation or scheduled pick-up interval, the robot resumes exploring and the process may be repeated (block 4326) for each other type of object in the environment having an associated collection bin.

FIG. 44 illustrates a state space map 4400 in accordance with one embodiment through which a tidying robot 100 may sequence as described above.

Figure 45:
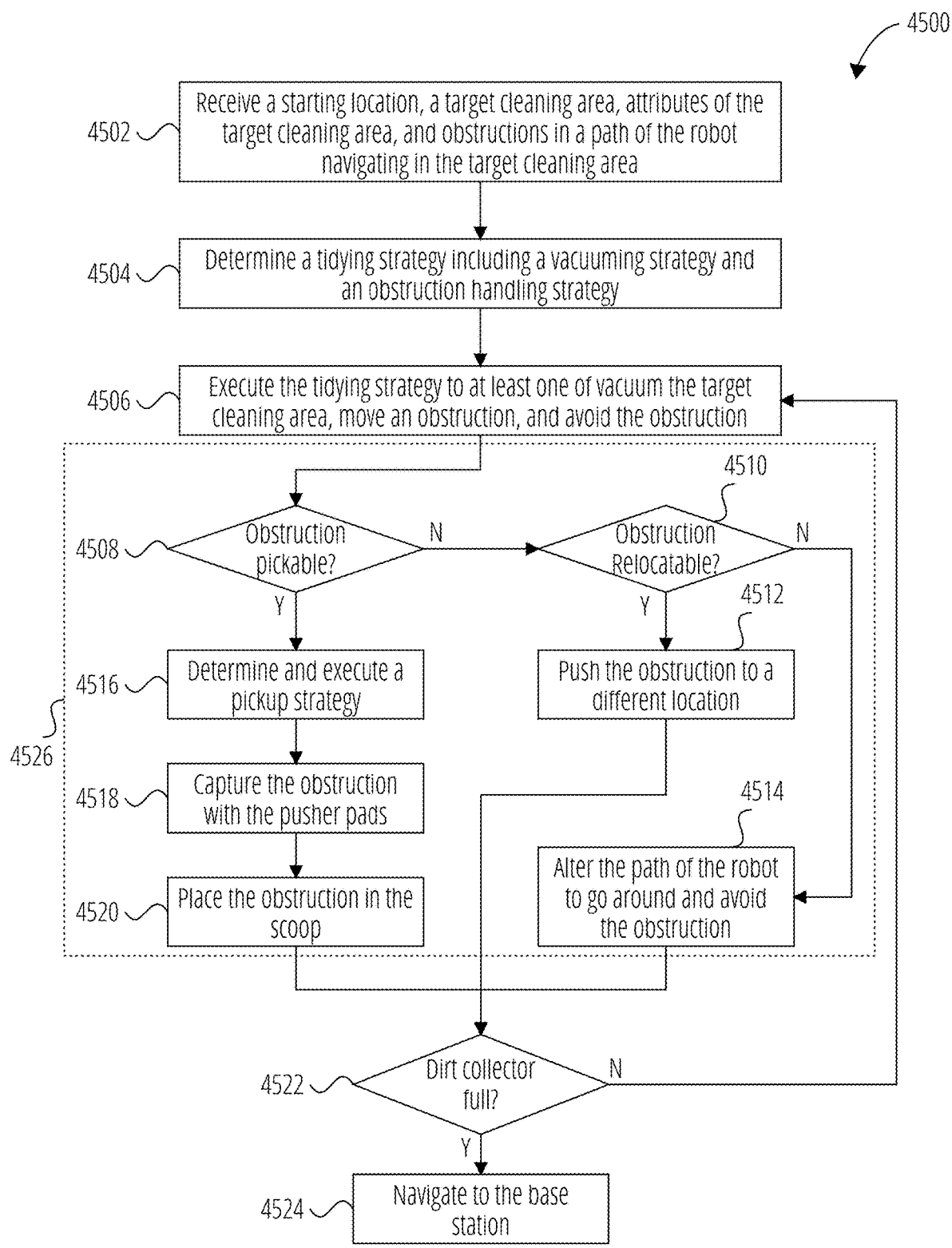
FIG. 45 illustrates a routine 4500 in accordance with one embodiment.

FIG. 45 illustrates an example routine 4500 for a tidying robot such as that introduced with respect to FIG. 1A. Although the example routine 4500 depicts a particular sequence of operations, the sequence may be altered without departing from the scope of the present disclosure. For example, some of the operations depicted may be performed in parallel or in a different sequence that does not materially affect the function of the routine 4500. In other examples, different components of an example device or system that implements the routine 4500 may perform functions at substantially the same time or in a specific sequence.

According to some examples, the method includes receiving a starting location, a target cleaning area, attributes of the target cleaning area, and obstructions in a path of the robot navigating in the target cleaning area at block 4502. For example, the tidying robot 100 illustrated in FIG. 1A may receive a starting location, a target cleaning area, attributes of the target cleaning area, and obstructions in a path of the robot navigating in the target cleaning area.

According to some examples, the method includes determining a tidying strategy including a vacuuming strategy and an obstruction handling strategy at block 4504. The vacuuming strategy may include choosing a vacuum cleaning pattern for the target cleaning area, identifying the obstructions in the target cleaning area, determining how to handle the obstructions, and vacuuming the target cleaning area. Handling the obstructions may include moving the obstructions and avoiding the obstructions. Moving the obstructions may include pushing them aside, executing a pickup strategy to pick them up in the scoop, carrying them to another location out of the way, etc. The obstruction may, for example, be moved to a portion of the target cleaning area that has been vacuumed, in close proximity to the path, to allow the robot to quickly return and continue, unobstructed, along the path. In one embodiment, the robot may execute an immediate removal strategy, in which it may pick an obstruction up in its scoop, then immediately navigate to a garget storage bine and place the obstruction into the bin. The robot may then navigate back to the position where it picked up the obstruction, and may resume vacuuming from there. In one embodiment, the robot may execute an in-situ removal strategy, where it picks the object up, then continues to vacuum. When the robot is near the target storage bin, it may place the obstruction in the bin, then continue vacuuming from there. It may adjust its pattern to vacuum any portions of the floor it missed due to handling the obstruction. Once vacuuming is complete, or if the robot determines it does not have adequate battery power, the robot may return to the base station to complete the vacuuming strategy.

According to some examples, the method includes executing the tidying strategy to at least one of vacuum the target cleaning area, move an obstruction, and avoid the obstruction at block 4506. The obstruction may include at least one of a tidyable object and a movable object.

If the robot determines that the obstruction is pickable at decision block 4508, that is, the obstruction is an object the robot is capable of picking up, the method may progress to block 4516. If the robot decides the obstruction is not pickable, it may then determine whether the obstruction is relocatable at decision block 4510, that is, the obstruction is an object the robot is capable of moving and relocating, even though it cannot pick it up. If the robot determines the obstruction is relocatable, the method may include pushing the obstruction to a different location at block 4512. The obstruction may be pushed with the pusher pads, the scoop, and/or the chassis. If the robot determines the object is not relocatable, according to some examples, the method includes altering the path of the robot to go around and avoid the obstruction at block 4514.

According to some examples, the method includes determining and executing a pickup strategy at block 4516. The pickup strategy may include an approach path for the robot to take to reach the obstruction, a grabbing height for initial contact with the obstruction, a grabbing pattern for moving the pusher pads while capturing the obstruction, and a carrying position of the pusher pads and the scoop that secures the obstruction in a containment area on the robot for transport. The containment area may include at least two of the pusher pad arms, the pusher pads, and the scoop. Executing the pickup strategy may include extending the pusher pads out and forward with respect to the pusher pad arms and raising the pusher pads to the grabbing height. The robot may then approach the obstruction via the approach path, coming to a stop when the obstruction is positioned between the pusher pads. The robot may execute the grabbing pattern to allow capture of the obstruction within the containment area. The robot may confirm the obstruction is within the containment area. If the obstruction is within the containment area, the robot may exert pressure on the obstruction with the pusher pads to hold the obstruction stationary in the containment area and raise at least one of the scoop and the pusher pads, holding the obstruction, to the carrying position.

If the obstruction is not within the containment area, the robot may alter the pickup strategy with at least one of a different reinforcement learning based strategy, a different rules based strategy, and relying upon different observations, current robot state, current object state, and sensor data, and may then execute the altered pickup strategy. According to some examples, the method includes capturing the obstruction with the pusher pads at block 4518. According to some examples, the method then includes placing the obstruction in the scoop at block 4520. In one embodiment, the robot may navigate to a target storage bin or an object collection bin, then execute a drop strategy to place the obstruction in the bin. In one embodiment, the robot may turn aside from its vacuuming path to an already vacuumed area, then execute a drop strategy to place the obstruction on the floor. In one embodiment, the object collection bin may be on top of the base station.

According to some examples, the robot may determine whether or not the dirt collector is full at decision block 4522. If the dirt collector is full, the robot may navigate to the base station at block 4524. Otherwise, the robot may return to block 4506 and continue executing the tidying strategy. In one embodiment, decision block 4508-block 4520 may constitute an obstruction handling strategy 4526.

Figure 46:
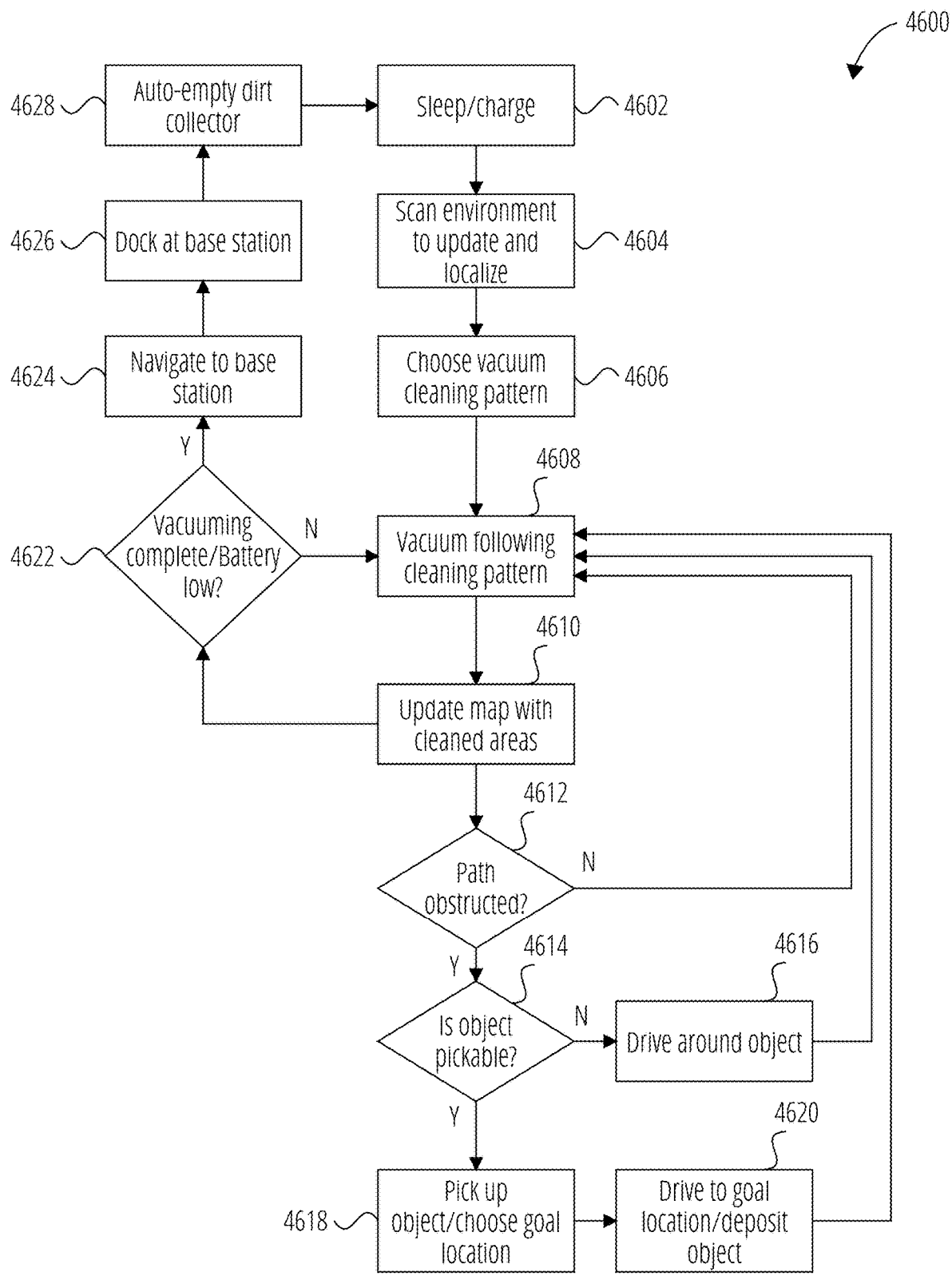
FIG. 46 illustrates a basic routine 4600 in accordance with one embodiment.

FIG. 46 illustrates an example basic routine 4600 for a system such as the tidying robot 100 and base station 300 disclosed herein and illustrated interacting in FIG. 3A. Although the example basic routine 4600 depicts a particular sequence of operations, the sequence may be altered without departing from the scope of the present disclosure. For example, some of the operations depicted may be performed in parallel or in a different sequence that does not materially affect the function of the basic routine 4600. In other examples, different components of an example device or system that implements the basic routine 4600 may perform functions at substantially the same time or in a specific sequence.

The basic routine 4600 may begin with the tidying robot 100 previously illustrated in a sleeping and charging state at the base station 300 previously illustrated. The robot may wake up from the sleeping and charging state at block 4602. The robot may scan the environment at block 4604 to update its local or global map and localize itself with respect to its surroundings and its map. In one embodiment, the tidying robot 100 may utilize its sensing system, including cameras and/or LIDAR sensors to localize itself in its environment. If this localization fails, the tidying robot 100 may execute an exploration cleaning pattern, such as a random walk in order to update its map and localize itself as it cleans.

At block 4606, the robot may determine a tidying strategy including at least one of a vacuuming strategy and an object isolation strategy. The tidying strategy may include choosing a vacuum cleaning pattern. For example, the robot may choose to execute a simple pattern of back and forth lines to clear a room where there are no obstacles detected. In one embodiment, the robot may choose among multiple planned cleaning patterns.

"Vacuum cleaning pattern" refers to a pre-determined path to be traveled by the tidying robot with its robot vacuum system engaged for the purposes of vacuuming all or a portion of a floor. The vacuum cleaning pattern may be configured to optimize efficiency by, e.g., minimizing the number of passes performed or the number of turns made. The vacuum cleaning pattern may account for the locations of known static objects and known movable objects which the tidying robot may plan to navigate around, and known tidyable objects which the tidying robot may plan to move out of its path. The vacuum cleaning pattern may be interrupted by tidyable objects or movable objects not anticipated at the time the pattern was selected, such that the tidying robot may be configured to engage additional strategies flexibly to complete a vacuum cleaning pattern under unanticipated circumstances it may encounter. "Tidyable objects" in this disclosure are elements detected in the environment that may be moved by the robot and put away in a home location. These objects may be of a type and size such that the robot may autonomously put them away, such as toys, clothing, books, stuffed animals, soccer balls, garbage, remote controls, keys, cellphones, etc. The term "movable object" in this disclosure refers to elements of the scene that are not desired to be moved by the robot (e.g., because they are decorative, too large, or attached to something), but that may be moved or deformed in the scene due to human influence. The term "Static object" in this disclosure refers to elements of a scene that are not expected to change over time, typically because they are rigid and immovable.

The robot may start vacuuming, and may at block 4608 vacuum the floor following the planned cleaning pattern. As cleaning progresses, maps may be updated at block 4610 to mark cleaned areas, keeping track of which areas have been cleaned. As long as the robot's path according to its planned cleaning pattern is unobstructed, the cleaning pattern is incomplete, and the robot has adequate battery power, the robot may return to block 4608 and continue cleaning according to its pattern.

Where the robot determines its path is obstructed at decision block 4612, the robot may next determine at decision block 4614 if the object obstructing its path may be picked up. If the object cannot be picked up, the robot may drive around the object at block 4616 and return to block 4608 to continue vacuuming/cleaning. If the object may be picked up, the robot may pick up the object and determine a goal location for that object at block 4618. Once the goal location is chosen, the robot may at block 4620 drive to the goal location with the object and may deposit the object at the goal location. The robot may then return to block 4608 and continue vacuuming.

In one embodiment, if the robot encounters an obstruction in its path at decision block 4612, it may determine the type of obstruction, and based on the obstruction type, the robot may determine an action plan for handling the obstruction. The action plan may be an action plan to move object(s) aside 4700 or an action plan to pick up objects in path 4800, as will be described in additional detail below. The action plan to pick up objects in path 4800 may lead to the determination of additional action plans, such as the action plan to drop object(s) at a drop location 4900. The robot may execute the action plan(s). If the action plan fails, the robot may execute an action plan to drive around object(s) 5000 and may return to block 4608 and continue vacuuming. If the action plan to handle the obstruction succeeds, the robot may return to its vacuuming task at block 4608 following its chosen cleaning pattern.

The robot may in one embodiment return to the point at which vacuuming was interrupted to address the obstructing object to continue vacuuming. In another embodiment, the robot may restart vacuuming at the goal location, following a new path that allows it to complete its vacuuming task from that point. In one embodiment, the robot may continue to carry the object while vacuuming, waiting to deposit the object until after vacuuming is complete, or until the robot has reached a location near the goal location.

Once vacuuming is complete, or if a low battery condition is detected before vacuuming is complete at decision block 4622, the robot may at block 4624 navigate back to its base station. Upon arriving at the base station, the robot may dock with the base station at block 4626. In one embodiment, the base station may be equipped to auto-empty dirt from the robot's dirt collector at block 4628, if any dust, dirt, or debris is detected in the dirt collector. In one embodiment, the base station may comprise a bin, such as the base station 300 and object collection bin 302 illustrated in FIG. 3A. The robot may deposit any objects it is carrying in this bin. The robot may return to block 4602, entering a sleeping and/or charging mode while docked at the base station.

Figure 47:
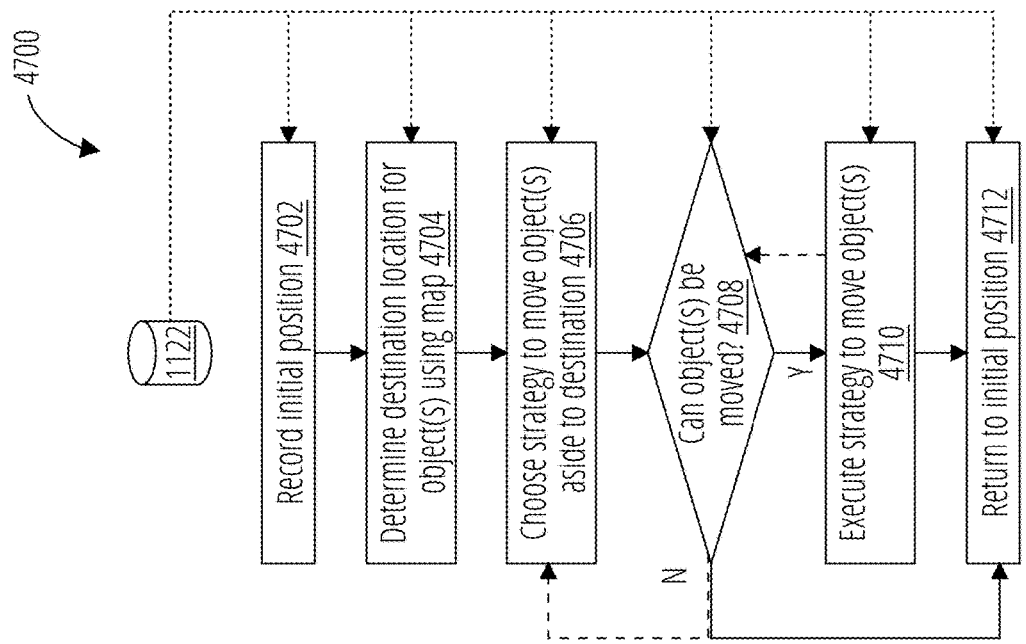
FIG. 47 illustrates an action plan to move object(s) aside 4700 in accordance with one embodiment.

FIG. 47 illustrates an action plan to move object(s) aside 4700 in accordance with one embodiment. The tidying robot 100 may execute the action plan to move object(s) aside 4700 supported by the observations, current robot state, current object state, and sensor data 1122 introduced earlier with respect to FIG. 11.

The action plan to move object(s) aside 4700 may begin with recording an initial position for the tidying robot 100 at block 4702. The tidying robot 100 may then determine a destination for the object(s) to be moved using its map at block 4704. The tidying robot 100 may use its map, which may include noting which areas have already been vacuumed and determining a target location for the object(s) that has already been vacuumed, is in close proximity, and/or will not obstruct the continued vacuuming pattern.

The robot may at block 4706 choose a strategy to move the object(s). The robot may determine if it is able to move the object(s) via the strategy at decision block 4708. If it appears the object(s) are not movable via the strategy selected, the tidying robot 100 may return to its initial portion at block 4712. Alternatively, the tidying robot 100 may return to block 4706 and select a different strategy.

If the object(s) appear to be able to be moved, the robot may execute the strategy for moving the object(s) at block 4710. Executing the strategy may include picking up object(s) and dropping them at a determined destination location. Alternatively, the obstructing object(s) may be aligned with the outside of a robot's arm, and the robot may then use a sweeping motion to push the object(s) to the side, out of its vacuuming path. For example, the robot may pivot away from cleaned areas to navigate to a point where the robot may be pushed into the cleaned area by the robot pivoting back toward those cleaned areas.

If it is determined during execution of the strategy at block 4710 the object(s) cannot be moved, or if the strategy fails, the robot may navigate back to a starting position at block 4712. Alternatively, the robot may navigate to a different position that allows for continuation of the vacuuming pattern, skipping the area of obstruction. The action plan to move object(s) aside 4700 may then be exited.

In one embodiment, the robot may store the obstruction location on its map. The robot may issue an alert to notify a user of the instruction. The user may be able to clear the obstruction physically from the path, and then clear it from the robot's map through a user interface, either on the robot or through a mobile application in communication with the robot. The robot may in one embodiment be configured to revisit areas of obstruction once the rest of its cleaning pattern has been completed.

Figure 48:
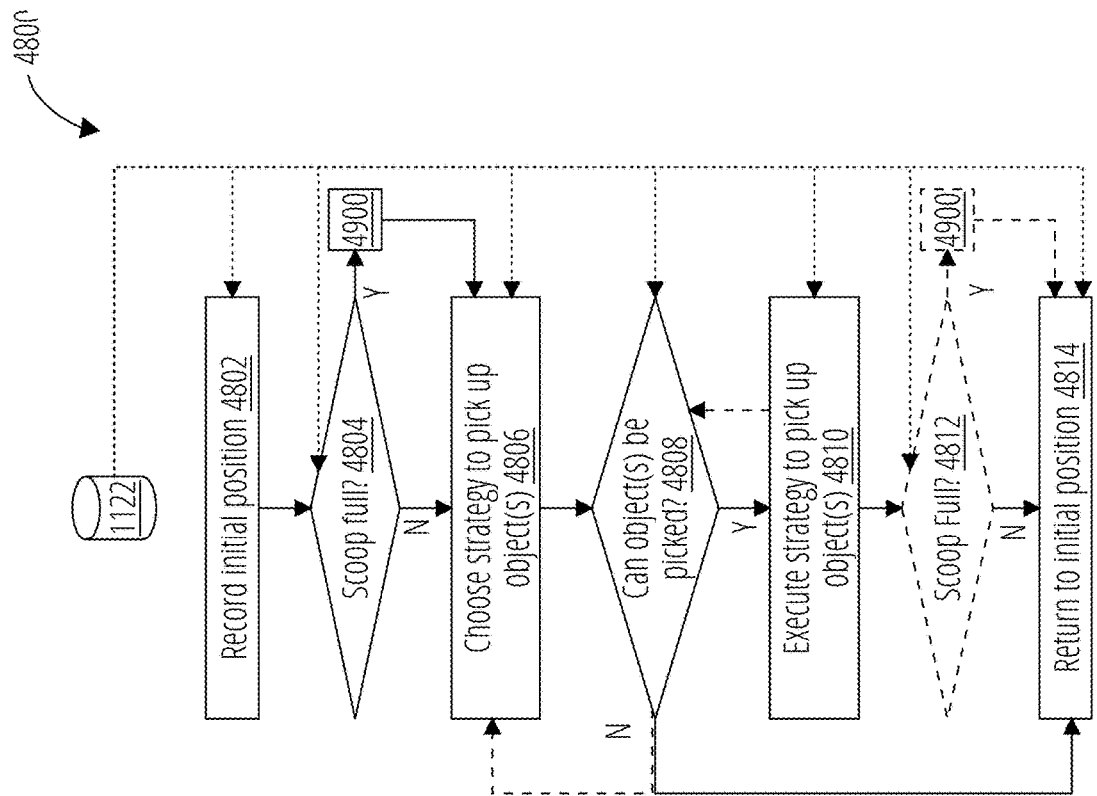
FIG. 48 illustrates an action plan to pick up objects in path 4800 in accordance with one embodiment.

FIG. 48 illustrates an action plan to pick up objects in path 4800 in accordance with one embodiment. The tidying robot 100 may execute the action plan to pick up objects in path 4800 supported by the observations, current robot state, current object state, and sensor data 1122 introduced earlier with respect to FIG. 11.

The action plan to pick up objects in path 4800 may begin with recording an initial position for the tidying robot 100 at block 4802. The tidying robot 100 may make a determination at decision block 4804 whether its scoop is full or has capacity to pick up additional objects. If the scoop is full, the tidying robot 100 may, before proceeding, empty its scoop by depositing the objects therein at a desired drop location by following action plan to drop object(s) at a drop location 4900. The drop location may be a bin, a designated place on the floor that will be vacuumed before objects are deposited, or a designated place on the floor that has already been vacuumed.

Once it is determined that the scoop has capacity to pick up the objects, the tidying robot 100 may at block 4806 choose a strategy to pick up the obstructing objects it has detected. The tidying robot 100 may determine if it is able to pick the objects up via the selected strategy at decision block 4808. If it appears the object(s) are not pickable via the strategy selected, the tidying robot 100 may return to its initial portion at block 4814. Alternatively, the tidying robot 100 may return to block 4806 and select a different strategy.

If it is determined during execution of the strategy at block 4810 the object(s) cannot be picked up, or if the strategy fails, the robot may navigate back to a starting position at block 4814. Alternatively, the robot may navigate to a different position that allows for continuation of the vacuuming pattern, skipping the area of obstruction. The action plan to pick up objects in path 4800 may then be exited.

Once the objects are picked up through execution of the pickup strategy at block 4810, the tidying robot 100 may in one embodiment re-check scoop capacity at decision block 4812. If the scoop is full, the tidying robot 100 may perform the action plan to drop object(s) at a drop location 4900 to empty the scoop.

In one embodiment, the tidying robot 100 may immediately perform the action plan to drop object(s) at a drop location 4900 regardless of remaining scoop capacity in order to immediately drop the objects in a bin. In one embodiment, the tidying robot 100 may include features that allow it to haul a bin behind it, or carry a bin with it. In such an embodiment, the robot may perform an immediate rear dump into the bin behind it, or may set down the bin it is carrying before executing the pickup strategy, then immediately deposit the objects in the bin and retrieve the bin.

In one embodiment, if the scoop is not full and still has capacity, the tidying robot 100 may return to the initial position at block 4814 and continue cleaning while carrying the objects in its scoop, exiting the action plan to pick up objects in path 4800. Alternately, the robot may navigate to a different position that allows for continuation of the vacuuming pattern and may exit the action plan to pick up objects in path 4800.

Figures 49, 50:
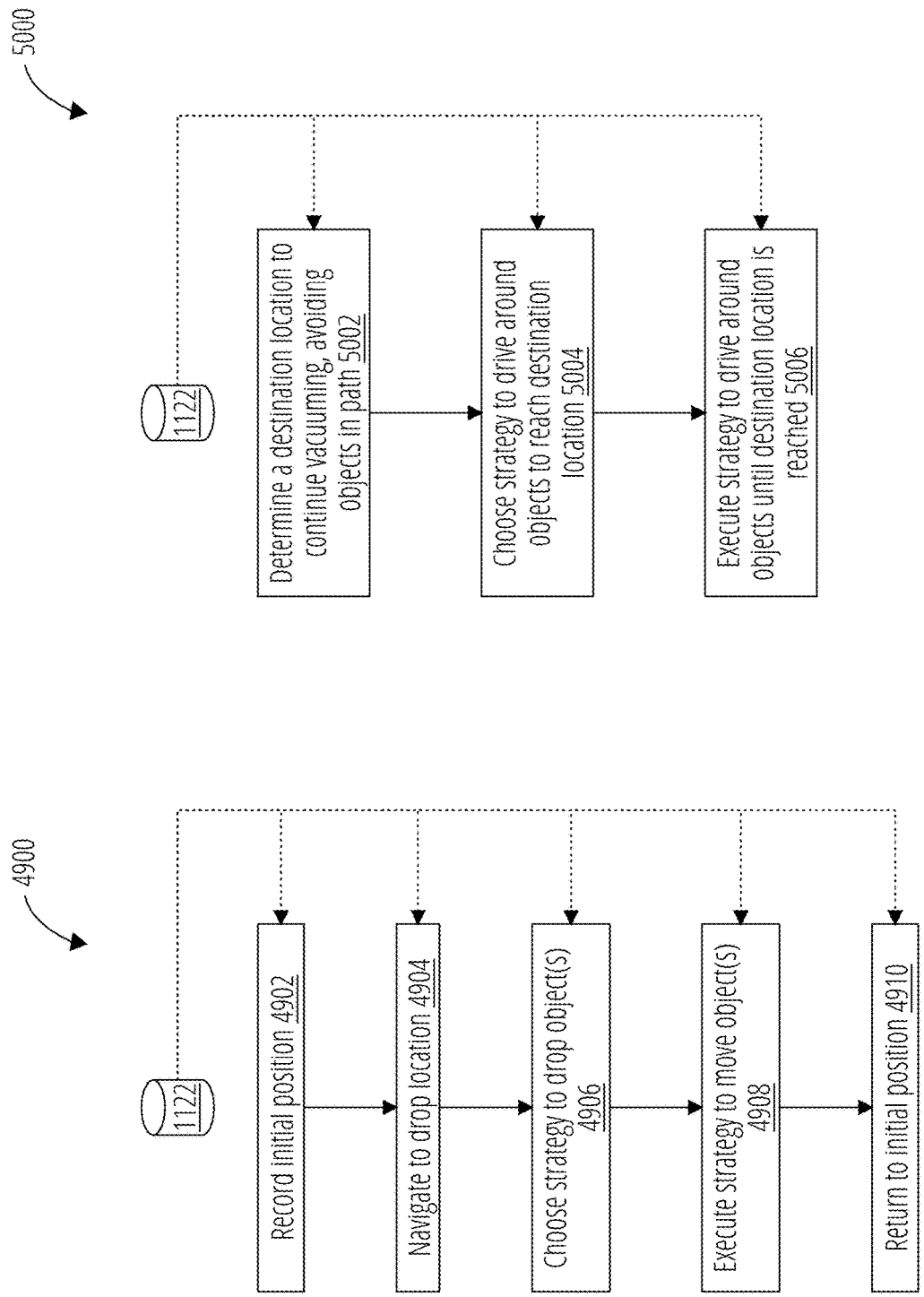
FIG. 49 illustrates an action plan to drop object(s) at a drop location 4900 in accordance with one embodiment.
FIG. 50 illustrates an action plan to drive around object(s) 5000 in accordance with one embodiment.

FIG. 49 illustrates an action plan to drop object(s) at a drop location 4900 in accordance with one embodiment. The tidying robot 100 may execute the action plan to drop object(s) at a drop location 4900 supported by the observations, current robot state, current object state, and sensor data 1122 introduced earlier with respect to FIG. 11.

The action plan to drop object(s) at a drop location 4900 may begin at block 4902 with the tidying robot 100 recording an initial position. The tidying robot 100 may then navigate to the drop location at block 4904. The drop location may be a bin or a designated place on the floor that will be vacuumed before dropping, or may have already been vacuumed.

At block 4906, the tidying robot 100 may choose a strategy for dropping the objects. The drop strategy may include performing a rear dump or a front dump, and may involve coordinated patterns of movement by the pusher pad arms to successfully empty the scoop, based on the types of objects to be deposited.

The tidying robot 100 may then execute the strategy to drop the objects at block 4908. In one embodiment, similar to other action plans disclosed herein, a failure in the drop strategy may be detected, wherein the tidying robot 100 may select a different strategy, return to other actions, or alert a user that an object is stuck in the scoop. Finally, at block 4910, the tidying robot 100 may return to the initial position, exiting the action plan to drop object(s) at a drop location 4900 and continuing to vacuum or perform other tasks.

FIG. 50 illustrates an action plan to drive around object(s) 5000 in accordance with one embodiment. The tidying robot 100 may execute the action plan to drive around object(s) 5000 supported by the observations, current robot state, current object state, and sensor data 1122 introduced earlier with respect to FIG. 11.

The action plan to drive around object(s) 5000 may begin at block 5002 with the tidying robot 100 determining a destination location to continue vacuuming after navigating around and avoiding the objects currently obstructing the vacuuming path. In one embodiment, the tidying robot 100 may use a map including the location of the objects and which areas have already been vacuumed to determine the desired target location beyond obstructing objects where it may best continue its vacuuming pattern.

At block 5004, the tidying robot 100 may choose a strategy to drive around the objects to reach the selected destination location. The tidying robot 100 may then execute the strategy at block 5006. In one embodiment, the robot may plot waypoint(s) to a destination location on a local map using an algorithm to navigate around objects. The robot may then navigate to the destination location following those waypoints.

Figure 51:
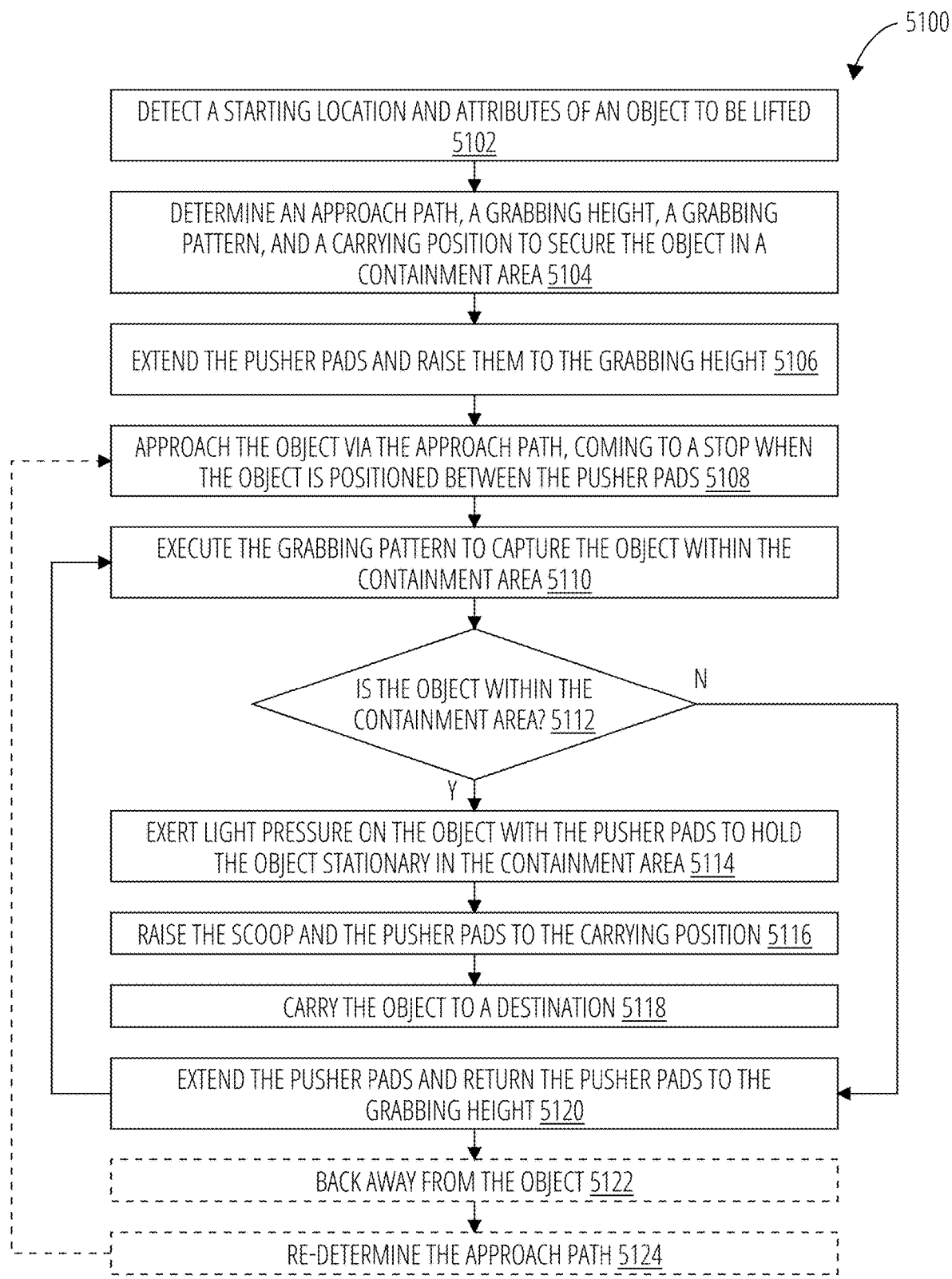
FIG. 51 illustrates a capture process 5100 portion of the disclosed algorithm in accordance with one embodiment.

The disclosed algorithm may comprise a capture process 5100 as illustrated in FIG. 51. The capture process 5100 may be performed by a tidying robot 100 such as that introduced with respect to FIG. 1A. This robot may have the sensing system, control system, mobility system, pusher pads, pusher pad arms, and scoop illustrated in FIG. 1A through FIG. 1A, or similar systems and features performing equivalent functions as is well understood in the art.

The capture process 5100 may begin in block 5102 where the robot detects a starting location and attributes of an object to be lifted. Starting location may be determined relative to a learned map of landmarks within a room the robot is programmed to declutter. Such a map may be stored in memory within the electrical systems of the robot. These systems are described in greater detail with regard to FIG. 10. Object attributes may be detected based on input from a sensing system, which may comprise cameras, LIDAR, or other sensors. In some embodiments, data detected by such sensors may be compared to a database of common objects to determine attributes such as deformability and dimensions. In some embodiments, the robot may use known landmark attributes to calculate object attributes such as dimensions. In some embodiments, machine learning may be used to improve attributes detection and analysis.

In block 5104, the robot may determine an approach path to the starting location. The approach path may take into account the geometry of the surrounding space, obstacles detected around the object, and how components the robot may be configured as the robot approaches the object. The robot may further determine a grabbing height for initial contact with the object. This grabbing height may take into account an estimated center of gravity for the object in order for the pusher pads to move the object with the lowest chance of slipping off of, under, or around the object, or deflecting the object in some direction other than into the scoop. The robot may determine a grabbing pattern for movement of the pusher pads during object capture, such that objects may be contacted from a direction and with a force applied in intervals optimized to direct and impel the object into the scoop. Finally, the robot may determine a carrying position of the pusher pads and a scoop that secures the object in a containment area for transport after the object is captured. This position may take into account attributes such as the dimensions of the object, its weight, and its center of gravity.

In block 5106, the robot may extend its pusher pads out and forward with respect to the pusher pad arms and raise the pusher pads to the grabbing height. This may allow the robot to approach the object as nearly as possible without having to leave room for this extension after the approach. Alternately, the robot may perform some portion of the approach with arms folded in close to the chassis and scoop to prevent impacting obstacles along the approach path. In some embodiments, the robot may first navigate the approach path and deploy arms and scoop to clear objects out of and away from the approach path. In block 5108, the robot may finally approach the object via the approach path, coming to a stop when the object is positioned between the pusher pads.

In block 5110, the robot may execute the grabbing pattern determined in block 5102 to capture the object within the containment area. The containment area may be an area roughly described by the dimensions of the scoop and the disposition of the pusher pad arms with respect to the scoop. It may be understood to be an area in which the objects to be transported may reside during transit with minimal chances of shifting or being dislodged or dropped from the scoop and pusher pad arms. In decision block 5112, the robot may confirm that the object is within the containment area. If the object is within the containment area, the robot may proceed to block 5114.

In block 5114, the robot may exert a light pressure on the object with the pusher pads to hold the object stationary in the containment area. This pressure may be downward in some embodiments to hold an object extending above the top of the scoop down against the sides and surface of the scoop. In other embodiments this pressure may be horizontally exerted to hold an object within the scoop against the back of the scoop. In some embodiments, pressure may be against the bottom of the scoop in order to prevent a gap from forming that may allow objects to slide out of the front of the scoop.

In block 5116, the robot may raise the scoop and the pusher pads to the carrying position determined in block 5102. The robot may then at block 5118 carry the object to a destination. The robot may follow a transitional path between the starting location and a destination where the object will be deposited. To deposit the object at the destination, the robot may follow the deposition process 5200 illustrated in FIG. 52.

If at decision block 5112 the object is not detected within the containment area, or is determined to be partially or precariously situated within the containment area, the robot may at block 5120 extend the pusher pads fall out of the scoop and forward with respect to the pusher pad arms and returns the pusher pads to the grabbing height. The robot may then return to block 5110. In some embodiments, the robot may at block 5122 back away from the object if simply releasing and reattempting to capture the object is not feasible. This may occur if the object has been repositioned or moved by the initial attempt to capture it. In block 5124, the robot may re-determine the approach path to the object. The robot may then return to block 5108.

Figure 52:
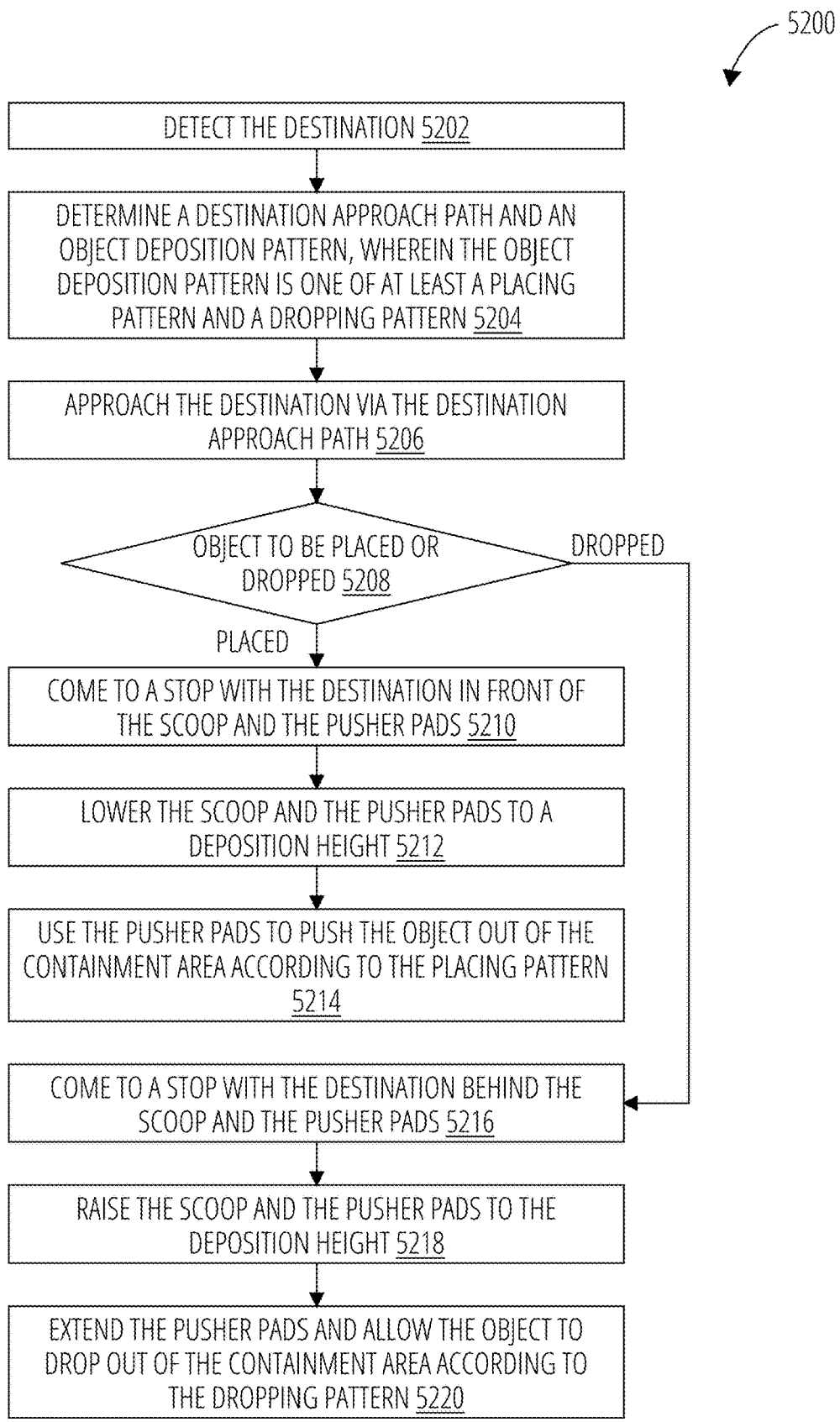
FIG. 52 illustrates a deposition process 5200 portion of the disclosed algorithm in accordance with one embodiment.
Figure 53A:
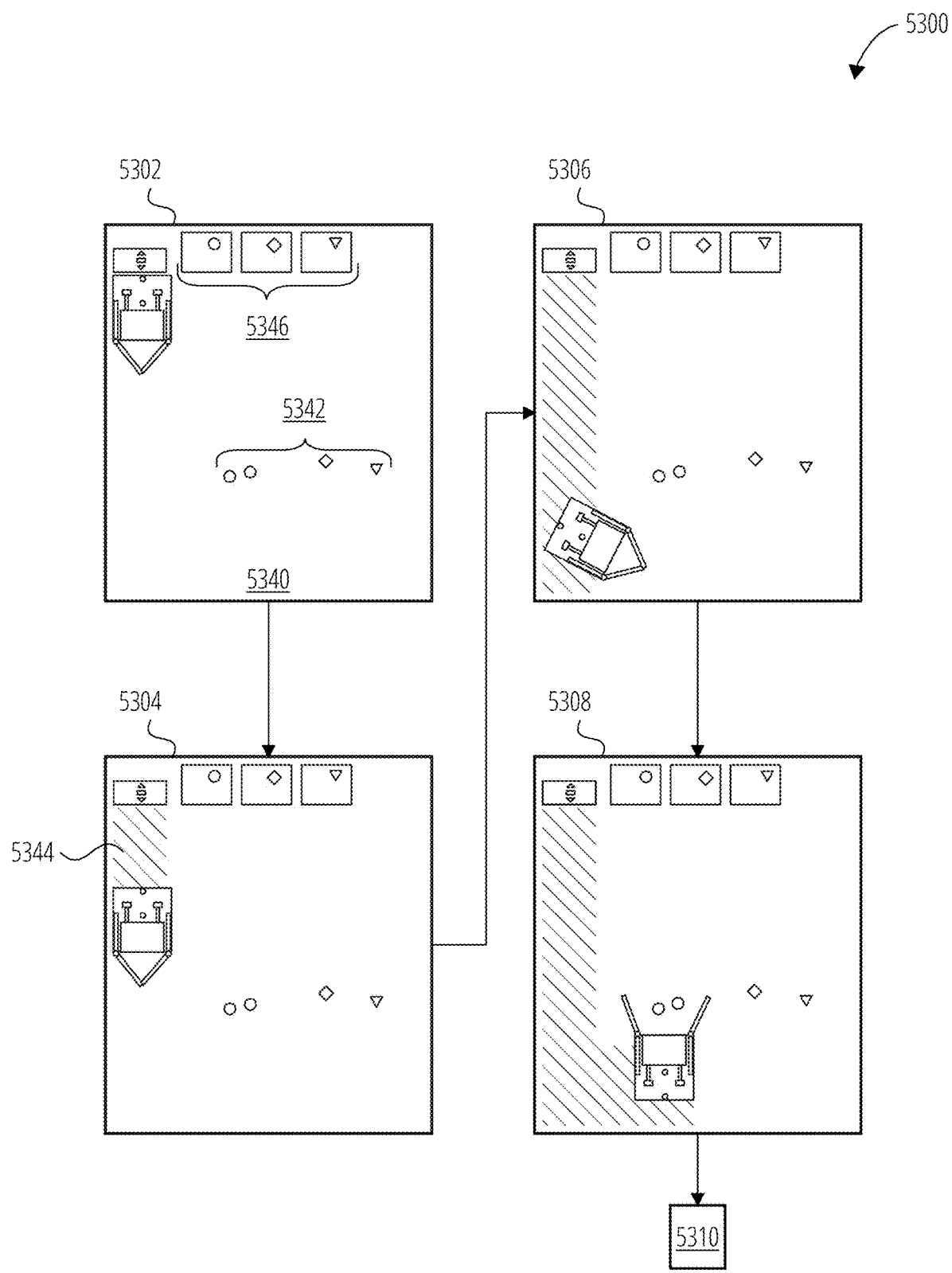
FIG. 53A-FIG. 53E illustrate an execution of a vacuuming strategy and tidying strategy 5300 in accordance with one embodiment.
Figure 53B:
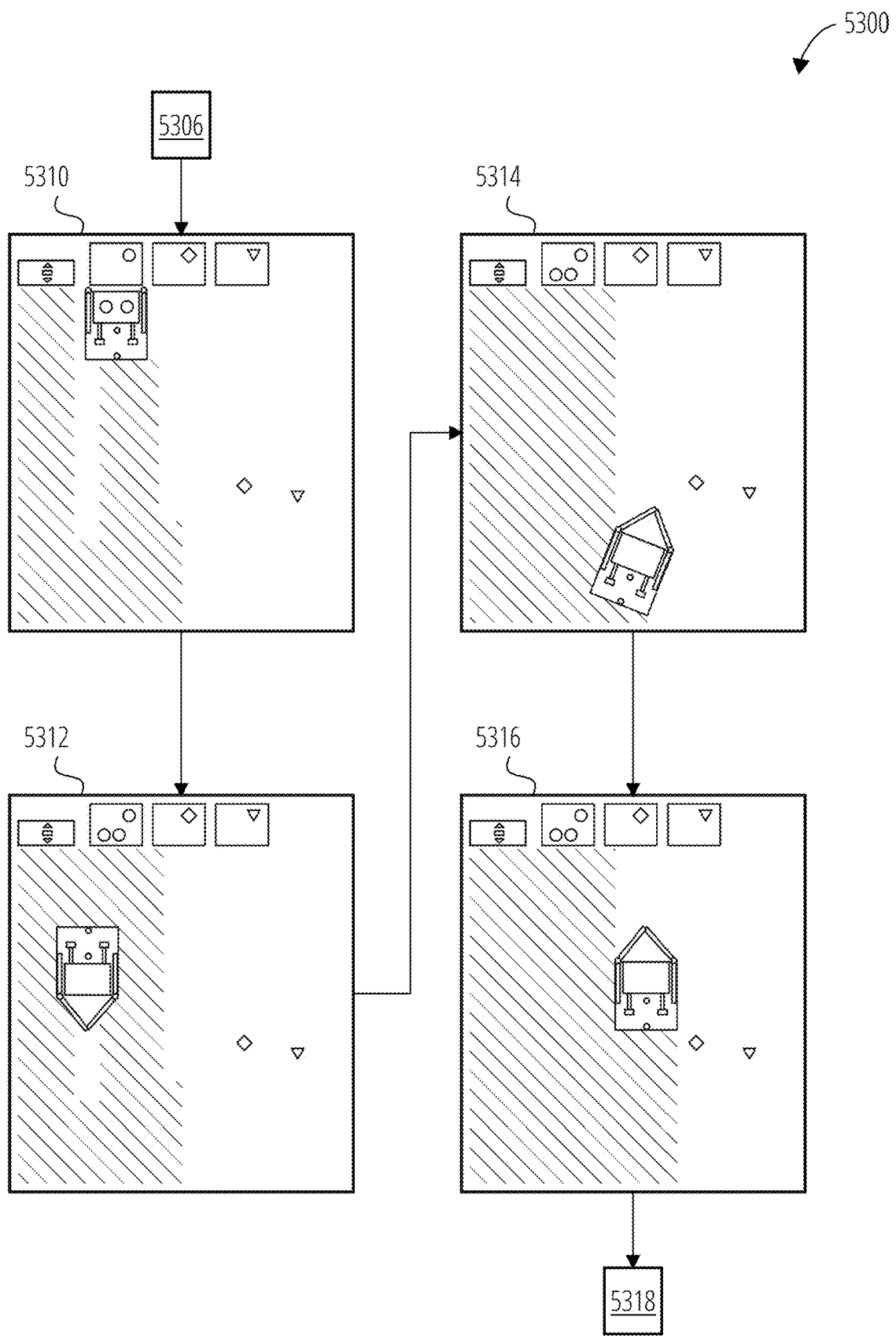
Figure 53C:
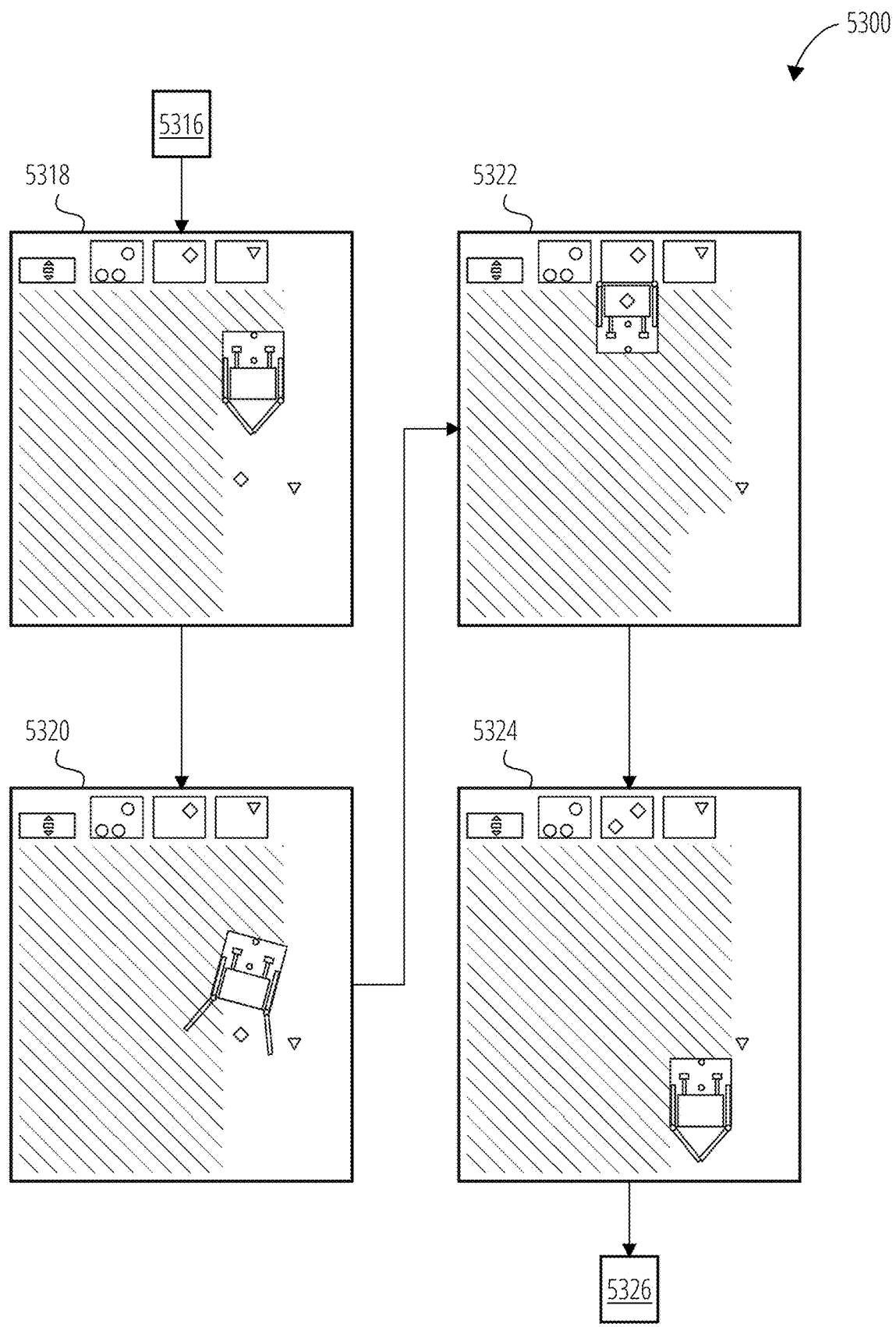
Figure 53D:
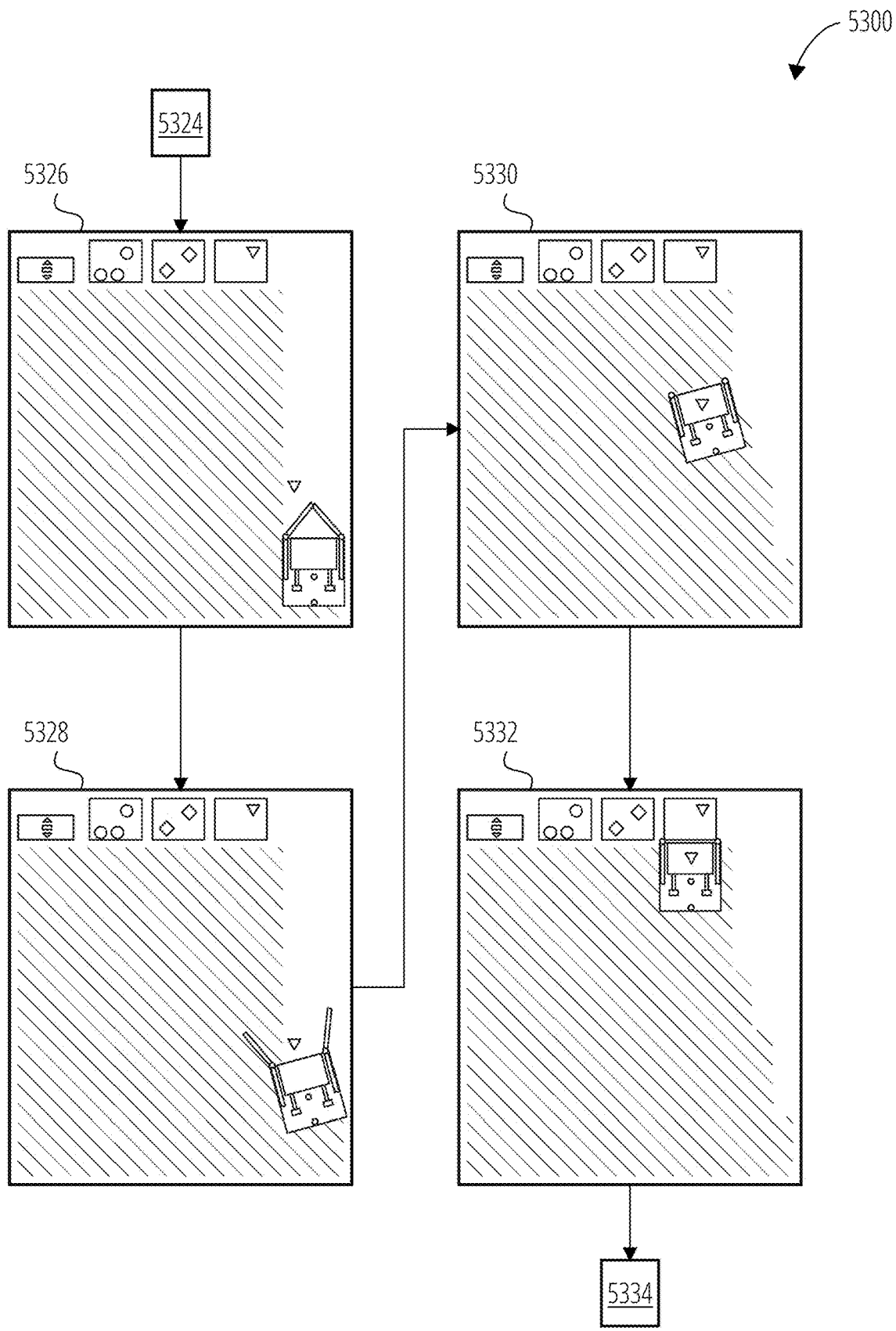
Figure 53E:
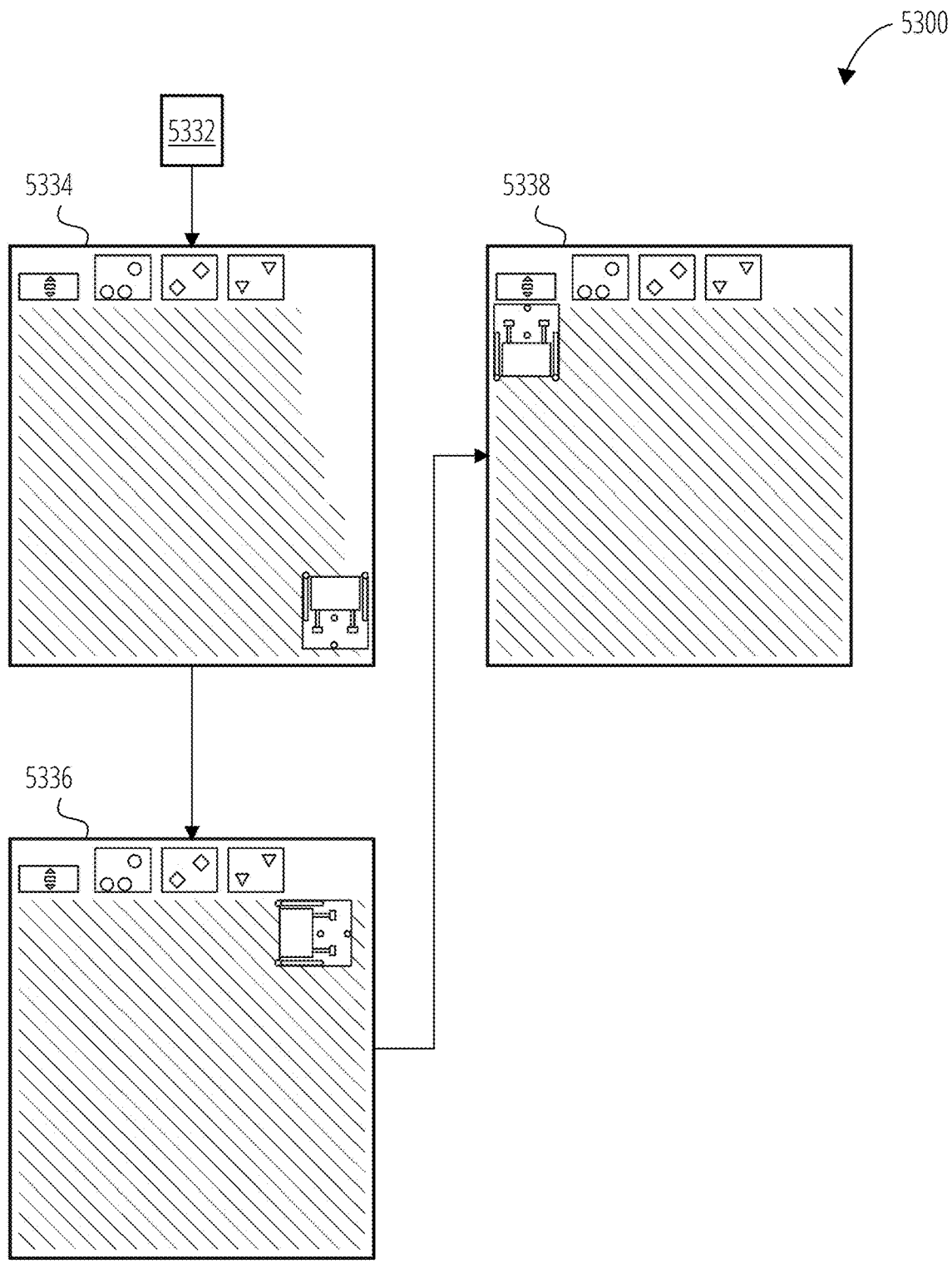

FIG. 52 illustrates a deposition process 5200 in accordance with one embodiment. The deposition process 5200 may be performed by a tidying robot 100 such as that introduced with respect to FIG. 1A as part of the algorithm disclosed herein. This robot may have the sensing system, control system, mobility system, pusher pads, pusher pad arms, and scoop illustrated in FIG. 1A through FIG. 2B or similar systems and features performing equivalent functions as is well understood in the art.

In block 5202, the robot may detect the destination where an object carried by the robot is intended to be deposited. In block 5204, the robot may determine a destination approach path to the destination. This path may be determined so as to avoid obstacles in the vicinity of the destination. In some embodiments, the robot may perform additional navigation steps to push objects out of and away from the destination approach path. The robot may also determine an object deposition pattern, wherein the object deposition pattern is one of at least a placing pattern and a dropping pattern. Some neatly stackable objects such as books, other media, narrow boxes, etc., may be most neatly decluttered by stacking them carefully. Other objects may not be neatly stackable, but may be easy to deposit by dropping into a bin. Based on object attributes, the robot may determine which object deposition pattern is most appropriate to the object.

In block 5206, the robot may approach the destination via the destination approach path. How the robot navigates the destination approach path may be determined based on the object deposition pattern. If the object being carried is to be dropped over the back of the robot's chassis, the robot may traverse the destination approach path in reverse, coming to a stop with the back of the chassis nearest the destination. Alternatively, for objects to be stacked or placed in front of the scoop, i.e., at the area of the scoop that is opposite the chassis, the robot may travel forward along the destination approach path so as to bring the scoop nearest the destination.

At decision block 5208, the robot may proceed in one of at least two ways, depending on whether the object is to be placed or dropped. If the object deposition pattern is intended to be a placing pattern, the robot may proceed to block 5210. If the object deposition pattern is intended to be a dropping pattern, the robot may proceed to block 5216.

For objects to be placed via the placing pattern, the robot may come to a stop with the destination in front of the scoop and the pusher pads at block 5210. In block 5212, the robot may lower the scoop and the pusher pads to a deposition height. For example, if depositing a book on an existing stack of books, the deposition height may be slightly above the top of the highest book in the stack, such that the book may be placed without disrupting the stack or dropping the book from a height such that it might have enough momentum to slide off the stack or destabilize the stack. Finally, at block 5214, the robot may use its pusher pads to push the object out of the containment area and onto the destination. In one embodiment, the scoop may be tilted forward to drop objects, with or without the assistance of the pusher pads pushing the objects out from the scoop.

If in decision block 5208 the robot determines that it will proceed with an object deposition pattern that is a dropping pattern, the robot may continue to block 5216. At block 5216, the robot may come to a stop with the destination behind the scoop and the pusher pads, and by virtue of this, behind the chassis for a robot such as the one introduced in FIG. 1A. In block 5218, the robot may raise the scoop and the pusher pads to the deposition height. In one embodiment the object may be so positioned that raising the scoop and pusher pad arms from the carrying position to the deposition height results in the object dropping out of the containment area into the destination area. Otherwise, in block 5220, the robot may extend the pusher pads and allow the object to drop out of the containment area, such that the object comes to rest at or in the destination area. In one embodiment, the scoop may be tilted forward to drop objects, with or without the assistance of the pusher pads pushing the objects out from the scoop.

FIG. 53A-FIG. 53E illustrate an execution of a vacuuming strategy and tidying strategy 5300 in accordance with one embodiment. A tidying robot 100 may be seen, beginning at its base station 300 in step 5302. It may be configured to clean a target cleaning area 5340 in which there are obstructions 5342. There are also target storage bins 5346 in which different categories of obstructions may be placed. In step 5304, the robot may be seen departing from its base station, having begun a vacuum cleaning pattern 5344, where cleaned areas are marked on its map, as indicated by the diagonal line pattern. The robot may encounter a wall or some other immovable object at step 5306, and may make a turn to continue its vacuuming strategy. The robot may encounter objects at step 5308. The robot may pick the objects up in its scoop and carry them to a bin, leaving a portion of the floor unvacuumed as shown in step 5310. After depositing the objects into the bin, the robot may turn and vacuum the portion left unvacuumed in step 5312, and may proceed to a point along the path it was previously following, continuing its vacuuming pattern, as shown in step 5314, step 5316, and step 5318. More objects may be encountered and retrieved at step 5320 and moved to appropriate bins at step 5322, with the robot returning to its vacuuming pattern at step 5324, this process being again repeated in step 5326, step 5328, step 5330, step 5332, and step 5334. When all areas of the vacuuming pattern have been completed and the entire floor has thus been vacuumed, as shown at step 5336, the robot may return to its base station at step 5338.

In one embodiment, debris and trash may be among the objects detected, and the robot may use its pusher pads to sweep these into its scoop and carry them to a designated trash bin. In another embodiment, the robot may traverse the floor in a pre-sweep position such as the inverted wedge configuration shown in FIG. 18A and FIG. 18B. In such an embodiment, the robot may relocate any debris it may have picked up in this position to an unvacuumed spot on the floor before retrieving and putting away objects. It may then re-encounter the debris later in its vacuuming pattern, and continue in this manner until all tidyable objects are put away, at which time it may collect the debris in its scoop and deposit it in an appropriate trash bin. For example, the bin on the base station 300 illustrated in FIG. 3A and FIG. 3B may be used for depositing this debris once the vacuuming pattern is complete.

Figure 54A:
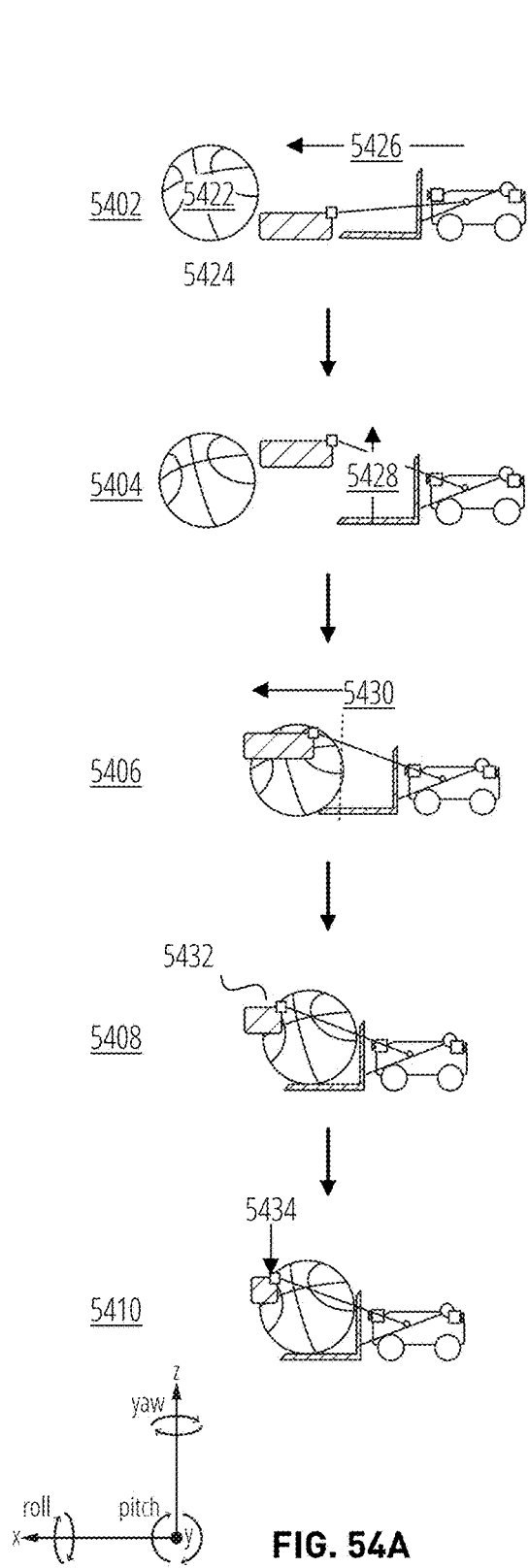
FIG. 54A through FIG. 54D illustrate a pickup strategy for a large, slightly deformable object 5400 in accordance with one embodiment.
Figure 54B:
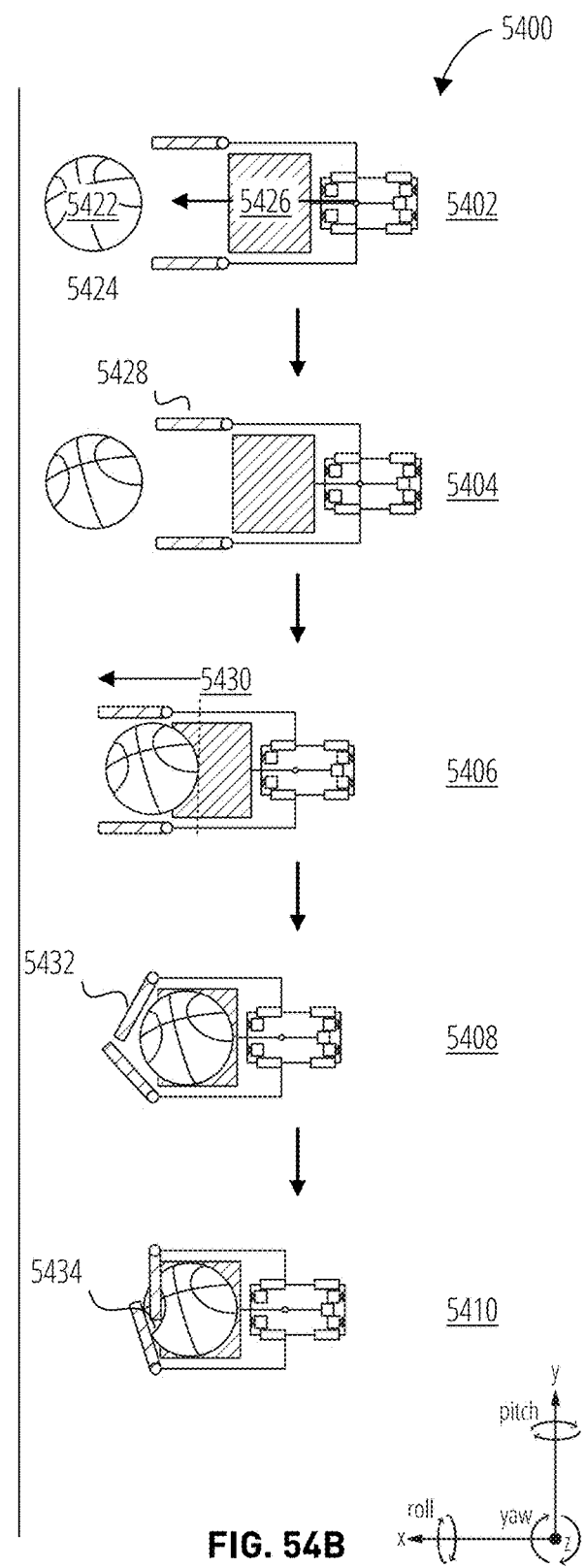
Figure 54C:
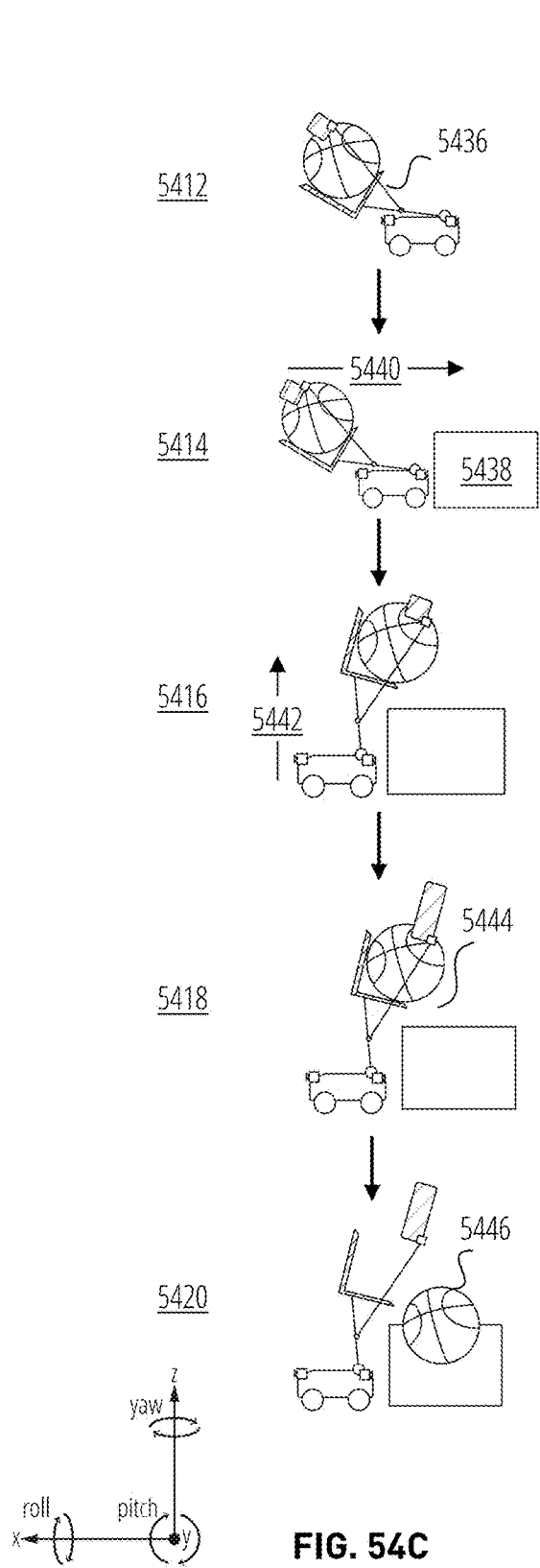
Figure 54D:
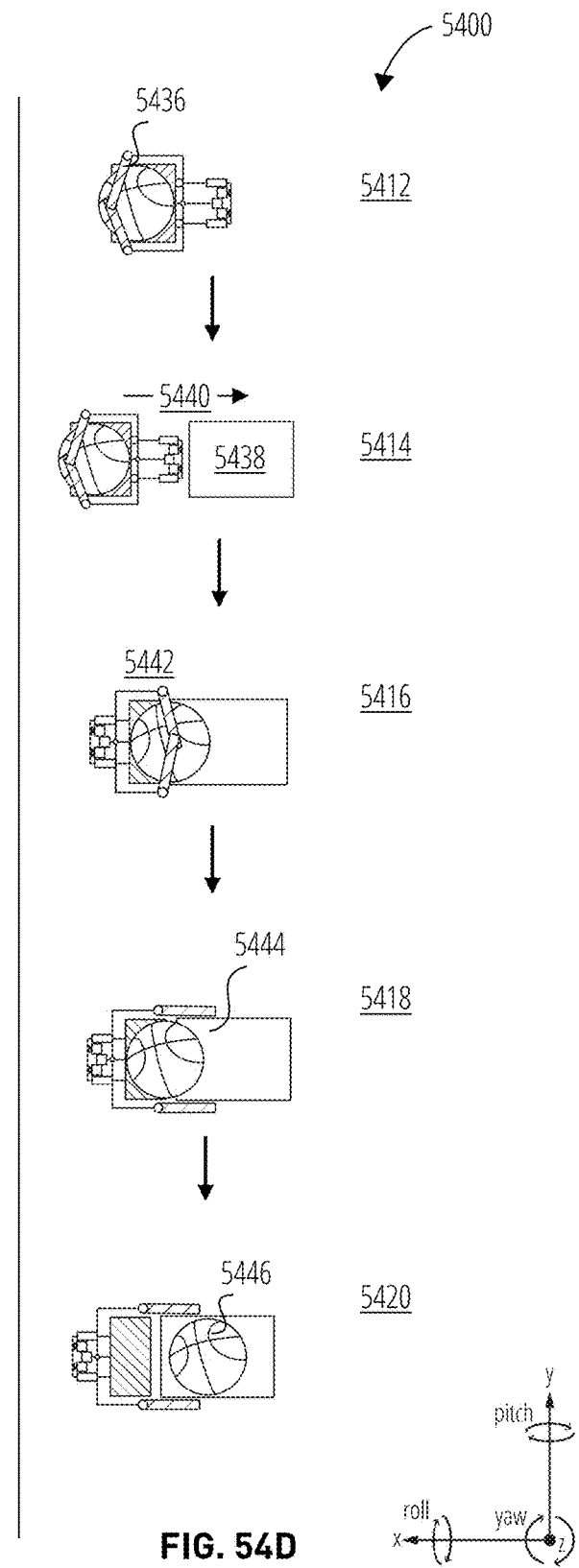

FIG. 54A-FIG. 54D illustrate a pickup strategy for a large, slightly deformable object 5400 in accordance with one embodiment. FIG. 54A shows a side view of the robot performing steps 5402-5410, while FIG. 54B shows a top view of the performance of these same steps. FIG. 54C illustrates a side view of steps 5412-5420, and FIG. 54D shows a top view of these steps. A large, slightly deformable object may be an object such as a basketball, which extends outside of the dimensions of the scoop, and may respond to pressure with very little deformation or change of shape.

As illustrated in FIG. 54A and FIG. 54B, the robot may first drive to the basketball 5422, such as a basketball, located at a starting location 5424, following an approach path 5426 at step 5402. The robot may adjust its pusher pad arms to a grabbing height 5428 based on the type of object at step 5404. For a basketball 5422 such as a basketball, this may be near or above the top of the basketball. The robot, at step 5406, may drive so that its arms align past the object 5430. The robot may employ a grabbing pattern 5432 at step 5408 to use its arms to push or roll the basketball onto the scoop or scoop. Using the pusher pad arms at step 5410, the robot may apply a light pressure 5434 to the top of the basketball to hold it securely within or atop the scoop.

As shown in FIG. 54C and FIG. 54D, the robot may lift the basketball at step 5412 while continuing to hold it with its pusher pad arms, maintaining the ball within the scoop in a carrying position 5436. Next, at step 5414, the robot may drive to the post pickup location 5438 where the basketball is intended to be placed, following a post pickup location approach path 5440. At step 5416, the robot may adjust the scoop and pusher pad arms to position the basketball at a deposition height 5442. For an object such as a basketball, this may position the scoop and ball in an area above the robot, tilted or aimed toward a container. Alternatively, the container may be to the front of the robot and the objects deposited as illustrated in FIG. 8. The robot may at step 5418 open its arms to release the object into the post pickup location container using a dropping pattern 5444. The basketball may then fall out of the scoop 5446 and come to rest in its post pickup location container at step 5420.

While the robot shown in FIG. 54A-FIG. 54D may be seen to have pusher pad arms attaching to pivot points on the scoop arm, this is a simplified schematic view provided for exemplary purposes. Performance of the pickup strategy for a large, slightly deformable object 5400 is not limited to robot embodiments exhibiting this feature. The pickup strategy for a large, slightly deformable object 5400 may be performed by any of the robot embodiments disclosed herein.

Figure 55:
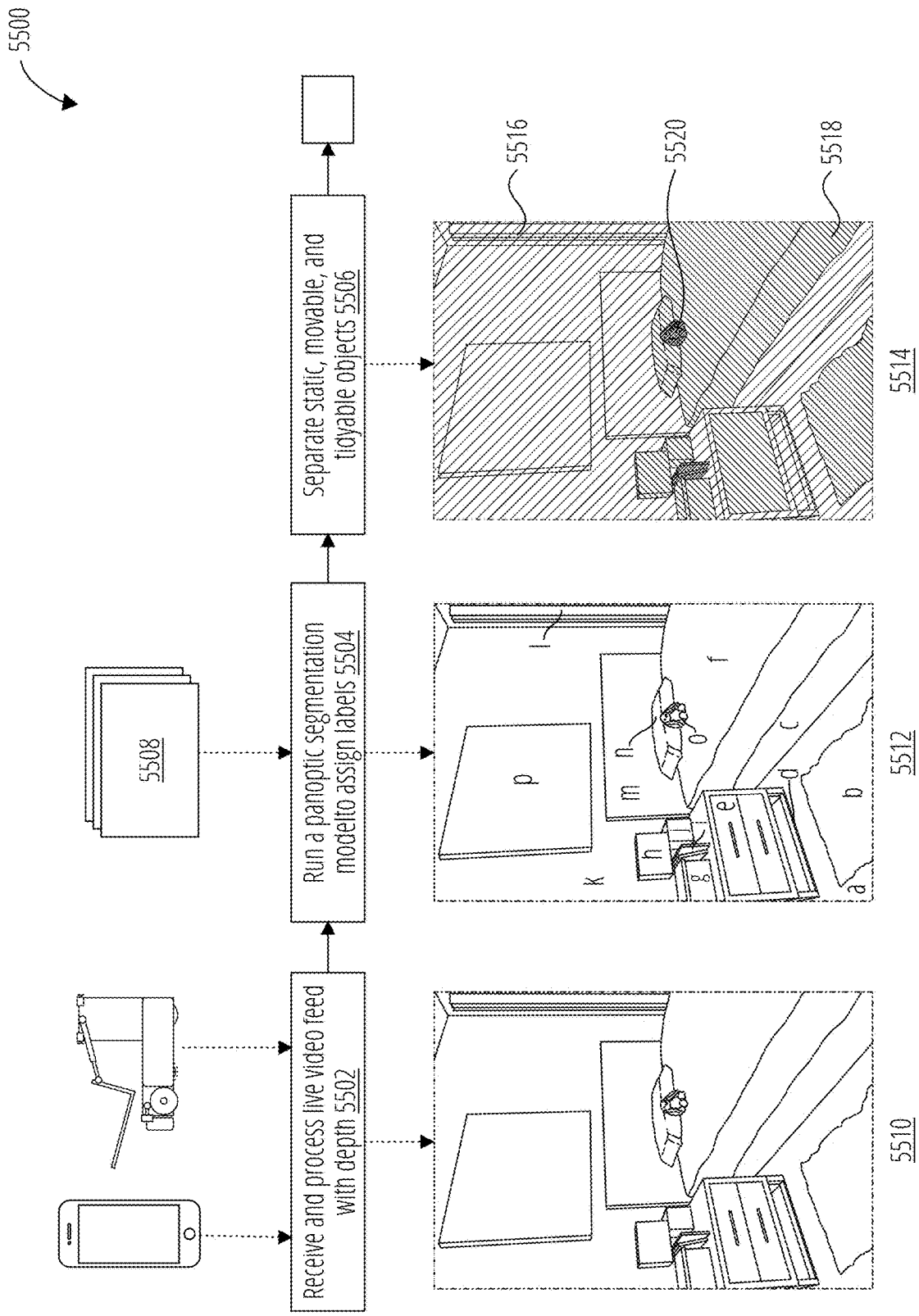
FIG. 55 illustrates a video-feed segmentation routine 5500 in accordance with one embodiment.

FIG. 55 illustrates a video-feed segmentation routine 5500 in accordance with one embodiment. Although the example video-feed segmentation routine 5500 depicts a particular sequence of operations, the sequence may be altered without departing from the scope of the present disclosure. For example, some of the operations depicted may be performed in parallel or in a different sequence that does not materially affect the function of the video-feed segmentation routine 5500. In other examples, different components of an example device or system that implements the video-feed segmentation routine 5500 may perform functions at substantially the same time or in a specific sequence.

According to some examples, the method includes receiving and processing live video with depth at block 5502. The live video feed may capture an environment to be tidied. For example, a mobile computing device such as a smartphone or tablet or the tidying robot 100 may be configured to receive and process live video with depth using a camera configured as part of the device in conjunction with the robotic control system 1000. This live video may be used to begin mapping the environment to be tidied, and to support the configuration and display of an augmented reality (AR) user interface. Alternatively, the tidying robot previously disclosed may be configured to receive and process live video with depth using its cameras 1104 in conjunction with the robotic control system 1000. This may support the robot's initialization, configuration, and operation as disclosed herein. The live video feed may include images of a scene 5510 across the environment to be tidied. These may be processed to display an augmented reality view to a user on a global map of the environment to be tidied.

According to some examples, the method includes running a panoptic segmentation model 5508 to assign labels at block 5504. For example, the panoptic segmentation model 5508 illustrated in FIG. 55 may run a model to assign labels. The model may assign a semantic label (such as an object type), an instance identifier, and a movability attribute (such as static, movable, and tidyable) for each pixel in an image of a scene 5510 (such as is displayed in a frame of captured video). The panoptic segmentation model 5508 may be configured as part of the logic 1014 of the robotic control system 1000 in one embodiment. The panoptic segmentation model 5508 may in this manner produce a segmented image 5512 for each image of a scene 5510. Elements detected in the segmented image 5512 may in one embodiment be labeled as shown:

a. floor
b. rug
c. bedframe
d. nightstand
e. drawer
f. bedspread
g. box
h. lamp
i. books
j. picture
k. wall
l. curtains
m. headboard
n. pillow
o. stuffed animal
p. painting According to some examples, the method includes separating the segmented image into static objects 5516, movable objects 5518, and tidyable objects 5520 at block 5506. For example, the robotic control system 1000 illustrated in FIG. 10 may separate static, movable, and tidyable objects. Using the segmented image 5512 and assigned labels, static structures in the represented scene, such as floors, walls, and large furniture, may be separated out as static objects 5516 from movable objects 5518 like chairs, doors, and rugs, and tidyable objects 5520 such as toys, books, and clothing. Upon completion of the video-feed segmentation routine 5500, the mobile device, tidying robot, and robotic control system may act to perform a static object identification process based on the objects separated into static objects, movable objects, and tidyable objects 5514.

Figure 56:
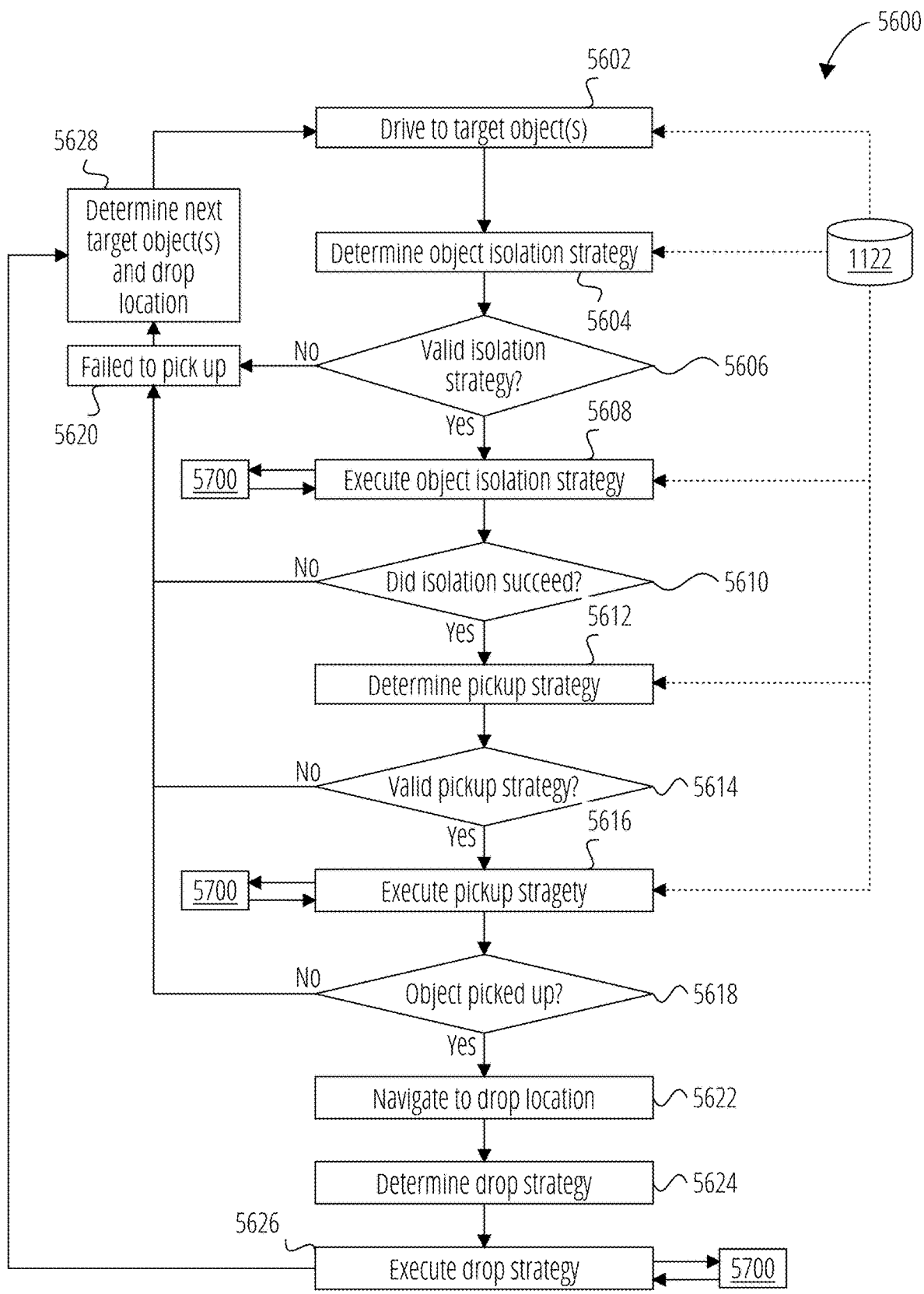
FIG. 56 illustrates a main navigation, collection, and deposition process 5600 in accordance with one embodiment.

FIG. 56 illustrates a main navigation, collection, and deposition process 5600 in accordance with one embodiment. According to some examples, the method includes driving to target object(s) at block 5602. For example, the tidying robot 100 such as that introduced with respect to FIG. 1A may drive to target object(s) using a local map or global map to navigate to a position near the target object(s), relying upon observations, current robot state, current object state, and sensor data 1122 determined as illustrated in FIG. 11.

According to some examples, the method includes determining an object isolation strategy at block 5604. For example, the robotic control system 1000 illustrated in FIG. 10 may determine an object isolation strategy in order to separate the target object(s) from other objects in the environment based on the position of the object(s) in the environment. The object isolation strategy may be determined using a machine learning model or a rules based approach, relying upon observations, current robot state, current object state, and sensor data 1122 determined as illustrated in FIG. 11. In some cases, object isolation may not be needed, and related blocks may be skipped. For example, in an area containing few items to be picked up and moved, or where such items are not in a proximity to each other, furniture, walls, or other obstacles, that would lead to interference in picking up target objects, object isolation may not be needed.

In some cases, a valid isolation strategy may not exist. For example, the robotic control system 1000 illustrated in FIG. 10 may be unable to determine a valid isolation strategy. If it is determined at decision block 5606 that there is no valid isolation strategy, the target object(s) may be marked as failed to pick up at block 5620. The main navigation, collection, and deposition process 5600 may then advance to block 5628, where the next target object(s) are determined.

If there is a valid isolation strategy determined at decision block 5606, the tidying robot 100 may execute the object isolation strategy to separate the target object(s) from other objects at block 5608. The isolation strategy may follow strategy steps for isolation strategy, pickup strategy, and drop strategy 5700 illustrated in FIG. 57. The isolation strategy may be a reinforcement learning based strategy using rewards and penalties in addition to observations, current robot state, current object state, and sensor data 1122, or a rules based strategy relying upon observations, current robot state, current object state, and sensor data 1122 determined as illustrated in FIG. 11. Reinforcement learning based strategies relying on rewards and penalties are described in greater detail with reference to FIG. 57.

Rules based strategies may use conditional logic to determine the next logic based on observations, current robot state, current object state, and sensor data 1122 such as are developed in FIG. 11. Each rules based strategy may have a list of available actions it may consider. In one embodiment, a movement collision avoidance system may be used to determine the range of motion involved with each action. Rules based strategies for object isolation may include:

- Navigating robot to a position facing the target object(s) to be isolated, but far enough away to open pusher pad arms and pusher pads and lower the scoop
- Opening the pusher pad arms and pusher pads, lowering the pusher pad arms and pusher pads, and lowering the scoop
- Turning robot slightly in-place so that target object(s) are centered in a front view
- Opening pusher pad arms and pusher pads to be slightly wider than target object(s)
- Driving forward slowly until the end of the pusher pad arms and pusher pads is positioned past the target object(s)
- Slightly closing the pusher pad arms and pusher pads into a V-shape so that the pusher pad arms and pusher pads surround the target object(s)
- Driving backwards 100 centimeters, moving the target object(s) into an open space According to some examples, the method includes determining whether or not the isolation succeeded at decision block 5610. For example, the robotic control system 1000 illustrated in FIG. 10 may determine whether or not the target object(s) were successfully isolated. If the isolation strategy does not succeed, the target object(s) may be marked as failed to pickup at block 5620. The main navigation, collection, and deposition process 5600 advances to block 5628, where a next target object is determined. In some embodiments, rather than determining a next target object, a different strategy may be selected for the same target object. For example, if target object(s) are not able to be isolated by the current isolation strategy, a different isolation strategy may be selected and isolation retried.

If the target object(s) were successfully isolated, the method then includes determining a pickup strategy at block 5612. For example, the robotic control system 1000 illustrated in FIG. 10 may determine the pickup strategy. The pickup strategy for the particular target object(s) and location may be determined using a machine learning model or a rules based approach, relying upon observations, current robot state, current object state, and sensor data 1122 determined as illustrated in FIG. 11.

In some cases, a valid pickup strategy may not exist. For example, the robotic control system 1000 illustrated in FIG. 10 may be unable to determine a valid pickup strategy. If it is determined at decision block 5614 that there is no valid pickup strategy, the target object(s) may be marked as failed to pick up at block 5620, as previously noted. The pickup strategy may need to take into account:

- An initial default position for the pusher pad arms and the scoop before starting pickup
- A floor type detection for hard surfaces versus carpet, which may affect pickup strategies
- A final scoop and pusher pad arm position for carrying If there is a valid pickup strategy determined at decision block 5614, the tidying robot 100 such as that introduced with respect to FIG. 1A may execute a pickup strategy at block 5616. The pickup strategy may follow strategy steps for isolation strategy, pickup strategy, and drop strategy 5700 illustrated in FIG. 57. The pickup strategy may be a reinforcement learning based strategy or a rules based strategy, relying upon observations, current robot state, current object state, and sensor data 1122 determined as illustrated in FIG. 11. Rules based strategies for object pickup may include:

- Navigating the robot to a position facing the target object(s), but far enough away to open the pusher pad arms and pusher pads and lower the scoop
- Opening the pusher pad arms and pusher pads, lowering the pusher pad arms and pusher pads, and lowering the scoop
- Turning the robot slightly in-place so that the target object(s) are centered in the front view
- Driving forward until the target object(s) are in a "pickup zone" against the edge of the scoop Determining a center location of target object(s) against the scoop-on the right, left or center
- If on the right, closing the right pusher pad arm and pusher pad first with the left pusher pad arm and pusher pad closing behind
- Otherwise, closing the left pusher pad arm and pusher pad first with the right pusher pad arm and pusher pad closing behind Determining if target object(s) were successfully pushed into the scoop
- If yes, then pickup was successful
- If no, lift pusher pad arms and pusher pads and then try again at an appropriate part of the strategy.

According to some examples, the method includes determining whether or not the target object(s) were picked up at decision block 5618. For example, the robotic control system 1000 illustrated in FIG. 10 may determine whether or not the target object(s) were picked up. Pickup success may be evaluated using:
- Object detection within the area of the scoop and pusher pad arms (i.e., the containment area as previously illustrated) to determine if the object is within the scoop/pusher pad arms/containment area
- Force feedback from actuator force feedback sensors indicating that the object is retained by the pusher pad arms
- Tracking motion of object(s) during pickup into area of scoop and retaining the state of those object(s) in memory (memory is often relied upon as objects may no longer be visible when the scoop is in its carrying position)
- Detecting an increased weight of the scoop during lifting indicating the object is in the scoop
- Utilizing a classification model for whether an object is in the scoop
- Using force feedback, increased weight, and/or a dedicated camera to re-check that an object is in the scoop while the robot is in motion If the pickup strategy fails, the target object(s) may be marked as failed to pick up at block 5620, as previously described. If the target object(s) were successfully picked up, the method includes navigating to drop location at block 5622. For example, the tidying robot 100 such as that introduced with respect to FIG. 1A may navigate to a predetermined drop location. The drop location may be a container or a designated area of the ground or floor. Navigation may be controlled by a machine learning model or a rules based approach.

According to some examples, the method includes determining a drop strategy at block 5624. For example, the robotic control system 1000 illustrated in FIG. 10 may determine a drop strategy. The drop strategy may need to take into account the carrying position determined for the pickup strategy. The drop strategy may be determined using a machine learning model or a rules based approach. Rules based strategies for object drop may include:
- Navigate the robot to a position 100 centimeters away from the side of a bin
- Turn the robot in place to align it facing the bin
- Drive toward the bin maintaining an alignment centered on the side of the bin.
- Stop three centimeters from the side of the bin
- Verify that the robot is correctly positioned against the side of the bin
  - If yes, lift the scoop up and back to drop target object(s) into the bin
  - If no, drive away from bin and restart the process Object drop strategies may involve navigating with a rear camera if attempting a back drop, or with the front camera if attempting a forward drop.

According to some examples, the method includes executing the drop strategy at block 5626. For example, the tidying robot 100 such as that introduced with respect to FIG. 1A may execute the drop strategy. The drop strategy may follow strategy steps for isolation strategy, pickup strategy, and drop strategy 5700 illustrated in FIG. 57. The drop strategy may be a reinforcement learning based strategy or a rules based strategy. Once the drop strategy has been executed at block 5626, the method may proceed to determining the next target object(s) at block 5628. For example, the robotic control system 1000 illustrated in FIG. 10 may determine next target object(s). Once new target object(s) have been determined, the process may be repeated for the new target object(s).

Strategies such as the isolation strategy, pickup strategy, and drop strategy referenced above may be simple strategies, or may incorporate rewards and collision avoidance elements. These strategies may follow general approaches such as the strategy steps for isolation strategy, pickup strategy, and drop strategy 5700 illustrated in FIG. 57.

Figure 57:
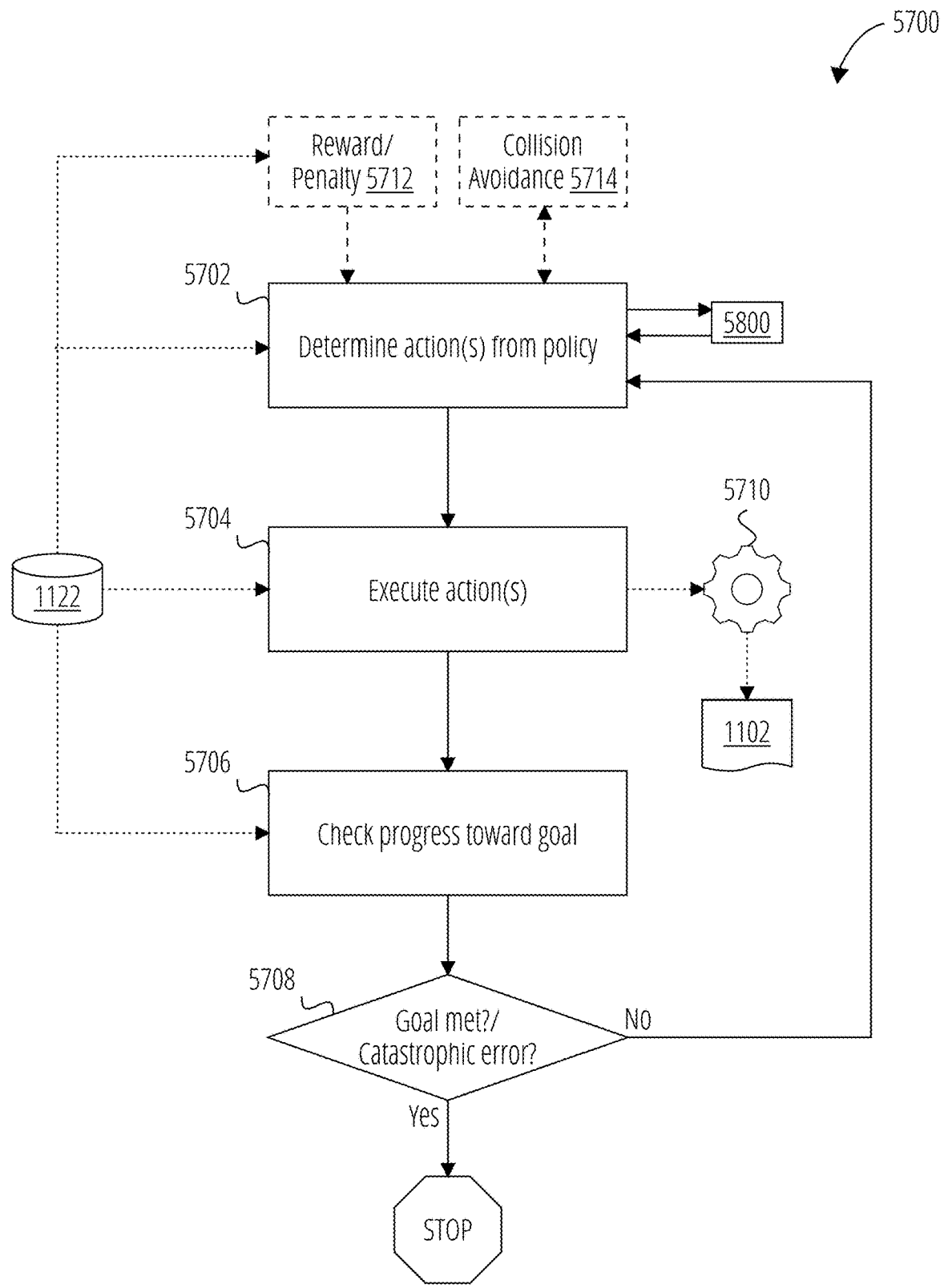
FIG. 57 illustrates strategy steps for isolation strategy, pickup strategy, and drop strategy 5700 in accordance with one embodiment.

In some embodiments, object isolation strategies may include:
- Using pusher pad arms and pusher pads on the floor in a V-shape to surround object(s) and backing up
- Precisely grasping the object(s) and backing up with pusher pad arms and pusher pads in a V-shape
- Loosely rolling a large object away with pusher pad arms and pusher pads elevated
- Spreading out dense clutter by loosely grabbing a pile and backing up
- Placing a single pusher pad arm/pusher pad on the floor between target object(s) and clutter, then turning
- Putting small toys in the scoop, then dropping them to separate them
- Using a single pusher pad arm/pusher pad to move object(s) away from a wall In some embodiments, pickup strategies may include:
- Closing the pusher pad arms/pusher pads on the floor to pick up a simple object
- Picking up piles of small objects like small plastic building blocks by closing pusher pad arms/pusher pads on the ground
- Picking up small, rollable objects like balls by batting them lightly on their tops with pusher pad arms/pusher pads, thus rolling them into the scoop
- Picking up deformable objects like clothing using pusher pad arms/pusher pads to repeatedly compress the object(s) into the scoop
- Grabbing an oversized, soft object like a large stuffed animal by grabbing and compressing it with the pusher pad arms/pusher pads
- Grabbing a large ball by rolling it and holding it against the scoop with raised pusher pad arms/pusher pads
- Picking up flat objects like puzzle pieces by passing the pusher pads over them sideways to cause instability
- Grasping books and other large flat objects
- Picking up clothes with pusher pad arms/pusher pads, lifting them above the scoop, and then dropping them into the scoop
- Rolling balls by starting a first pusher pad arm movement and immediately starting a second pusher pad arm movement In some embodiments, drop strategies may include:
Back dropping into a bin
Front dropping into a bin
Forward releasing onto the floor
Forward releasing against a wall
Stacking books or other flat objects
Directly dropping a large object using pusher pad arms/pusher pads instead of relying on the scoop FIG. 57 illustrates strategy steps for isolation strategy, pickup strategy, and drop strategy 5700 in accordance with one embodiment. According to some examples, the method includes determining action(s) from a policy at block 5702. For example, the robotic control system 1000 illustrated in FIG. 10 may determine action(s) from the policy. The next action(s) may be based on the policy along with observations, current robot state, current object state, and sensor data 1122. The determination may be made through the process for determining an action from a policy 5800 illustrated in FIG. 58.

In one embodiment, strategies may incorporate a reward or penalty 5712 in determining action(s) from a policy at block 5702. These rewards or penalties 5712 may primarily be used for training the reinforcement learning model and, in some embodiments, may not apply to ongoing operation of the robot. Training the reinforcement learning model may be performed using simulations or by recording the model input/output/rewards/penalties during robot operation. Recorded data may be used to train reinforcement learning models to choose actions that maximize rewards and minimize penalties. In some embodiments, rewards or penalties 5712 for object pickup using reinforcement learning may include:
Small penalty added every second
Reward when target object(s) first touches edge of scoop
Reward when target object(s) pushed fully into scoop
Penalty when target object(s) lost from scoop
Penalty for collision with obstacle or wall (exceeding force feedback maximum)
Penalty for picking up non-target object
Penalty if robot gets stuck or drives over object In some embodiments, rewards or penalties 5712 for object isolation (e.g., moving target object(s) away from a wall to the right) using reinforcement learning may include:
Small penalty added every second
Reward when right pusher pad arm is in-between target object(s) and wall
Reward when target object(s) distance from wall exceeds ten centimeters
Penalty for incorrectly colliding with target object(s)
Penalty for collision with obstacle or wall (exceeding force feedback maximum)
Penalty if robot gets stuck or drives over object In some embodiments, rewards or penalties 5712 for object dropping using reinforcement learning may include:
Small penalty added every second
Reward when robot correctly docks against bin
Reward when target object(s) is successfully dropped into bin
Penalty for collision that moves bin
Penalty for collision with obstacle or wall (exceeding force feedback maximum)
Penalty if robot gets stuck or drives over object In at least one embodiment, techniques described herein may use a reinforcement learning approach where the problem is modeled as a Markov decision process (MDP) represented as a tuple (S, O, A, P, r, γ), where S is the set of states in the environment, O is the set of observations, A is the set of actions, P: S×A×S→ℝ is the state transition probability function, r: S×A→ℝ is the reward function, and γ is a discount factor.

In at least one embodiment, the goal of training may be to learn a deterministic policy π: O→A such that taking action $a_t=\pi(o_t)$ at time t maximizes the sum of discounted future rewards from state $s_t$:

$$R_t = \sum_{i=t}^{\infty} \gamma^{i-t} r(s_i, a_i)$$

In at least one embodiment, after taking action at, the environment transitions from state $s_t$, to state $s_{t+1}$ by sampling from P. In at least one embodiment, the quality of taking action $a_t$ in state $s_t$ is measured by $Q(s_t, a_t)=\mathbb{E}[R_t|s_t, a_t]$, known as the Q-function.

In one embodiment, data from a movement collision avoidance system 5714 may be used in determining action(s) from a policy at block 5702. Each strategy may have an associated list of available actions which it may consider. A strategy may use the movement collision avoidance system to determine the range of motion for each action involved in executing the strategy. For example, the movement collision avoidance system may be used to see if the scoop may be lowered to the ground without hitting the pusher pad arms or pusher pads (if they are closed under the scoop), an obstacle such as a nearby wall, or an object (like a ball) that may have rolled under the scoop.

According to some examples, the method includes executing action(s) at block 5704. For example, the tidying robot 100 such as that introduced with respect to FIG. 1A may execute the action(s) determined from block 5702. The actions may be based on the observations, current robot state, current object state, and sensor data 1122. the actions may be performed through motion of the robot motors and other actuators 5710 of the tidying robot 100. The real world environment 1102 may be affected by the motion of the tidying robot 100. The changes in the environment 1102 may be detected as described with respect to FIG. 11.

According to some examples, the method includes checking progress toward a goal at block 5706. For example, the robotic control system 1000 illustrated in FIG. 10 may check the progress of the tidying robot 100 toward the goal. If this progress check determines that the goal of the strategy has been met, or that a catastrophic error has been encountered at decision block 5708, execution of the strategy will be stopped. If the goal has not been met and no catastrophic error has occurred, the strategy may return to block 5702.

Figure 58:
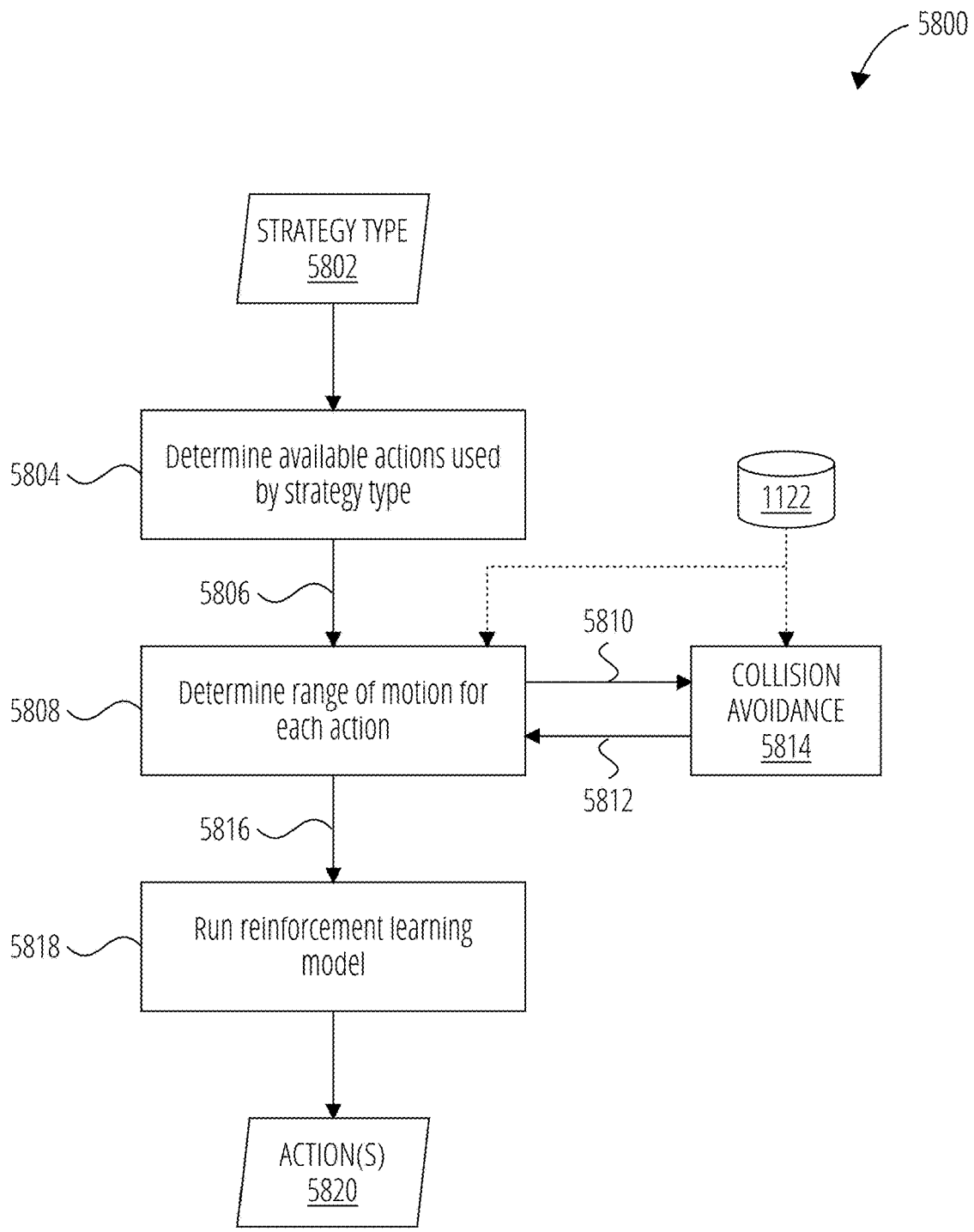
FIG. 58 illustrates process for determining an action from a policy 5800 in accordance with one embodiment.

FIG. 58 illustrates process for determining an action from a policy 5800 in accordance with one embodiment. The process for determining an action from a policy 5800 may take into account a strategy type 5802, and may, at block 5804 determined the available actions to be used based on the strategy type 5802. Reinforcement learning algorithms or rules based algorithms may take advantage of both simple actions and pre-defined composite actions. Examples of simple actions controlling individual actuators may include:
Moving the left pusher pad arm to a new position (rotating up or down)
Moving the left pusher pad wrist to a new position (rotating left or right)
Moving the right pusher pad arm to a new position (rotating up or down)
Moving the right pusher pad wrist to a new position (rotating left or right)

Lifting the scoop to a new position (rotating up or down)

Changing the scoop angle (with a second motor or actuator for front dropping)

Driving a left wheel

Driving a right wheel

Examples of pre-defined composite actions may include:

Driving the robot following a path to a position/waypoint

Turning the robot in place left or right

Centering the robot with respect to object(s)

Aligning pusher pad arms with objects' top/bottom/middle

Driving forward until an object is against the edge of the scoop

Closing both pusher pad arms, pushing object(s) with a smooth motion

Lifting the scoop and pusher pad arms together while grasping object(s)

Closing both pusher pad arms, pushing object(s) with a quick tap and slight release Setting the scoop lightly against the floor/carpet Pushing the scoop down against the floor/into the carpet Closing the pusher pad arms until resistance is encountered/pressure is applied and hold that position Closing the pusher pad arms with vibration and left/right turning to create instability and slight bouncing of flat objects over scoop edge At block 5808, the process for determining an action from a policy 5800 may take the list of available actions 5806 determined at block 5804, and may determine a range of motion 5812 for each action. The range of motion 5812 may be determined based on the observations, current robot state, current object state, and sensor data 1122 available to the robotic control system 1000. Action types 5810 may also be indicated to the movement collision avoidance system 5814, and the movement collision avoidance system 5814 may determine the range of motion 5812.

Block 5808 of process for determining an action from a policy 5800 may determine an observations list 5816 based on the ranges of motion 5812 determined. An example observations list 5816 may include:

Detected and categorized objects in the environment

Global or local environment map

State 1: Left arm position 20 degrees turned in

State 2: Right arm position 150 degrees turned in

State 3: Target object 15 centimeters from scoop edge

State 4: Target object 5 degrees right of center

Action 1 max range: Drive forward 1 centimeter max

Action 2 max range: Drive backward 10 centimeters max

Action 3 max range: Open left arm 70 degrees max

Action 4 max range: Open right arm 90 degrees max

Action 5 max range: Close left arm 45 degrees max

Action 6 max range: Close right arm 0 degrees max

Action 7 max range: Turn left 45 degrees max

Action 8 max range: Turn right 45 degrees max

At block 5818, a reinforcement learning model may be run based on the observations list 5816. The reinforcement learning model may return action(s) 5820 appropriate for the strategy the tidying robot 100 is attempting to complete based on the policy involved.

Figure 59:
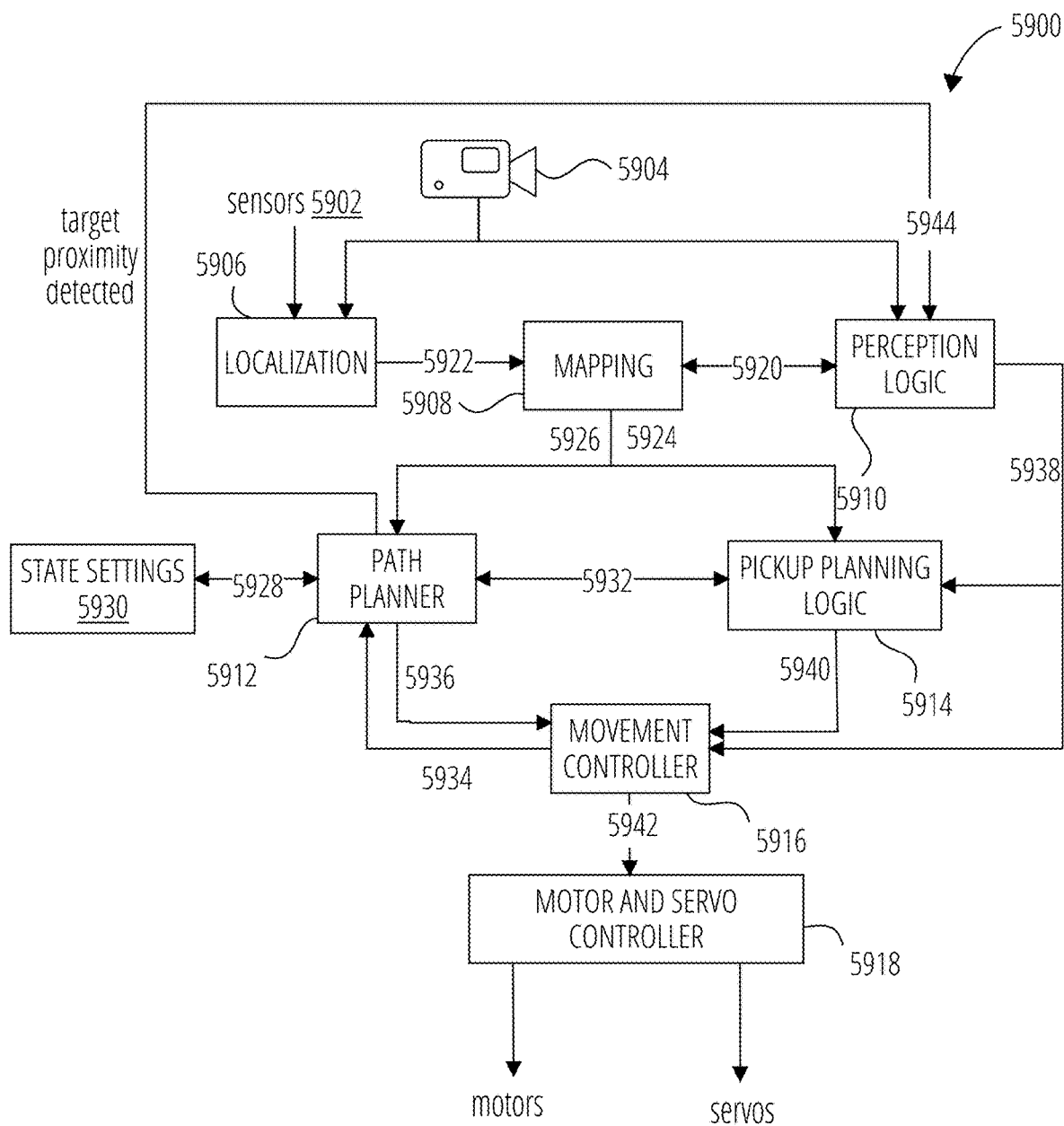
FIG. 59 depicts a robotics system 5900 in accordance with one embodiment.

FIG. 59 depicts a robotics system 5900 in one embodiment. The robotics system 5900 receives inputs from one or more sensors 5902 and one or more cameras 5904 and provides these inputs for processing by localization logic 5906, mapping logic 5908, and perception logic 5910. Outputs of the processing logic are provided to the robotics system 5900 path planner 5912, pick-up planner 5914, and motion controller 5916, which in turn drives the system's motor and servo controller 5918.

The cameras may be disposed in a front-facing stereo arrangement, and may include a rear-facing camera or cameras as well. Alternatively, a single front-facing camera may be utilized, or a single front-facing along with a single rear-facing camera. Other camera arrangements (e.g., one or more side or oblique-facing cameras) may also be utilized in some cases.

One or more of the localization logic 5906, mapping logic 5908, and perception logic 5910 may be located and/or executed on a mobile robot, or may be executed in a computing device that communicates wirelessly with the robot, such as a cell phone, laptop computer, tablet computer, or desktop computer. In some embodiments, one or more of the localization logic 5906, mapping logic 5908, and perception logic 5910 may be located and/or executed in the "cloud", i.e., on computer systems coupled to the robot via the Internet or other network.

The perception logic 5910 is engaged by an image segmentation activation 5944 signal, and utilizes any one or more of well-known image segmentation and objection recognition algorithms to detect objects in the field of view of the camera 5904. The perception logic 5910 may also provide calibration and objects 5920 signals for mapping purposes. The localization logic 5906 uses any one or more of well-known algorithms to localize the mobile robot in its environment. The localization logic 5906 outputs a local to global transform 5922 reference frame transformation and the mapping logic 5908 combines this with the calibration and objects 5920 signals to generate an environment map 5924 for the pick-up planner 5914, and object tracking 5926 signals for the path planner 5912.

In addition to the object tracking 5926 signals from the mapping logic 5908, the path planner 5912 also utilizes a current state 5928 of the system from the system state settings 5930, synchronization signals 5932 from the pick-up planner 5914, and movement feedback 5934 from the motion controller 5916. The path planner 5912 transforms these inputs into navigation waypoints 5936 that drive the motion controller 5916. The pick-up planner 5914 transforms local perception with image segmentation 5938 inputs from the perception logic 5910, the 5924 from the mapping logic 5908, and synchronization signals 5932 from the path planner 5912 into manipulation actions 5940 (e.g., of robotic graspers, scoops) to the motion controller 5916. Embodiments of algorithms utilized by the path planner 5912 and pick-up planner 5914 are described in more detail below.

In one embodiment simultaneous localization and mapping (SLAM) algorithms may be utilized to generate the global map and localize the robot on the map simultaneously. A number of SLAM algorithms are known in the art and commercially available.

The motion controller 5916 transforms the navigation waypoints 5936, manipulation actions 5940, and local perception with image segmentation 5938 signals to target movement 5942 signals to the motor and servo controller 5918.

Figure 60:
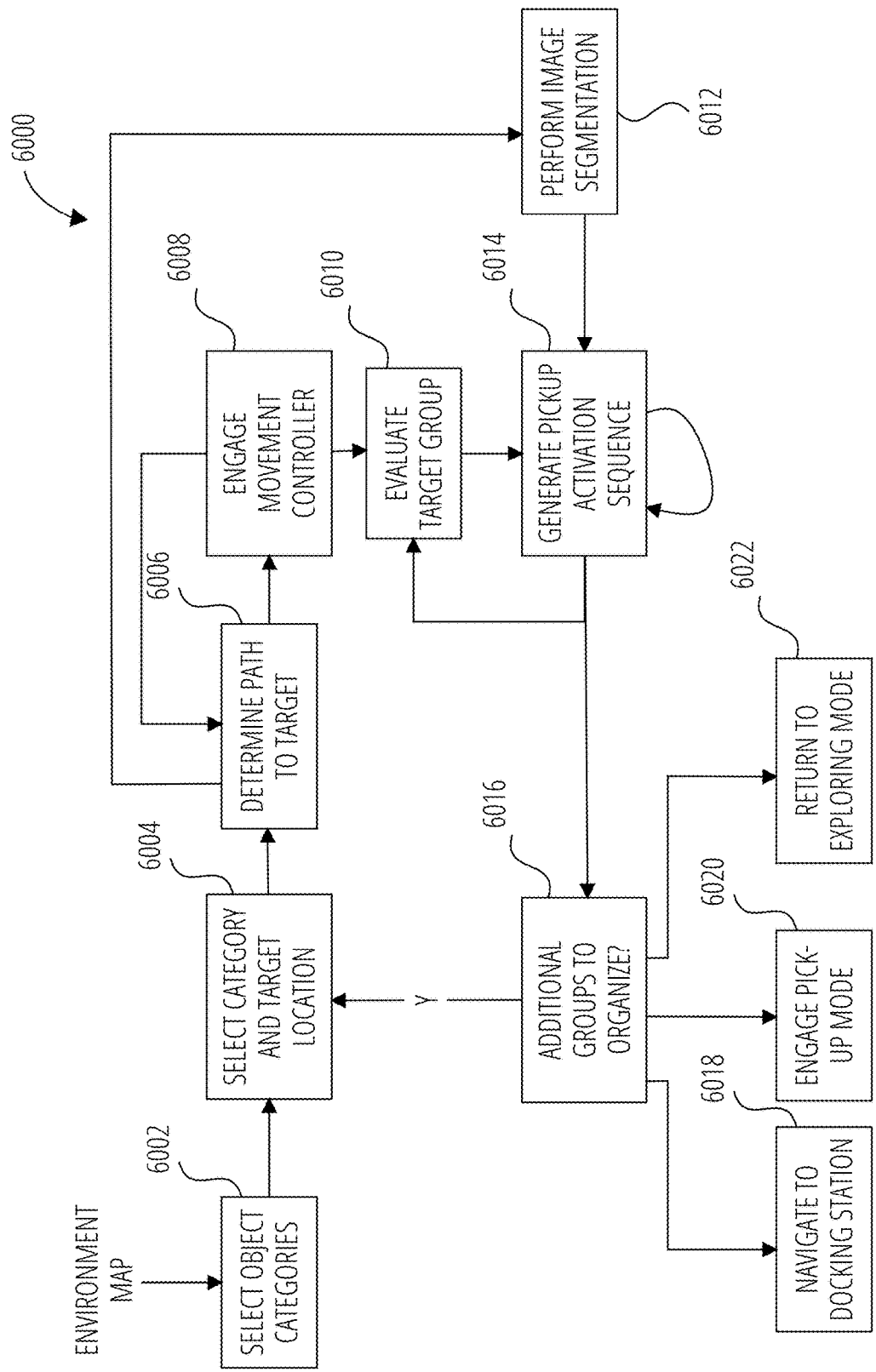
FIG. 60 depicts a robotic control algorithm 6000 for a robotic system in accordance with one embodiment.

FIG. 60 depicts a robotic control algorithm 6000 for a robotic system in one embodiment. The robotic control algorithm 6000 begins by selecting one or more category of objects to organize (block 6002). Within the selected category or categories, a grouping is identified that determines a target category and starting location for the path (block 6004). Any of a number of well-known clustering algorithms may be utilized to identify object groupings within the category or categories.

A path is formed to the starting goal location, the path comprising zero or more waypoints (block 6006). Movement feedback is provided back to the path planning algorithm. The waypoints may be selected to avoid static and/or dynamic (moving) obstacles (objects not in the target group and/or category). The robot's movement controller is engaged to follow the waypoints to the target group (block 6008). The target group is evaluated upon achieving the goal location, including additional qualifications to determine if it may be safely organized (block 6010).

The robot's perception system is engaged (block 6012) to provide image segmentation for determination of a sequence of activations generated for the robot's manipulators (e.g., arms) and positioning system (e.g., wheels) to organize the group (block 6014). The sequencing of activations is repeated until the target group is organized, or fails to organize (failure causing regression to block 6010). Engagement of the perception system may be triggered by proximity to the target group. Once the target group is organized, and on condition that there is sufficient battery life left for the robot and there are more groups in the category or categories to organize, these actions are repeated (block 6016).

In response to low battery life the robot navigates back to the docking station to charge (block 6018). However, if there is adequate battery life, and on condition that the category or categories are organized, the robot enters object pick-up mode (block 6020), and picks up one of the organized groups for return to the drop-off container. Entering pickup mode may also be conditioned on the environment map comprising at least one drop-off container for the target objects, and the existence of unobstructed objects in the target group for pick-up. On condition that no group of objects is ready for pick up, the robot continues to explore the environment (block 6022).

Figure 61:
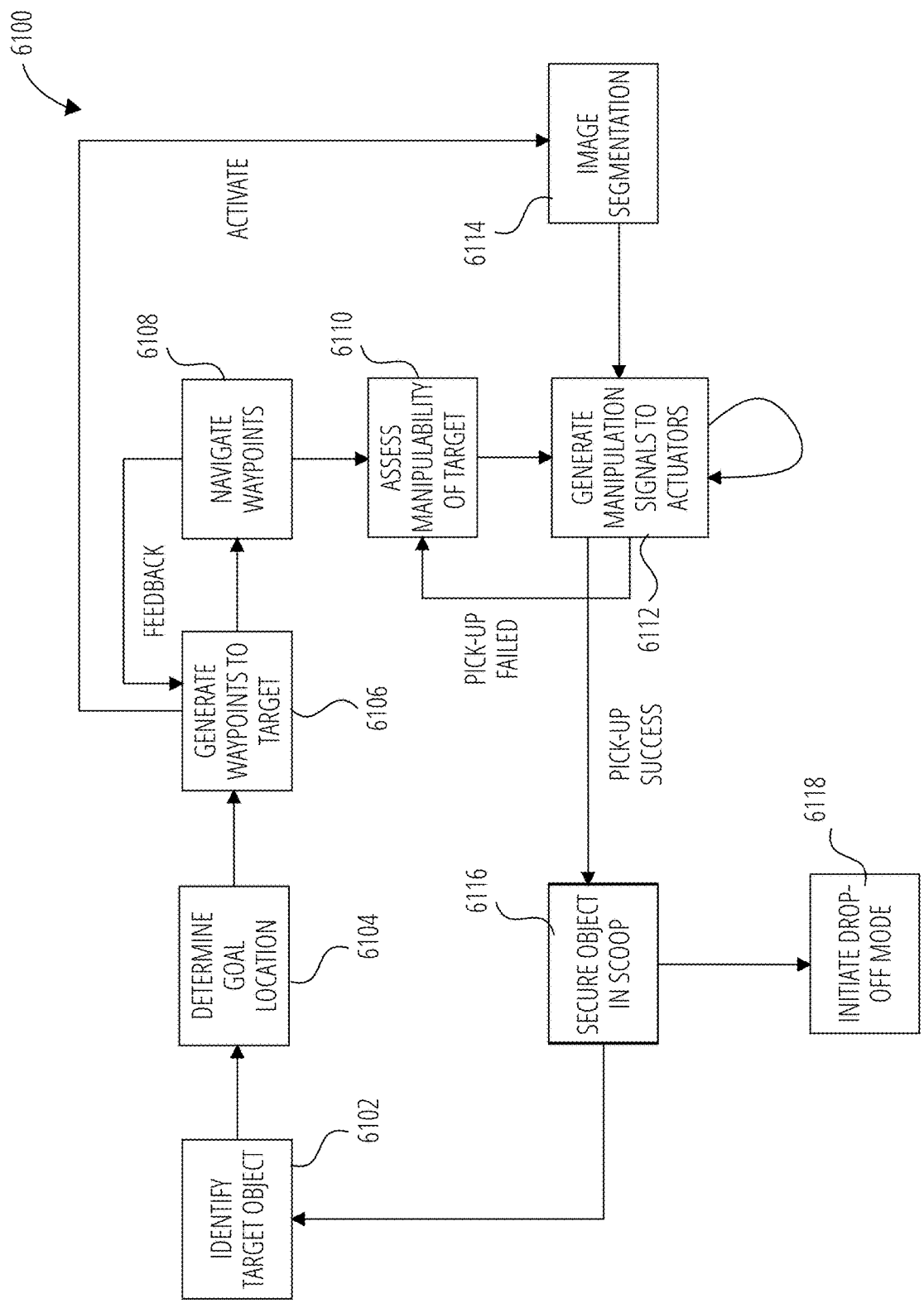
FIG. 61 depicts a robotic control algorithm 6100 for a robotic system in accordance with one embodiment.

FIG. 61 depicts a robotic control algorithm 6100 for a robotic system in one embodiment. A target object in the chosen object category is identified (block 6102) and a goal location for the robot is determined as an adjacent location of the target object (block 6104). A path to the target object is determined as a series of waypoints (block 6106) and the robot is navigated along the path while avoiding obstacles (block 6108).

Once the adjacent location is reached, as assessment of the target object is made to determine if may be safely manipulated (block 6110). On condition that the target object may be safely manipulated, the robot is operated to lift the object using the robot's manipulator arm, e.g., scoop (block 6112). The robot's perception module may by utilized at this time to analyze the target object and nearby objects to better control the manipulation (block 6114).

The target object, once on the scoop or other manipulator arm, is secured (block 6116). On condition that the robot does not have capacity for more objects, or it's the last object of the selected category(ies), object drop-off mode is initiated (block 6118). Otherwise the robot may begin the process again (6102).

The following figures set forth, without limitation, exemplary cloud-based systems that may be used to implement at least one embodiment.

In at least one embodiment, cloud computing is a style of computing in which dynamically scalable and often virtualized resources are provided as a service over the Internet. In at least one embodiment, users need not have knowledge of, expertise in, or control over technology infrastructure, which may be referred to as "in the cloud," that supports them. In at least one embodiment, cloud computing incorporates infrastructure as a service, platform as a service, software as a service, and other variations that have a common theme of reliance on the Internet for satisfying the computing needs of users. In at least one embodiment, a typical cloud deployment, such as in a private cloud (e.g., enterprise network), or a data center in a public cloud (e.g., Internet) may consist of thousands of servers (or alternatively, virtual machines (VMs)), hundreds of Ethernet, Fiber Channel or Fiber Channel over Ethernet (FCOE) ports, switching and storage infrastructure, etc. In at least one embodiment, cloud may also consist of network services infrastructure like IPsec virtual private network (VPN) hubs, firewalls, load balancers, wide area network (WAN) optimizers etc. In at least one embodiment, remote subscribers may access cloud applications and services securely by connecting via a VPN tunnel, such as an IPsec VPN tunnel.

In at least one embodiment, cloud computing is a model for enabling convenient, on-demand network access to a shared pool of configurable computing resources (e.g., networks, servers, storage, applications, and services) that may be rapidly provisioned and released with minimal management effort or service provider interaction.

In at least one embodiment, cloud computing is characterized by on-demand self-service, in which a consumer may unilaterally provision computing capabilities, such as server time and network storage, as needed automatically without needing human interaction with each service's provider. In at least one embodiment, cloud computing is characterized by broad network access, in which capabilities are available over a network and accessed through standard mechanisms that promote use by heterogeneous thin or thick client platforms (e.g., mobile phones, laptops, and personal digital assistants (PDAs)). In at least one embodiment, cloud computing is characterized by resource pooling, in which a provider's computing resources are pooled to serve multiple consumers using a multi-tenant model, with different physical and virtual resources dynamically assigned and reassigned according to consumer demand. In at least one embodiment, there is a sense of location independence in that a customer generally has no control or knowledge over an exact location of provided resources, but may be able to specify location at a higher level of abstraction (e.g., country, state, or datacenter). In at least one embodiment, examples of resources include storage, processing, memory, network bandwidth, and virtual machines. In at least one embodiment, cloud computing is characterized by rapid elasticity, in which capabilities may be rapidly and elastically provisioned, in some cases automatically, to quickly scale out and rapidly released to quickly scale in. In at least one embodiment, to a consumer, capabilities available for provisioning often appear to be unlimited and may be purchased in any quantity at any time. In at least one embodiment, cloud computing is characterized by measured service, in which cloud systems automatically control and optimize resource use by leveraging a metering capability at some level of abstraction appropriate to a type of service (e.g., storage, processing, bandwidth, and active user accounts). In at least one embodiment, resource usage may be monitored, controlled, and reported providing transparency for both a provider and consumer of a utilized service.

In at least one embodiment, cloud computing may be associated with various services. In at least one embodiment, cloud Software as a Service (SaaS) may refer to a service in which a capability provided to a consumer is to use a provider's applications running on a cloud infrastructure. In at least one embodiment, applications are accessible from various client devices through a thin client interface such as a web browser (e.g., web-based email). In at least one embodiment, the consumer does not manage or control underlying cloud infrastructure including network, servers, operating systems, storage, or even individual application capabilities, with a possible exception of limited user-specific application configuration settings.

In at least one embodiment, cloud Platform as a Service (PaaS) may refer to a service in which capability is provided to a consumer to deploy onto the cloud infrastructure consumer-created or acquired applications created using programming languages and tools supported by a provider. In at least one embodiment, a consumer does not manage or control underlying cloud infrastructure including networks, servers, operating systems, or storage, but has control over deployed applications and possibly application hosting environment configurations.

In at least one embodiment, cloud Infrastructure as a Service (IaaS) may refer to a service in which a capability provided to a consumer is to provision processing, storage, networks, and other fundamental computing resources where a consumer is able to deploy and run arbitrary software, which may include operating systems and applications. In at least one embodiment, a consumer does not manage or control underlying cloud infrastructure, but has control over operating systems, storage, deployed applications, and possibly limited control of select networking components (e.g., host firewalls).

In at least one embodiment, cloud computing may be deployed in various ways. In at least one embodiment, a private cloud may refer to a cloud infrastructure that is operated solely for an organization. In at least one embodiment, a private cloud may be managed by an organization or a third party and may exist on-premises or off-premises. In at least one embodiment, a community cloud may refer to a cloud infrastructure that is shared by several organizations and supports a specific community that has shared concerns (e.g., mission, security, policy, and compliance considerations). In at least one embodiment, a community cloud may be managed by organizations or a third party and may exist on-premises or off-premises. In at least one embodiment, a public cloud may refer to a cloud infrastructure that is made available to the general public or a large industry group and is owned by an organization providing cloud services. In at least one embodiment, a hybrid cloud may refer to a cloud infrastructure that is a composition of two or more clouds (private, community, or public) that remain unique entities but are bound together by standardized or proprietary technology that supports data and application portability (e.g., cloud bursting for load-balancing between clouds). In at least one embodiment, a cloud computing environment is service-oriented with a focus on statelessness, low coupling, modularity, and semantic interoperability.

Figure 62:
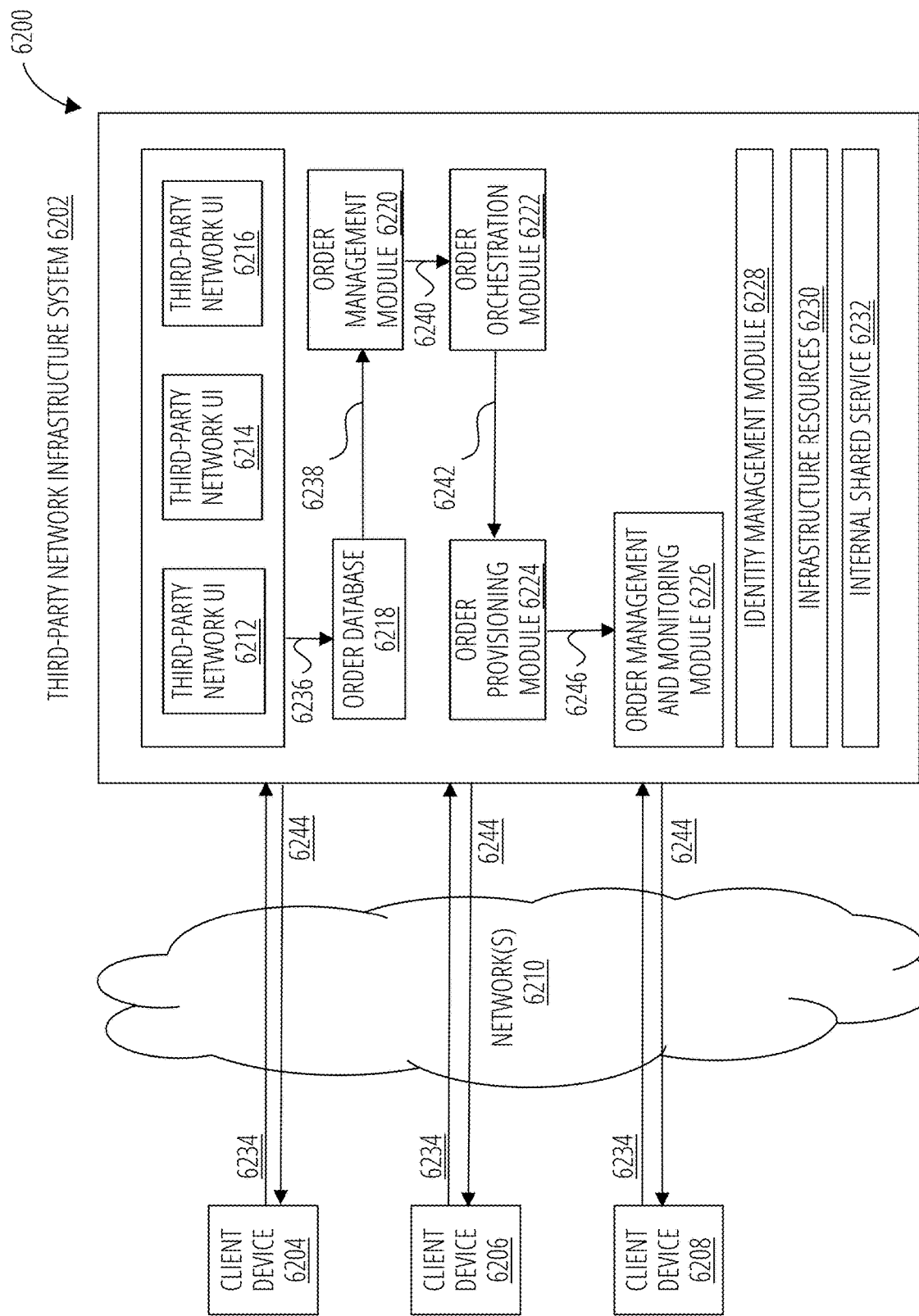
FIG. 62 illustrates a system environment 6200 in accordance with one embodiment.

FIG. 62 illustrates one or more components of a system environment 6200 in which services may be offered as third-party network services, in accordance with at least one embodiment. In at least one embodiment, a third-party network may be referred to as a cloud, cloud network, cloud computing network, and/or variations thereof. In at least one embodiment, system environment 6200 includes one or more client computing devices 6204, 6206, and 6208 that may be used by users to interact with a third-party network infrastructure system 6202 that provides third-party network services, which may be referred to as cloud computing services. In at least one embodiment, third-party network infrastructure system 6202 may comprise one or more computers and/or servers.

It may be appreciated that third-party network infrastructure system 6202 depicted in FIG. 62 may have other components than those depicted. Further, FIG. 62 depicts an embodiment of a third-party network infrastructure system. In at least one embodiment, third-party network infrastructure system 6202 may have more or fewer components than depicted in FIG. 62, may combine two or more components, or may have a different configuration or arrangement of components.

In at least one embodiment, client computing devices 6204, 6206, and 6208 may be configured to operate a client application such as a web browser, a proprietary client application, or some other application, which may be used by a user of a client computing device to interact with third-party network infrastructure system 6202 to use services provided by third-party network infrastructure system 6202. Although exemplary system environment 6200 is shown with three client computing devices, any number of client computing devices may be supported. In at least one embodiment, other devices such as devices with sensors, etc. may interact with third-party network infrastructure system 6202. In at least one embodiment, network 6210 may facilitate communications and exchange of data between client computing devices 6204, 6206, and 6208 and third-party network infrastructure system 6202.

In at least one embodiment, services provided by third-party network infrastructure system 6202 may include a host of services that are made available to users of a third-party network infrastructure system on demand. In at least one embodiment, various services may also be offered including, without limitation, online data storage and backup solutions, Web-based e-mail services, hosted office suites and document collaboration services, database management and processing, managed technical support services, and/or variations thereof. In at least one embodiment, services provided by a third-party network infrastructure system may dynamically scale to meet the needs of its users.

In at least one embodiment, a specific instantiation of a service provided by third-party network infrastructure system 6202 may be referred to as a "service instance." In at least one embodiment, in general, any service made available to a user via a communication network, such as the Internet, from a third-party network service provider's system is referred to as a "third-party network service." In at least one embodiment, in a public third-party network environment, servers and systems that make up a third-party network service provider's system are different from a customer's own on-premises servers and systems. In at least one embodiment, a third-party network service provider's system may host an application, and a user may, via a communication network such as the Internet, on demand, order and use an application.

In at least one embodiment, a service in a computer network third-party network infrastructure may include protected computer network access to storage, a hosted database, a hosted web server, a software application, or other service provided by a third-party network vendor to a user. In at least one embodiment, a service may include password-protected access to remote storage on a third-party network through the Internet. In at least one embodiment, a service may include a web service-based hosted relational database and a script-language middleware engine for private use by a networked developer. In at least one embodiment, a service may include access to an email software application hosted on a third-party network vendor's website.

In at least one embodiment, third-party network infrastructure system 6202 may include a suite of applications, middleware, and database service offerings that are delivered to a customer in a self-service, subscription-based, elastically scalable, reliable, highly available, and secure manner. In at least one embodiment, third-party network infrastructure system 6202 may also provide "big data" related computation and analysis services. In at least one embodiment, the term "big data" is generally used to refer to extremely large data sets that may be stored and manipulated by analysts and researchers to visualize large amounts of data, detect trends, and/or otherwise interact with data. In at least one embodiment, big data and related applications may be hosted and/or manipulated by an infrastructure system on many levels and at different scales. In at least one embodiment, tens, hundreds, or thousands of processors linked in parallel may act upon such data in order to present it or simulate external forces on data or what it represents. In at least one embodiment, these data sets may involve structured data, such as that organized in a database or otherwise according to a structured model, and/or unstructured data (e.g., emails, images, data blobs (binary large objects), web pages, complex event processing). In at least one embodiment, by leveraging the ability of an embodiment to relatively quickly focus more (or fewer) computing resources upon an objective, a third-party network infrastructure system may be better available to carry out tasks on large data sets based on demand from a business, government agency, research organization, private individual, group of like-minded individuals or organizations, or other entity.

In at least one embodiment, third-party network infrastructure system 6202 may be adapted to automatically provision, manage and track a customer's subscription to services offered by third-party network infrastructure system 6202. In at least one embodiment, third-party network infrastructure system 6202 may provide third-party network services via different deployment models. In at least one embodiment, services may be provided under a public third-party network model in which third-party network infrastructure system 6202 is owned by an organization selling third-party network services, and services are made available to the general public or different industry enterprises. In at least one embodiment, services may be provided under a private third-party network model in which third-party network infrastructure system 6202 is operated solely for a single organization and may provide services for one or more entities within an organization. In at least one embodiment, third-party network services may also be provided under a community third-party network model in which third-party network infrastructure system 6202 and services provided by third-party network infrastructure system 6202 are shared by several organizations in a related community. In at least one embodiment, third-party network services may also be provided under a hybrid third-party network model, which is a combination of two or more different models.

In at least one embodiment, services provided by third-party network infrastructure system 6202 may include one or more services provided under Software as a Service (SaaS) category, Platform as a Service (PaaS) category, Infrastructure as a Service (IaaS) category, or other categories of services including hybrid services. In at least one embodiment, a customer, via a subscription order, may order one or more services provided by third-party network infrastructure system 6202. In at least one embodiment, third-party network infrastructure system 6202 then performs processing to provide services in a customer's subscription order.

In at least one embodiment, services provided by third-party network infrastructure system 6202 may include, without limitation, application services, platform services, and infrastructure services. In at least one embodiment, application services may be provided by a third-party network infrastructure system via a SaaS platform. In at least one embodiment, the SaaS platform may be configured to provide third-party network services that fall under the SaaS category. In at least one embodiment, the SaaS platform may provide capabilities to build and deliver a suite of on-demand applications on an integrated development and deployment platform. In at least one embodiment, the SaaS platform may manage and control underlying software and infrastructure for providing SaaS services. In at least one embodiment, by utilizing services provided by a SaaS platform, customers may utilize applications executing on a third-party network infrastructure system. In at least one embodiment, customers may acquire application services without a need for customers to purchase separate licenses and support. In at least one embodiment, various different SaaS services may be provided. In at least one embodiment, examples include, without limitation, services that provide solutions for sales performance management, enterprise integration, and business flexibility for large organizations.

In at least one embodiment, platform services may be provided by third-party network infrastructure system 6202 via a PaaS platform. In at least one embodiment, the PaaS platform may be configured to provide third-party network services that fall under the PaaS category. In at least one embodiment, examples of platform services may include without limitation services that allow organizations to consolidate existing applications on a shared, common architecture, as well as an ability to build new applications that leverage shared services provided by a platform. In at least one embodiment, the PaaS platform may manage and control underlying software and infrastructure for providing PaaS services. In at least one embodiment, customers may acquire PaaS services provided by third-party network infrastructure system 6202 without a need for customers to purchase separate licenses and support.

In at least one embodiment, by utilizing services provided by a PaaS platform, customers may employ programming languages and tools supported by a third-party network infrastructure system and also control deployed services. In at least one embodiment, platform services provided by a third-party network infrastructure system may include database third-party network services, middleware third-party network services, and third-party network services. In at least one embodiment, database third-party network services may support shared service deployment models that allow organizations to pool database resources and offer customers a Database as a Service in the form of a database third-party network. In at least one embodiment, middleware third-party network services may provide a platform for customers to develop and deploy various business applications, and third-party network services may provide a platform for customers to deploy applications, in a third-party network infrastructure system.

In at least one embodiment, various different infrastructure services may be provided by an IaaS platform in a third-party network infrastructure system. In at least one embodiment, infrastructure services facilitate management and control of underlying computing resources, such as storage, networks, and other fundamental computing resources for customers utilizing services provided by a SaaS platform and a PaaS platform.

In at least one embodiment, third-party network infrastructure system 6202 may also include infrastructure resources 6230 for providing resources used to provide various services to customers of a third-party network infrastructure system. In at least one embodiment, infrastructure resources 6230 may include pre-integrated and optimized combinations of hardware, such as servers, storage, and networking resources to execute services provided by a PaaS platform and a SaaS platform, and other resources.

In at least one embodiment, resources in third-party network infrastructure system 6202 may be shared by multiple users and dynamically re-allocated per demand. In at least one embodiment, resources may be allocated to users in different time zones. In at least one embodiment, third-party network infrastructure system 6202 may allow a first set of users in a first time zone to utilize resources of a third-party network infrastructure system for a specified number of hours and then allow a re-allocation of the same resources to another set of users located in a different time zone, thereby maximizing utilization of resources.

In at least one embodiment, a number of internal shared services 6232 may be provided that are shared by different components or modules of third-party network infrastructure system 6202 to support the provision of services by third-party network infrastructure system 6202. In at least one embodiment, these internal shared services may include, without limitation, a security and identity service, an integration service, an enterprise repository service, an enterprise manager service, a virus scanning and white list service, a high availability, backup and recovery service, service for enabling third party network support, an email service, a notification service, a file transfer service, and/or variations thereof.

In at least one embodiment, third-party network infrastructure system 6202 may provide comprehensive management of third-party network services (e.g., SaaS, PaaS, and IaaS services) in a third-party network infrastructure system. In at least one embodiment, third-party network management functionality may include capabilities for provisioning, managing, and tracking a customer's subscription received by third-party network infrastructure system 6202, and/or variations thereof.

In at least one embodiment, as depicted in FIG. 62, third-party network management functionality may be provided by one or more modules, such as an order management module 6220, an order orchestration module 6222, an order provisioning module 6224, an order management and monitoring module 6226, and an identity management module 6228. In at least one embodiment, these modules may include or be provided using one or more computers and/or servers, which may be general-purpose computers, specialized server computers, server farms, server clusters, or any other appropriate arrangement and/or combination.

In at least one embodiment, at a service request step 6234, a customer using a client device, such as client computing devices 6204, 6206, or 6208, may interact with third-party network infrastructure system 6202 by requesting one or more services provided by third-party network infrastructure system 6202 and placing an order for a subscription for one or more services offered by third-party network infrastructure system 6202. In at least one embodiment, a customer may access a third-party network User Interface (UI) such as third-party network UI 6212, third-party network UI 6214, and/or third-party network UI 6216 and place a subscription order via these UIs. In at least one embodiment, order information received by third-party network infrastructure system 6202 in response to a customer placing an order may include information identifying a customer and one or more services offered by a third-party network infrastructure system 6202 that a customer intends to subscribe to.

In at least one embodiment, at a storing information step 6236, order information received from a customer may be stored in an order database 6218. In at least one embodiment, if this is a new order, a new record may be created for an order. In at least one embodiment, order database 6218 may be one of several databases operated by third-party network infrastructure system 6202 and operated in conjunction with other system elements.

In at least one embodiment, at a forwarding information step 6238, order information may be forwarded to an order management module 6220 that may be configured to perform billing and accounting functions related to an order, such as verifying an order, and upon verification, booking an order.

In at least one embodiment, at a communicating information step 6240, information regarding an order may be communicated to an order orchestration module 6222 that is configured to orchestrate the provisioning of services and resources for an order placed by a customer. In at least one embodiment, order orchestration module 6222 may use services of order provisioning module 6224 for provisioning. In at least one embodiment, order orchestration module 6222 supports the management of business processes associated with each order and applies business logic to determine whether an order may proceed to provisioning.

In at least one embodiment, at a receiving a new order step 6242, upon receiving an order for a new subscription, order orchestration module 6222 sends a request to order provisioning module 6224 to allocate resources and configure resources needed to fulfill a subscription order. In at least one embodiment, an order provisioning module 6224 supports an allocation of resources for services ordered by a customer. In at least one embodiment, an order provisioning module 6224 provides a level of abstraction between third-party network services provided by third-party network infrastructure system 6202 and a physical implementation layer that is used to provision resources for providing requested services. In at least one embodiment, this allows order orchestration module 6222 to be isolated from implementation details, such as whether or not services and resources are actually provisioned in real-time or pre-provisioned and allocated/assigned upon request.

In at least one embodiment, at a service provided step 6244, once services and resources are provisioned, a notification may be sent to subscribing customers indicating that a requested service is now ready for use. In at least one embodiment, information (e.g., a link) may be sent to a customer that allows a customer to start using the requested services.

In at least one embodiment, at a notification step 6246, a customer's subscription order may be managed and tracked by an order management and monitoring module 6226. In at least one embodiment, order management and monitoring module 6226 may be configured to collect usage statistics regarding a customer's use of subscribed services. In at least one embodiment, statistics may be collected for the amount of storage used, the amount of data transferred, the number of users, the amount of system up time and system down time, and/or variations thereof.

In at least one embodiment, third-party network infrastructure system 6202 may include an identity management module 6228 that is configured to provide identity services, such as access management and authorization services in third-party network infrastructure system 6202. In at least one embodiment, identity management module 6228 may control information about customers who wish to utilize services provided by third-party network infrastructure system 6202. In at least one embodiment, such information may include information that authenticates the identities of such customers and information that describes which actions those customers are authorized to perform relative to various system resources (e.g., files, directories, applications, communication ports, memory segments, etc.). In at least one embodiment, identity management module 6228 may also include management of descriptive information about each customer and about how and by whom that descriptive information may be accessed and modified.

Figure 63:
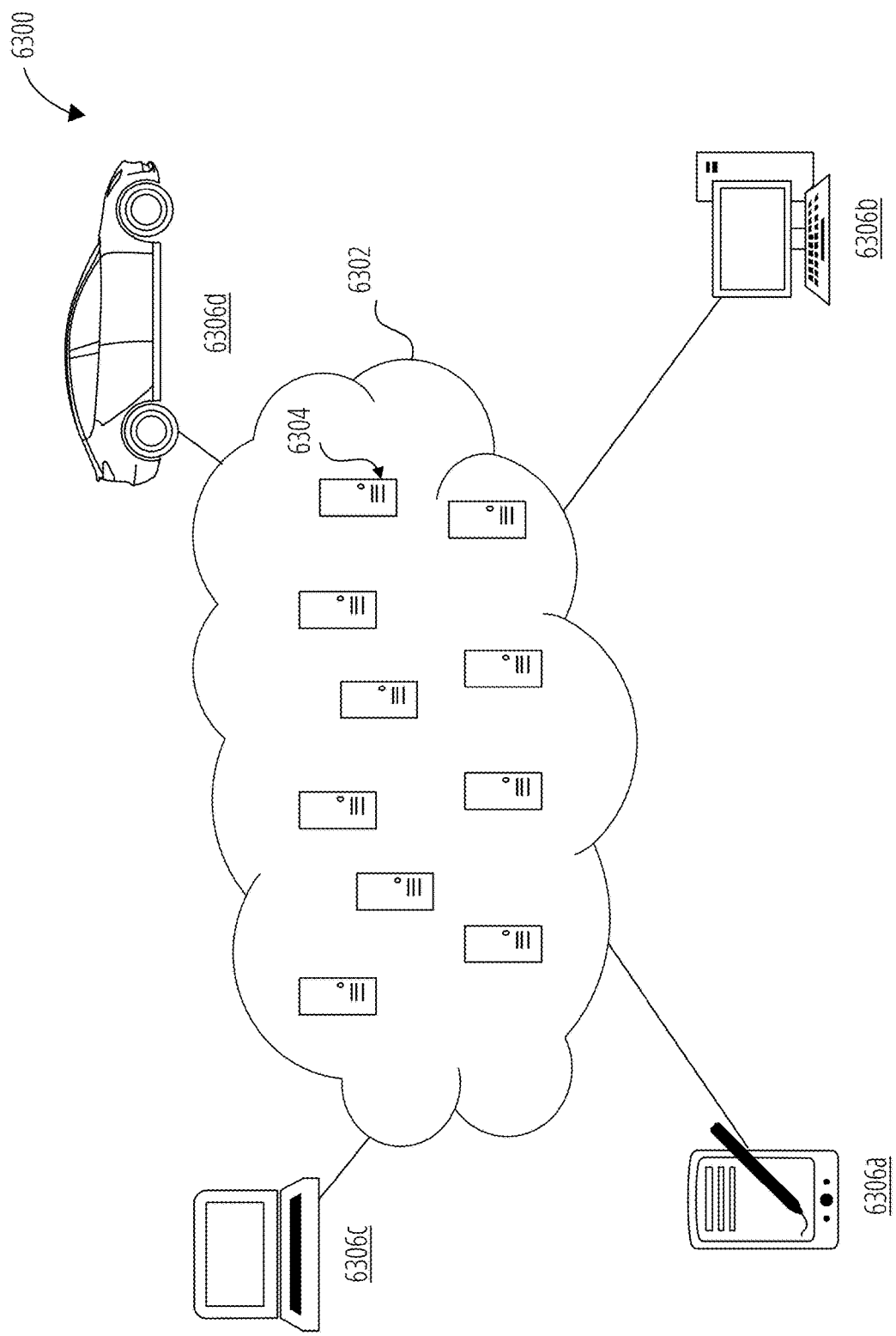
FIG. 63 illustrates a computing environment 6300 in accordance with one embodiment.

FIG. 63 illustrates a computing environment 6300 including cloud computing environment 6302, in accordance with at least one embodiment. In at least one embodiment, cloud computing environment 6302 comprises one or more cloud servers 6304 with which computing devices such as, personal digital assistant (PDA) or computing device 6306a, computing device 6306b, computing device 6306c, and/or computing device 6306d communicate. In at least one embodiment, this allows for infrastructure, platforms, and/or software to be offered as services from cloud computing environment 6302, so as to not require each client to separately maintain such resources. It is understood that the types of computing devices 6306a-6306d shown in FIG. 63 (a mobile or handheld device, a desktop computer, a laptop computer, and an automobile computer system) are intended to be illustrative, and that cloud computing environment 6302 may communicate with any type of computerized device over any type of network and/or network/addressable connection (e.g., using a web browser).

In at least one embodiment, a cloud server 6304, which may be denoted as a cloud computing node, is operational with numerous other general purpose or special purpose computing system environments or configurations. In at least one embodiment, examples of computing systems, environments, and/or configurations that may be suitable for use with cloud server 6304 include, but are not limited to, personal computer systems, server computer systems, thin clients, thick clients, hand-held or laptop devices, multiprocessor systems, microprocessor-based systems, set-top boxes, programmable consumer electronics, network personal computers (PCs), minicomputer systems, mainframe computer systems, and distributed cloud computing environments that include any of the above systems or devices, and/or variations thereof.

In at least one embodiment, cloud server 6304 may be described in a general context of computer system-executable instructions, such as program modules, being executed by a computer system. In at least one embodiment, program modules include routines, programs, objects, components, logic, data structures, and so on, that perform particular tasks or implement particular abstract data types. In at least one embodiment, an exemplary cloud server 6304 may be practiced in distributed cloud computing environments where tasks are performed by remote processing devices that are linked through a communications network. In at least one embodiment, in a distributed cloud computing environment, program modules may be located in both local and remote computer system storage media including memory storage devices.

Figure 64:
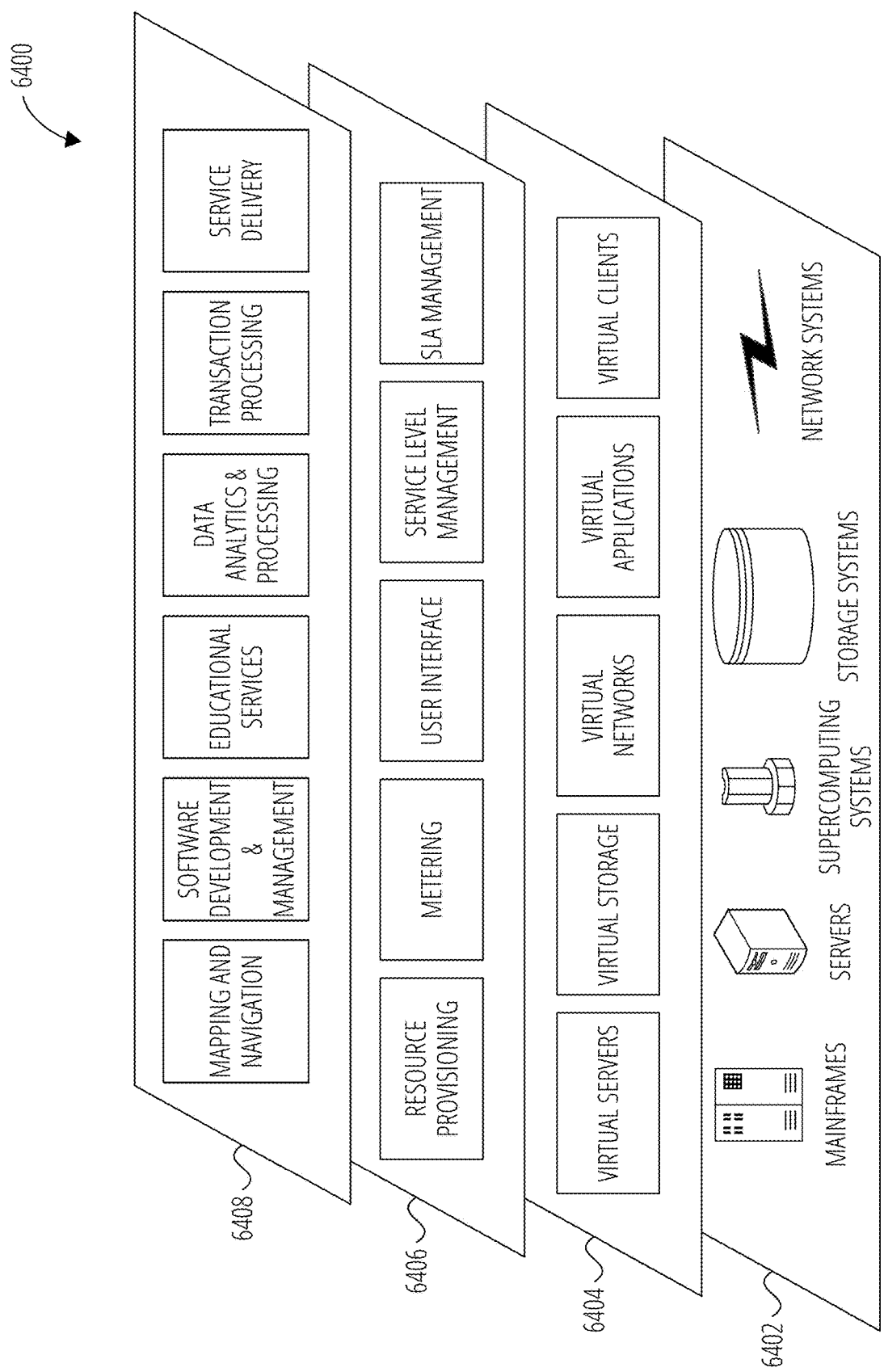
FIG. 64 illustrates a set of functional abstraction layers 6400 in accordance with one embodiment.

FIG. 64 illustrates a set of functional abstraction layers 6400 provided by cloud computing environment 6302 (FIG. 63), in accordance with at least one embodiment. It may be understood in advance that the components, layers, and functions shown in FIG. 64 are intended to be illustrative, and components, layers, and functions may vary.

In at least one embodiment, hardware and software layer 6402 includes hardware and software components. In at least one embodiment, examples of hardware components include mainframes, various RISC (Reduced Instruction Set Computer) architecture-based servers, various computing systems, supercomputing systems, storage devices, networks, networking components, and/or variations thereof. In at least one embodiment, examples of software components include network application server software, various application server software, various database software, and/or variations thereof.

In at least one embodiment, virtualization layer 6404 provides an abstraction layer from which the following exemplary virtual entities may be provided: virtual servers, virtual storage, virtual networks, including virtual private networks, virtual applications, virtual clients, and/or variations thereof.

In at least one embodiment, management layer 6406 provides various functions. In at least one embodiment, resource provisioning provides dynamic procurement of computing resources and other resources that are utilized to perform tasks within a cloud computing environment. In at least one embodiment, metering provides usage tracking as resources are utilized within a cloud computing environment, and billing or invoicing for consumption of these resources. In at least one embodiment, resources may comprise application software licenses. In at least one embodiment, security provides identity verification for users and tasks, as well as protection for data and other resources. In at least one embodiment, a user interface provides access to a cloud computing environment for both users and system administrators. In at least one embodiment, service level management provides cloud computing resource allocation and management such that the needed service levels are met. In at least one embodiment, Service Level Agreement (SLA) management provides pre-arrangement for, and procurement of, cloud computing resources for which a future need is anticipated in accordance with an SLA.

In at least one embodiment, workloads layer 6408 provides functionality for which a cloud computing environment is utilized. In at least one embodiment, examples of workloads and functions which may be provided from this layer include mapping and navigation, software development and management, educational services, data analytics and processing, transaction processing, and service delivery.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation-[entity] configured to [perform one or more tasks]—is used herein to refer to structure (i.e., something physical, such as an electronic circuit). More specifically, this formulation is used to indicate that this structure is arranged to perform the one or more tasks during operation. A structure may be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed field programmable gate array (FPGA), for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112 (f) for that claim element. Accordingly, claims in this application that do not otherwise include the "means for" [performing a function] construct should not be interpreted under 35 U.S.C § 112 (f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" may be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the disclosure as claimed. The scope of inventive subject matter is not limited to the depicted embodiments but is rather set forth in the following Claims.

What is claimed is:

1. A tidying robotic system comprising:
    a robot including:
        a chassis;
        a robot vacuum system including a vacuum generating assembly and a dirt collector;
        a capture and containment system including:
            a scoop;
            a scoop motor configured to rotate the scoop into different positions at a scoop pivot point;
            a scoop arm;
            a scoop arm motor configured to rotate the scoop arm into different positions around a scoop arm pivot point;
            a scoop arm linear actuator configured to extend the scoop arm;
            pusher pads including a first pusher pad and a second pusher pad;
            a first pusher pad motor configured to rotate the first pusher pad around a first pad pivot point;
            a second pusher pad motor configured to rotate the second pusher pad around a second pad pivot point;
            pusher pad arms including a first pusher pad arm and a second pusher pad arm;
            a first pusher pad arm motor and a second pusher pad arm motor configured to rotate the respective first pusher pad arm and second pusher pad arm around pad arm pivot points;

a first pusher pad arm linear actuator and a second pusher pad arm linear actuator configured to extend and retract the respective first pusher pad arm and second pusher pad arm;
a gripper arm;
a gripper arm motor configured to move the gripper arm around a gripper pivot point; and
a gripper arm linear actuator configured to extend and retract the gripper arm;
a lifting column configured to raise and lower the capture and containment system through extension and retraction of a lifting column linear actuator;
a robot charge connector;
at least one of at least one wheel and at least one track for mobility of the robot;
a battery;
a processor; and
a memory storing instructions that, when executed by the processor, allow operation and control of the robot;
a base station with a base station charge connector configured to couple with the robot charge connector;
a robotic control system in at least one of the robot and a cloud server; and logic, to:
receive a starting location, a target cleaning area, attributes of the target cleaning area, and obstructions in a path of the robot navigating in the target cleaning area;
determine a tidying strategy including a vacuuming strategy and an obstruction handling strategy;
execute the tidying strategy to at least one of vacuum the target cleaning area, move an obstruction, and avoid the obstruction, wherein the obstruction includes at least one of a tidyable object and movable object;
on condition the obstruction is able to be picked up:
determine a pickup strategy and execute the pickup strategy;
capture the obstruction with the pusher pads; and
place the obstruction in the scoop;
on condition the obstruction is able to be relocated but is not able to be picked up:
push the obstruction to a different location using at least one of the pusher pads, the scoop, and the chassis; and
on condition the obstruction is not able to be relocated and is not able to be picked up:
avoid the obstruction by altering the path of the robot around the obstruction; and
determine if the dirt collector is full;
on condition the dirt collector is full:
navigate to the base station; and
on condition the dirt collector is not full:
continue executing the tidying strategy.

2. The tidying robotic system of claim 1, wherein the logic for the pickup strategy includes:
an approach path for the robot to the obstruction;
a grabbing height for initial contact with the obstruction;
a grabbing pattern for movement of the pusher pads while capturing the obstruction;
a carrying position of the pusher pads and the scoop that secures the obstruction in a containment area on the robot for transport, the containment area including at least two of the pusher pad arms, the pusher pads, and the scoop; and configuring the robot to:
execute the pickup strategy, including:
raise the capture and containment system, using the lifting column linear actuator, to the grabbing height of the obstruction;
extend the pusher pads out and forward with respect to the pusher pad arms;
rotate the first pusher pad inward toward a front edge of the scoop;
approach the obstruction via the approach path, coming to a stop when the obstruction is positioned between the pusher pads and contacts the inward rotated first pusher pad;
execute the grabbing pattern to allow capture of the obstruction within the containment area, the grabbing pattern including:
rotate the second pusher pad until the second pusher pad contacts the obstruction;
retract the pusher pad arms to move the obstruction into the containment area; and
confirm the obstruction is within the containment area;
on condition that the obstruction is within the containment area:
exert pressure on the obstruction with the pusher pads to hold the obstruction stationary in the containment area; and
raise at least one of the scoop, the pusher pads and the lifting column linear actuator, holding the obstruction, to the carrying position;
on condition that the obstruction is not within the containment area:
alter the pickup strategy with at least one of a different reinforcement learning based strategy, a different rules based strategy, and relying upon different observations, current robot state, current object state, and sensor data; and
execute the altered pickup strategy.

3. The tidying robotic system of claim 2, wherein the logic for the pickup strategy further includes:
an approach path to a destination for the obstruction, wherein the destination includes a handle on an access panel for accessing an interior of the destination including a storage platform;
an obstruction placement procedure, including:
at least one of raise and lower the capture and containment system so that the gripper arm is within reach of the handle on the access panel;
rotate and extend the gripper arm toward the handle;
grab the handle with the gripper arm;
retract the gripper arm and rotate the gripper arm to open the access panel;
retract the lifting column linear actuator to lower the lifting column while backing up the robot from the access panel to fully open the access panel;
actuate the gripper arm to grip the storage platform;
partially pull out the storage platform from the destination using at least one of:
forward and backward motion of the robot;
extension, retraction, and rotation of the gripper arm; and
raising and lowering of the lifting column;
place the obstruction on the storage platform, including:
on condition the obstruction needs to be inverted:
extend the scoop arm linear actuator such that the scoop is over the storage platform;

rotate the scoop motor until the scoop inverts so that the obstruction is in a partially inverted position above and in close proximity to the storage platform;
rotate, away from the scoop, the first pusher pad using the first pusher pad arm motor and extend the first pusher pad arm using the first pusher pad arm linear actuator until the obstruction rests on the storage platform in an inverted position; and
release the first pusher pad and the second pusher pad from the obstruction;
on condition the obstruction does not need to be inverted:
extend the scoop arm linear actuator such that the scoop is over the storage platform;
lower the lifting column until the scoop is at least one of on and above and in close proximity to the storage platform;
extend the first pusher pad arm and the second pusher pad arm until the obstruction is off of the scoop and rests on the storage platform; and
release the first pusher pad and the second pusher pad from the obstruction.

4. The tidying robotic system of claim 3, wherein the logic for the pickup strategy further includes:
actuate the gripper arm to grip the storage platform;
push the storage platform into the destination using at least one of:
forward and backward motion of the robot;
extension, retraction, and rotation of the gripper arm; and
raising and lowering of the lifting column;
grip the handle of the access panel with the gripper arm; and
close the access panel.

5. The tidying robotic system of claim 3, wherein the destination is a dishwasher and the storage platform is a dishwasher tray in the dishwasher for holding the obstruction.

6. The tidying robotic system of claim 2, wherein the logic for the pickup strategy further includes:
an approach path to a destination for the obstruction, wherein the destination includes a handle on an access panel for accessing an interior of the destination;
an obstruction placement procedure, including:
at least one of raise and lower the capture and containment system so that the gripper arm is within reach of the handle on the access panel;
rotate and extend the gripper arm toward the handle on the access panel;
grab the handle with the gripper arm;
open the access panel of the destination using at least one of:
forward and backward motion of the robot;
extension, retraction, and rotation of the gripper arm; and
raising and lowering of the lifting column;
remove a portable bin from the destination, wherein the portable bin is configured to receive the scoop, be lifted by the scoop, and to hold obstructions, the removal of the portable bin including:
move the gripper arm and pusher pads to a position that allows the scoop to engage the portable bin;
move the scoop toward the portable bin and engage the portable bin with the scoop;
lift the portable bin and remove the portable bin from the destination by at least one of backing up the robot and retracting the scoop arm linear actuator;
tilt the scoop up and back while extending the gripper arm;
grasp the handle on the access panel with the gripper arm and push the access panel closed with the gripper arm;
transport the portable bin to a desired location;
place the portable bin on a surface at the desired location;
disengage the scoop from the portable bin by backing the robot away from the portable bin.

7. The tidying robotic system of claim 6, wherein the logic for the pickup strategy further includes:
a return approach path to the destination, for the robot carrying the portable bin;
a portable bin placement procedure, including:
at least one of raise and lower the capture and containment system so that the gripper arm is within reach of the handle on the access panel;
tilt the scoop up and back while extending the gripper arm;
rotate and extend the gripper arm toward the handle on the access panel;
grab the handle with the gripper arm;
open the access panel of the destination using at least one of:
forward and backward motion of the robot;
extension, retraction, and rotation of the gripper arm; and
raising and lowering of the lifting column;
place the portable bin into the destination, the placement of the portable bin including:
tilt the scoop to a position allowing the portable bin to enter the destination;
place the portable bin in the destination by at least one of driving the robot forward and extending the scoop arm linear actuator;
lower the scoop and rest the portable bin on a surface in the destination;
remove the scoop from inside of the destination by at least one of driving the robot backwards and retracting the scoop arm linear actuator; and
grasp the handle on the access panel with the gripper arm and push the access panel closed with the gripper arm.

8. The tidying robotic system of claim 6, wherein the logic for the pickup strategy further includes:
an approach path to an elevated surface with at least one target object, for the robot to retrieve the at least one target object;
a grabbing height for initial contact with the at least one target object;
a grabbing pattern for movement of the pusher pads while capturing the at least one target object;
a carrying position of the pusher pads and the scoop that secures the at least one target object in the containment area on the robot for transport; and
configuring the robot to:
execute the pickup strategy, including:
raise the capture and containment system, using the lifting column linear actuator, to the grabbing height of the at least one target object;
extend the pusher pads out and forward with respect to the pusher pad arms;

rotate the first pusher pad and the second pusher pad inward toward the front edge of the scoop such that an end of the first pusher pad touches the end of the second pusher pad;

retract the first pusher pad arm linear actuator and the second pusher pad arm linear actuator to move the at least one target object closer to the scoop;

execute the grabbing pattern to allow capture of the at least one target object within the containment area, the grabbing pattern including:

rotate the first pusher pad toward the at least one target object until the first pusher pad pushes the at least one target object into the containment area on the scoop;

rotate the second pusher pad toward the first pusher pad until the second pusher pad is substantially parallel to the first pusher pad; and confirm the at least one target object is within the containment area;

on condition that the at least one target object is within the containment area:

raise at least one of the scoop, the pusher pads, and the lifting column linear actuator, holding the at least one target object, to the carrying position;

on condition that the at least one target object is not within the containment area:

alter the pickup strategy with at least one of the different reinforcement learning based strategy, the different rules based strategy, and relying upon the different observations, current robot state, current object state, and sensor data; and execute the altered pickup strategy.

9. The tidying robotic system of claim 1, wherein the logic for the vacuuming strategy includes at least one of:

choose a vacuum cleaning pattern for the target cleaning area;

identify the obstructions in the target cleaning area;

determine how to handle the obstructions in the path of the robot, including at least one of:
move the obstructions; and
avoid the obstructions;

vacuum the target cleaning area if the robot has adequate battery power; and return to the base station if at least one of the robot does not have adequate battery power and the vacuuming of the target cleaning area is completed.

10. The tidying robotic system of claim 1, wherein the logic for the vacuuming strategy includes:

raise the scoop above the pusher pads, wherein the pusher pads are in contact with a surface of the target cleaning area;

rotate the pusher pads toward a center of the chassis to form an inverted wedge configuration;

execute the vacuuming strategy including a vacuum cleaning pattern for the target cleaning area;

execute the pickup strategy, wherein the pickup strategy includes:

collect heavy dirt and debris between the pusher pads in the inverted wedge configuration, from the target cleaning area;

on condition no other obstructions are encountered:
collect the heavy dirt and debris within the scoop; and
transport the collected heavy dirt and debris to a disposal location;

on condition other obstructions are encountered:
push the collected heavy dirt and debris to an intermediate location away from the other obstructions;
execute the obstruction handling strategy for the other obstructions, including removing the other obstructions from a containment area, the containment area including at least two of the pusher pad arms, the pusher pads, and the scoop;
return the pusher pads to the inverted wedge configuration;
return to the intermediate location and collect the heavy dirt and debris;
execute the vacuuming strategy for areas of the target cleaning area that have not been vacuumed;
collect the heavy dirt and debris within the scoop; and
transport the collected heavy dirt and debris to the disposal location.

* * * * *